(12) United States Patent
Ike et al.

(10) Patent No.: US 9,855,502 B2
(45) Date of Patent: Jan. 2, 2018

(54) GAMING MACHINE

(71) Applicants: UNIVERSAL ENTERTAINMENT CORPORATION, Koto-Ku, Tokyo (JP); ARUZE GAMING AMERICA, INC., Las Vegas, NV (US)

(72) Inventors: Hiroatsu Ike, Tokyo (JP); Masahide Narimatsu, Tokyo (JP); Shinya Hashizume, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 63 days.

(21) Appl. No.: 14/860,899

(22) Filed: Sep. 22, 2015

(65) Prior Publication Data

US 2016/0089607 A1    Mar. 31, 2016

(30) Foreign Application Priority Data

Sep. 25, 2014 (JP) .................. 2014-195633

(51) Int. Cl.
*A63F 9/24* (2006.01)
*A63F 13/00* (2014.01)
*G06F 17/00* (2006.01)
*G06F 19/00* (2011.01)
*A63F 13/73* (2014.01)
(Continued)

(52) U.S. Cl.
CPC .............. *A63F 13/73* (2014.09); *A63F 13/75* (2014.09); *A63F 13/90* (2014.09); *A63F 13/95* (2014.09); *G07F 17/3211* (2013.01); *G07F 17/3216* (2013.01); *G07F 17/3223* (2013.01); *G07F 17/3241* (2013.01); *G07F 17/34* (2013.01)

(58) Field of Classification Search
CPC ...... G07F 17/32; G06F 21/64; G06F 17/3211; G06F 17/3216; G06F 17/3223; G06F 17/3241; G06F 17/34; A63F 13/73; A63F 13/75; A63F 13/90; A63F 13/95
USPC .......................................................... 463/29
See application file for complete search history.

(56) References Cited

U.S. PATENT DOCUMENTS 5,643,086 A * 7/1997 Alcorn .................... G06F 21/00
                                                              463/16
7,693,282 B2   4/2010 Tanimura
(Continued)

*Primary Examiner* — Omkar Deodhar
*Assistant Examiner* — Wei Lee
(74) *Attorney, Agent, or Firm* — KMF Patent Services, PLLC; S. Peter Konzel; Kenneth M. Fagin

(57) ABSTRACT

To enable prevention of reading and running of a game program in an illegitimate storage medium, the disclosed slot machine includes: an SSD device including a flash memory configured to store a game program for running a game and an authentication program including an authentication key, which authenticates the game program; and a memory controller SD23 having a reference key corresponding to the authentication key, which is configured to control the storage area, and a CPU core, wherein the CPU core executes the steps of: (A) executing the authentication program in which the reference key is retrieved from the memory controller to determine whether the authentication key matches with the reference key, and if the authentication key matches with the reference key, the game program is authenticated by the authentication program; (B) starting a game by running the game program when the game program is authenticated in the step (A).

4 Claims, 163 Drawing Sheets

(51) Int. Cl.
*A63F 13/95* (2014.01)
*A63F 13/90* (2014.01)
*A63F 13/75* (2014.01)
*G07F 17/32* (2006.01)
*G07F 17/34* (2006.01)

(56) References Cited

U.S. PATENT DOCUMENTS

| 8,078,540 B2 | 12/2011 | Tanimura | |
|---|---|---|---|
| 2005/0009599 A1* | 1/2005 | Ryan | G06F 21/57 463/29 |
| 2010/0178977 A1* | 7/2010 | Kim | G06F 21/51 463/25 |

* cited by examiner

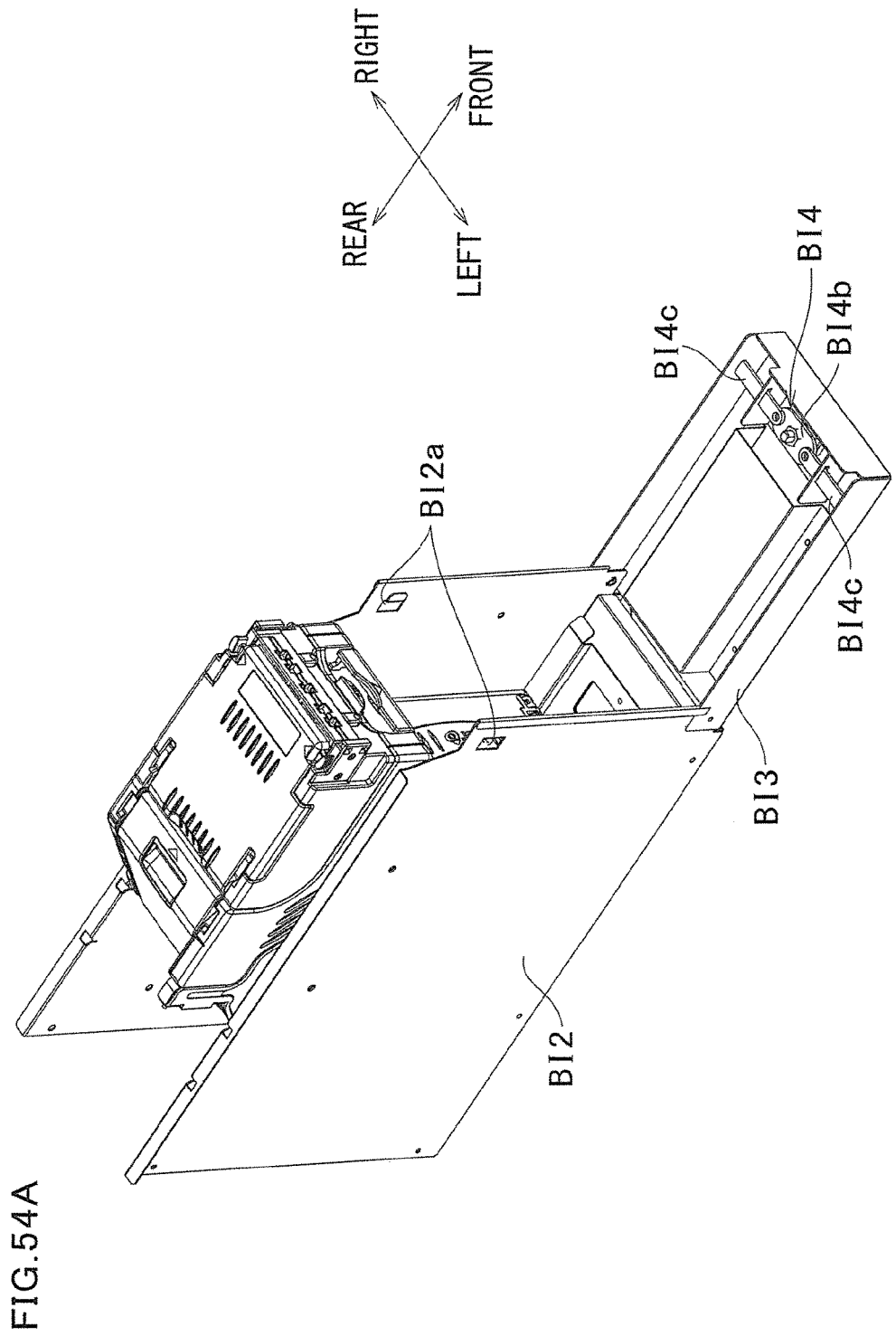

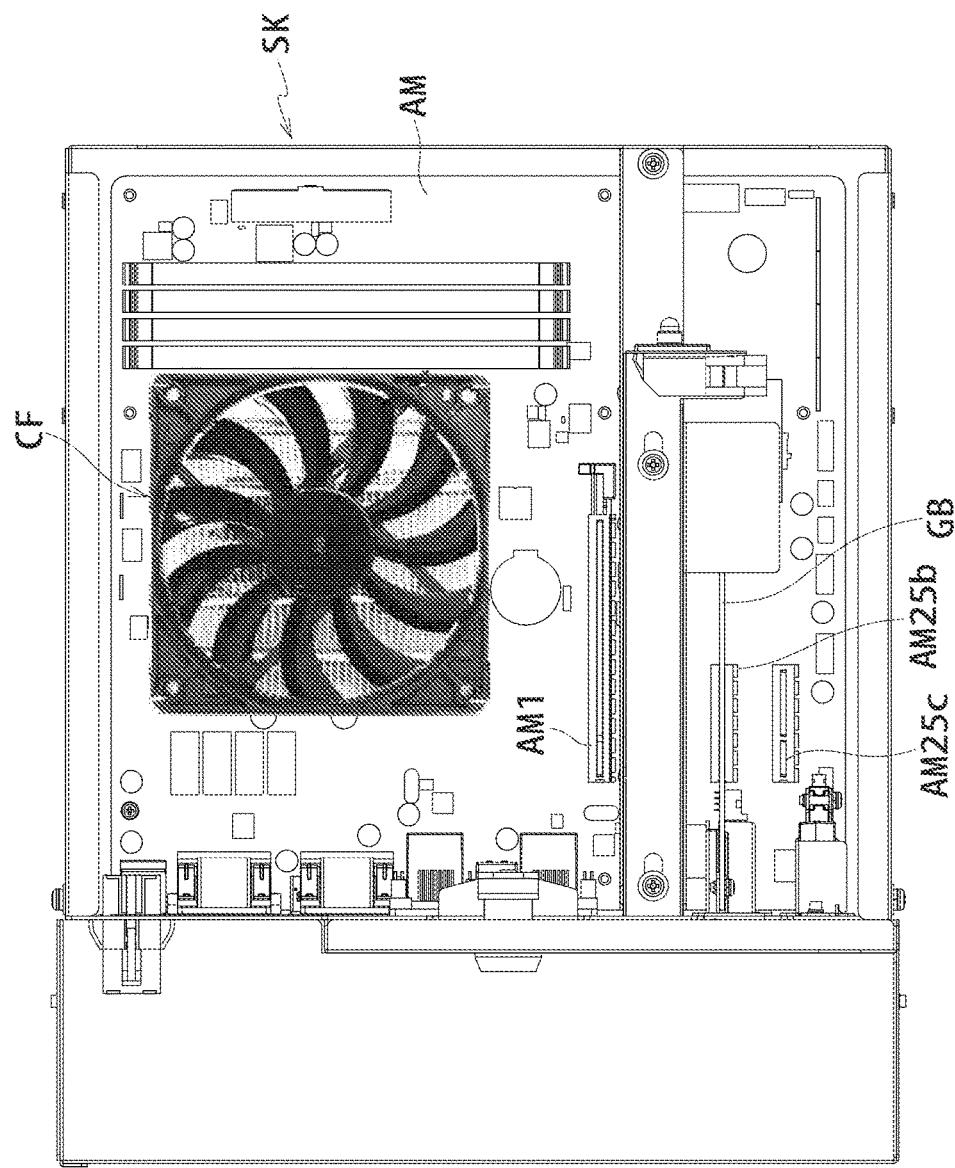

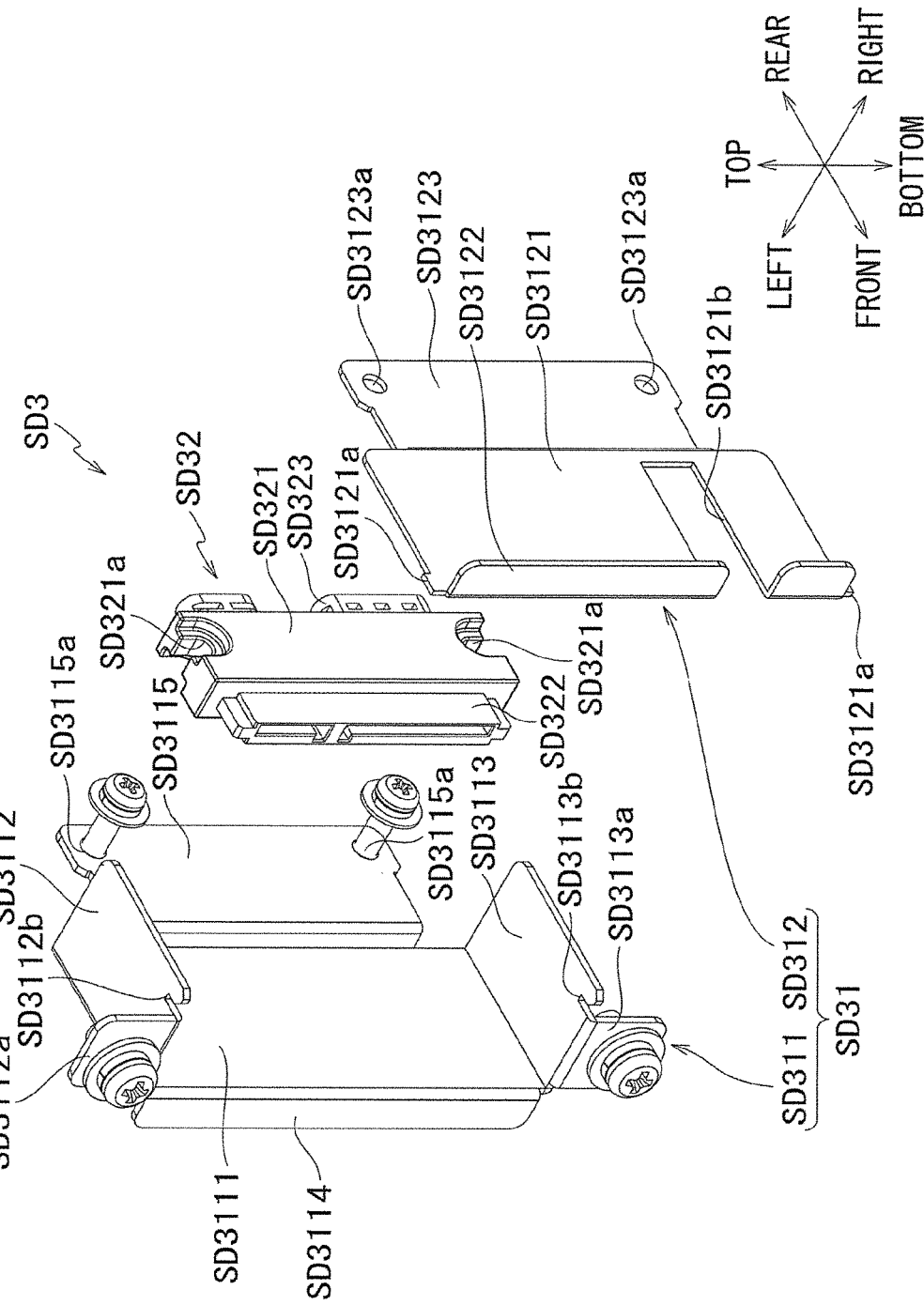

FIG.103B

SPECIFICATION FOR EACH REGION

| AREA | FILE SYSTEM | DESCRIPTION | START ADDRESS (LBA) | TERMINAL REGION NOT IN USE |
|---|---|---|---|---|
| BOOT RECORD | N/A | STRUCTURE OF MBR (MASTER BOOT RECORD) IN GENERAL | 0X00000000 | ZERO FILLED |
| FIRST PARTITION | SQUASHFS | OPERATION SYSTEM | 0X00000800 | ZERO FILLED |
| SECOND PARTITION | EXT4 | BASE CODE | 0X00200800 | N/A |
| THIRD PARTITION | EXT4 | GAME CODE | 0X002FA800 | N/A |

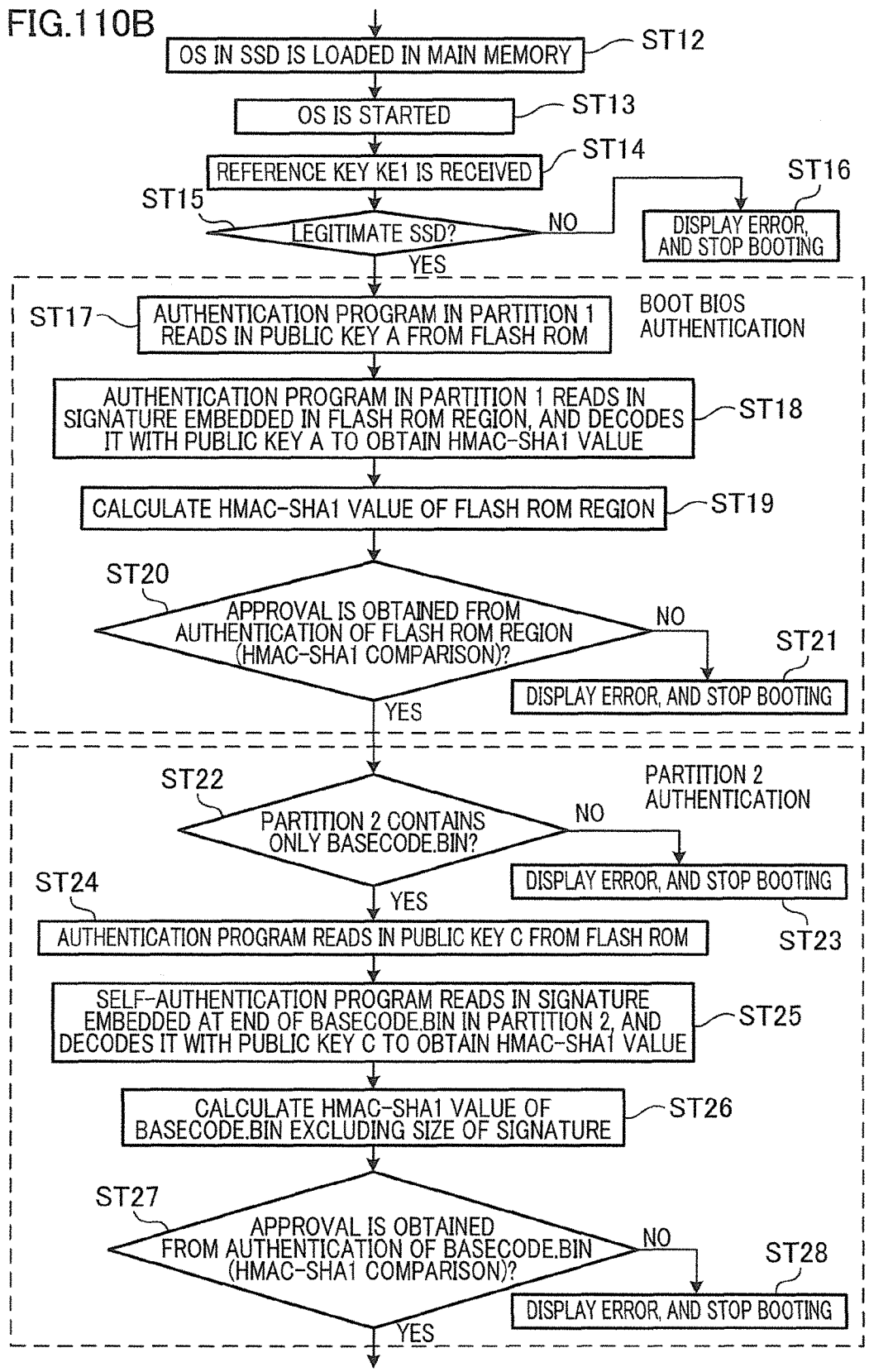

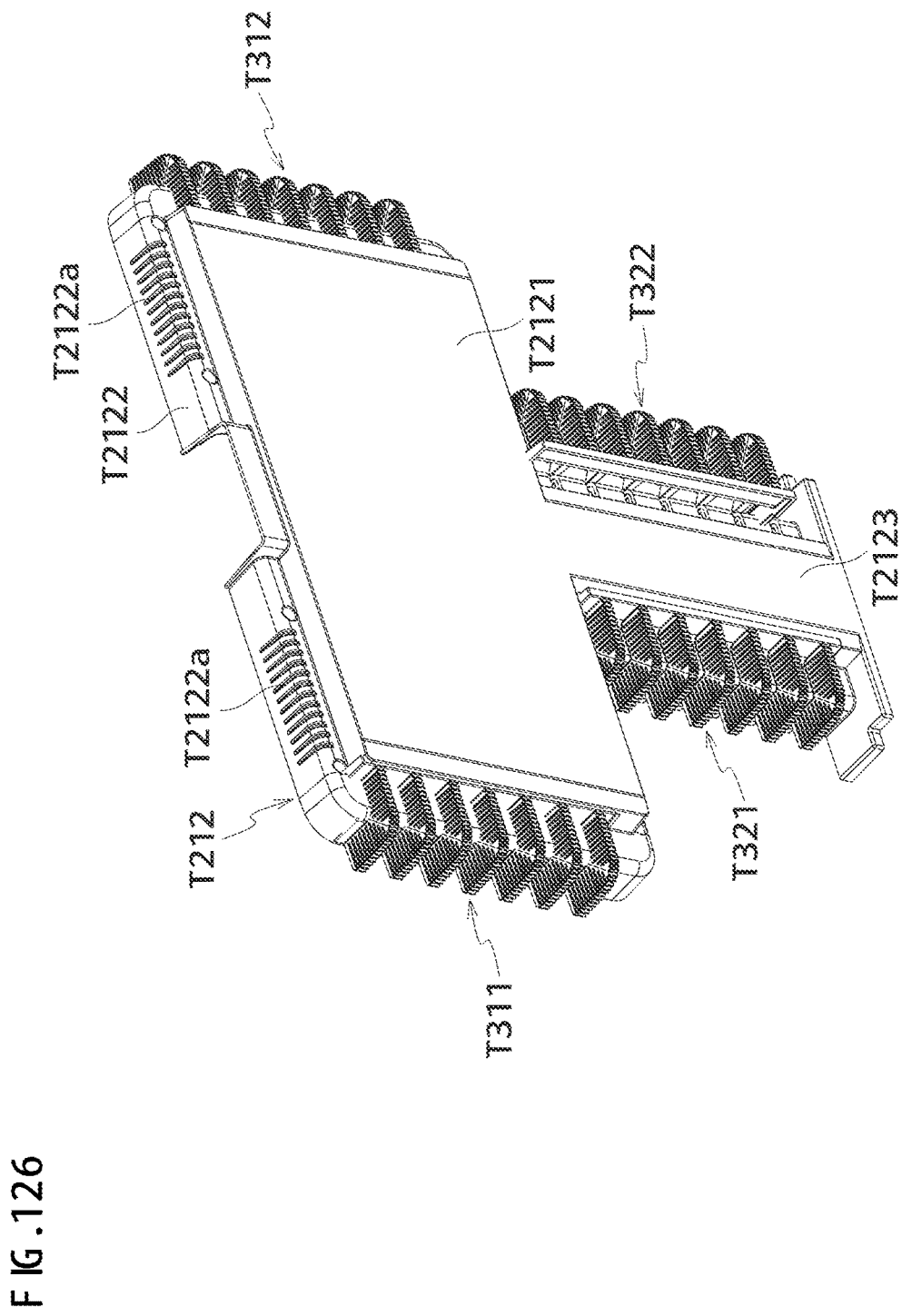
F I G. 126

GAMING MACHINE

CROSS REFERENCE TO RELATED APPLICATION

The present application claims priority from Japanese Patent Application No. 2014-195633 filed on Sep. 25, 2014, the disclosures of which are herein incorporated by reference in its entirety.

BACKGROUND OF THE INVENTION

1. Field of the Invention

The present invention relates to a gaming machine having a storage medium storing a game program, which is configured to perform authentication process to the storage medium.

2. Background Art

Traditionally, there has been known a gaming machine configured to perform game related operations (gaming process, game display process and the like) by reading and executing a game program from a storage medium storing the game program, as described in the specifications of publications of U.S. Pat. No. 7,693,282 and U.S. Pat. No. 8,078,540. In such a traditional gaming machine, in order to prevent a modified game program from being read from a storage medium and run, an authentication program is executed at the time of reading the game program from the storage medium to authenticate the game program, thereby reading the game program after confirmation of no modification to the game program.

SUMMARY OF THE INVENTION

Technical Problem

The above-described traditional gaming machine performs authentication of a game program. However, when a storage medium is not legitimate medium and is a pirated medium and the like, such an authentication alone could not prevent the game program in the illegitimate storage medium from being read and run.

In view of the above problem, it is an object of the present invention to prevent reading and running of a game program in an illegitimate storage medium.

Technical Solution (1) A gaming machine related to the present invention comprises: a storage medium including a storage area configured to store a game program for running a game and an authentication program including an authentication key, which authenticates the game program; and a storage area control component having a reference key corresponding to the authentication key, which is configured to control the storage area, and a control unit configured to execute the following steps of (A) executing the authentication program in which the reference key is retrieved from the storage area control component to determine whether or not the authentication key and the reference key match with each other, and if the authentication key and the reference key match with each other, authentication of the game program by the authentication program is executed; (B) starting a game by running the game program when the authentication of the game program in the step (A) is successful.

With the above-described structure, the reference key is stored, for example, by the time of shipping, in the storage area control component of the storage medium. Further, the authentication key corresponding to the reference key is contained in the authentication program stored in the storage area of the storage medium. In authentication of the storage medium, the storage medium is approved when the reference key and the authentication key matches with each other. When the storage medium is approved, the game program is authenticated. The game program is run only when the game program is approved. The reference key is stored in the storage area control component. Thus, when data in the storage medium is copied to another storage medium, the data in the storage area is copied; however, copying the data in the storage area control component is difficult as it requires a use of the storage area control component. Therefore, when a person illegitimately copies the data (e.g., game program and authentication program) in the storage medium to another storage medium for illegitimate use, the other device will contain therein a copy of the authentication program and a reference key which is originally stored (e.g. by the time of shipping) in the other storage medium. In this case, the reference key and the authentication key in the authentication program mismatch with each other, as such. Therefore, with the above structure, it is possible to accurately disapprove the other storage medium to which the data in the storage medium is illegitimately copied, and prevent reading and running of the game program in an illegitimate storage medium (e.g. pirated storage medium).

(2) Further, the gaming machine further comprises a storage unit storing a public key for decrypting predetermined encrypted data, wherein the storage area stores encrypted data which is the predetermined encrypted data, the control unit, prior to executing the steps (A) and (B), executes the following steps of (C) to (F) to perform authentication process to the storage area, and proceeds to the step (A) when the storage area is approved, the step (C) being a step of decrypting the encrypted data with the public key to obtain decrypted data; the step (D) being a step of obtaining reference data corresponding to the encrypted data, which is calculated based on the storage area of the gaming machine; the step (E) being a step of determining whether or not the decrypted data and the reference data respectively obtained in the steps of (C) and (D) match with each other, the step (F) being a step of determining that the storage area is approved when the decrypted data and the reference data are determined as to match with each other in the step (E).

In the above structure, the public key is used to decrypt the encrypted data in the storage area of the storage medium thereby obtaining decrypted data, and the reference data corresponding to the encrypted data is calculated based on the storage area of the gaming machine. Then, whether or not the decrypted data and the reference data match with each other is determined. When it is determined that these sets of data match with each other, the above steps (A) and (B) are executed. As described, the authentication program is authenticated before executing the authentication program, and when the authentication program is not modified, the game program is executed. This prevents reading and running of an illegitimate game program.

(3) The reference key may indicate unique identification information of the storage medium.

This way, when the authentication program in the storage medium is copied to another storage medium, the reference key which has been already stored for example by the time of shipping in the storage area control component of the other storage medium does not match with the authentication key in the copied authentication program. With this, it is possible to more accurately disapprove the other storage medium to which the data in the storage medium is illegitimately copied.

(4) The control unit may execute the step (A) when booting its own device, and may stop the booting process when the authentication key and the reference key are determined as not to match with each other.

In the above structure, the step (A) is performed in the booting process, and the booting process is stopped when the authentication key and the reference key are determined as not to match with each other. Therefore, it is possible to effectively prevent a game program in the storage medium from being loaded to the gaming machine and run.

(5) The storage area and the storage area control component may be attached to a gaming cassette board provided to the storage medium, the control unit may be attached to a gaming board, and the gaming cassette board may be detachable from the gaming board.

In the above structure, the gaming cassette board is detachable with respect to the gaming board. This facilitates mounting of the storage medium to the gaming machine. Moreover, by means of determining whether the authentication key and the reference key match with each other, it is possible to prevent reading a game program from an illegitimate storage medium.

(6) The storage medium may be an SSD.

The above structure enables fast reading and writing. Further, the structure retains resistance to impact.

Advantageous Effects

The present invention enables prevention of reading and running of a game program in an illegitimate storage medium.

BRIEF DESCRIPTION OF THE DRAWINGS

FIG. 54A is a perspective view of the bill stocker case.

FIG. 74B is an explanatory diagram of the security cage.

FIG. 89 is an exploded perspective view of the SSD mounting device.

FIG. 103B is an explanatory diagram showing data arrangement of the SSD substrate.

FIG. 110B is a flowchart of the boot sequence.

FIG. 126 is a perspective view of the topper rear cover, an upper rear illumination member, and a lower rear illumination member.

DESCRIPTION OF THE PREFERRED EMBODIMENTS

Embodiment 1

Figure 1:
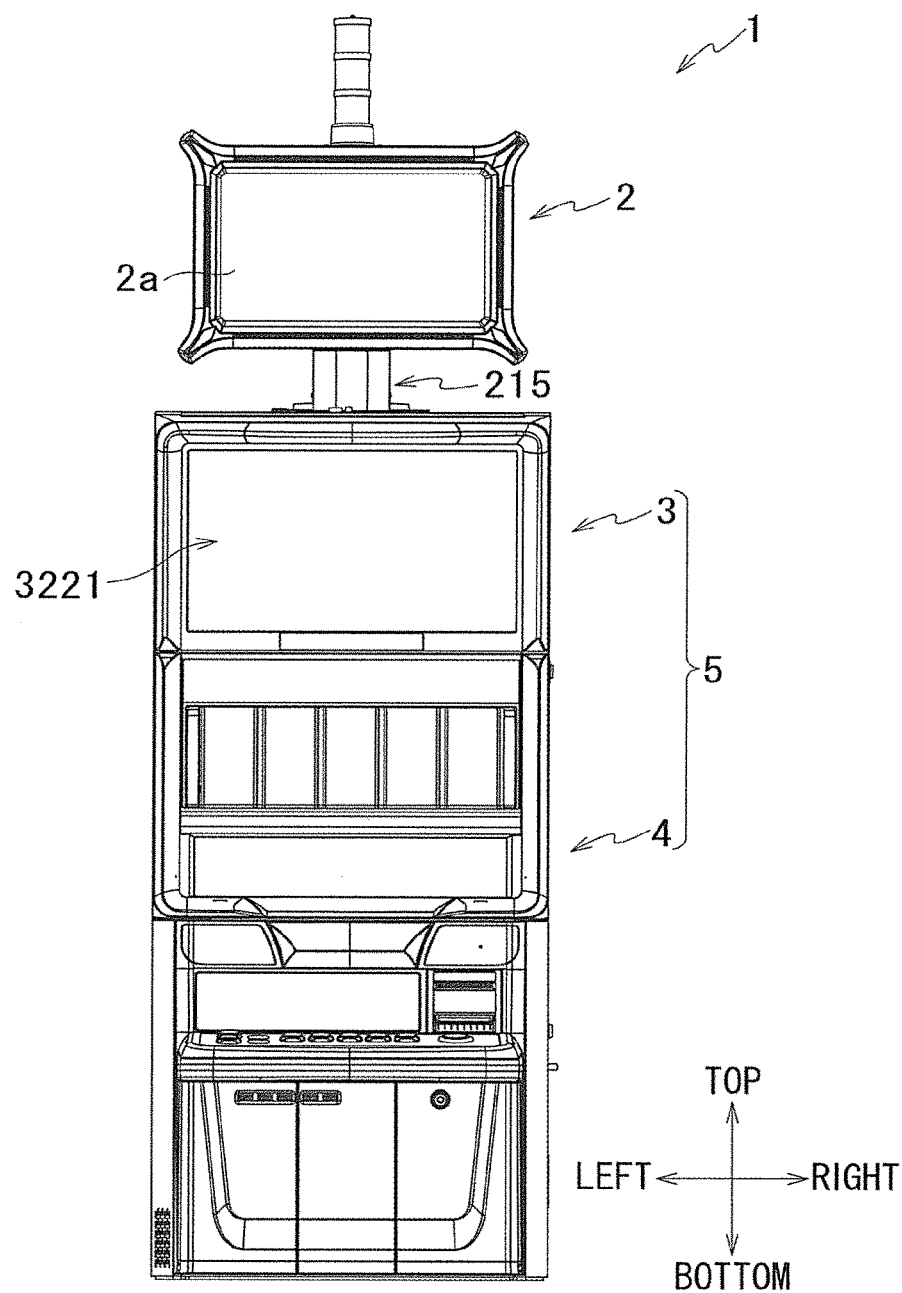
FIG. 1 is a front view of a slot machine.

The following describes a gaming machine of the present invention with reference to attached drawings. Note that Embodiment 1 deals with a case where the gaming machine is a single slot machine 1.

Overview of the Invention

A slot machine 1 (FIG. 1) of the present embodiment includes: an SSD device SD1 (FIG. 109B) including a flash memory SD22 configured to store a game program PR2 ("Game.bin" of FIG. 109A) for running a game and an authentication program PR1 (FIG. 109A) including an authentication key KE2, which authenticates the game program PR2; and a memory controller SD23 (FIG. 109B) having a reference key KE1 (FIG. 109B) corresponding to the authentication key KE2, which is configured to control the storage area, and a CPU cores AM103a to AM103d (FIG. 100B) configured to execute the following steps of (A) and (B). Namely, the CPU cores AM103a to AM103d (FIG. 100B) executes (A) executing the authentication program in which the reference key KE1 is retrieved from the memory controller SD23 to determine whether or not the authentication key KE2 and the reference key KE1 match with each other, and if the authentication key KE2 and the reference key KE1 match with each other, authentication of the game program PR2 by the authentication program PR1 is executed; (B) starting a game by running the game program PR2 when the authentication of the game program PR2 in the step (A) is successful.

With the above-described structure, the reference key KE1 is stored, for example, by the time of shipping, in the memory controller SD23 of the SSD device SD1. Further, the authentication key KE2 corresponding to the reference key KE1 is contained in the authentication program PR1 stored in the flash memory SD22 of the SSD device SD1. In authentication of the SSD device SD1, the SSD device SD1 is approved when the reference key KE1 and the authentication key KE2 match with each other. When the SSD device SD1 is approved, the game program PR2 is authenticated. The game program PR2 is run only when the game program PR2 is approved. With the above-described structure, for example, the SSD device SD1 stores the reference key KE1 in the memory controller SD23 when being shipped. Thus, when data in the SSD device SD1 is copied to another SSD device SD1, the data in the flash memory SD22 is copied; however, copying the data in the memory controller SD23 is difficult as it requires a use of the memory controller SD23. Therefore, when a person illegitimately copies the data (e.g., game program and authentication program) in the SSD device SD1 to another SSD device SD1 for illegitimate use, the other device will contain therein a copy of the authentication program PR1 and a reference key KE1 which is originally stored (e.g. by the time of its shipment) in the other SSD device SD1. The reference key is information unique to the SSD device SD1, such as a serial number and the like given to the SSD device SD1. In this case, the reference key and the authentication key KE2 contained in the authentication program PR1 do not match with each other. Therefore, with the above structure, it is possible to accurately disapprove the other SSD device SD1 to which the data in the SSD device SD1 is illegitimately copied, and prevent reading and running of the game program PR2 in an illegitimate SSD device SD1 (e.g. pirated storage medium).

It should be noted that, in the present embodiment, a reference key storage unit SD 231 and a reference key control unit SD232 are unitized and are hardly separable in the memory controller SD23. This way, attaching only the reference key storage unit SD 231 to another SSD device SD1 is prevented.

(2) Further, the slot machine 1 further includes a storage unit (Flash ROM in FIG. 108) storing a public key (public key B in FIG. 108) for decrypting predetermined encrypted data. The flash memory SD22 stores encrypted data (signature of boot record in FIG. 109A) which is the predetermined encrypted data. The CPU cores AM103a to AM103d, prior to executing the steps (A) and (B), executes the following steps of (C) to (F) to perform authentication process to the storage area, and proceeds to the step (A) when the storage area is approved, To be more specific, the CPU cores AM103*a* to AM103*d* executes the step (C) which is a step of decrypting the encrypted data with the public key B to obtain decrypted data; the step (D) which is a step of obtaining reference data (HIMAC-SHA1 value) corresponding to the encrypted data (signature of boot record in FIG. 109A), which is calculated based on a data region of partition 1 (FIG. 109A) in the flash memory SD22 of the slot machine 1; the step (E) which is a step of determining whether or not the decrypted data (HMAC-SHA1 value obtained by decrypting the signature of boot record in FIG. 109A) and the reference data (HIMAC-SHA1 value calculated based on the data region of the partition 1 indicated in FIG. 109A) respectively obtained in the steps of (C) and (D) match with each other, the step (F) which is a step of determining that the flash memory SD22 is approved when the decrypted data (decrypted data of the signature of boot record in FIG. 109A) and the reference data (HIMAC-SHA1 value calculated based on the data region of the partition 1 indicated in FIG. 109A) are determined as to match with each other in the step (E).

In the above structure, the public key B is used to decrypt the encrypted data (decrypted data of the signature of boot record in FIG. 109A) in the flash memory SD22 of the SSD device SD1 thereby obtaining decrypted data, and the reference data (HIMAC-SHA1 value) corresponding to the encrypted data is calculated based on the flash memory SD22 of the slot machine 1. Then whether or not the decrypted data (HMAC-SHA1 value obtained by decrypting the signature of boot record in FIG. 109A) and the reference data (HIMAC-SHA1 value calculated based on the data region of the partition 1 indicated in FIG. 109A) match with each other is determined. When these sets of data are determined as to match with each other, the steps (A) and (B) are executed. As described, the authentication program PR1 is authenticated before executing the authentication program PR1, and when the authentication program PR1 is not modified, the game program PR1 is executed. This prevents reading and running of an illegitimate game program PR1.

(3) The reference key KE1 may indicate unique identification information of the SSD device SD1.

This way, when the authentication program PR1 in the SSD device SD1 is copied to another SSD device SD1, the reference key KE1 which has been already stored, for example, by the time of shipping, in the CPU cores AM103*a* to AM103*d* in the Flash memory SD22 of the other SSD device SD1 does not match with the authentication key KE2 in the copied authentication program PR1. With this, it is possible to more accurately disapprove the other SSD device SD1 to which the data in the SSD device SD1 is illegitimately copied.

(4) The CPU cores AM103*a* to AM103*d* may execute the step (A) when booting its own device, and may stop the booting process when the authentication key KE2 and the reference key KE1 are determined as not to match with each other in the step (A).

In the above structure, the step (A) is performed in the booting process, and the booting process is stopped when the authentication key KE2 and the reference key KE1 are determined as not to match with each other. Therefore, it is possible to effectively prevent a game program in the SSD device SD1 from being loaded to the slot machine 1 and run.

(5) The flash memory SD22 and the memory controller SD23 may be attached to a gaming cassette board (SSD substrate SD2 in FIG. 88A and FIG. 97A) provided to the SSD device SD1, the CPU cores AM103*a* to AM103*d* may be attached to a gaming board (APX motherboard AM in FIG. 100B and FIG. 97A), and the gaming cassette board may be detachable from the gaming board.

Figure 97A:
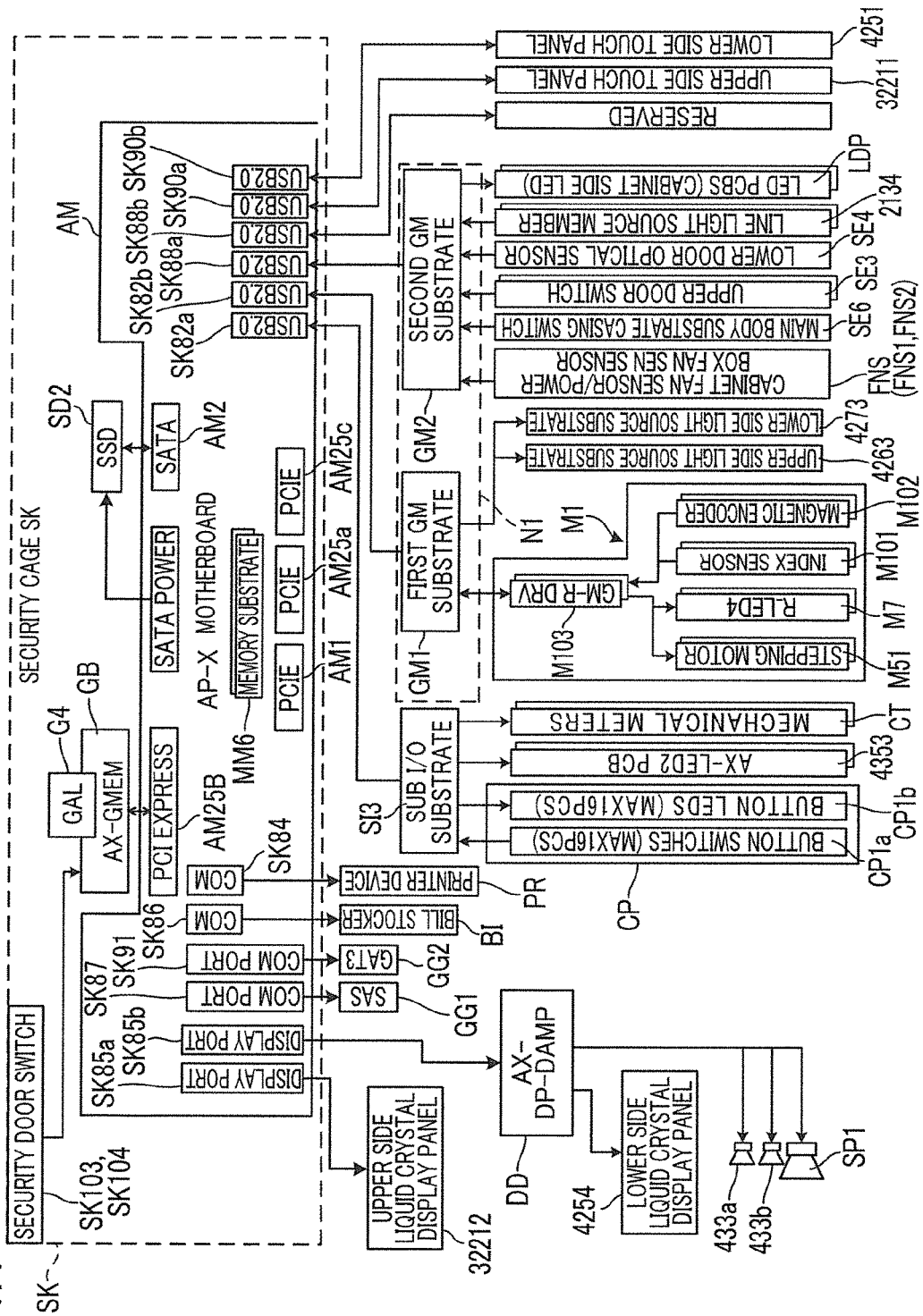
FIG. 97A is a block diagram showing a circuit structure of the slot machine.
Figure 100A:
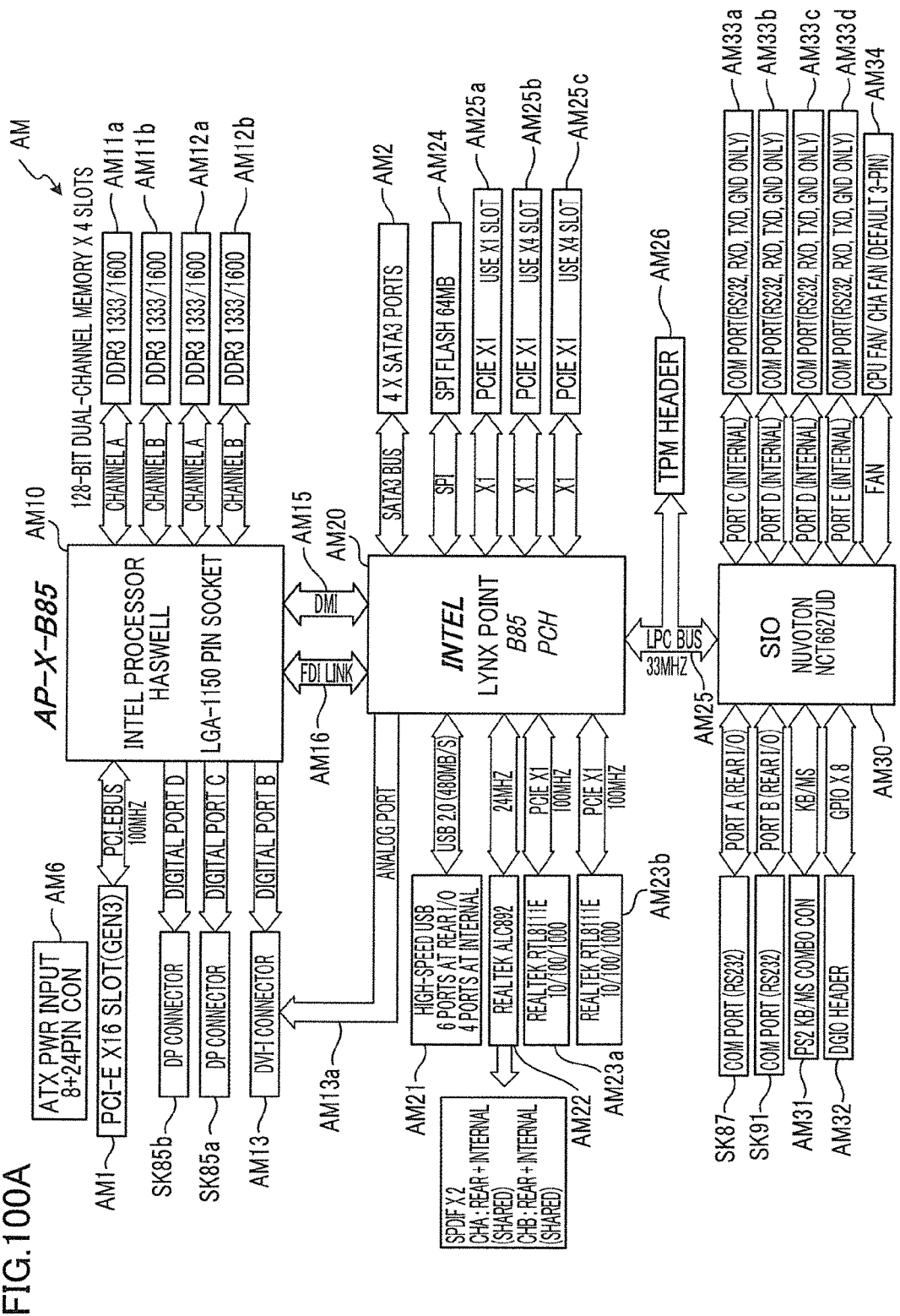
FIG. 100A is a block diagram showing a circuit structure of the APX motherboard.
Figure 100B:
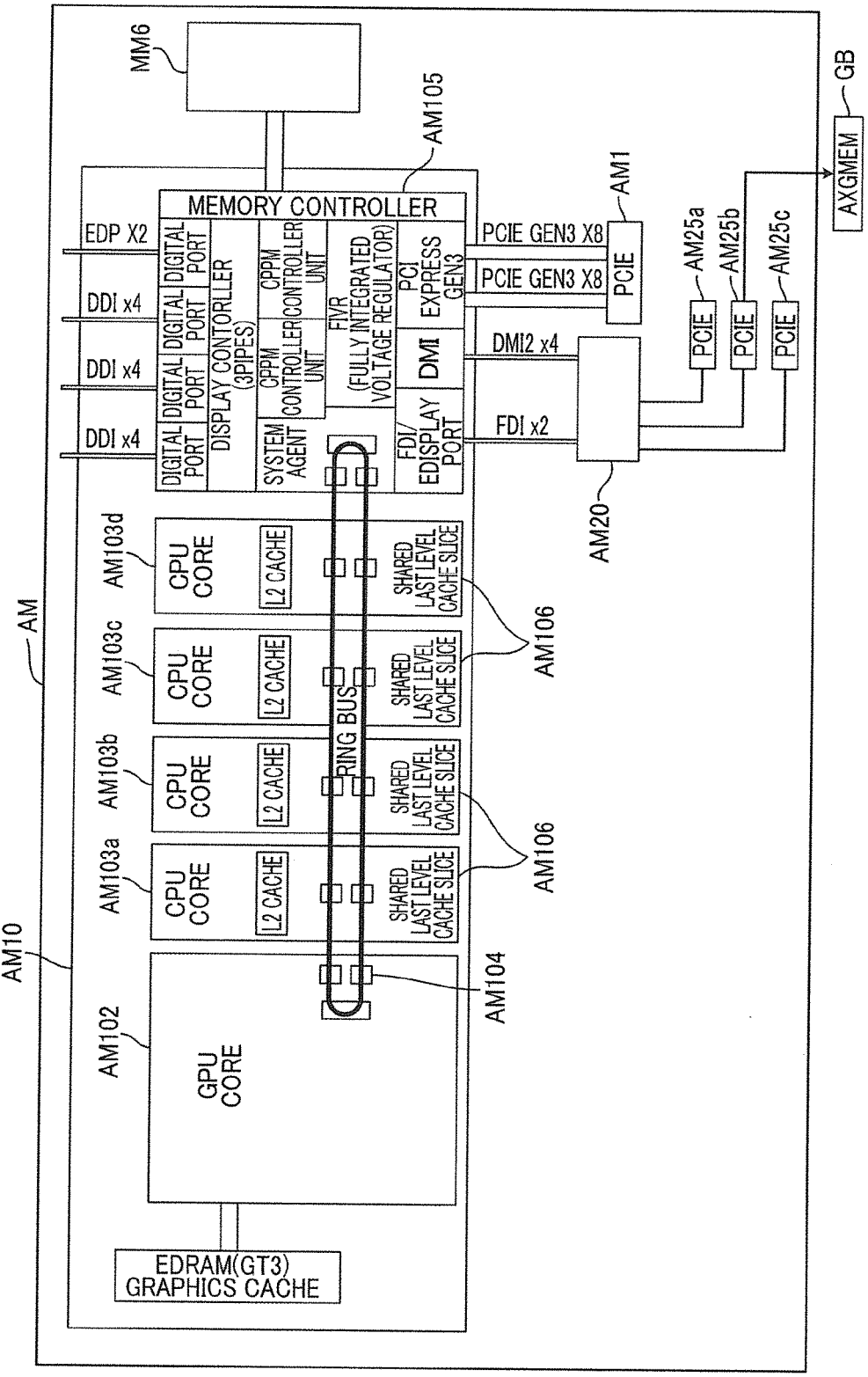
FIG. 100B is a block diagram showing the circuit structure of the APX motherboard.

In the above structure, the gaming cassette board (SSD substrate SD2 in FIG. 88A and FIG. 97A) is detachable with respect to the gaming board (APX motherboard AM in FIG. 100B and FIG. 97A). This facilitates mounting of the SSD device SD1 to the slot machine 1. Moreover, by means of determining whether the authentication key KE2 and the reference key KE1 match with each other, it is possible to prevent reading a game program from an illegitimate SSD device SD1.

(Overall Structure of Slot Machine 1)

Figure 4:
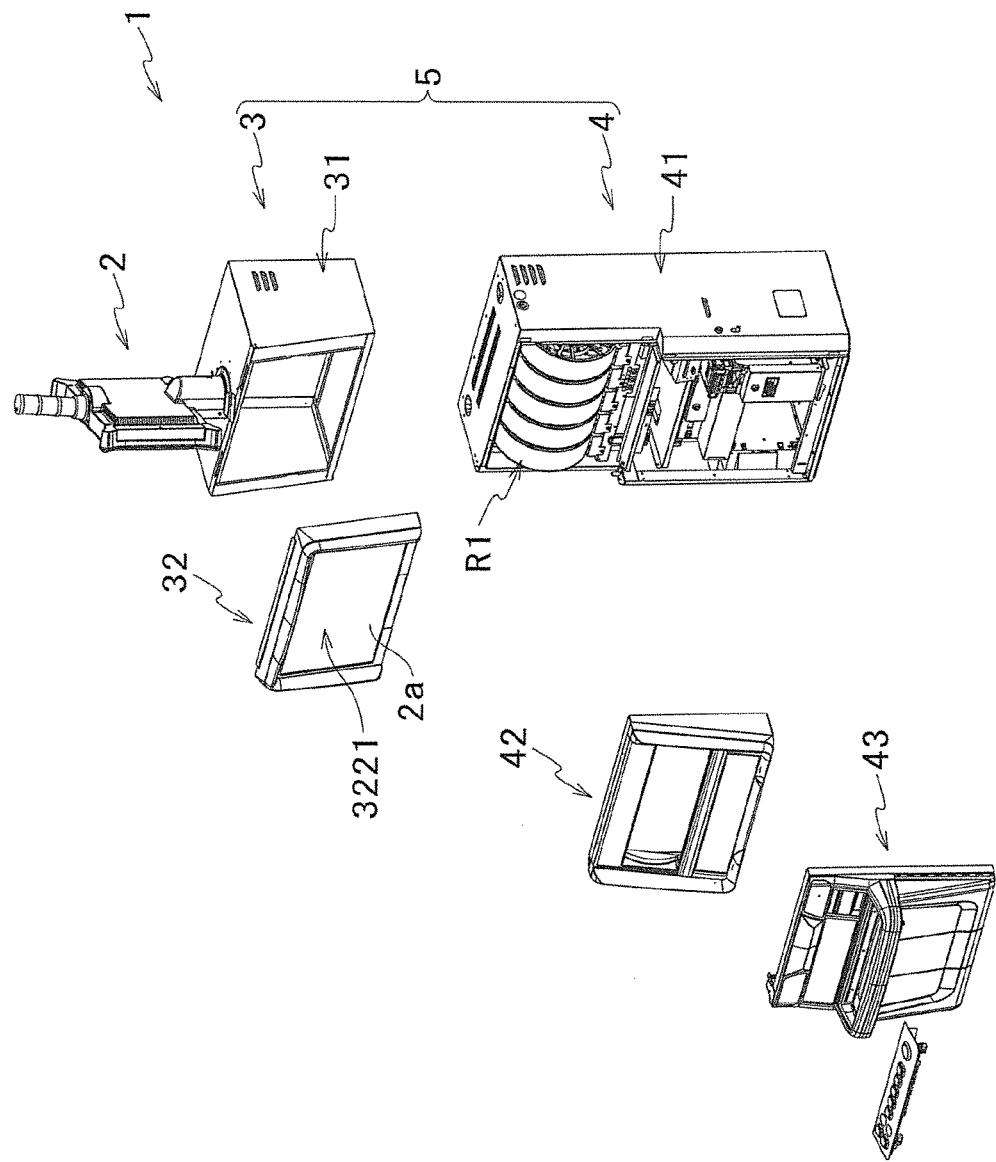
FIG. 4 is an exploded perspective view of the slot machine.

As shown in FIG. 1 and FIG. 4, the slot machine 1 serving as the gaming machine includes: a topper device 2, and a gaming machine main body 5 having the topper device 2 on its top wall. The gaming machine main body 5 includes: a top device 3 having a liquid crystal display device 3221, and a device main body 4 having the top device 3 on its top wall. The topper device 2 makes the slot machine 1 noticeable from a distant position, while enabling the game on the slot machine 1 visible from the distant position. The top device 3 is configured to display game-related information such as specific content of the game, a payout table, and rules. The device main body 4 has a function of running a game.

In the description below, a side (direction) from the slot machine 1 towards a player is referred to as the front side (forward direction) of the slot machine 1. The opposite to the front side is referred to as back side (backward direction, depth direction). The player's left and right sides are referred to as the right side (rightward) and the left side (leftward) of the slot machine 1, respectively. Further, the directions towards the front side and the back sides are collectively referred to as forward/backward direction or thickness direction. The directions towards the left side and the right sides are collectively referred to as left/right direction or width direction. Further, directions perpendicular to the forward/backward direction (thickness direction) and the left/right direction (width direction) are collectively referred as vertical direction or height direction.

(Outline of Topper Device 2)

Figure 2:
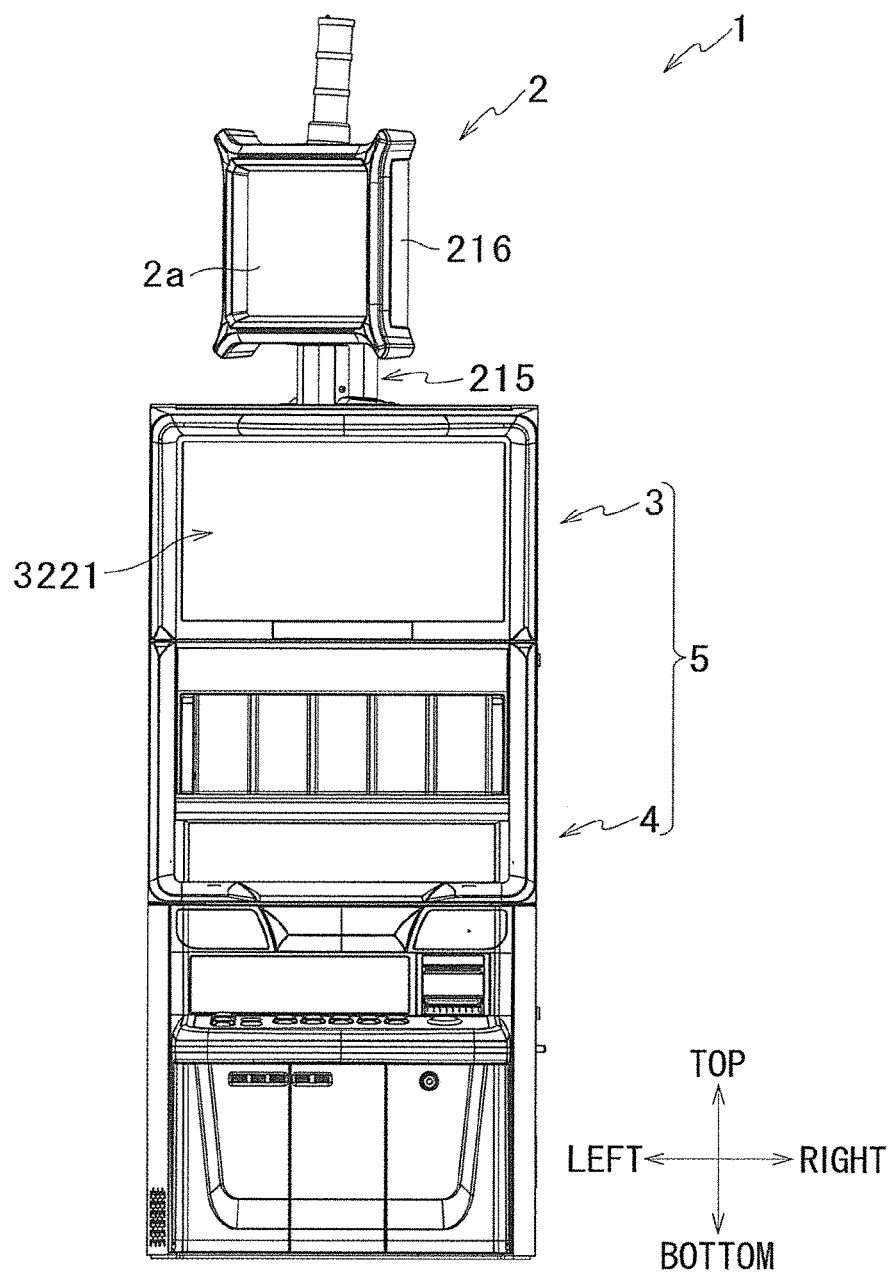
FIG. 2 is a front view of the slot machine.
Figure 3:
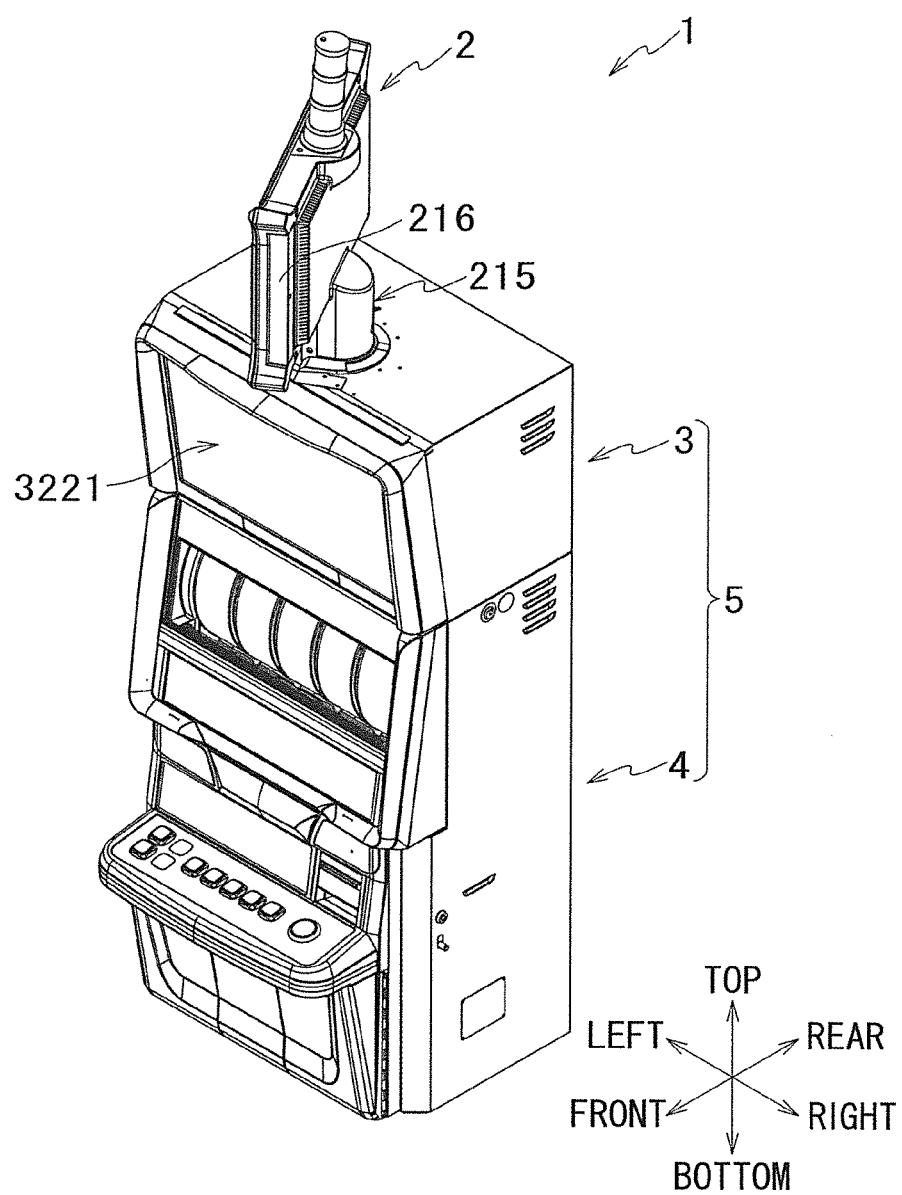
FIG. 3 is a perspective view of the slot machine.

The topper device 2 is provided on the top wall of the top device 3 so as to be in the highest position of the slot machine 1. The topper device 2 has a rotation axis corresponding to the vertical direction of the slot machine 1, and is capable of rotating, within a predetermined angle range, in the normal direction and the reverse direction about this rotation axis. This way, the topper device 2 is capable of switching its posture between a front-facing posture in which the display surface 2*a* displaying the game content faces the front side and a tilted posture in which the display surface 2*a* faces diagonally front side (see FIG. 2 and FIG. 3). The front-facing posture is a posture adopted in a normal state, such as when the game is running or during the standby state. This is for enabling a person (players, gaming facility staff, and the like) far apart from the slot machine 1 to visually confirm the game content. The tilted posture on the other hand is a posture adopted when displayed content of the topper device 2 is changed. As shown in FIG. 2 and FIG. 3, when taking the tilted posture, a side plate cover 216 (replacement mechanism) disposed at the right side end portion of the topper device 2 is positioned on the front side.

This enables changing of the displayed content of the topper device 2 from the front side of the slot machine 1.

(Detailed Structure of Topper Device 2)

Figure 5:
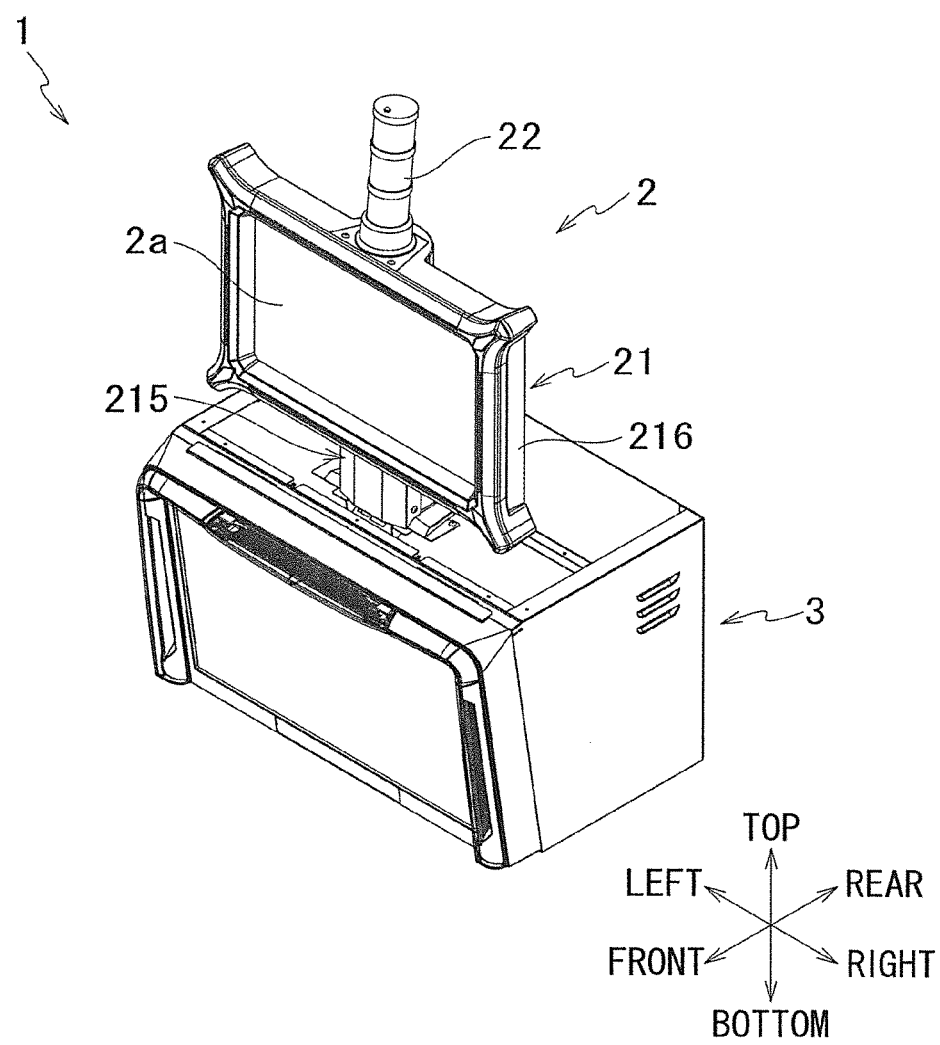
FIG. 5 is a perspective view of a topper device.
Figure 6:
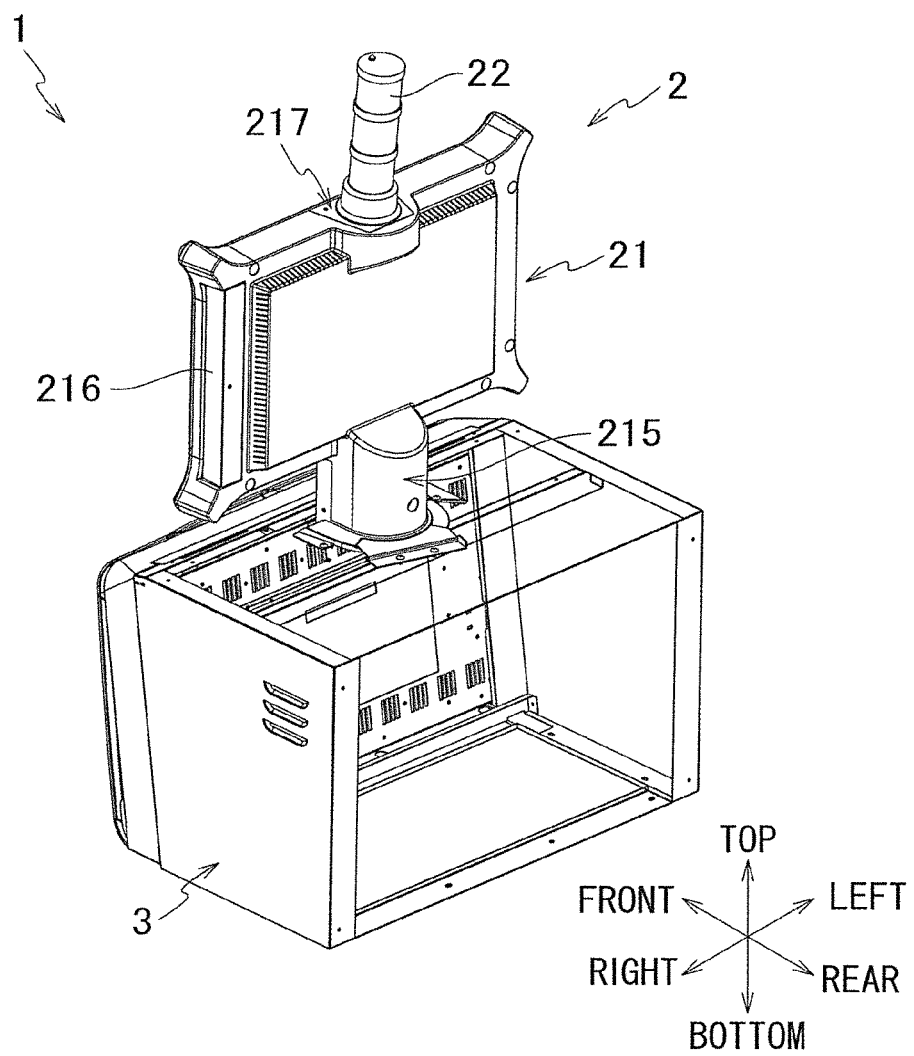
FIG. 6 is a perspective view of the topper device.

As shown in FIG. 5 and FIG. 6, the topper device 2 has a topper main body 21 having the display surface 2a, and a tower member 22 provided on the top wall of the topper main body 21. The tower member 22 has a cylindrical cover made of a transparent resin, and has therein a light emitting device such as LED. At the uppermost part of the slot machine 1, the tower member 22 lights in a single color or in a plurality of colors, thereby improving the visibility of the slot machine 1 from a distant position.

Figure 7:
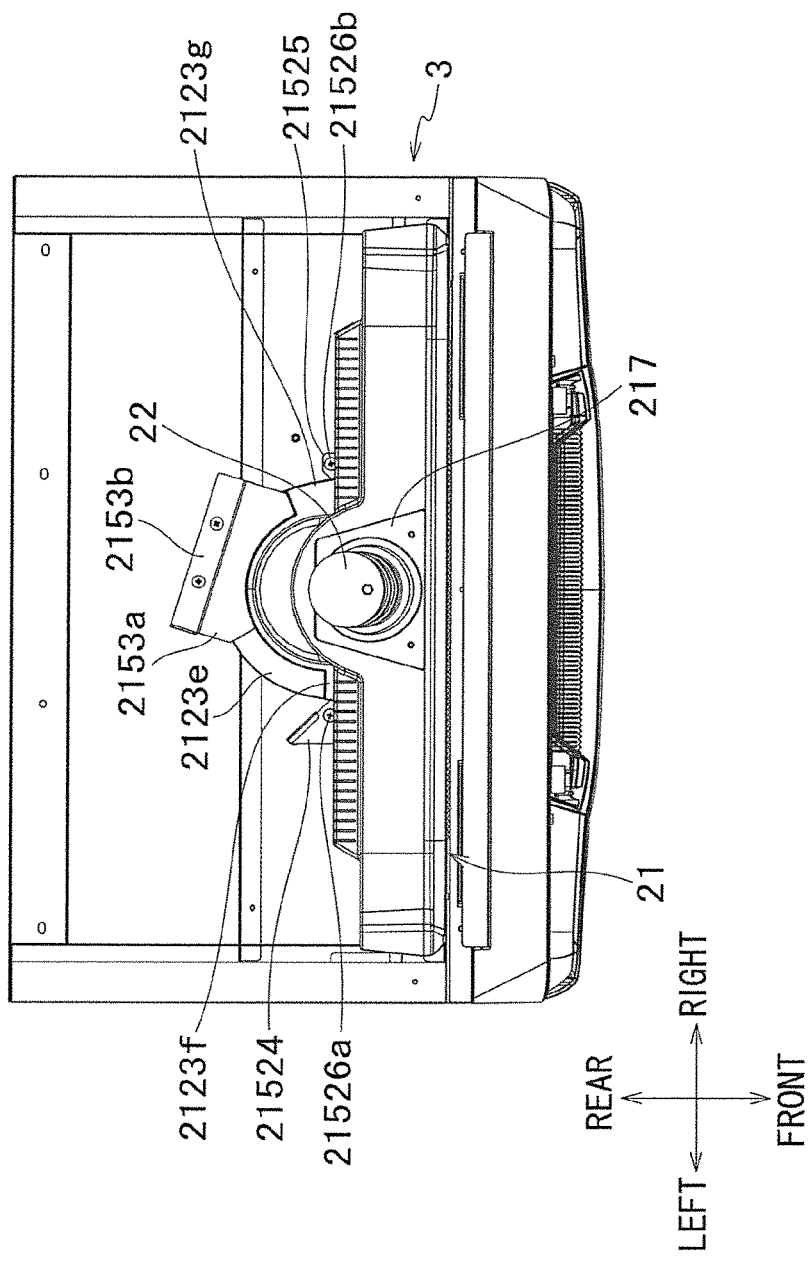
FIG. 7 is a plan view of the topper device.
Figure 8:
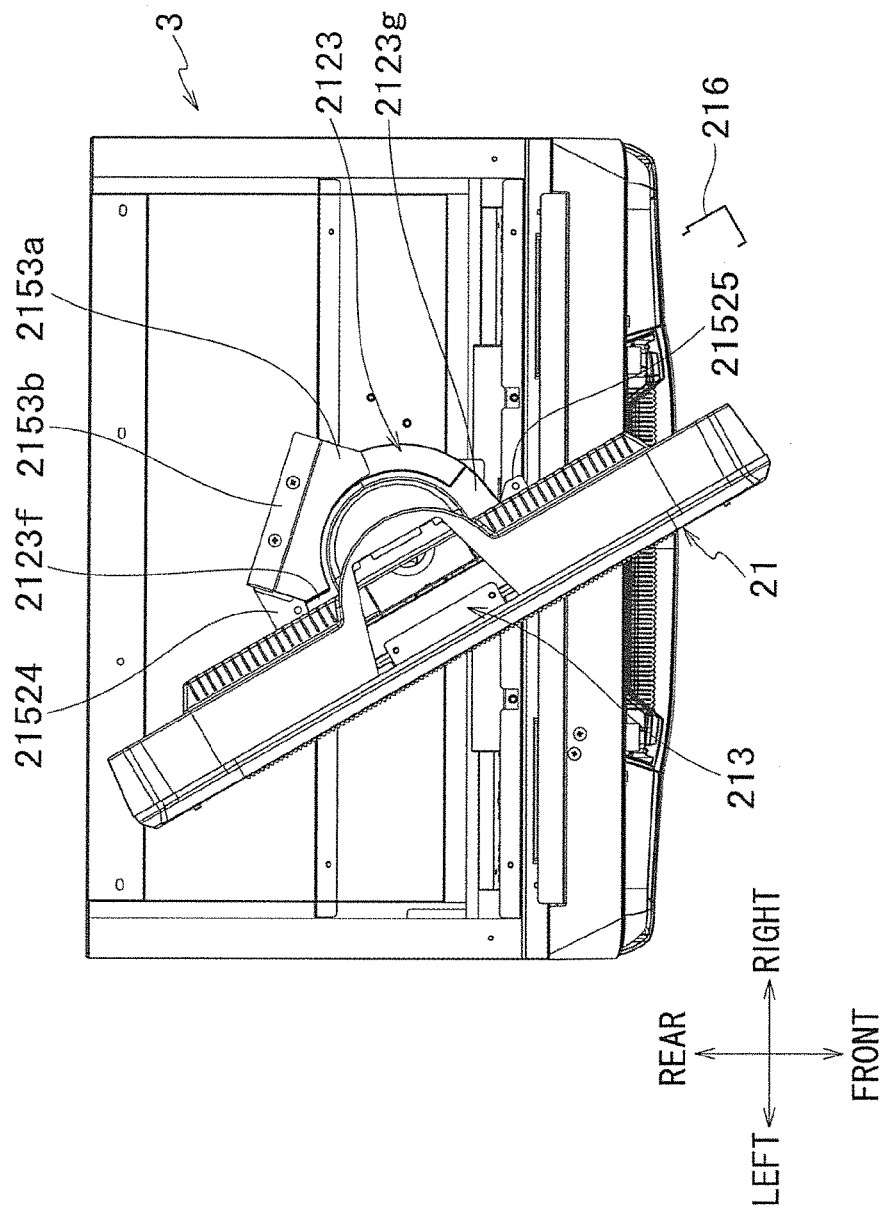
FIG. 8 is a plan view of the topper device.
Figure 10:
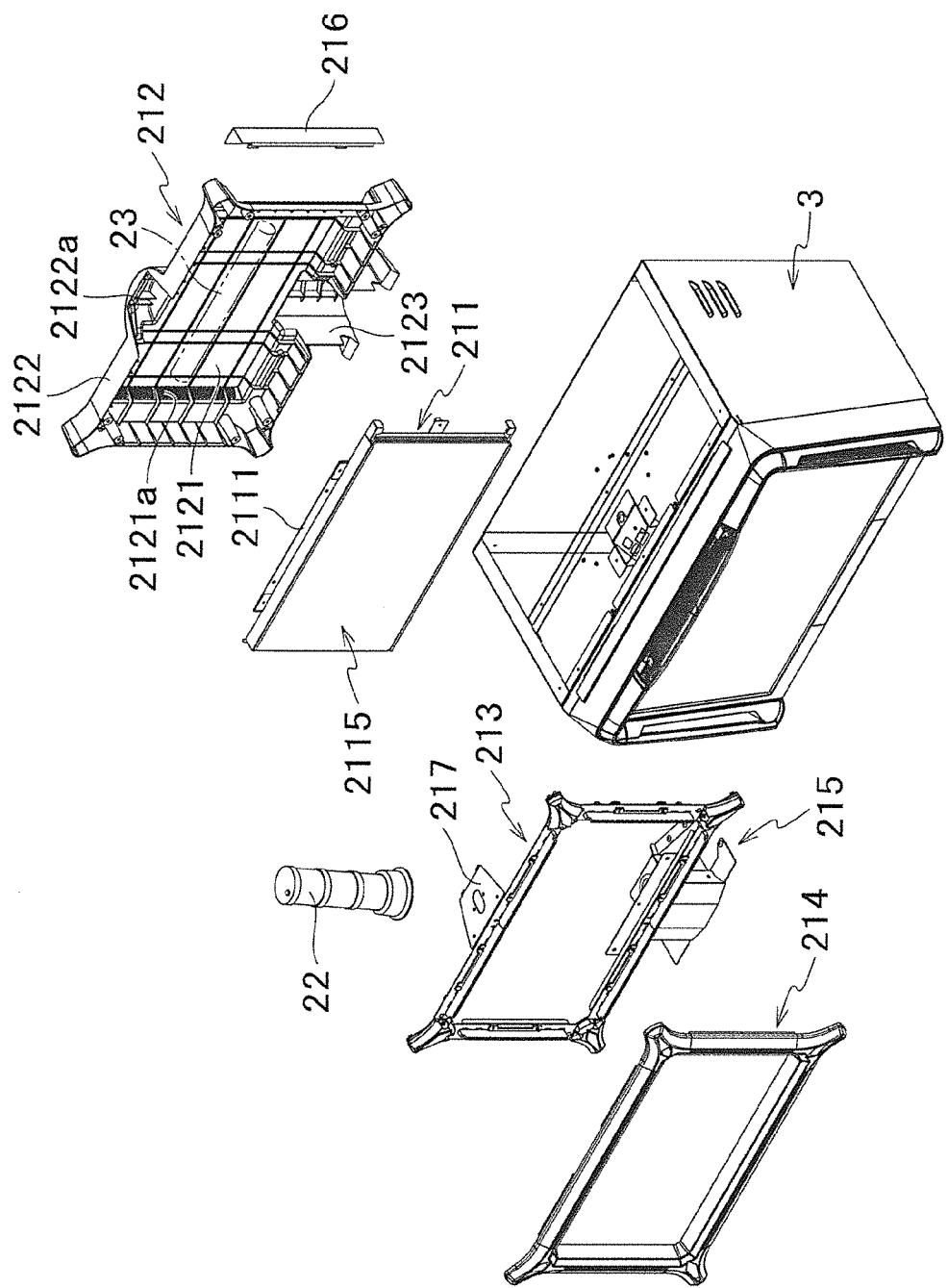
FIG. 10 is an exploded perspective view of the topper device.

The topper main body 21 is provided to the top device 3 in such a manner that the posture of the topper main body 21 is switched between the front-facing posture shown in FIG. 7 and the tilted posture shown in FIG. 8. As shown in FIG. 10, the topper main body 21 includes: a topper display device 211, a topper pillar base 212 which accommodates and holds the topper display device 211 from its back side, a side plate cover 216 (replacement mechanism) detachably provided to the right end portion of the topper pillar base 212, a topper illumination mechanism 213 disposed on the front side of the topper display device 211, a topper front cover 214 disposed on the front side of the topper illumination mechanism 213, and a topper support mechanism 215 rotatably supports the topper device 2 so that the topper device 2 is capable of rotating, within a predetermined angle range, in a horizontal direction with respect to the top device 3.

(Detailed Structure of Topper Device 2: Topper Pillar Base 212)

Figure 11:
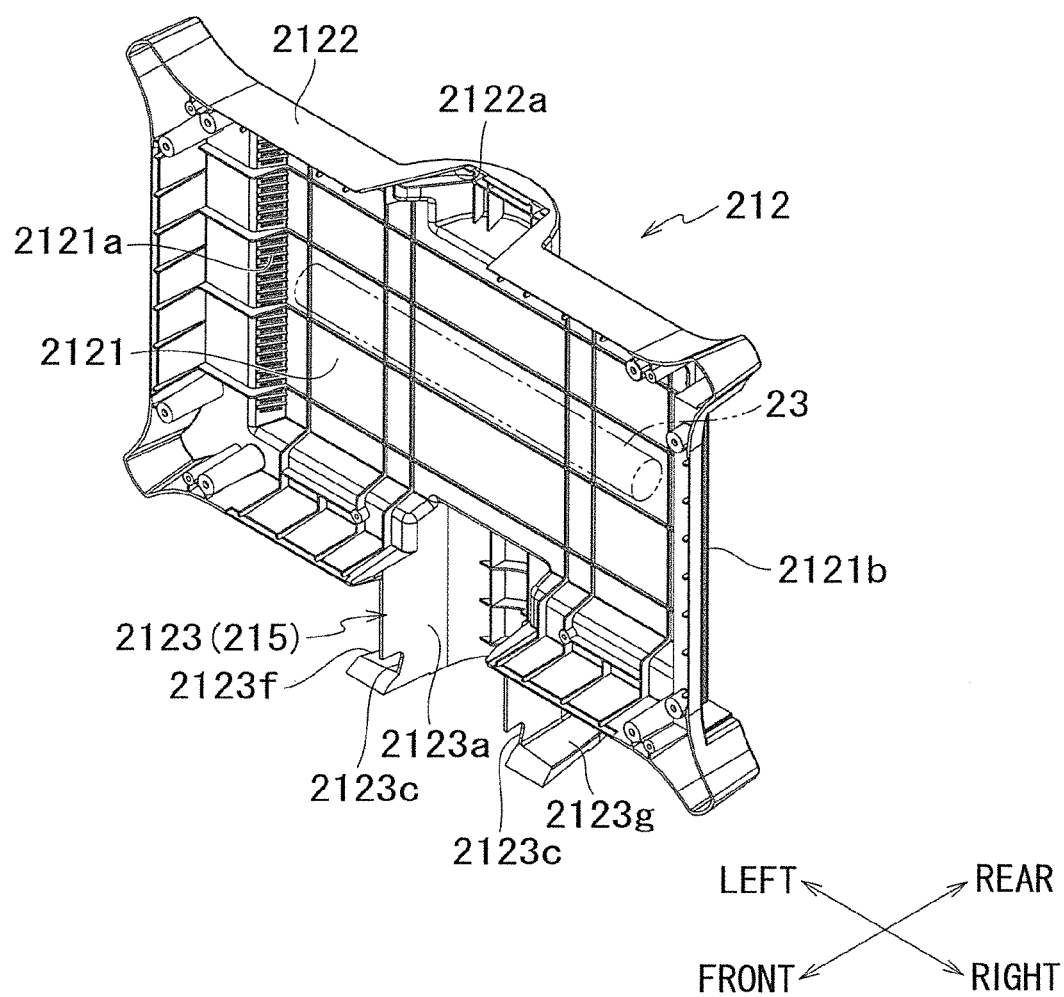
FIG. 11 is a perspective view of a topper rear cover.
Figure 12:
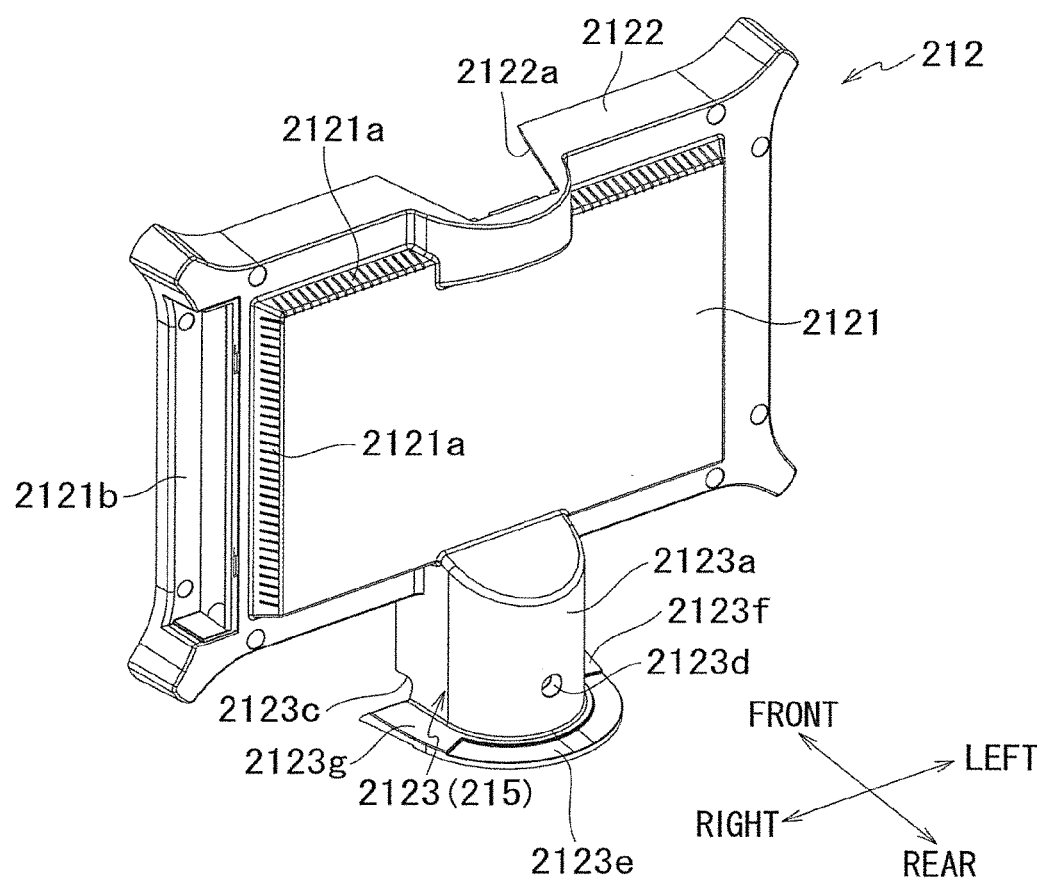
FIG. 12 is a perspective view of the topper rear cover.

As shown in FIG. 11, the topper pillar base 212 has a housing frame member 2121 whose front surface is in a rectangular shape, and a rim portion 2122 protruding from the peripheral edge of the housing frame member 2121 towards the front side. To the housing frame member 2121 of the topper pillar base 212 are arranged a backlight unit 23 such as a cold cathode tube and a fluorescent tube, and the like. The housing frame member 2121 has a plurality of ventilation holes 2121a, as shown in FIG. 12. The ventilation holes 2121a are formed on the upper portion, the left portion, and the right portion of the housing frame member 2121. Through these holes, the air inside the topper device 2 heated by the backlight unit 23 flows out, while the outside air flows inside the topper device 2. This way, cooling of the topper device 2 is made possible.

Further, the topper pillar base 212 has a recess portion 2122a which is a notched portion in the upper middle portion of the rim portion 2121b. As shown in FIG. 7, to the recess portion 2122a is fit an upper bracket 217. The front end portion of the upper bracket 217 is provided at the topper illumination mechanism 213 shown in FIG. 8. On the top surface of the upper bracket 217 is provided a tower member 22. As shown in FIG. 11 and FIG. 12, the topper pillar base 212 has an opening 2121b at the right side portion of the housing frame member 2121. The opening 2121b allows access of a worker to the topper display device 211 shown in FIG. 10.

Figure 9:
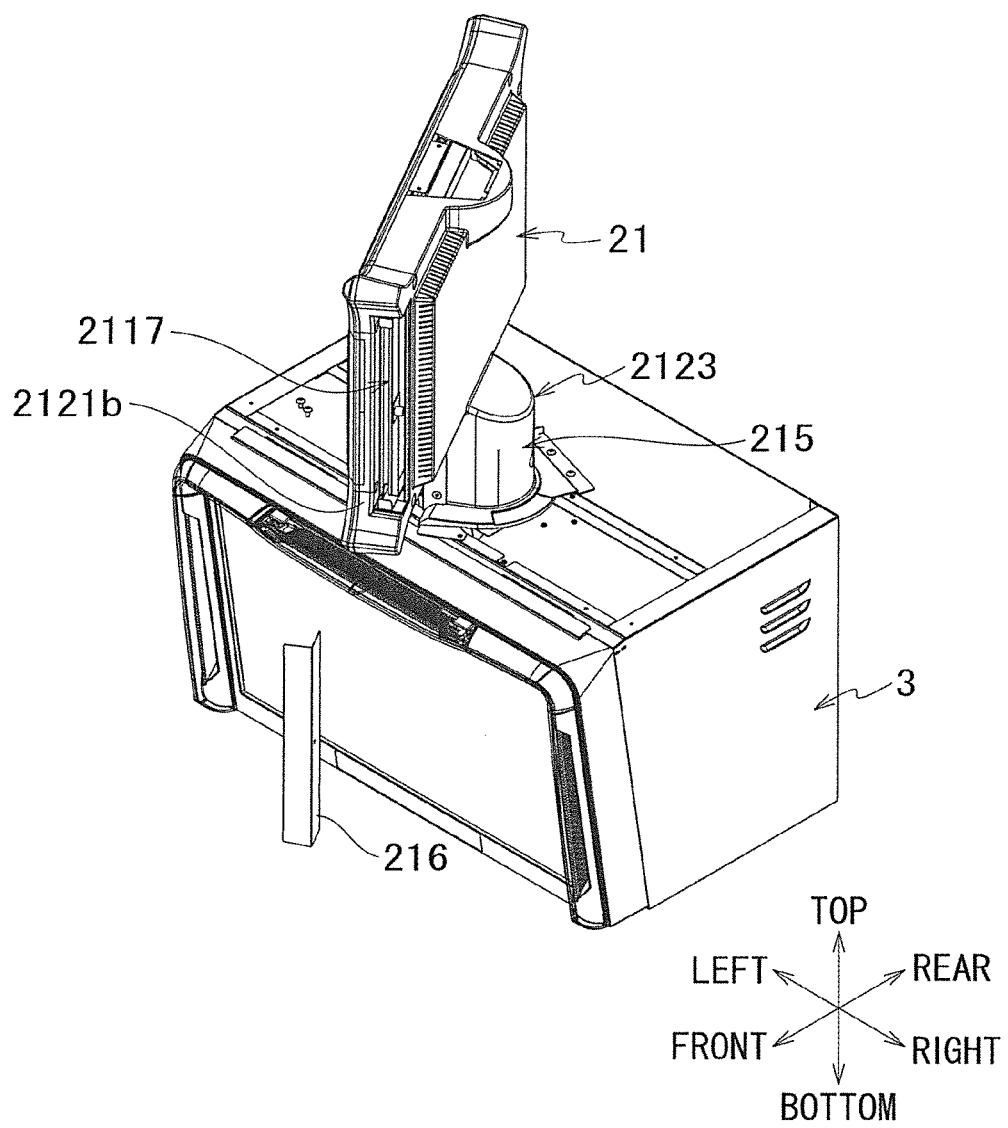
FIG. 9 is a perspective view of the topper device, with a side plate cover detached.

As shown in FIG. 6, the opening 2121b is covered by the side plate cover 216. The side plate cover 216 is attachable and detachable to and from the topper pillar base 212, and as shown in FIG. 8 and FIG. 9, is detached at a time of changing the displayed content of the topper device 2.

The topper pillar base 212 has a topper support unit 2123 in the lower middle portion. The topper support unit 2123 constitutes a part of a topper support mechanism 215. The topper support mechanism 215 is detailed later.

(Detailed Structure of Topper Device 2: Topper Display Device 211)

Figure 13:
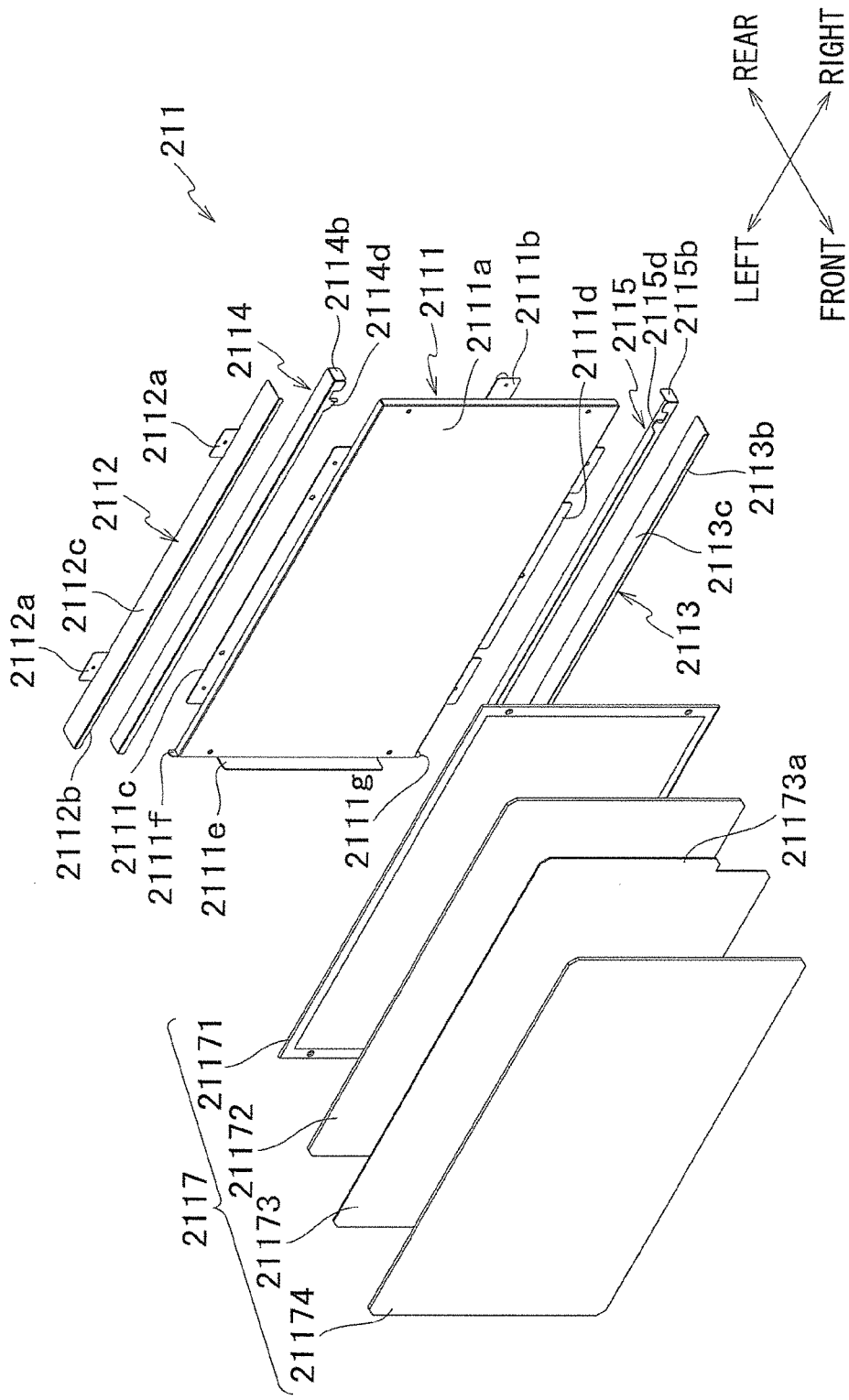
FIG. 13 is an exploded perspective view of the topper display device.

As shown in FIG. 10, the topper pillar base 212 with the structure described above accommodates the topper display device 211 at a position in front of the backlight unit 23. As shown in FIG. 13, the topper display device 211 includes: a TP light guide base 2111 fixed to the topper pillar base 212, and a display plate module 2117 disposed on the front surface of the TP light guide base 2111. The TP light guide base 2111 is made of a transparent resin, and is capable of letting pass light from the backlight unit 23 disposed behind the TP light guide base 2111. The TP light guide base 2111 includes: a front surface portion 2111a having a rectangular shape when viewed from the front side, a fastening portion 2111b formed at the right-end middle portion of the front surface portion 2111a, an upper side attachment portion 2111c protruding upward from the upper side of the front surface portion 2111a, a lower side attachment portion 2111d protruding downward from the lower side of the front surface portion 2111a, a first abutting portion 2111e protruding forward from the left-side middle portion of the front surface portion 2111a, a second abutting portion 2111f protruding upward from the upper end on the left-side of the front surface portion 2111a, and a third abutting portion 2111g protruding downward from the lower end on the left-side of the front surface portion 2111a.

The fastening portion 2111b makes the side plate cover 216 attachable and detachable. A grip portion 2111b, the side plate cover 216, and the opening 2121b structure the replacement mechanism. To the upper side attachment portion 2111c of the TP light guide base 2111 is provided an upper side plate holder 2112. The upper side plate holder 2112 is positioned relative to the left/right direction by having its left end abutting the second abutting portion 2111f. The upper side plate holder 2112 includes: a planar portion 2112c horizontally disposed along the upper side of the TP light guide base 2111, attachment portions 2112a disposed on the left side portion and the right side portion at the back side of the planar portion 2112c, and a holding portion 2112b disposed on the front side of the planar portion 2112c. The attachment portions 2112a are each extended upward from the planar portion 2112c, and are fixed to the upper side attachment portion 2111c of the TP light guide base 2111. On the other hand, the holding portion 2112b is bent downward from the planar portion 2112c, and is capable of holding the upper side of the display plate module 2117.

Figure 15:
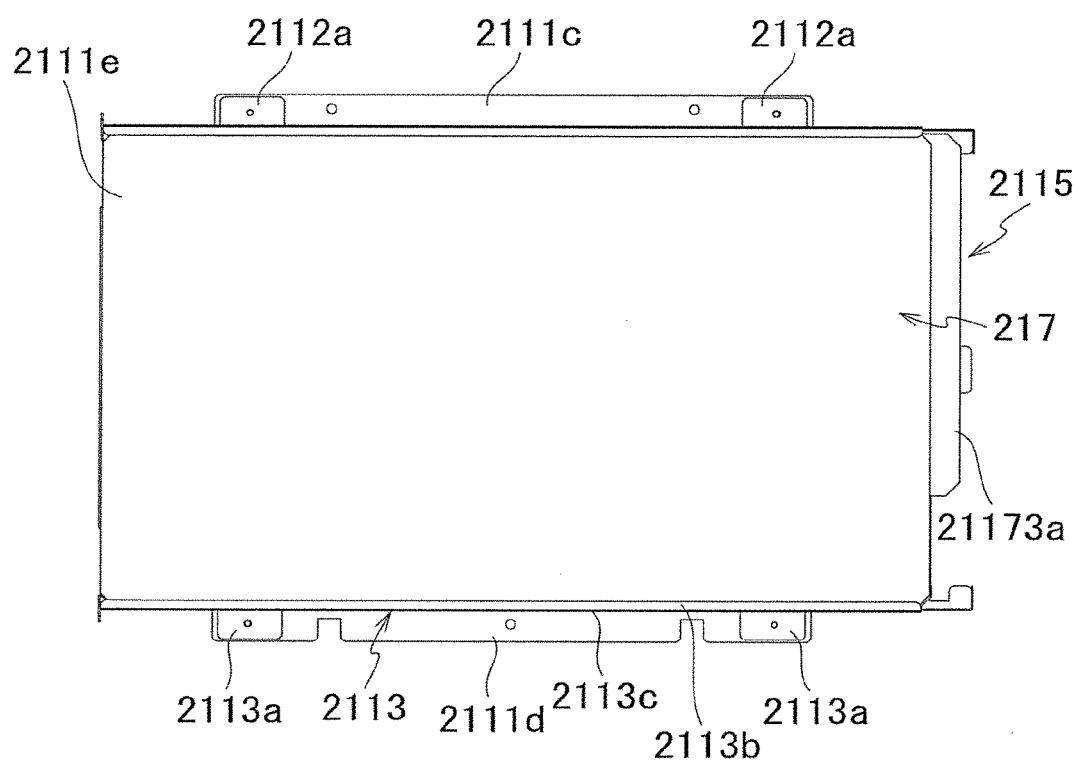
FIG. 15 is a front view of a display plate module.

To the lower side attachment portion 2111d of the TP light guide base 2111 is provided a lower side plate holder 2113. The lower side plate holder 2113 is positioned relative to the left/right direction by having its left end abutting the third abutting portion 2111g. As shown in FIG. 15, the lower side plate holder 2113 has a planer portion 2113c, attachment portions 2113a, and a holding portion 2113b, as in the case of the upper side plate holder 2112. The attachment portions 2113a are each bent downward from the planer portion 2113c, and are fixed to the lower side attachment portion 2111d of the TP light guide base 2111. On the other hand, the holding portion 2113b is extended upward from the planar portion 2113c, and is capable of holding the lower side of the display plate module 2117.

As shown in FIG. 13, between the upper side plate holder 2112 and the TP light guide base 2111 is disposed an upper plate 2114. The upper plate 2114 is positioned relative to the left/right direction by having its left end abutting the second abutting portion 2111f. On the other hand, between the lower side plate holder 2113 and the TP light guide base 2111 is disposed a under plate 2115. The under plate 2115 is positioned relative to the left/right direction by having its left end abutting the third abutting portion 2111g.

Figure 14:
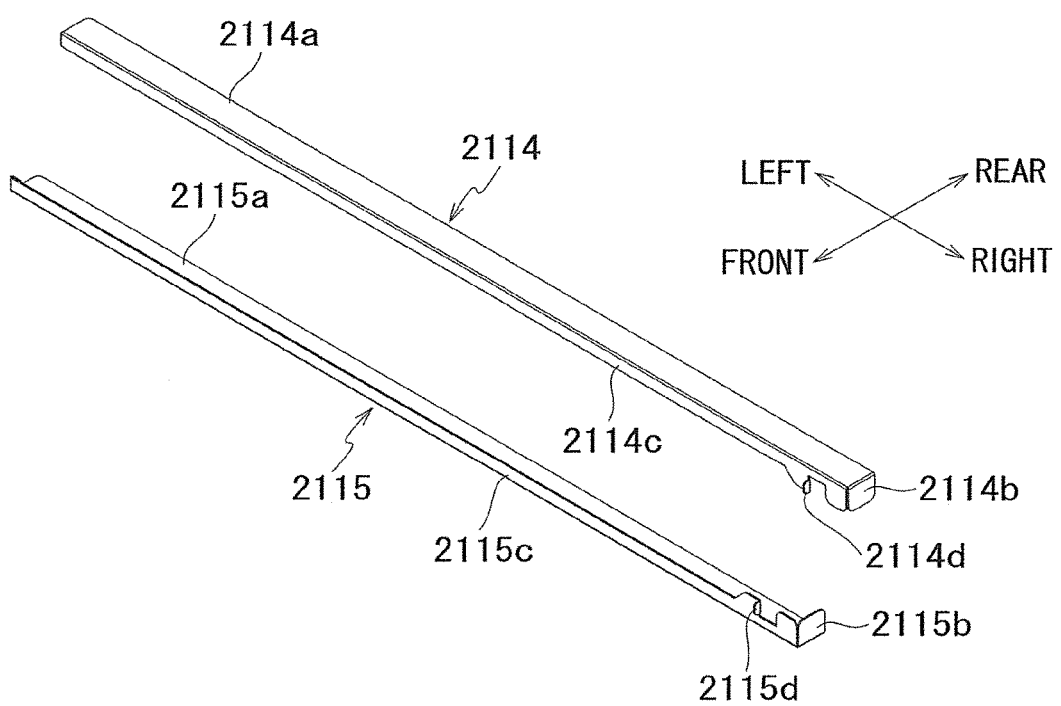
FIG. 14 is a perspective view of an upper plate and an under plate.

As shown in FIG. 14, the upper plate 2114 includes: a planar portion 2114a horizontally disposed, a first abutting portion 2114b extending downward from the right side of the planar portion 2114a, a second abutting portion 2114c extending downward from the front side of the planar portion 2114a, and a third abutting portion 2114d disposed on the right end portion. The second abutting portion 2114c is formed so that the width at its right end portion is made wider downward than the other portions. The third abutting portion 2114d is extending forward from the right end portion of the second abutting portion 2114c.

The under plate 2115 has: a planer portion 2115a horizontally disposed, a first abutting portion 2115b extending upward from the right side of the planer portion 2115a, a second abutting portion 2115c extending upward from the front side of the planer portion 2115a, and a third abutting portion 2115d disposed on the right end portion. The second abutting portion 2115c is formed so that the width at its right end portion is made wider upward than the other portions. The third abutting portion 2115d is extended forward from the right end portion of the second abutting portion 2115c.

(Detailed Structure of Topper Device 2: Topper Display Device 211-Display Plate Module 2117)

As shown in FIG. 13, the upper side plate holder 2112 and the upper plate 2114, the lower side plate holder 2113 and the under plate 2115 are symmetrically arranged to the top and bottom with respect to the TP light guide base 2111, so as to hold the display plate module 2117 in positions relative to the vertical direction and in the forward/backward direction. Further, the display plate module 2117 abuts the first abutting portion 2111e of the TP light guide base 2111, so that the first abutting portion 2111e restricts leftward movements.

The display plate module 2117 includes a light guiding plate 21171, a first base plate 21172, a design plate 21173, and a second base plate 21174. The light guiding plate 21171 has a function of emitting light forward, from its front side. The first base plate 21172 and the second base plate 21174 are made of a transparent material and are formed into the same rectangular shape of the same size. The design plate 21173 has an image suggestive of the game of the slot machine 1.

Figure 16A:
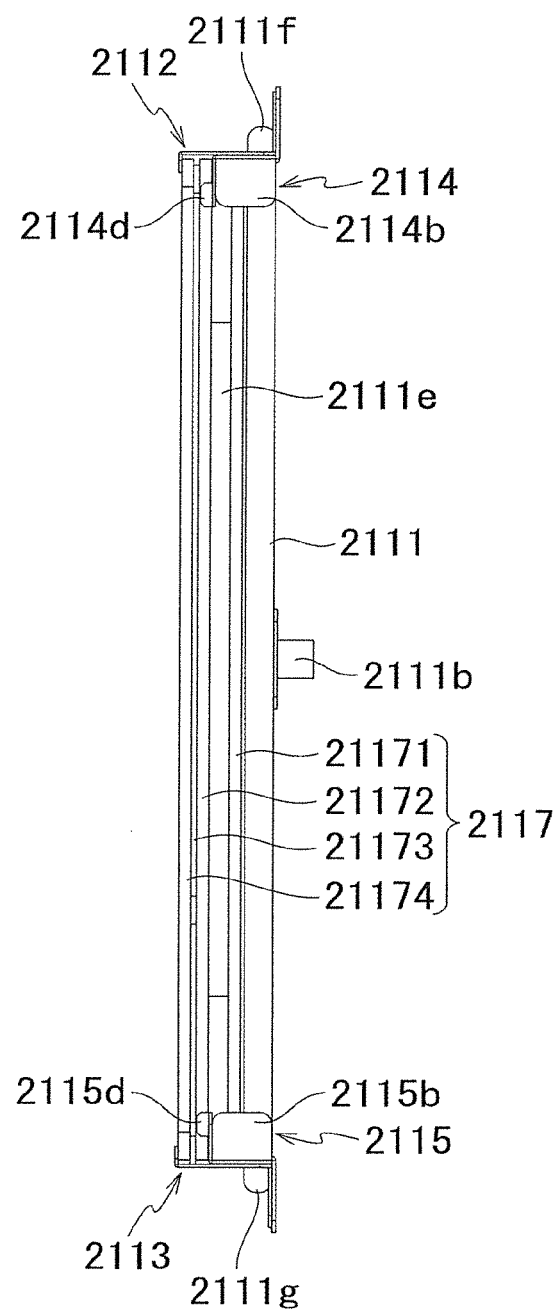
FIG. 16A is an explanatory diagram showing a state where the display plate module is mounted.
Figure 16B:
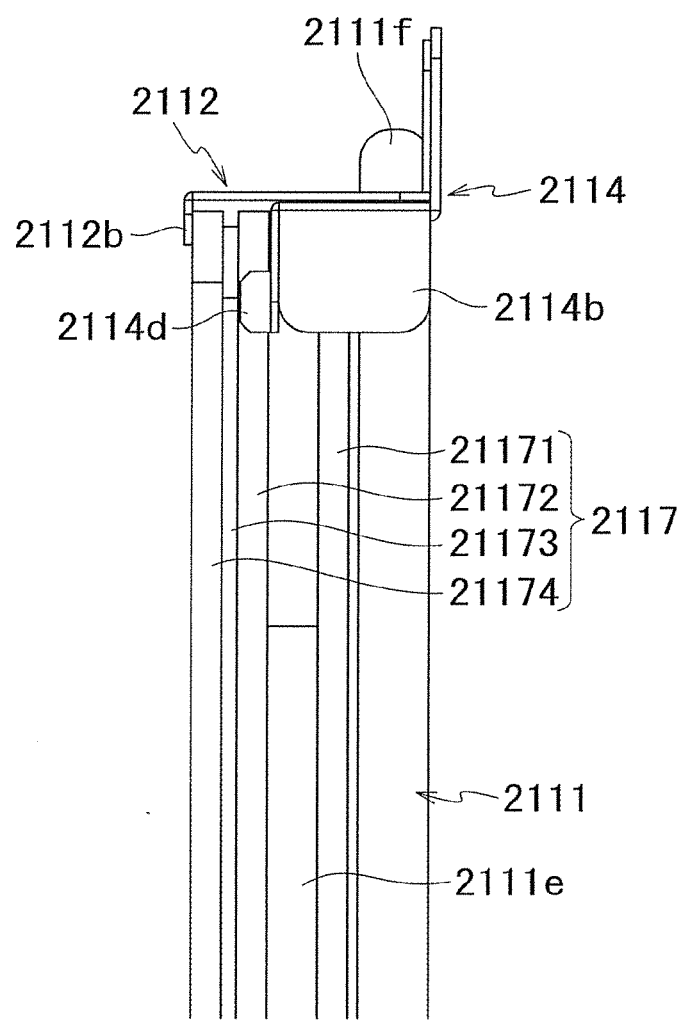
FIG. 16B is an explanatory diagram showing the main part of a state where the display plate module is mounted.
Figure 16C:
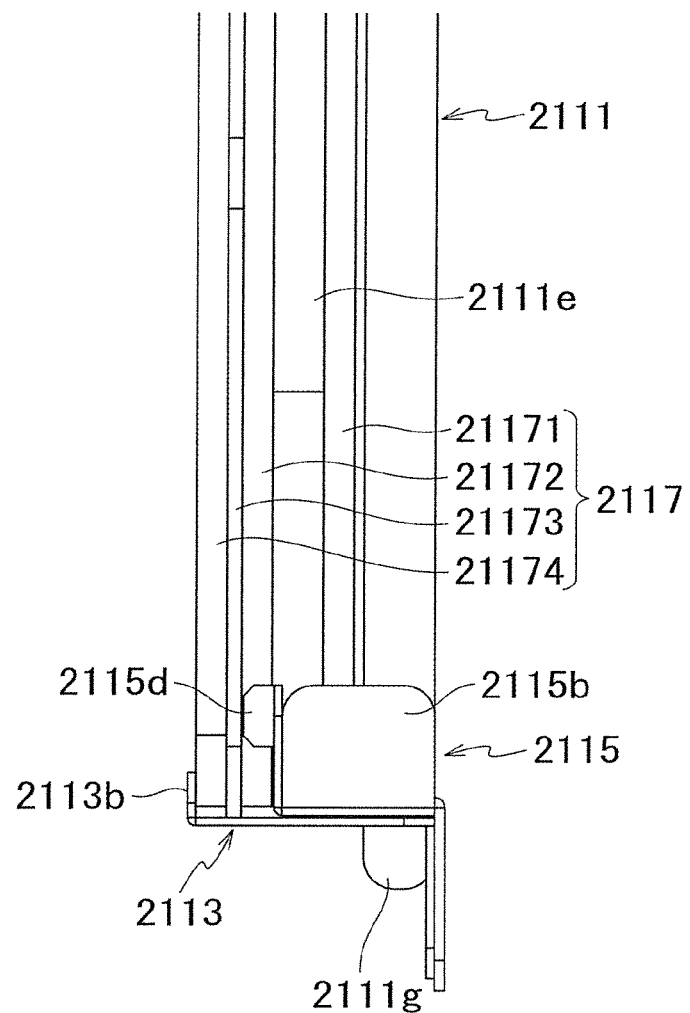
FIG. 16C is an explanatory diagram showing the main part of a state where the display plate module is mounted.

The light guiding plate 21171 is attached to the front surface portion 2111a of the TP light guide base 2111. On the front side of the light guiding plate 21171 is arranged the first base plate 21172. As shown in FIG. 16A, FIG. 16B, and FIG. 16C, the first base plate 21172 has its upper side portion and its lower side portion abutting the second abutting portion 2114c and the second abutting portion 2115c of the upper plate 2114 and the under plate 2115, respectively. Further, the first base plate 21172 has its left side upper end portion abut the third abutting portion 2114d of the upper plate 2114, and has its left side lower end portion abut the third abutting portion 2115d of the under plate 2115. This way, the first base plate 21172 is fixed its position relative to the left/right direction by the first abutting portion 2111e of the TP light guide base 2111 and the third abutting portion 2114d and the third abutting portion 2115d of the upper plate 2114 and the under plate 2115.

The thickness of the first base plate 21172 is the same as the protruding length of the third abutting portion 2114d and the third abutting portion 2115d of the upper plate 2114 and the under plate 2115. In front of the first base plate 21172 are sequentially disposed the design plate 21173 and the second base plate 21174 in this order. In other words, the design plate 21173 is sandwiched between the first base plate 21172 and the second base plate 21174. This way, the illumination light from the light guiding plate 21171 makes the image on the design plate 21173 visible from outside via the second base plate 21174.

The design plate 21173 abuts the first base plate 21172 and the second base plate 21174 and is capable of moving. With the rightward movement of the first base plate 21172 being restricted by the third abutting portion 2114d and third abutting portion 2115d, the design plate 21173 and the second base plate 21174 are moveable in the left/right direction in the right side area of the abutting position of the first abutting portion 2111e.

Figure 17:
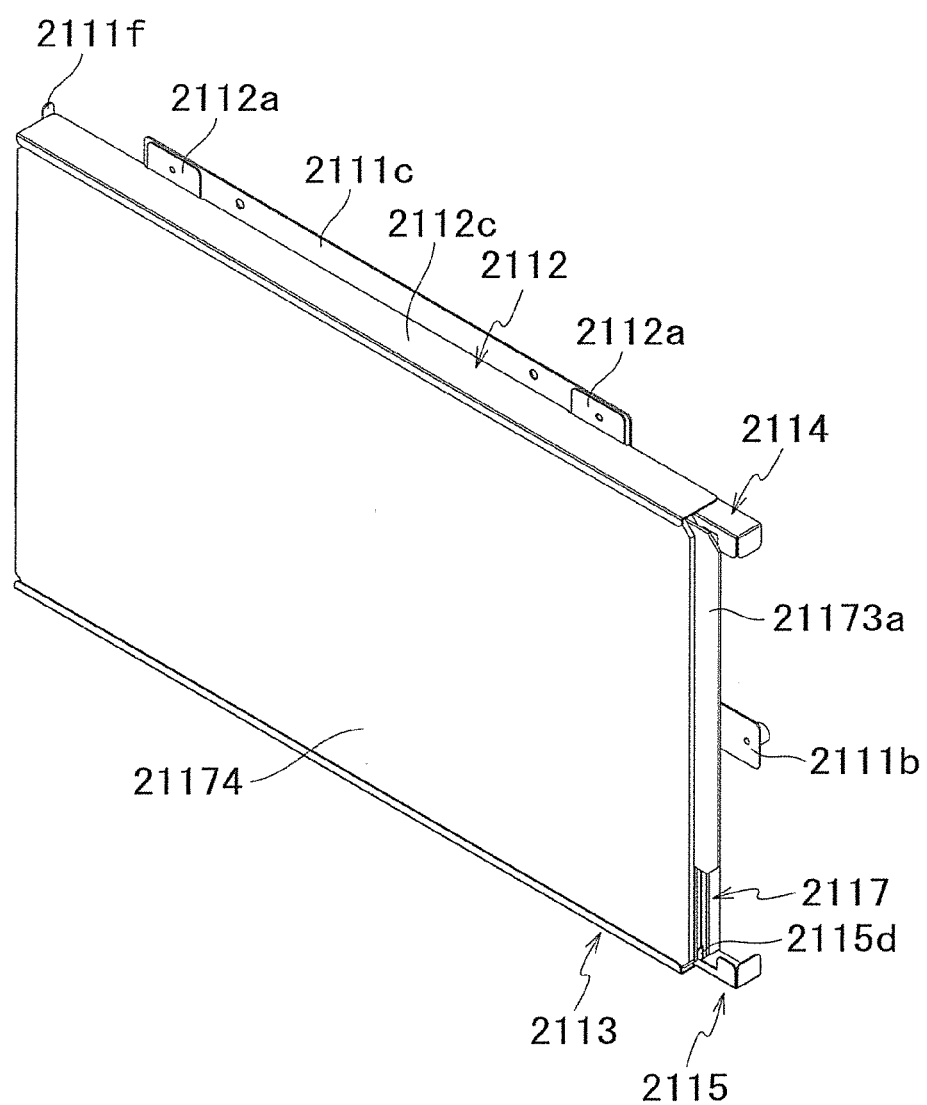
FIG. 17 is an explanatory diagram showing a process of exchanging the display plate module.

To the right side of the design plate 21173 is an overhang portion 21173a. The overhang portion 21173a protrudes to the right side beyond the second base plate 21174. Thus, as shown in FIG. 16 and FIG. 17, it is possible to detach or attach only the design plate 21173 from and to the topper display device 211, by using one hand to hold the second base plate 21174 at the forefront position of the display plate module 2117, while using the other hand to hold the overhang portion 21173a and move the same in the left/right direction.

Figure 19:
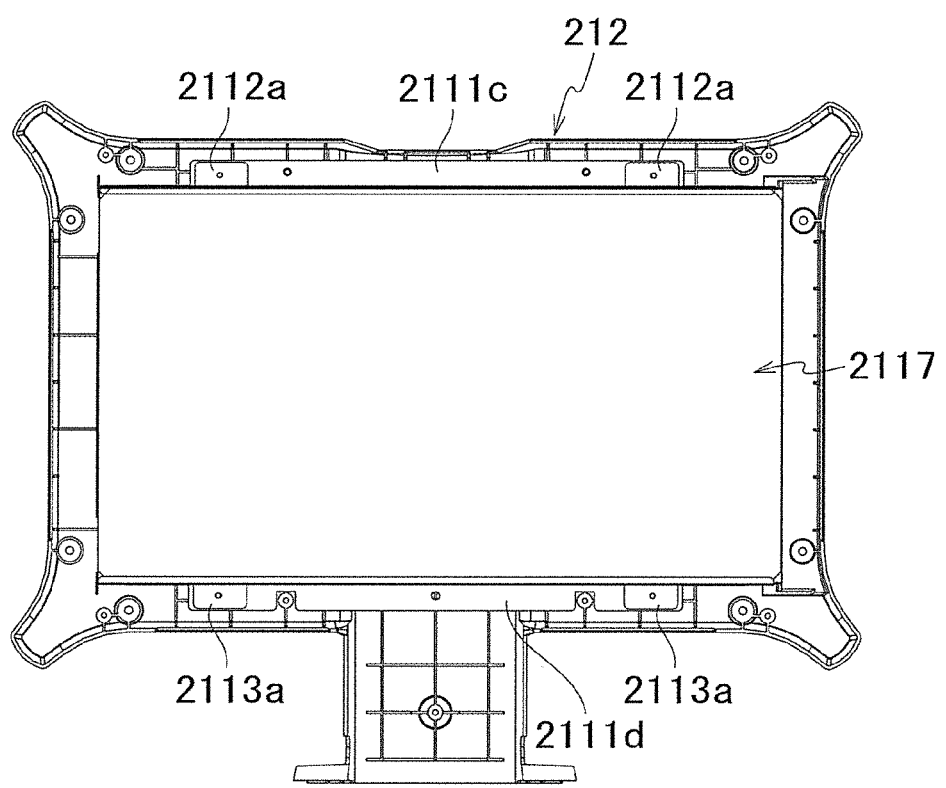
FIG. 19 is an explanatory diagram showing a state where the display plate module is mounted to a topper pillar base.

The display plate module 2117 with the structure described above is attached to the front surface (inside surface) of the topper pillar base 212, as shown in FIG. 19. Further, the display plate module 2117 shown in FIG. 19 is exposed to the outside at the opening 2121b of the topper pillar base 212. Therefore, simply by detaching the side plate cover 216, it is possible to replace only the design plate 21173 of the display plate module 2117 from the opening 2121b. It should be noted that the topper display device 211 may be a display device such as a liquid crystal display device.

(Detailed Structure of Topper Device 2: Topper Illumination Mechanism 213)

Figure 20:
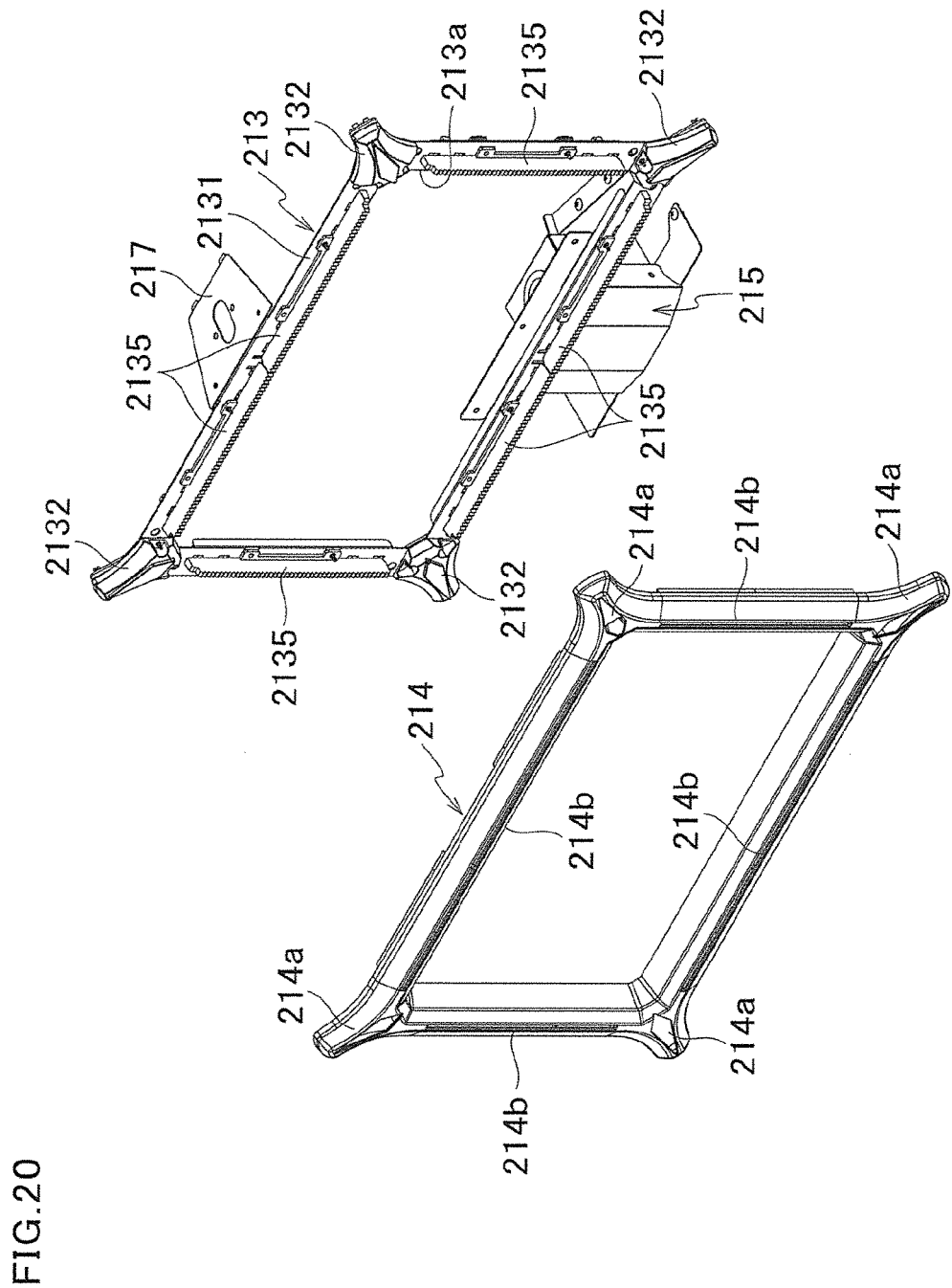
FIG. 20 is a perspective view of the topper illumination mechanism and a topper front cover.

As shown in FIG. 10, in front of the topper display device 211 are sequentially disposed the topper illumination mechanism 213 and the topper front cover 214 in this order. As shown in FIG. 20, the topper illumination mechanism 213 has a topper illumination base 2131. The topper illumination base 2131 is formed in a rectangular shape, and has an open window 213a through which the topper display device 211 is shown to the front. In the upper side middle portion of the topper illumination base 2131 is provided the above mentioned upper bracket 217. On the front surface of each corner portion of the topper illumination base 2131 is a corner lens 2132 made of a transparent synthetic resin such as acrylic resin.

Figure 21:
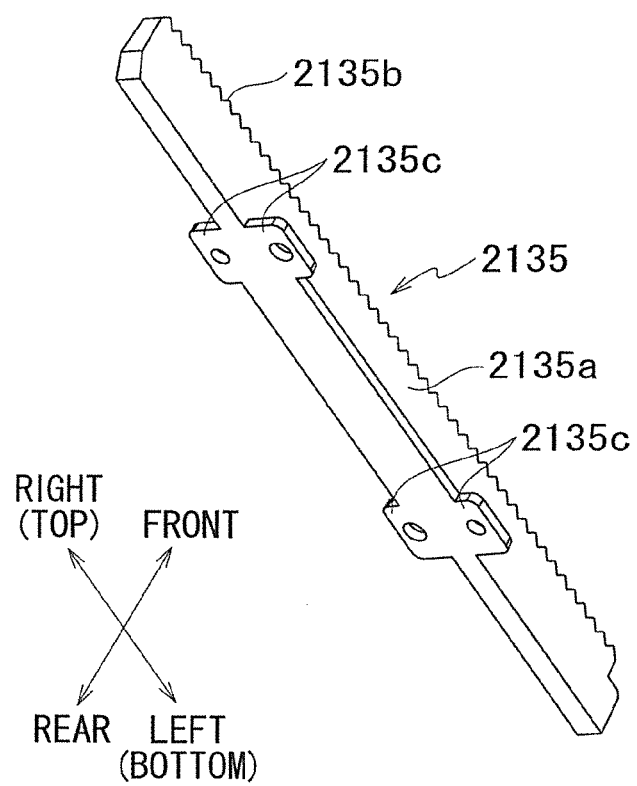
FIG. 21 is a perspective view of light dispersion plate.

On the front surfaces of the upper side portion and the lower side portions of the topper illumination base 2131 is a light dispersion plate 2135 made of a transparent synthetic resin such as acrylic resin. There are two light dispersion plates 2135 horizontally aligned in series. On the front surfaces of the left side portion and the right side portion of the topper illumination base 2131 is a single light dispersion plate 2135 made provided in the vertical direction. As shown in FIG. 21, the light dispersion plate 2135 includes: a reflection unit main body 2135a; a corrugated portion 2135b formed throughout the entire front end portion of the reflection unit main body 2135a; fastening portions 2135c formed on the right side portion and the left side portion of the rear end portion of the reflection unit main body 2135a.

Figure 22:
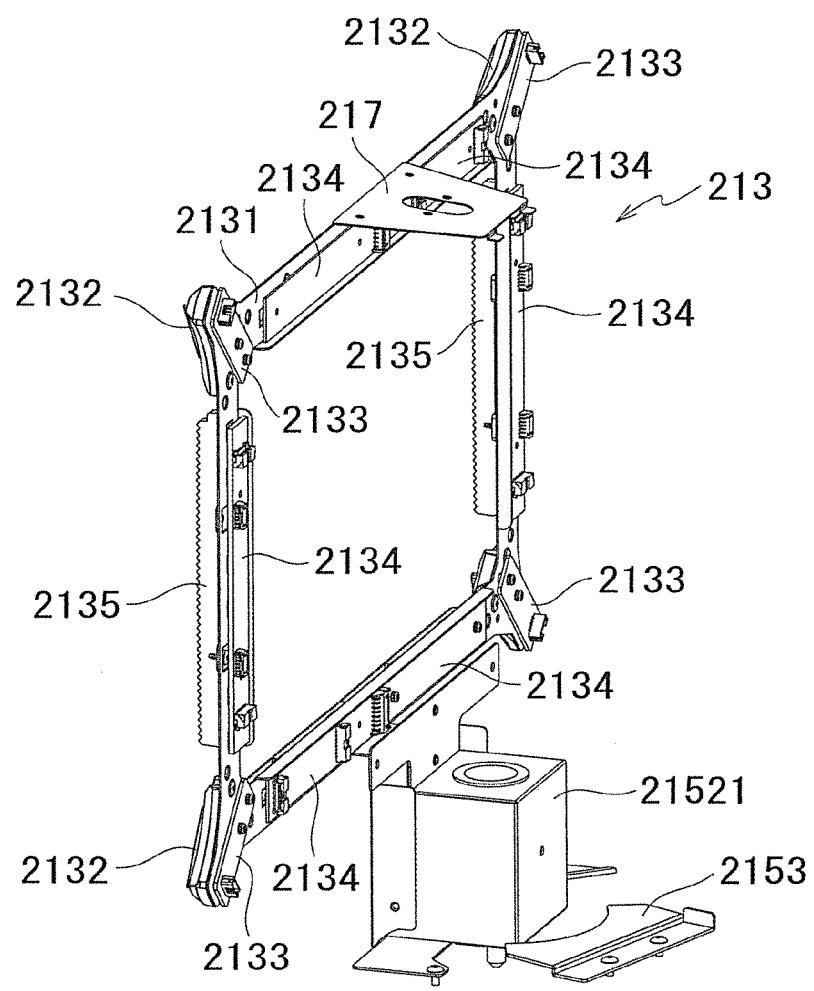
FIG. 22 is a perspective view of a topper illumination mechanism.

As shown in FIG. 22, on the back surface of each corner portion of the topper illumination base 2131 is a corner light source member 2133. The light source member 2133 has a plurality of color LEDs. The light source member 2133 emits effect light of various colors to the corner lens 2132 through the through hole of the topper illumination base 2131, thereby causing the corner lens 2132 to shed the effect light.

On the back surfaces of the upper side portion and the lower side portions of the topper illumination base 2131 is serially aligned two lines of line light source members 2134. On the back surfaces of the left side portion and the right side portion of the topper illumination base 2131 is a single line light source member 2134. Each of the line light source member 2134 has a plurality of color LEDs linearly aligned at equal intervals. Each of the line light source member 2134 emits effect light of various colors to the light dispersion plate 2135 through the through hole of the topper illumination base 2131, thereby causing the effect light to be dispersed from the corrugated portion 2135*b* of the light dispersion plate 2135.

(Detailed Structure of Topper Device 2: Topper Front Cover 214)

As shown in FIG. 20, on the front side of the topper illumination mechanism 213 is the topper front cover 214. The topper front cover 214 is formed in a rectangular shape. The topper front cover 214 includes: a corner window 214*a* through which the central portion of the corner lens 2132 is shown to the front; and a linear window 214*b* through which the corrugated portion 2135*b* of the light dispersion plate 2135 is shown to the front.

(Detailed Structure of Topper Device 2: Topper Support Mechanism 215)

Figure 23:
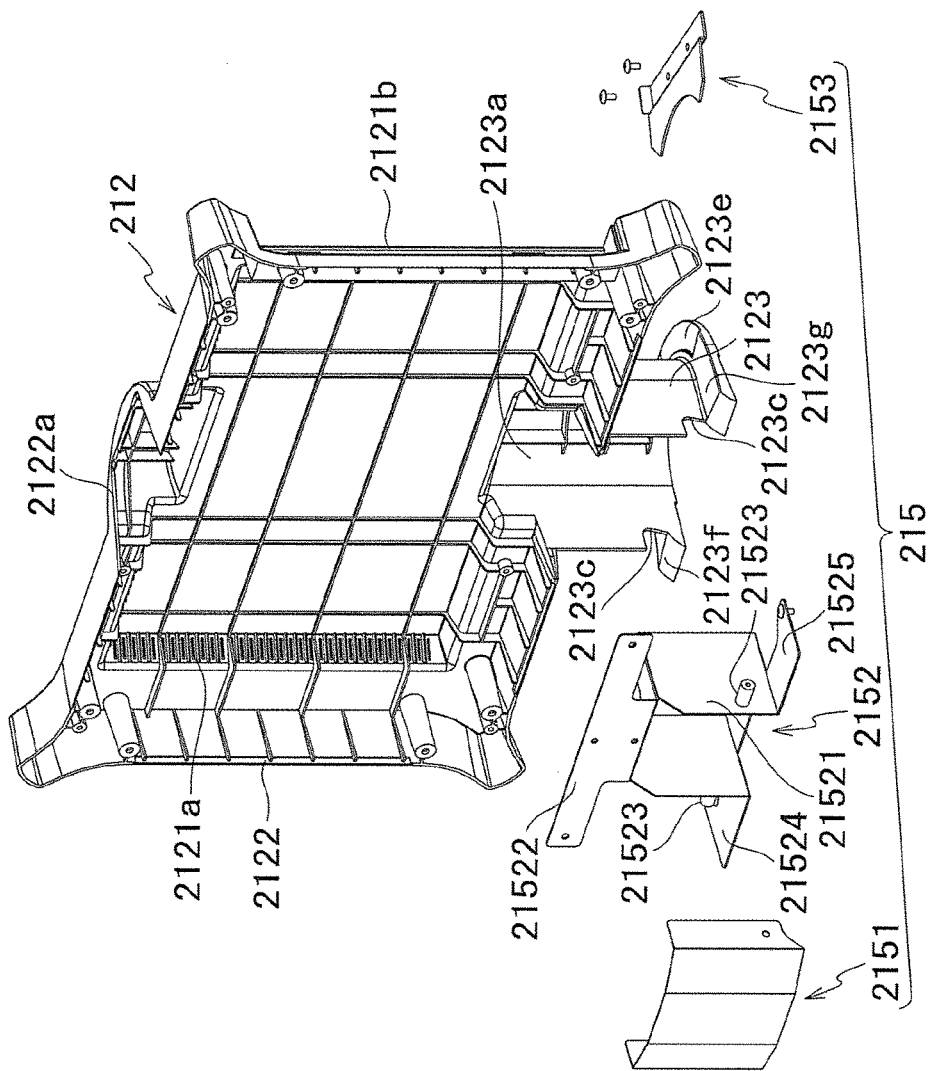
FIG. 23 is an exploded perspective view of a topper support mechanism.

Below the topper illumination mechanism 213 is the topper support mechanism 215. As shown in FIG. 23, the topper support mechanism 215 includes: a TP support cover 2151; a TP support 2152; a TP support guide plate 2153; a TP support hinge pin 2154 shown in FIG. 24; and the topper support unit 2123 of the topper pillar base 212. The TP support hinge pin 2154 is disposed so as to serve as the rotational axis of the topper support mechanism 215.

The left side portion and the right side portion of the TP support cover 2151 is extended backward. The topper support unit 2123 has a back side cover unit 2123*a* extended downward from the lower side middle portion of the rim portion 2122. The back side cover unit 2123*a* is formed in a semicircular cylindrical shape whose front side is open, and engagement portions 2123C are symmetrically arranged to left and right sides at the lower end portion of the both open ends.

Figure 25:
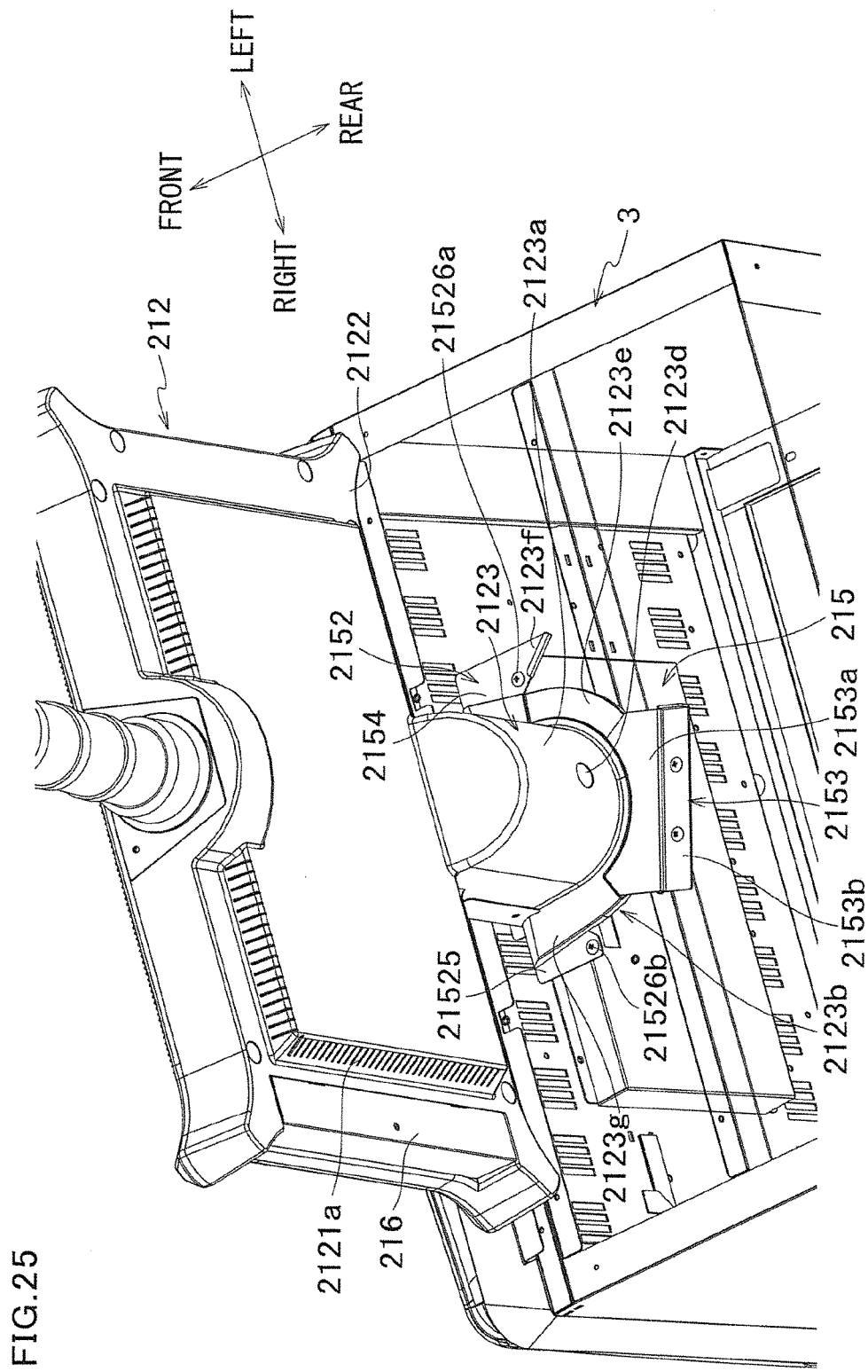
FIG. 25 is a perspective view of the topper support mechanism.

As shown in FIG. 25, in the middle portion of the back side cover unit 2123*a* is a through hole 2123*d* for fastening a screw to join the TP support 2152 to the topper support unit 2123. Further, at the lower end portion of the back side cover unit 2123*a* is a curved support unit 2123*b*. In the support unit 2123*b*, the lower end portion of the back side cover unit 2123*a* extends in radially outward directions. The support unit 2123*b* is placed on support plate portions 21524 and 21525 of the TP support 2152. The support unit 2123*b* has a recess at the middle portion of a part of its top surface, and has a slide portion 2123*e* corresponding to the low surface of the recess, and a first slide restriction portion 2123*f* and a second slide restriction portion 2123*g* corresponding to the high surfaces of the recessed portion. In other words, the support unit 2123*b* has the slide portion 2123*e*, and the first slide restriction portion 2123*f* and the second slide restriction portion 2123*g* at the both ends of the slide portion 2123*e* whose high surfaces are leveled higher than the slide portion 2123*e*.

Figure 24:
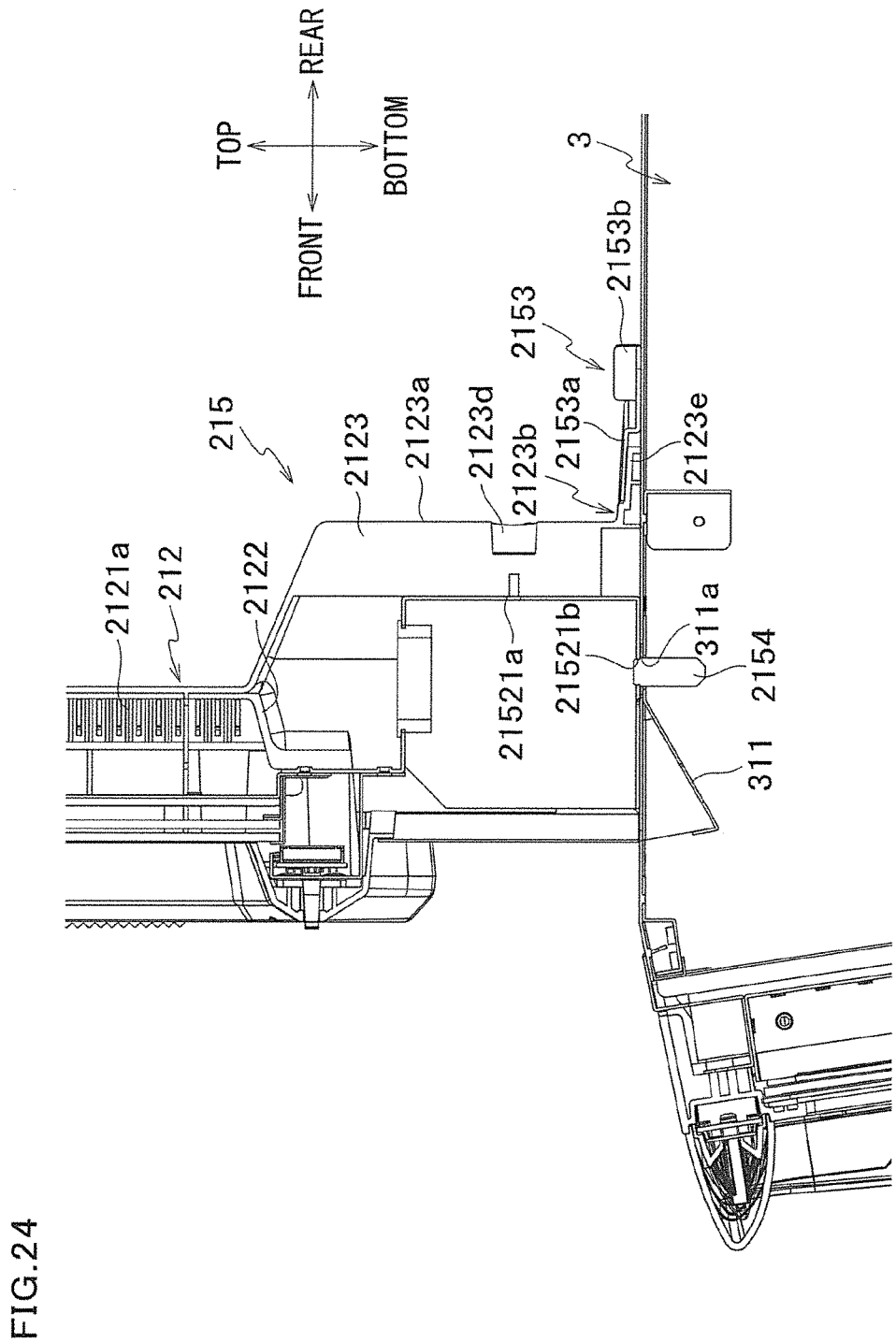
FIG. 24 is a cross sectional view of the topper support mechanism.

As shown in FIG. 24, the slide portion 2123*e* is covered by the TP support guide plate 2153. The TP support guide plate 2153 has an abutting portion 2153*a* movably contacting the high surfaces of the slide portion 2123*e*, and a fixed portion 2153*b* fixed to the top wall of the top device 3. The length of the abutting portion 2153*a* is shorter than that of the slide portion 2123*e* relative to the curving direction. Thus, the rotational angle range of the topper support unit 2123 about the TP support hinge pin 2154 covers a range in which the slide portion 2123*e* slides in contact with the abutting portion 2153*a* of the TP support guide plate 2153, and the first slide restriction portion 2123*f* or the second slide restriction portion 2123*g* abuts an end portion of the abutting portion 2153*a*. The relation between the first slide restriction portion 2123*f* and the second slide restriction portion 2123*g* is set so that the topper main body 21 is rotatable in the normal direction and the reverse direction, within a range of an angle at which the first slide restriction portion 2123*f* abuts one of the end portion of the abutting portion 2153*a* and the topper main body 21 takes the tilted posture as shown in FIG. 8 to another angle at which the second slide restriction portion 2123*g* abuts the other end portion of the abutting portion 2153*a* and the topper main body 21 takes the front-facing posture as shown in FIG. 7.

Figure 26:
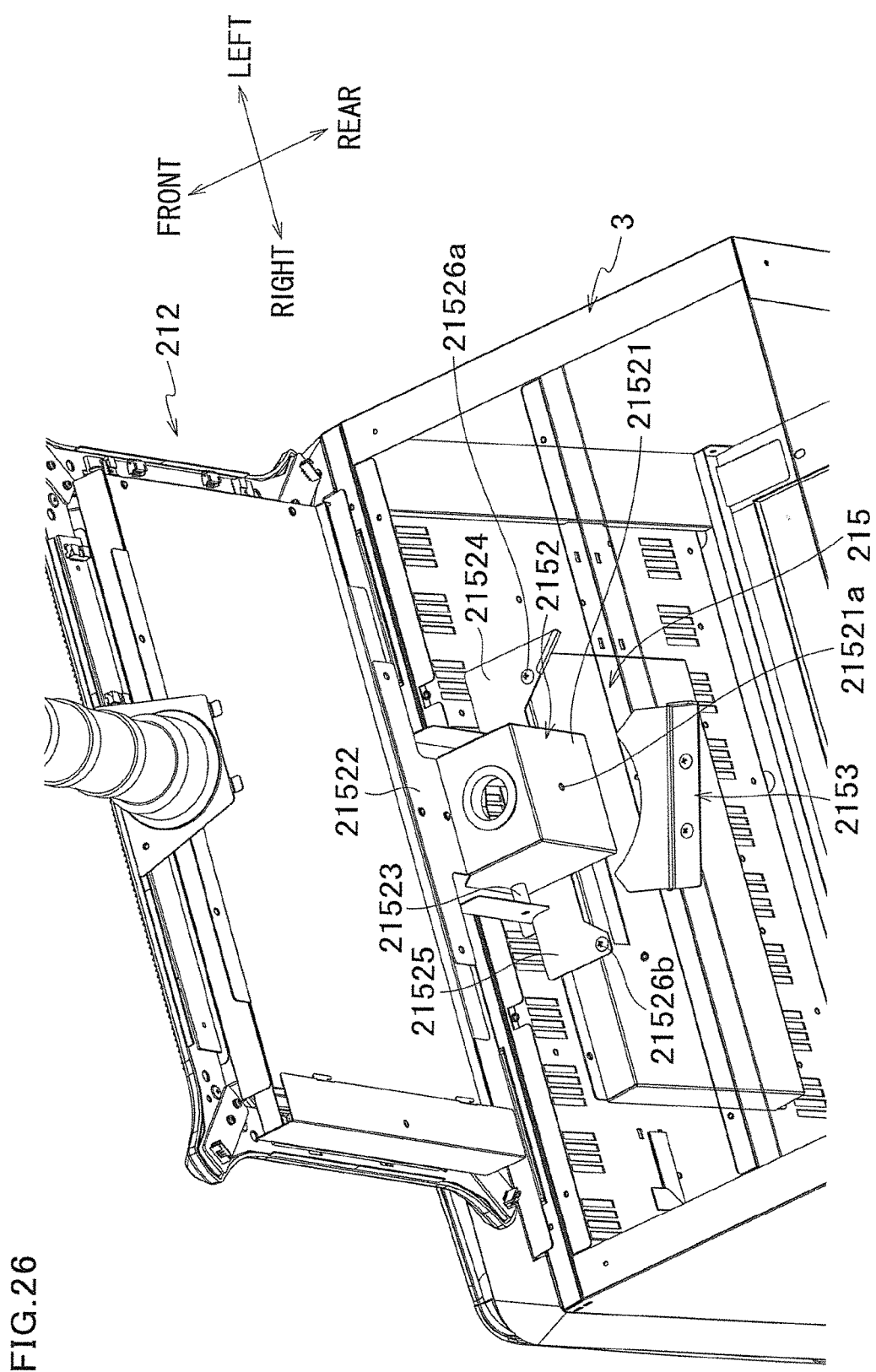
FIG. 26 is a perspective view of the topper support mechanism.

As shown in FIG. 26, inside the topper support unit 2123 is a TP support 2152. As shown in FIG. 23, the TP support 2152 includes: a main unit 21521 having a box-like shape; a fixed portion 21522 extended upward from the front side of the upper wall of the main unit 21521; protrusions 21523 protruding, in the left/right directions, from the lower portion of the left side wall and the right side wall of the main unit 21521, respectively; support plate portion 21524 and 21525 formed by the lower ends lower end portions of the left side wall and the right side wall of the main unit 21521 respectively extended in the left/right directions; and a first through hole 21521*a* formed at the center of the back side wall of the main unit 21521.

As shown in FIG. 24, the TP support 2152 has a second through hole 21521*b* at the central portion of its lower side wall. The second through hole 21521*b* is positioned to the through hole 311*a* formed on the upper wall of the top device 3, and the TP support hinge pin 2154 is rotatably inserted therein. This enables the TP support 2152 to rotate along the top surface of the top device 3, about the TP support hinge pin 2154.

As shown in FIG. 26, the fixed portion 21522 is fixed to the lower side portion of the topper illumination base 2131 and to the lower side attachment portion 2111*d* of the TP light guide base 2111. The protrusions 21523 are engaged with engagement portions 2123C of the topper support unit 2123, respectively. The protrusions 21523 are also screw-fastened to the left side portion and the right side portion of the TP support cover 2151. The first through hole 21521*a* is positioned to the through hole 2123*d* shown in FIG. 25, and is screw-fastened to the topper support unit 2123. This way, the topper support unit 2123, the TP support 2152, and the TP support cover 2151 are integrated into one piece.

The support plate portions 21524 and 21525 are placed on the top surface of the top device 3. The support plate portion 21524 on the left side has its end portion on the side of the TP support guide plate 2153 extended upward so that the end portion is able to abut the end portion of the TP support guide plate 2153. Further, each of the support plate portions 21524 and 21525 can be fastened to the top device 3 with use of screws 21526*a* and 21526*b*, during a state of taking the front-facing posture. This enables and disables rotation of the TP support 2152, simply by fastening or unfastening the screws at two positions in relation to the top device 3.

As should be understood from the above, the topper support mechanism 215 is configured so that the topper main body 21 is positioned to the front-facing posture, by having the abutting portion 2153a of the TP support guide plate 2153 abut the second slide restriction portion 2123g of the topper support unit 2123, as shown in FIG. 7. Further, using the screws 21526a and 21526b to fix the support plate portion 21524 and 21525 to the upper wall of the top device 3, during the topper main body 21 takes the front-facing posture, allows the topper main body 21 to maintain the front-facing posture.

As shown in FIG. 8, the topper support mechanism 215 is configured so that the topper main body 21 is able to change its posture from the front-facing posture to the tilted posture by unfastening the screws 21526a and 21526b to enable the rotation. Further, as shown in FIG. 9, the right side of the topper main body 21 is positioned on the front side while it takes the tilted posture. This is advantageous in that a worker is able to replace the design plate 21173 while he/she is standing in front of the slot machine 1.

Figure 18:
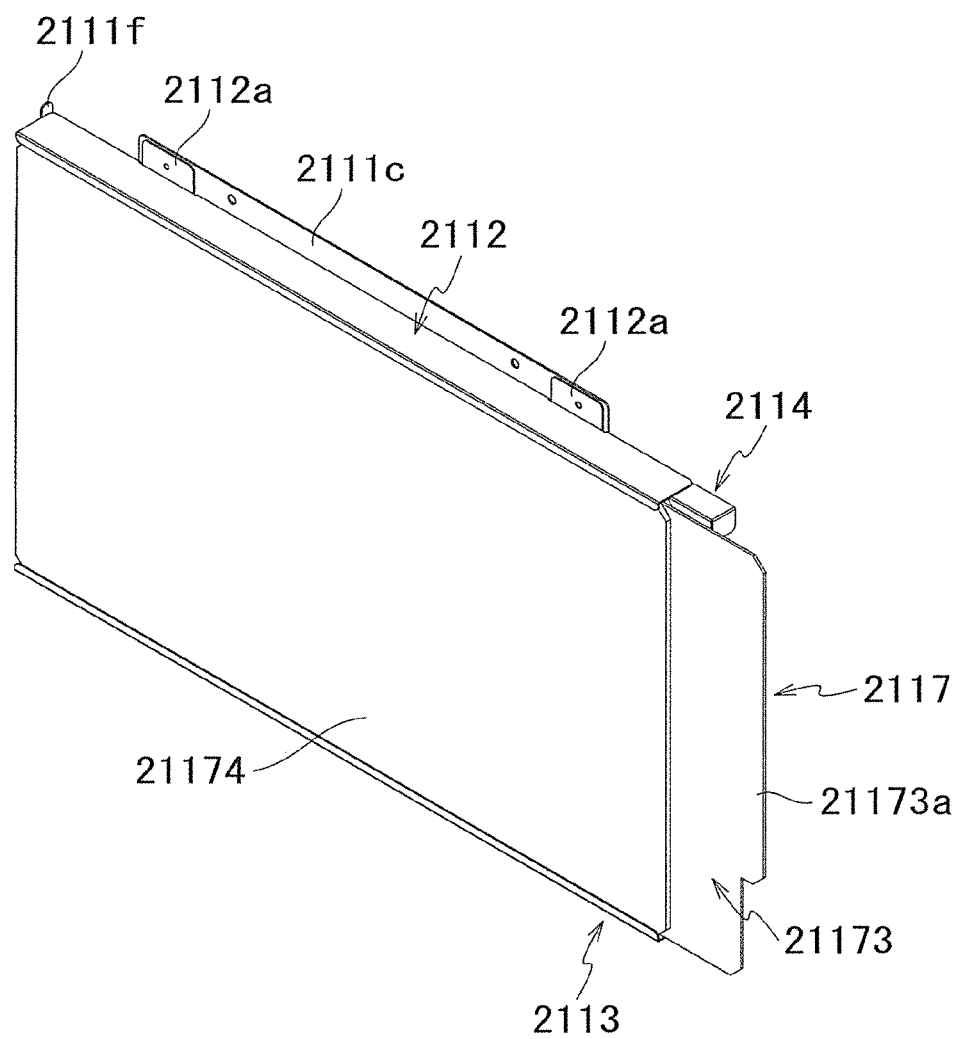
FIG. 18 is an explanatory diagram showing the process of exchanging the display plate module.

Specifically, the worker detaches the side plate cover 216 and opens the opening 2121b of the topper pillar base 212 to expose the display plate module 2117 to the outside. After that, as shown in FIG. 17 and FIG. 18, by holding the overhang portion 21173a of the design plate 21173 and pulling the same to the right side, the design plate 21173 is taken out from the topper main body 21. Then, replacement of the design plate 21173 is completed after inserting a replacement design plate 21173 into the display plate module 2117. Thus, the display of the topper device 2 is easily changed even when a plurality of slot machines 1 are aligned adjacent to each other in the width direction, or when there is an obstacle such as a wall in the width direction of the slot machine 1.

(Top Device 3: Top Box 31)

Figure 27:
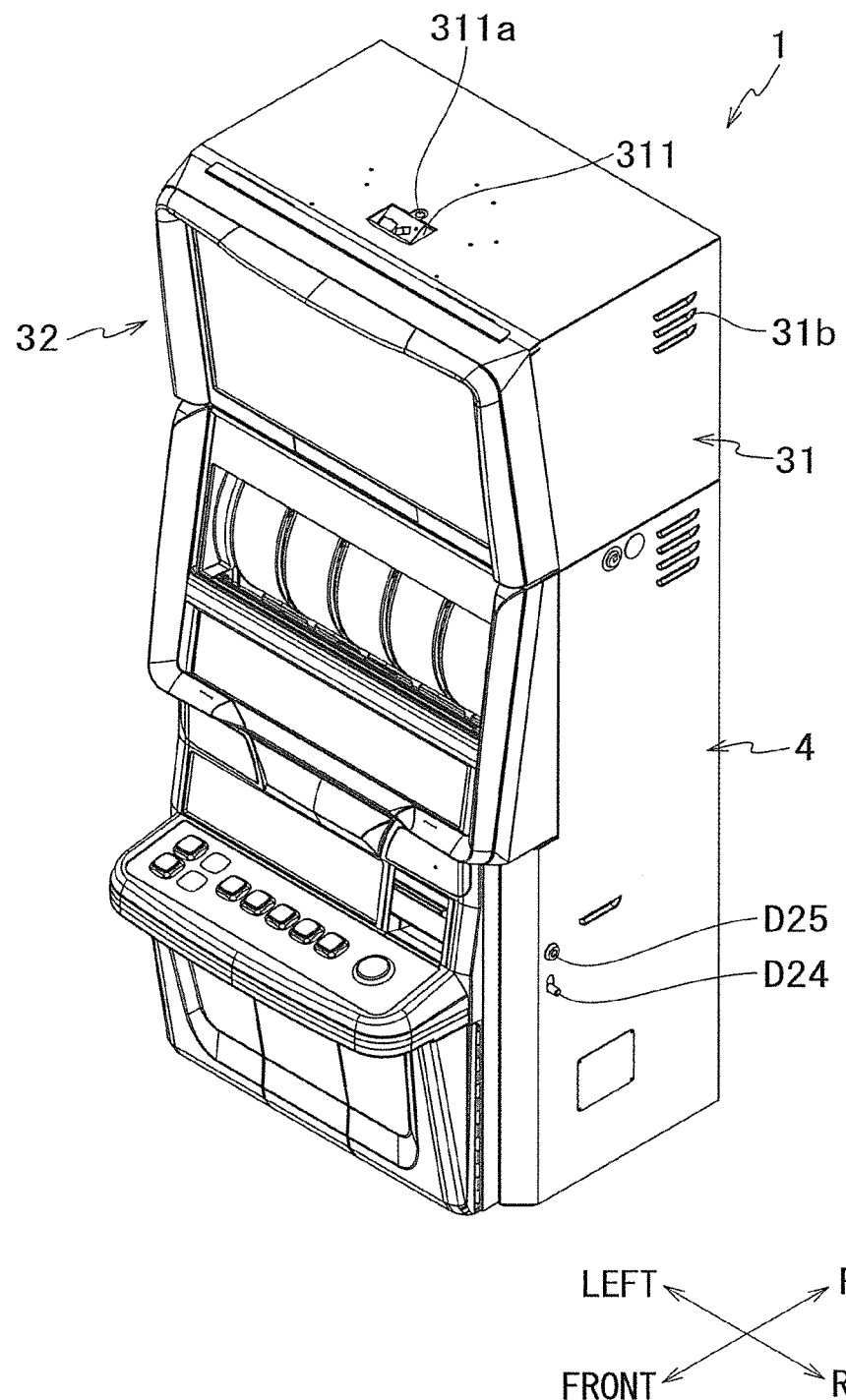
FIG. 27 is a perspective view of the slot machine.
Figure 28:
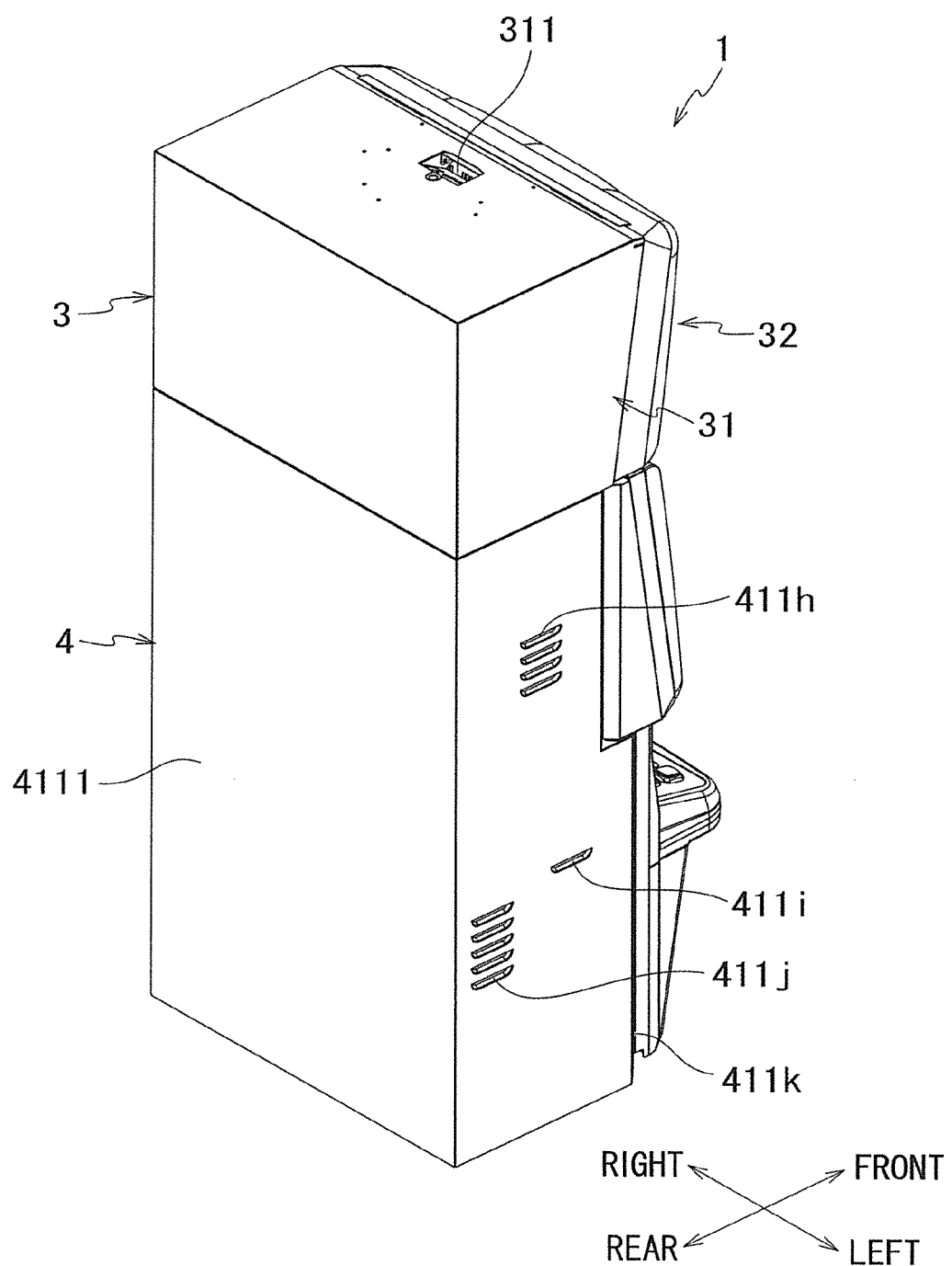
FIG. 28 is a perspective view of the slot machine.

The topper device 2 with the structure detailed above is provided on the top surface of the top device 3, as shown in FIG. 4. The top device 3 includes a top box 31 and an upper display device 32 provided to the front surface of the top box 31. The front surface and the under surface of the top box 31 is opened. Further, as shown in FIG. 27 and FIG. 28, on the upper wall of the top box 31 is an attachment member 311 having a through hole 311a. With the TP support hinge pin 2154 shown in FIG. 24 being inserted into the through hole 311a, the attachment member 311 rotatably supports the topper device 2 shown in FIG. 4 in a horizontal direction. Further, on the right side wall of the top box 31 is formed a ventilation hole 31b.

(Top Device 3: Upper Display Device 32: Illumination Mechanism 324)

Figure 29:
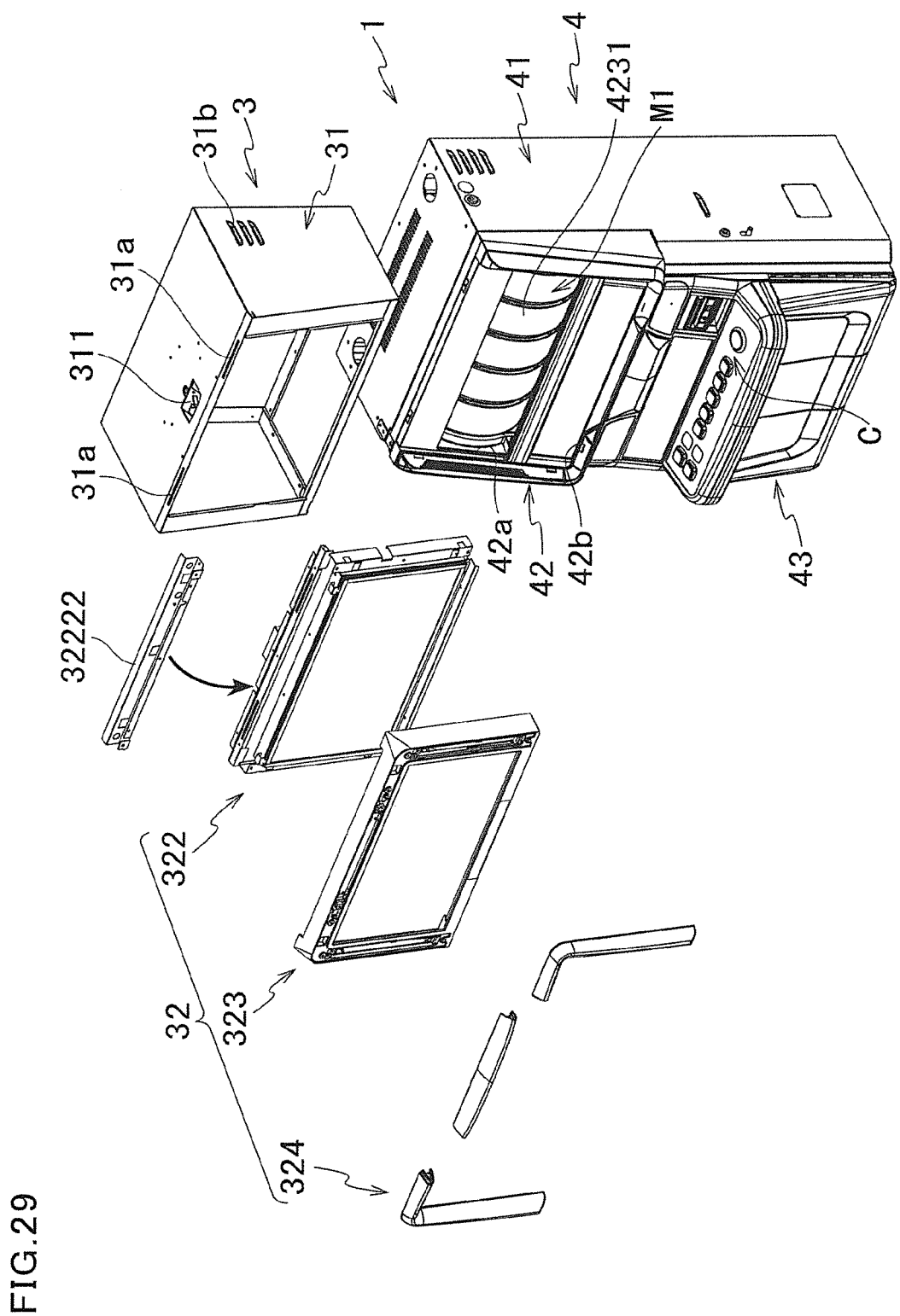
FIG. 29 is an exploded perspective view of the top device.
Figure 30:
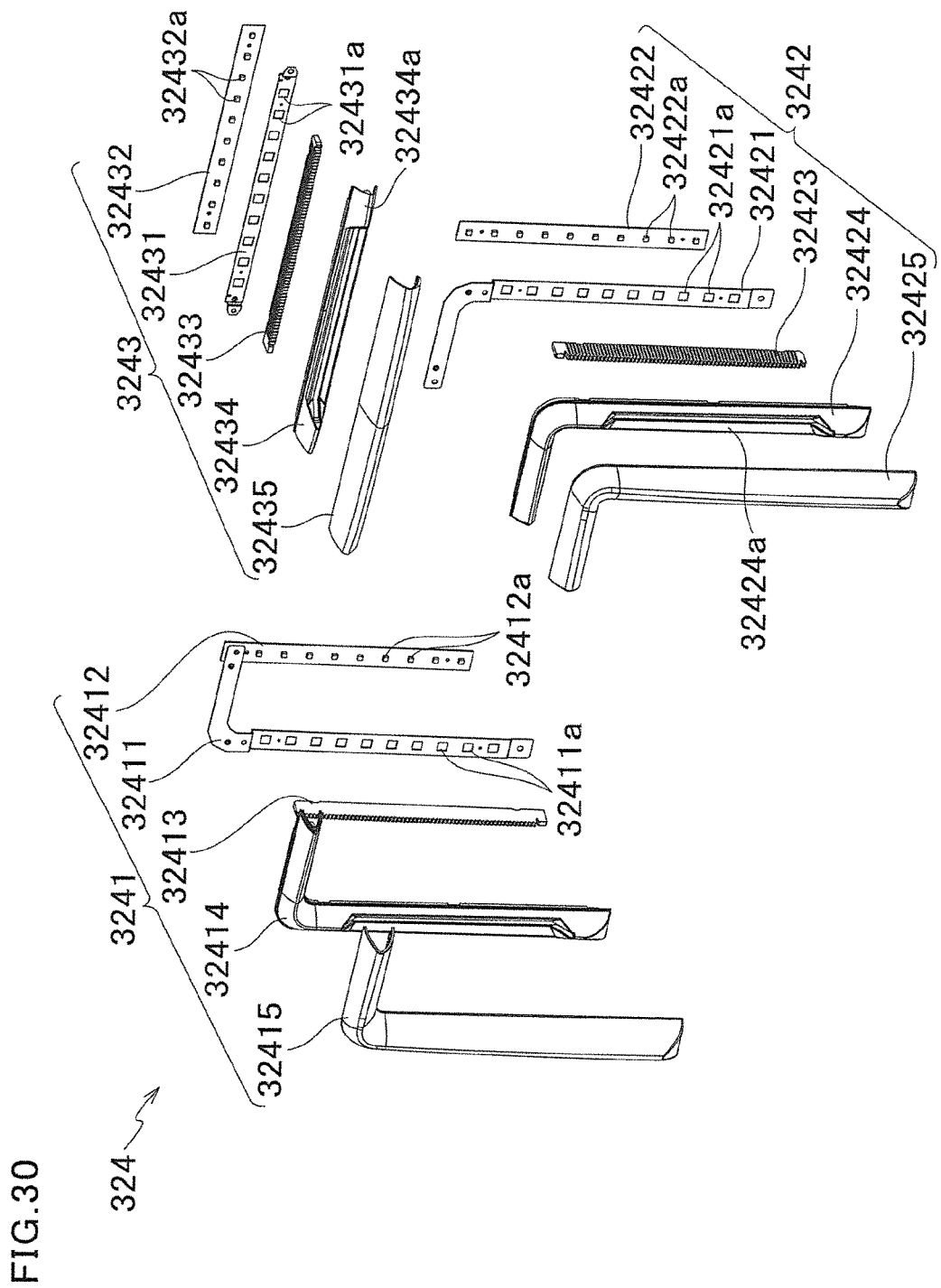
FIG. 30 is an exploded perspective view of an illumination mechanism.

As shown in FIG. 29, the upper display device 32 includes: an upper display mechanism 322, a bezel mechanism 323, and an illumination mechanism 324. As shown in FIG. 30, the illumination mechanism 324 includes: a left side illumination module 3241 disposed on the left side, a right side illumination module 3242 disposed on the right side, and an upper side illumination module 3243 disposed on the upper side.

The left side illumination module 3241 includes: an L-shaped bracket 32411, an LED panel 32412 provided on the back surface of the L-shaped bracket 32411, a diffusing plate 32413 provided on the front surface of the L-shaped bracket 32411, a casing frame member 32414 disposed in front of the diffusing plate 32413, and a cover member 32415 disposed in front of the casing frame member 32414.

The L-shaped bracket 32411 includes a linear portion which extends in the vertical direction from the upper end portion to the lower end portion and a bent portion which extends rightward from the upper end portion, and has a plurality of through holes 32411a which are linearly lined up at regular intervals at the linear portion. The LED panel 32412 has a plurality of LEDs 32412a. These LEDs 32412a are disposed so as to correspond to the through holes 32411a, and emits light forward through the through holes 32411a. The diffusing plate 32413 is formed and disposed so as to cover all the through holes 32411a. The diffusing plate 32413 is made of a transparent synthetic resin such as acrylic resin. Further, the front surface and the left surface of the diffusing plate 32413 is corrugated from its one end to the other end relative to its length. With this structure, the diffusing plate 32413 diffuses light from the LEDs 32412a linearly incident on the back surface, at its front surface and left surface and emits light as diffused light.

The diffusing plate 32413 is accommodated in the casing frame member 32414. The casing frame member 32414 has the through holes 32414a. The through holes 32414a are formed so as to leave the front surface and the both side surfaces of the diffusing plate 32413 uncovered. The casing frame member 32414 is covered by the transparent cover member 32415. Thus, the left side illumination module 3241 is configured to illuminate mostly the front side and the left side of the top device 3.

On the other hand, the right side illumination module 3242 is formed by members that are left-right symmetrical to the members constituting the left side illumination module 3241. To be more specific, the right side illumination module 3242 includes an L-shaped bracket 32421, an LED panel 32422 provided on the back surface of the L-shaped bracket 32421, a diffusing plate 32423 provided on the front surface of the L-shaped bracket 32421, a casing frame member 32424 disposed in front of the diffusing plate 32423, and a cover member 32425 disposed in front of the casing frame member 32424.

The L-shaped bracket 32421 includes a linear portion which extends in the vertical direction from the upper end portion to the lower end portion and a bent portion which extends leftward from the upper end portion, and in the linear portion a plurality of through holes 32421a are linearly lined up at regular intervals. The LED panel 32422 has a plurality of LEDs 32422a. These LEDs 32422a are disposed so as to correspond to the through holes 32421a, and emits light forward through the through holes 32421a. The diffusing plate 32423 is formed and disposed so as to cover all the through holes 32421a. The diffusing plate 32423 is made of a transparent synthetic resin such as acrylic resin. Further, the front surface and the right surface of the diffusing plate 32423 is corrugated from its one end to the other end relative to its length. With this structure, the diffusing plate 32423 diffuses light from the LEDs 32422a linearly incident on the back surface, at its front surface and right surface and emits light as diffused light.

The diffusing plate 32423 is accommodated in the casing frame member 32424. The casing frame member 32424 has the through holes 32424a. The through holes 32424a are formed so as to leave the front surface and the both side surfaces of the diffusing plate 32423 uncovered. The casing frame member 32424 is covered by the transparent cover member 32425. Thus, the right side illumination module 3242 is configured to illuminate mostly the front side and the right side of the top device 3.

The upper side illumination module 3243 includes: an I-shaped bracket 32431, an LED panel 32432 provided on the back surface of the I-shaped bracket 32431, a diffusing plate 32433 provided on the front surface of the I-shaped bracket 32431, a casing frame member 32434 disposed in front of the diffusing plate 32433, and a cover member 32435 disposed in front of the casing frame member 32434.

The I-shaped bracket 32431 has a linear portion arranged in the horizontal direction, and has a plurality of through holes 32431a linearly at equal intervals on the linear portion. The LED panel 32432 has a plurality of LEDs 32432a. These LEDs 32432a are disposed so as to correspond to the through holes 32431a, and emits light forward through the through holes 32431a. The diffusing plate 32433 is formed and disposed so as to cover all the through holes 32431a. The diffusing plate 32433 is made of a transparent synthetic resin such as acrylic resin. Further, the front surface and the top surface of the diffusing plate 32433 is corrugated from its one end to the other end relative to its length. With this structure, the diffusing plate 32433 diffuses light from the LEDs 32432a linearly incident on the back surface, at its front surface and top surface and emits light as diffused light.

The diffusing plate 32433 is accommodated in the casing frame member 32434. The casing frame member 32434 has the through holes 32434a. The through holes 32434a are formed so as to leave the front surface and the both side surfaces of the diffusing plate 32433 uncovered. The casing frame member 32434 is covered by the transparent cover member 32435. Thus, the upper side illumination module 3243 is configured to illuminate mostly the front side and the upper side of the top device 3.

(Top Device 3: Upper Display Device 32: Bezel Mechanism 323)

Figure 31:
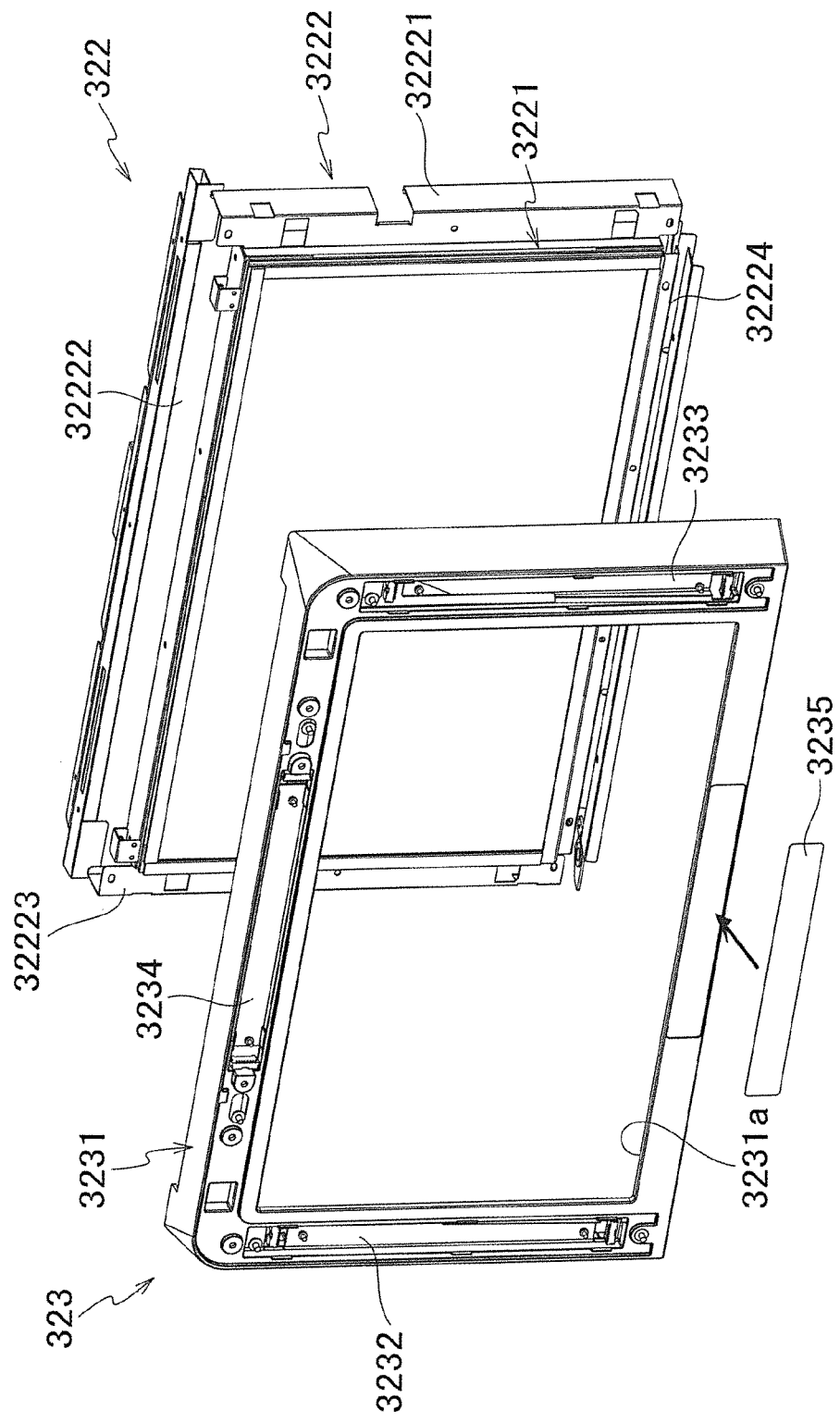
FIG. 31 is an exploded perspective view of an upper display mechanism and a bezel mechanism.

The illumination mechanism 324 with the structure detailed above is provided at the front surface of the bezel mechanism 323, as shown in FIG. 31. The bezel mechanism 323 has a rectangular frame member 3231. The frame member 3231 has an open window 3231a at the central portion of the front surface. To the left side front surface, the right side front surface, and the upper side front surface of the frame member 3231 are provided attachment plates 3232, 3233, and 3234. To each of the attachment plates 3232, 3233, and 3234 are attached the left side illumination module 3241, the right side illumination module 3242, and the upper side illumination module 3243 shown in FIG. 30, respectively. Further, to the lower side front surface of the frame member 3231 is provided a name plate 3235 showing the names of model and manufacturer.

(Top Device 3: Upper Display Device 32: Upper Display Mechanism 322)

Figure 32:
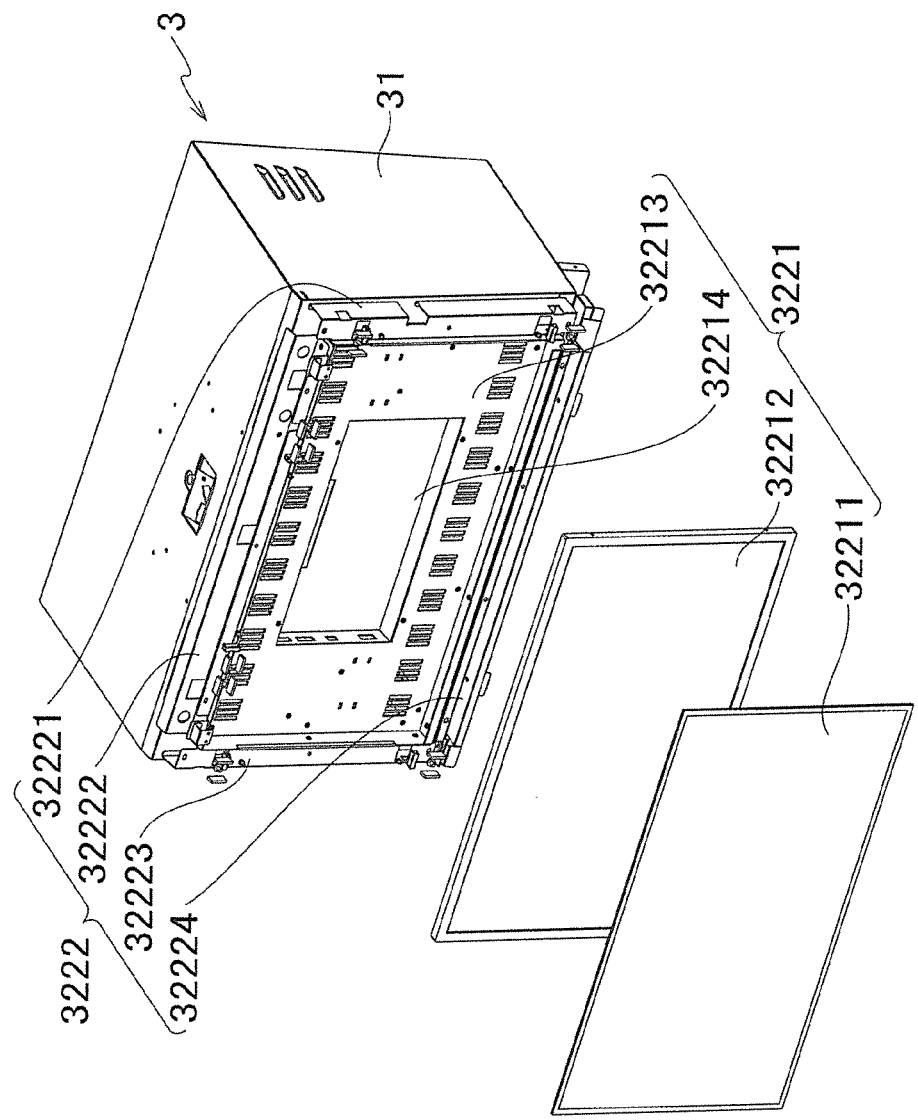
FIG. 32 is an exploded perspective view of the top device.

The bezel mechanism 323 is attached to the upper display mechanism 322. The upper display mechanism 322 includes a liquid crystal display device 3221 and a support mechanism 3222 configured to support the liquid crystal display device 3221. As shown in FIG. 32, the liquid crystal display device 3221 has: an upper side touch panel 32211 disposed in the forefront position, an upper side liquid crystal display panel 32212 disposed on the back side of the upper side touch panel 32211, a panel support base 32213 configured to support the upper side liquid crystal display panel 32212, and a control board base 32214 disposed at the central portion of the panel support base 32213.

The upper side liquid crystal display panel 32212 displays moving pictures such as video recordings, and image data of still image such as text and figures. The upper side touch panel 32211 let pass the image displayed on the upper side liquid crystal display panel 32212 so a player is able to see the image through the upper side touch panel 32211, while enabling operation on screen by a finger tip of the player. The control board base 32214 has therein a not-shown control board for controlling the upper side liquid crystal display panel 32212.

The liquid crystal display device 3221 has its circumference supported by the support mechanism 3222. The support mechanism 3222 has a right side bracket 32221, an upper side bracket 32222, a left side bracket 32223, and a lower side bracket 32224. These brackets 32221 to 32224 abut the outer circumferential surface of the panel support base 32213, and are fastened at both ends by using screws.

Figure 33:
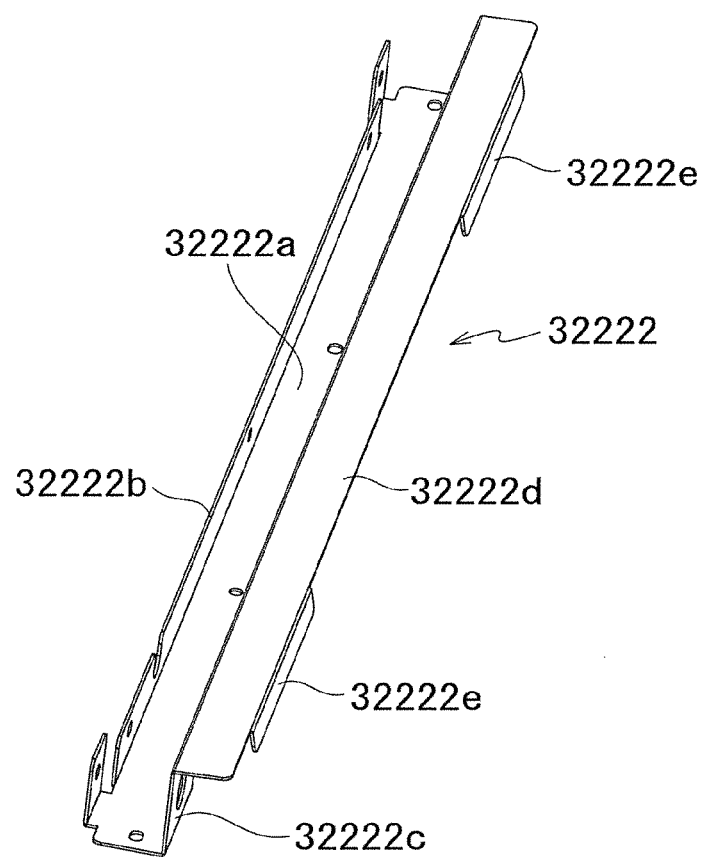
FIG. 33 is a perspective view of an upper bracket.

As shown in FIG. 33, the upper side bracket 32222 includes: a bottom surface portion 32222a, a front side protrusion 32222b extended upward the front side of the bottom surface portion 32222a, an intermediate uprising portion 32222c extended upward from the back side of the bottom surface portion 32222a, a top surface portion 32222d extended backward from the upper side of the intermediate uprising portion 32222c, and back side protrusions 32222e extended downward from the right side portion and the left side portion at the back side of the top surface portion 32222d. As shown in FIG. 29, the back side protrusions 32222e are engaged with engagement holes 31a. Thus, by engaging the back side protrusions 32222e of the upper side bracket 32222 with the engagement holes 31a after the bezel mechanism 323 and the illumination mechanism 324 are attached to the upper display mechanism 322, the top device 3 enables screw-fastening while allowing temporarily positioning of the upper display upper display device 32 to the top box 31.

(Device Main Body 4)

The top device 3 with the structure detailed above is provided on the top surface of the device main body 4. The device main body 4 includes: a game mechanism device 41, an upper door device 42 disposed at the upper portion of the front surface of the game mechanism device 41, and a lower door device 43 disposed at the lower portion of the front surface of the game mechanism device 41. The game mechanism device 41 accommodates therein various types of equipment such as reel device M1 and various control boards. The both upper door device 42 and the lower door device 43 are configured to be opened and closed with respect to the game mechanism device 41. Opening and closing of the upper door device 42 is enabled on condition that the lower door device 43 is opened.

(Device Main Body 4: Upper Door Device 42)

Figure 34:
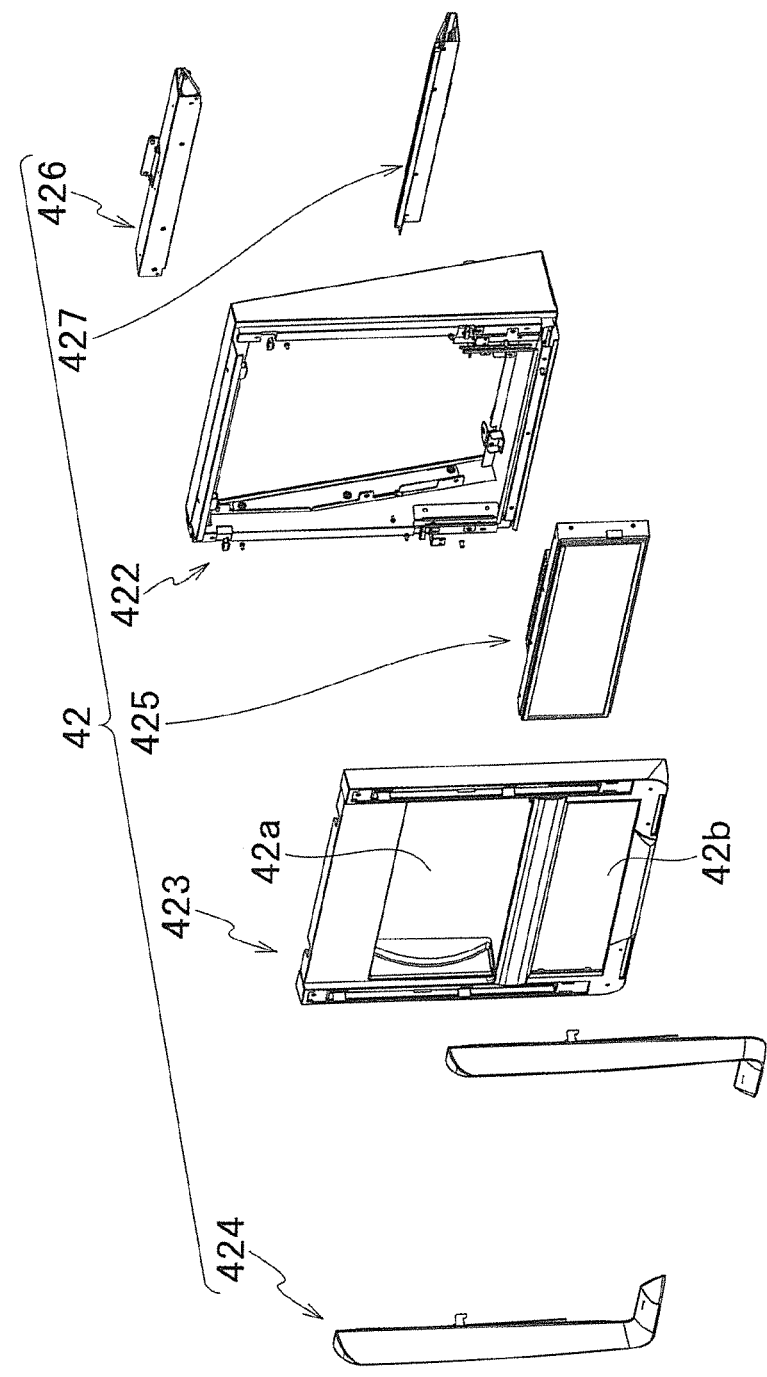
FIG. 34 is an exploded perspective view of an upper door device.
Figure 35:
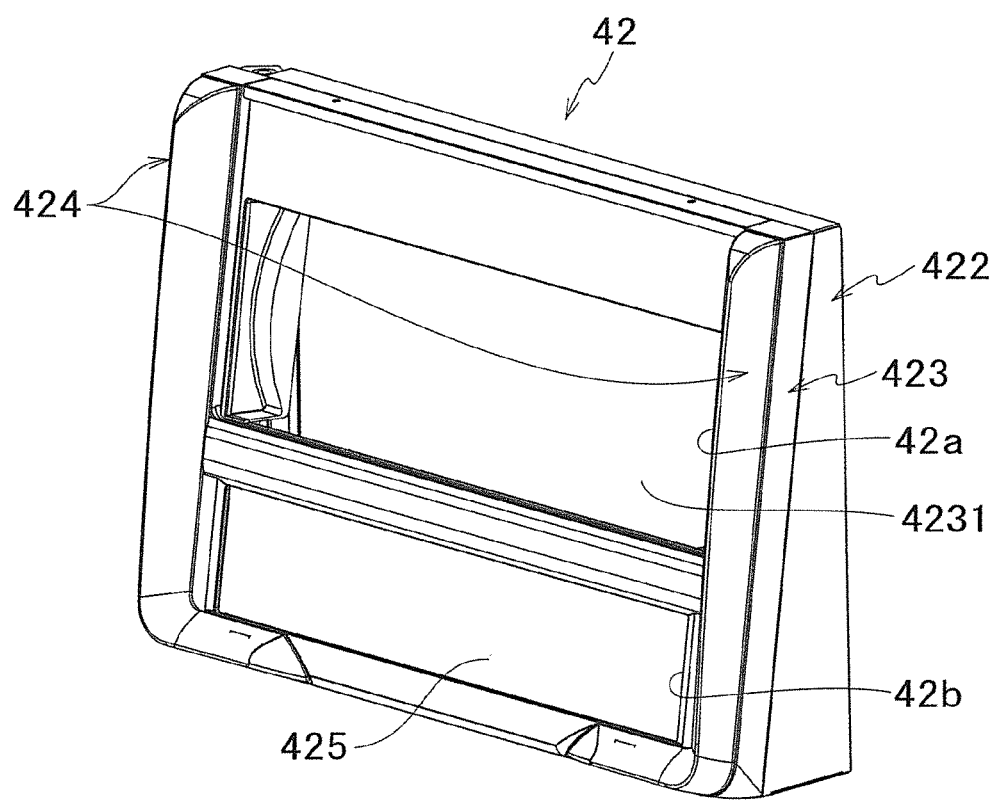
FIG. 35 is a perspective view of the upper door device.
Figure 36:
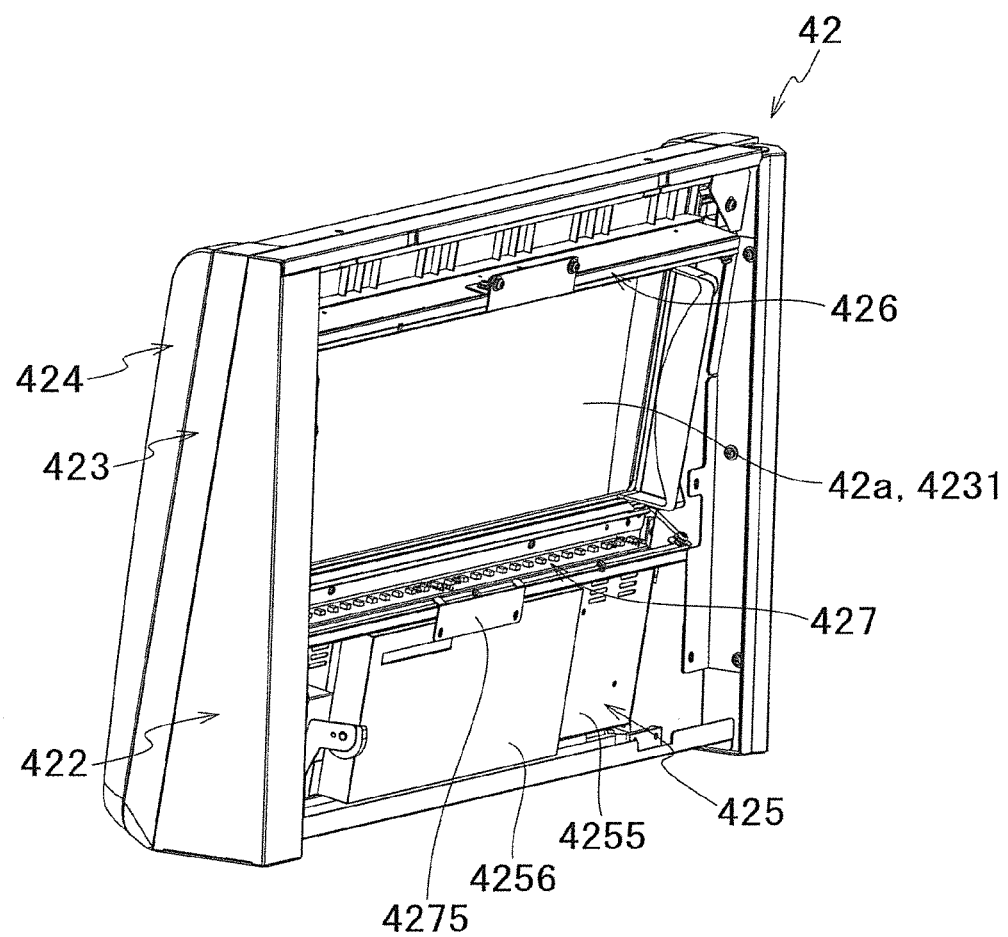
FIG. 36 is a perspective view of the upper door device.
Figure 37:
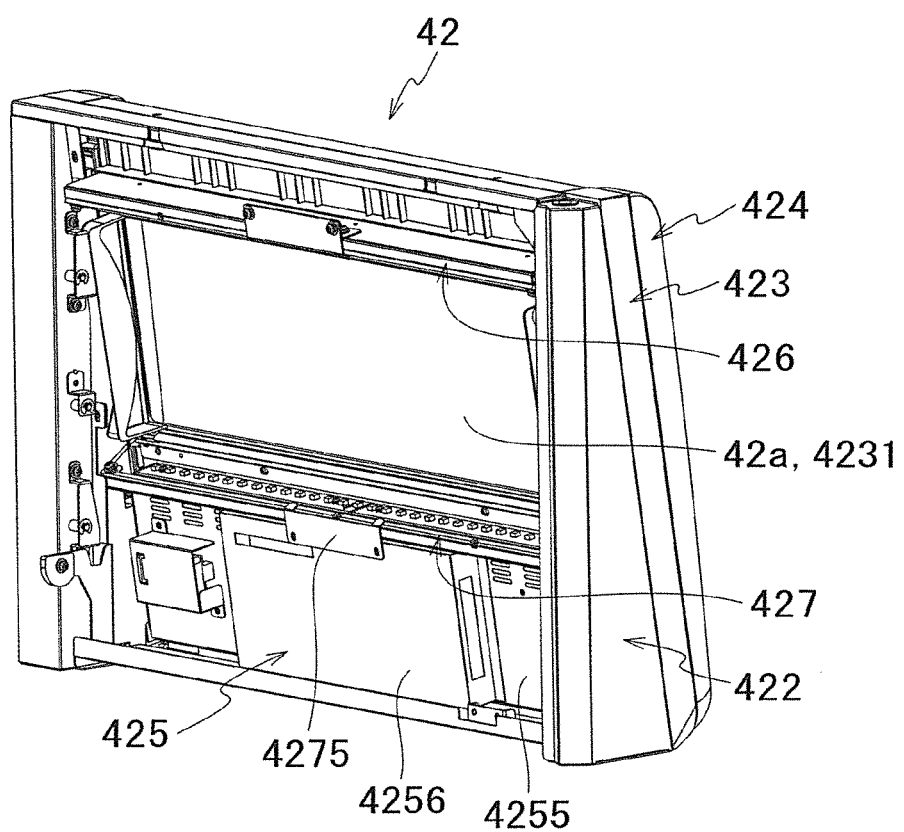
FIG. 37 is a perspective view of the upper door device.

As shown in FIG. 34, the upper door device 42 includes: an upper door main body 422, a bezel mechanism 423, an illumination mechanism 424, a lower display mechanism 425, an upper illumination mechanism 426, and a lower illumination mechanism 427. These mechanisms are assembled as a modularized upper door device 42 by: attaching the illumination mechanism 424 to the front surface of the bezel mechanism 423; attaching the lower display mechanism 425, the upper illumination mechanism 426, and the lower illumination mechanism 427 to the back surface of the bezel mechanism 423; and then attaching the mechanisms 423 to 427 to the front surface of the upper door main body 422, as shown in FIG. 35 to FIG. 37.

(Device Main Body 4: Upper Door Device 42: Symbol Display Window 42a)

The upper door device 42 has a symbol display window 42a. The symbol display window 42a is covered by a reel cover 4231. The reel cover 4231 includes: a base panel such as a transparent liquid crystal panel and a transparent panel, and a touch panel provided to the front surface of the base panel. The symbol display window 42a covered by the reel cover 4231 makes visible 15 symbols arranged in 5 columns, and 3 rows. Three symbols in each column are aligned in a single column on the outer circumferential surface of a reel M3 of the reel unit M11 shown in FIG. 29. It should be noted that the reel unit M11 constitutes a part of the reel device M1. The reel unit M11 and the reel device M1 are detailed later.

The reel M3 of each reel unit M11 is configured so that its rotational speed and rotational direction are variable, and that, when symbols arranged in 5 columns and 3 rows are viewed through the symbol display window 42a, symbols in the columns are displayed and moving upward and downward at different speeds. That is, the symbol display window 42a and the reel device M1 enables a process of rearranging symbols displayed on each reel M3 in which symbols on the reel M3 are vertically rotated and then stopped.

In the left end portion and the right end portion of the symbol display window 42a are payline occurrence columns which are arranged symmetrically to the left and right. When viewing from the player's view point, the payline occurrence column in the left end portion on the left side has 15 payline occurrence parts. Similarly, the payline occurrence column in the right end portion on the right side has 15 payline occurrence parts.

The payline occurrence parts in the left end portion are each paired with any one of the payline occurrence parts in the right end portion. Between the payline occurrence parts on the left end portion and the associated payline occurrence parts on the right end portion are pre-set paylines. There are 15 pre-set paylines.

When a payline occurrence part on the left end portion and one on the right end portion are associated with each other, a payline connecting these to payline occurrence parts on both sides are activated. In other occasions, the payline is inactive. The number of paylines to be activated is determined on the basis of a bet amount. In cases of Maximum bet that is a case of placing a maximum bet amount, there will be 15 paylines, a maximum number of paylines, are activated. Based on the activated paylines, various winning combinations of symbols are established. The winning combinations are detailed later.

It should be noted that the present embodiment deals with a case where the slot machine 1 employs the reel device M1 in the form of mechanical reels; however, the slot machine 1 may adopt in combination video reels which are pseudo reels and the mechanical reels.

(Device Main Body 4: Upper Door Device 42: Gaming Status Display Window 42b)

The upper door device 42 includes a gaming status display window 42b. The gaming status display window 42b is disposed below the symbol display window 42a. The gaming status display window 42b is configured to display various game-related information such as credit conditions and bet information.

(Device Main Body 4: Upper Door Device 42: Lower Display Mechanism 425)

Figure 38:
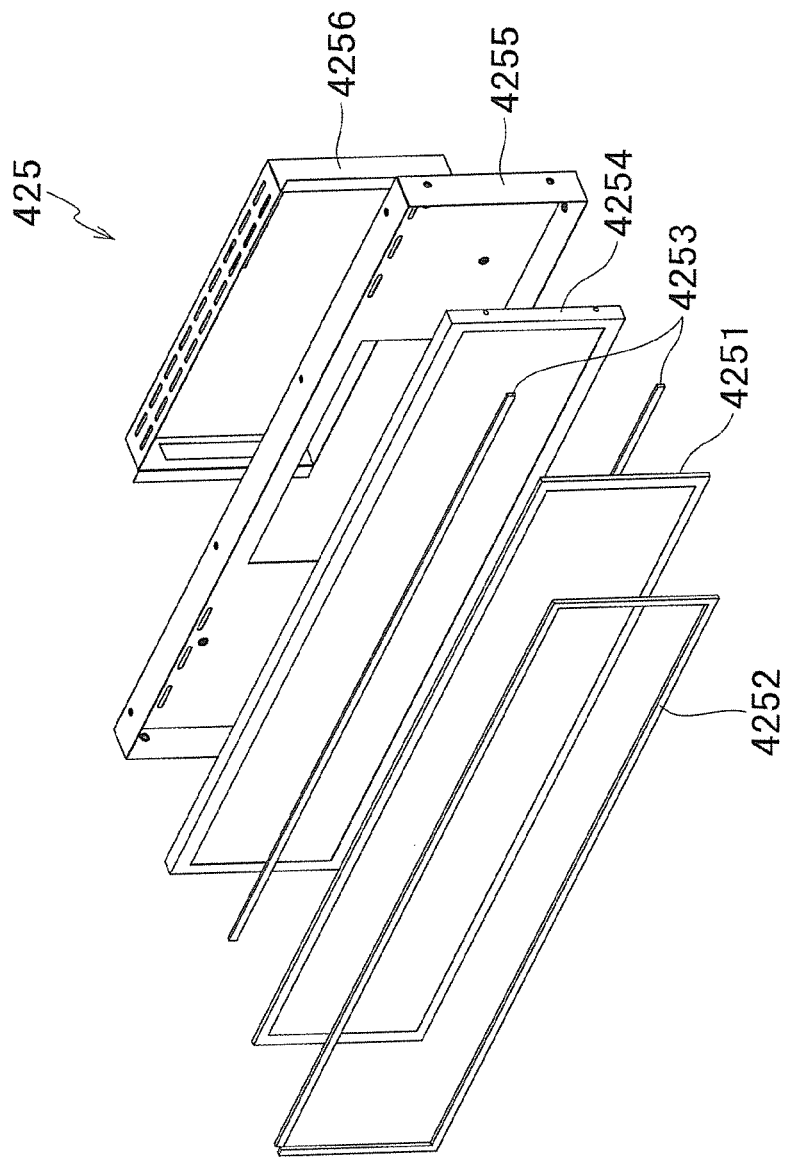
FIG. 38 is an exploded perspective view of a lower display mechanism.

The gaming status display window 42b allows the lower display mechanism 425 to be viewable from the front. As shown in FIG. 36 and FIG. 37, the lower display mechanism 425 is provided on the back surface of the bezel mechanism 423. As shown in FIG. 38, the lower display mechanism 425 includes a lower side touch panel 4251 provided on the forefront. The front peripheral edge of the lower side touch panel 4251 is joined with the back surface of the bezel mechanism 423 of FIG. 35 by a cushion member 4252 which is sponge. The back surface of the lower side touch panel 4251 is connected with a lower side liquid crystal display panel 4254 via a cushion member 4253 made of rubber. The lower side liquid crystal display panel 4254 is supported at a peripheral edge by the panel support base 4255, and a control board base 4256 is provided at a central part of the panel support base 4255.

The lower side liquid crystal display panel 4254 displays image data constituted by a moving image such as a moving picture and a still image such as a text and a figure. The lower side touch panel 4251 allows an image displayed on the lower side liquid crystal display panel 4254 to pass through to be viewable by the player, and allows the player to make an input to the screen by a finger. The control board base 4256 includes a not-shown control board which controls the image display on the lower side liquid crystal display panel 4254.

(Device Main Body 4: Upper Door Device 42: Lower Illumination Mechanism 427)

As shown in FIG. 36, above the lower display mechanism 425 is provided a lower illumination mechanism 427. The lower illumination mechanism 427 is provided along the lower side portion of the symbol display window 42a to mainly illuminate a lower region of the surface of the reel device M1 shown in FIG. 29.

Figure 39:
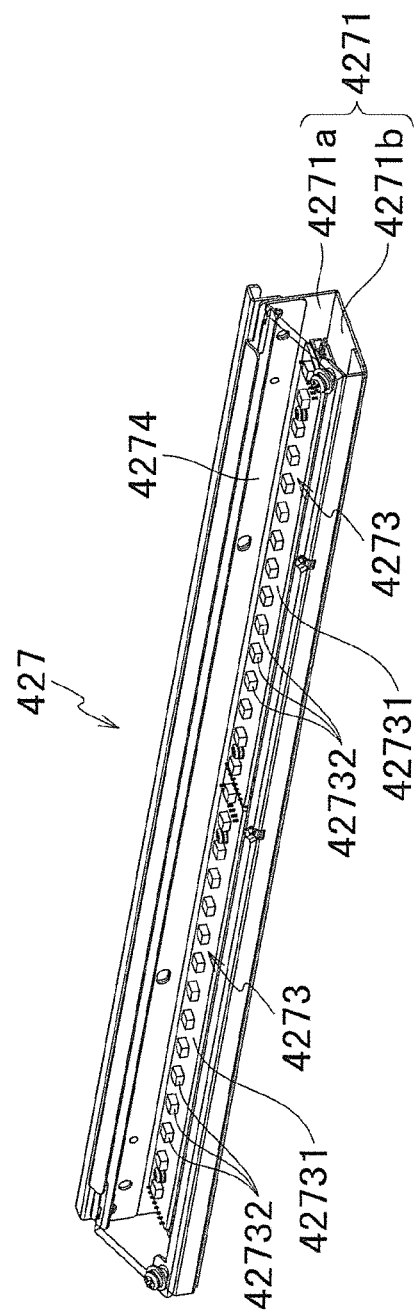
FIG. 39 is a perspective view of a lower illumination mechanism.
Figure 40:
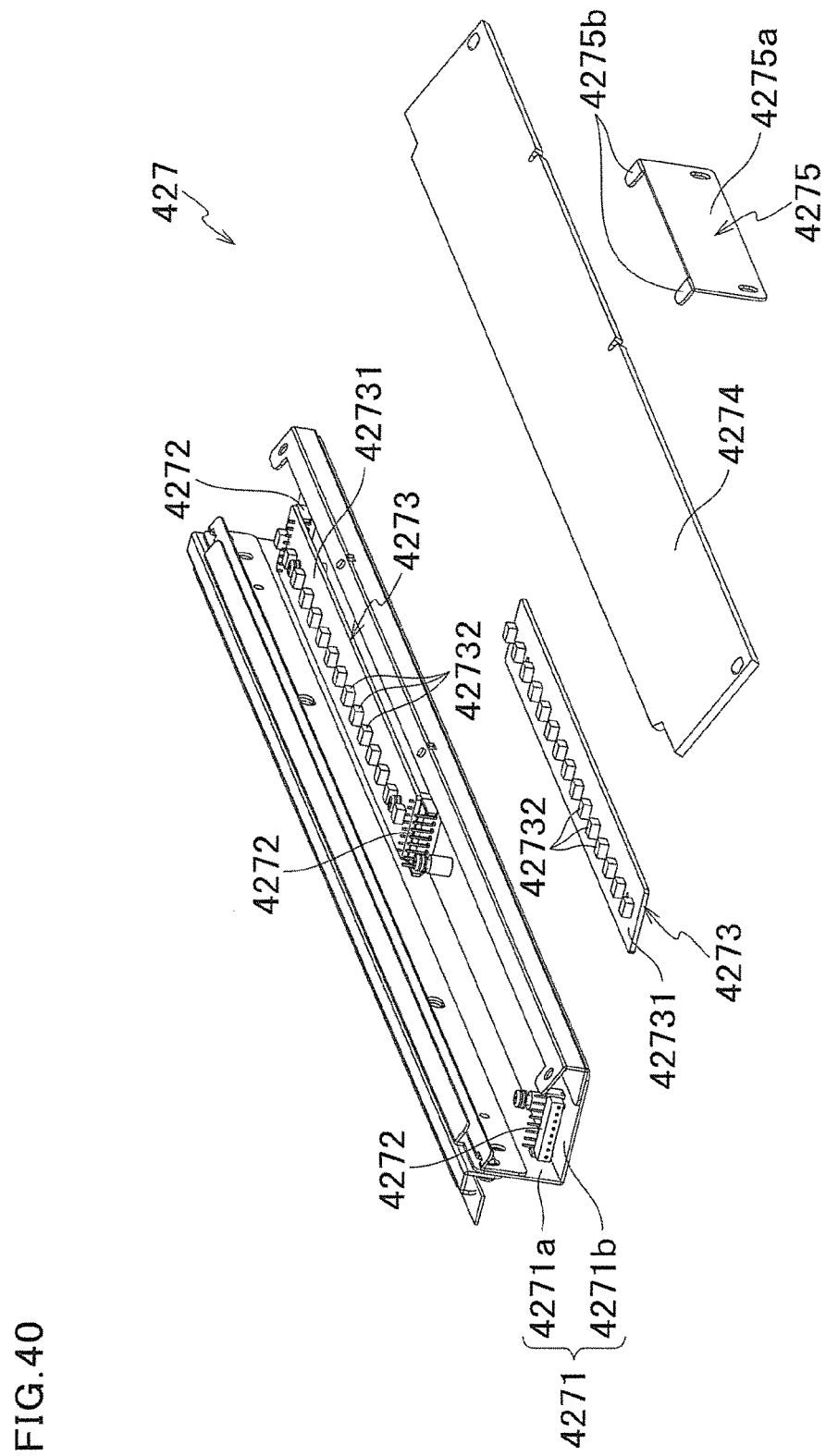
FIG. 40 is an exploded perspective view of the lower illumination mechanism.

As shown in FIG. 39 and FIG. 40, the lower illumination mechanism 427 includes a light source supporter 4271 which is L-shaped when viewed in the left/right direction. The light source supporter 4271 includes an uprising portion 4271a attached to the back surface of the bezel mechanism 423 and a supporting portion 4271b which extends in the horizontal direction from the lower side of the uprising portion 4271a. On the top surface of the supporting portion 4271b, terminal members 4272 each including plurality of connection pins are provided. These terminal members 4272 are provided at both end portions and a central portion in the longitudinal direction (left/right direction) of the light source supporter 4271. In each of these terminal members 4272, the connection pins are provided in the vertical direction, and electric power for illumination is output from these connection pins.

The terminal members 4272 at the right end portion and the central portion support the respective end portions of one lower side light source substrate 4273. The terminal members 4272 at the left portion and the central portion support the respective end portions of the other lower side light source substrate 4273. To these lower side light source substrates 4273, the electric power for illumination is supplied from the connection pins of the light source supporter 4271.

Each lower side light source substrate 4273 includes a light source supporting plate 42731 which is horizontally provided and a plurality of light source members 42732 provided on the top surface of the light source supporting plate 42731. Each light source member 42732 is constituted by a full color LED or a mono-color LED, and is arranged to output illumination light mainly upward. These light source members 42732 are disposed at regular intervals to form a single line in the left/right direction.

Above the lower side light source substrate 4273 is provided a light reflecting plate 4274. The light reflecting plate 4274 is a rectangular flat plate made of transparent resin such as acrylic resin, which allows the illumination light to pass through. One side and the other side of the light reflecting plate 4274 are each connected to the upper side of the uprising portion 4271a and the back side of the supporting portion 4271b of the light source supporter 4271. With this, the normal vector with respect to the top surface and the under surface of the light reflecting plate 4274 is inclined backward, i.e., toward the reel device M1 with respect to the upward direction. As a result, the lower illumination mechanism 427 mainly illuminates the lower region of the front surface of the reel device M1, as the illumination light output upward from the lower side light source substrate 4273 is bended toward the reel device M1 by the light reflecting plate 4274.

The above-described light reflecting plate 4274 is supported at a central part of the top surface by a supporting member 4275. The supporting member 4275 includes a plate member 4275a and two claw members 4275b protruding forward from the both end portions on the upper side of the supporting member 4275. The claw members 4275b contact with the top surface of the light reflecting plate 4274. As shown in FIG. 36 and FIG. 37, the plate member 4275a is screwed to the control board base 4256.

(Device Main Body 4: Upper Door Device 42: Upper Illumination Mechanism 426)

Above the lower illumination mechanism 427 is provided an upper illumination mechanism 426. The upper illumination mechanism 426 is provided along the upper side of the symbol display window 42a, and illuminates mainly an upper region of the surface of the reel device M1 shown in FIG. 29.

Figure 41:
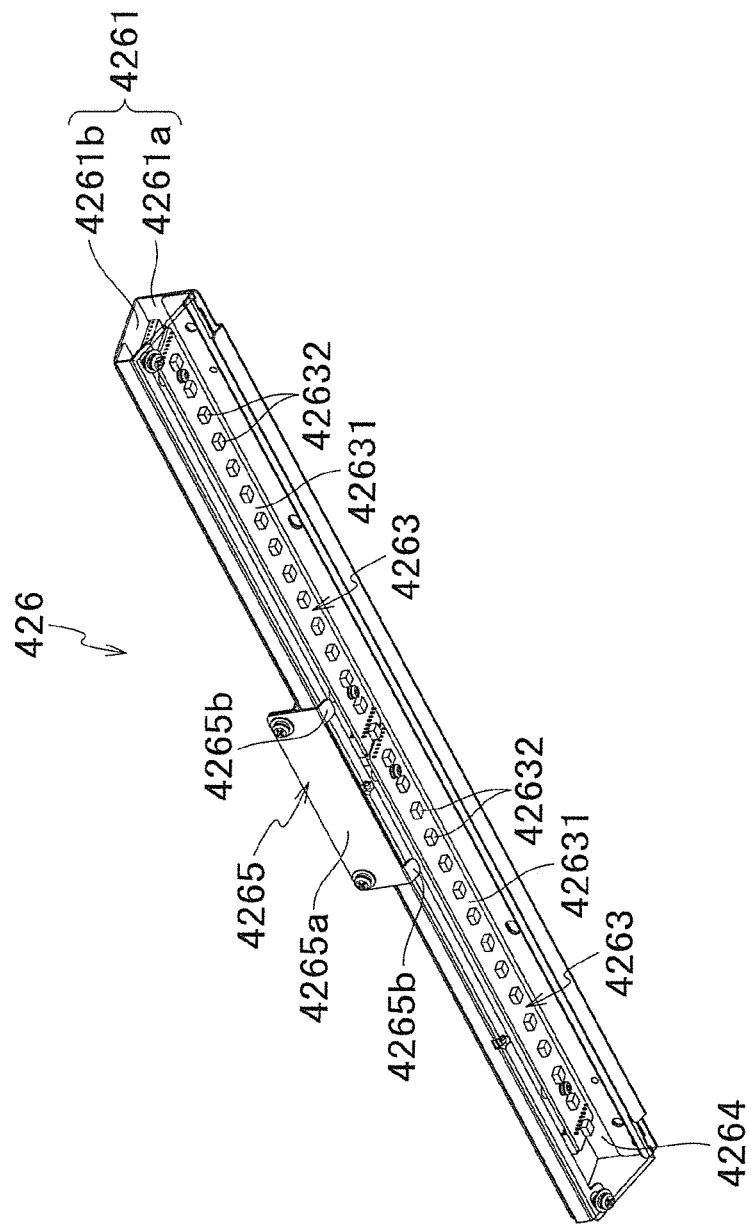
FIG. 41 is a perspective view of an upper illumination mechanism.
Figure 42:
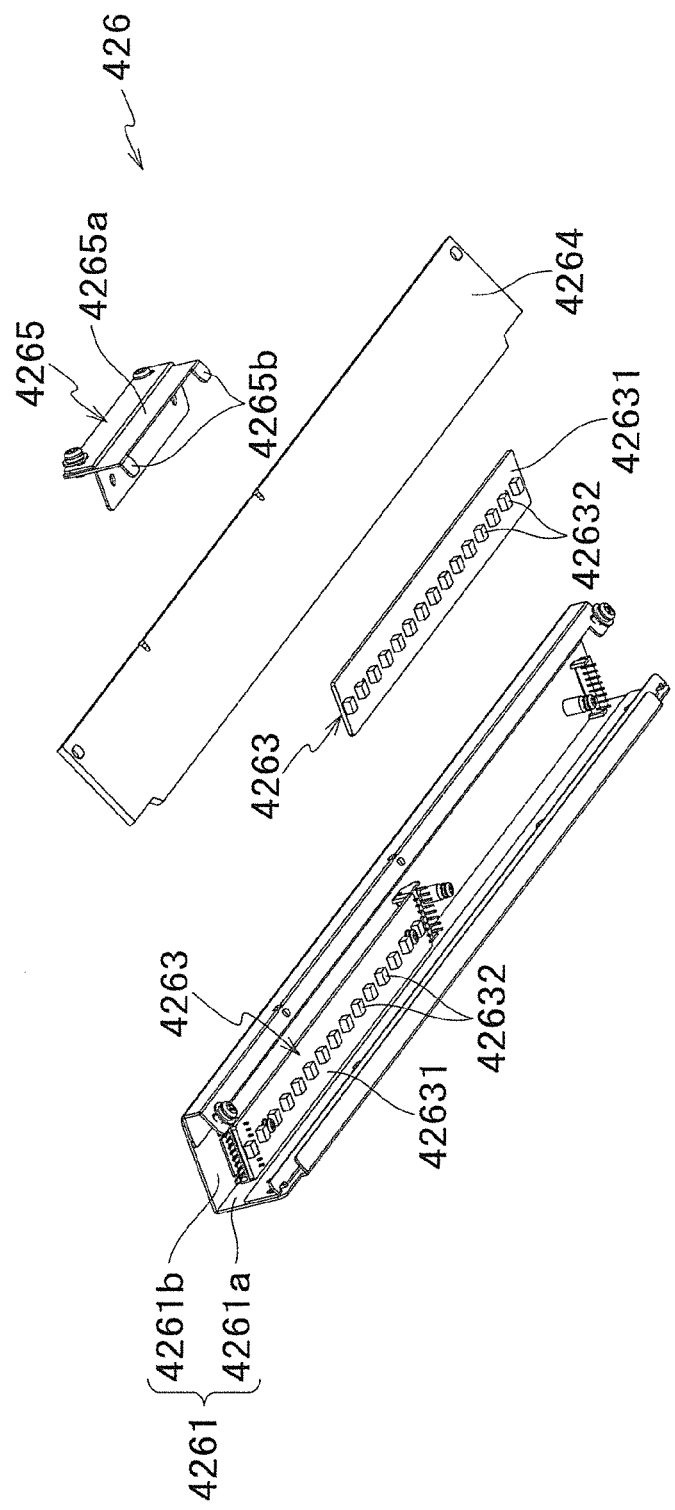
FIG. 42 is an exploded perspective view of the upper illumination mechanism.

As shown in FIG. 41 and FIG. 42, the upper illumination mechanism 426 includes a light source supporter 4261 which is L-shaped when viewed in the left/right direction. The light source supporter 4261 includes a downfalling portion 4261a attached to the back surface of the bezel mechanism 423 and a supporting portion 4261b extending horizontally from the lower side of the downfalling portion 4261a. On the lower surface of the supporting portion 4261b, terminal members 4262 having plurality of connection pins are provided. The terminal members 4262 are provided at both end portions and a central portion in the longitudinal direction (left/right direction) of the light source supporter 4261. In these terminal members 4262, the connection pins are provided in the vertical direction, and the electric power for illumination is output from these connection pins.

The terminal members 4262 at the right end portion and the central portion support the respective end portions of one upper side light source substrate 4263. The terminal members 4262 at the left portion and the central portion support the both end portions of the other upper side light source substrate 4263. These upper side light source substrates 4263 receive the electric power for illumination from the connection pins of the light source supporters 4261.

Each upper side light source substrate 4263 includes a light source supporting plate 42631 which is horizontally provided and a plurality of light source members 42632 provided on the top surface of the light source supporting plate 42631. Each light source member 42632 is constituted by a full color LED and a mono-color LED, and outputs illumination light mainly downward. These light source members 42632 are provided at regular intervals to form a single line in the left/right direction.

Above the upper side light source substrate 4263 is provided a light reflecting plate 4264. The light reflecting plate 4264 is a rectangular flat plate made of transparent resin such as acrylic resin which allows illumination light to pass through. One side and the other side of the light reflecting plate 4264 are each connected with the upper side of the downfalling portion 4261a and the back side of the supporting portion 4261b of the light source supporter 4261. With this, the normal vector with respect to the top surface and under surface of the light reflecting plate 4264 is inclined backward, i.e., toward the reel device M1 with respect to the downward direction. With this, the upper illumination mechanism 426 illuminates mainly the upper region of the front surface of the reel device M1, as the illumination light output upward from the upper side light source substrate 4263 is bended toward the reel device M1 by the light reflecting plate 4264.

The above-described light reflecting plate 4264 is supported at a central portion of the top surface by a supporting member 4265. The supporting member 4265 includes a plate member 4265a, two claw members 4265b extending forward from the both end portions of the upper side of the supporting member 4265, and a protrusion 4265c which protrudes forward from a central part of the supporting member 4265. The claw members 4265b contact with the under surface of the light reflecting plate 4264. As shown in FIG. 36 and FIG. 37, the plate member 4265a is screwed to the control board base 4256. The protrusion 4265c is screwed to the supporting portion 4261b of the light source supporter 4261.

(Device Main Body 4: Upper Door Device 42: Illumination Mechanism 424)

Figure 43:
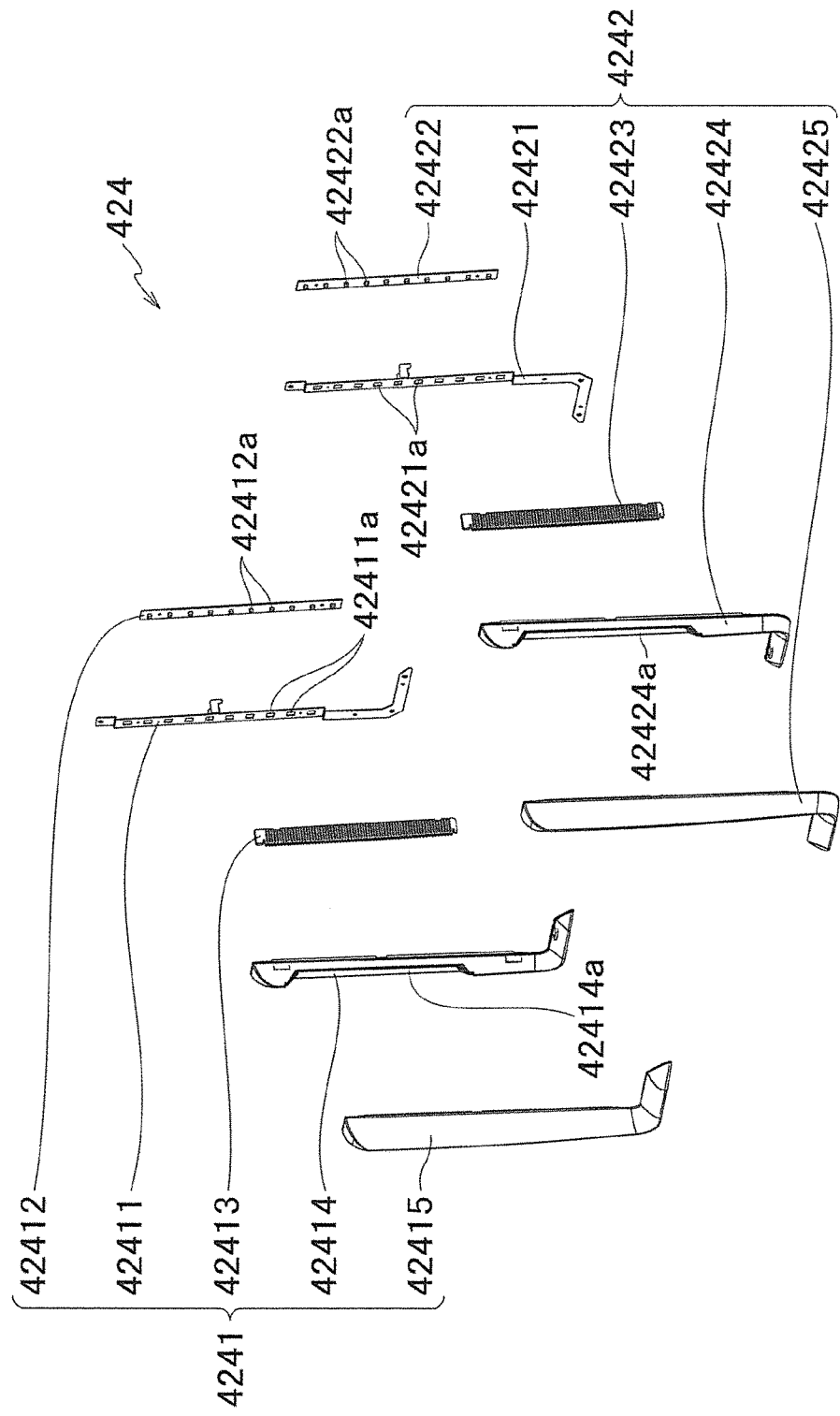
FIG. 43 is an exploded perspective view of an illumination mechanism.

Around the symbol display window 42a in the upper door device 42, an illumination mechanism 424 is provided. As shown in FIG. 43, the illumination mechanism 424 includes a left side illumination module 4241 provided on the left side and a right side illumination module 4242 provided on the right side.

The left side illumination module 4241 includes an L-shaped bracket 42411, an LED panel 42412 provided on the back surface of the L-shaped bracket 42411, a dispersing plate 42413 provided on the front surface of the L-shaped bracket 42411, a casing frame member 42414 provided to the front of the dispersing plate 42413, and a cover member 42415 provided to the front of the casing frame member 42414.

The L-shaped bracket 42411 includes a linear portion which extends in the vertical direction from the upper end portion to the lower end portion and a bent portion which extends rightward from the lower end portion, and has a plurality of through holes 432411a which are linearly lined up at regular intervals at the linear portion. The LED panel 42412 has a plurality of LEDs 42412a. These LEDs 42412a are provided to correspond to the respective through holes 432411a, and emit light forward through the through holes 432411a. The dispersing plate 42413 is formed and positioned to cover all of the through holes 432411a. The dispersing plate 42413 is made of synthetic resin such as acrylic resin which allows light to pass through. Furthermore, the front surface and the right surface of the dispersing plate 42413 are corrugated between the longitudinal ends. With this, when the light from the LEDs 42412a linearly enters from the back surface, the dispersing plate 42413 outputs the light as scattered light, thanks to the corrugated shape of each of the front surface and the right surface.

The dispersing plate 42413 is housed in the casing frame member 42414. The casing frame member 42414 has a through hole 42414a. The through hole 42414a is formed to expose the side surfaces and the front surface of the dispersing plate 42413. The casing frame member 42414 is covered with a light-transmissive cover member 42415. With this, the left side illumination module 4241 illuminates mainly the front side and the left side of the upper door device 42.

In the meanwhile, the right side illumination module 4242 is constructed by members which are symmetrical with the members by which the left side illumination module 4241 is constructed. To be more specific, the right side illumination module 4242 includes an L-shaped bracket 42421, an LED panel 42422 provided on the back surface of the L-shaped bracket 42421, a dispersing plate 42423 provided on the front surface of the L-shaped bracket 42421, a casing frame member 42424 provided to the front of the dispersing plate 42423, and a cover member 42425 provided to the front of the casing frame member 42424.

The L-shaped bracket 42421 includes a linear portion which extends in the vertical direction from the upper end portion to the lower end portion and a bent portion which extends leftward from the lower end portion, and in the linear portion a plurality of through holes 42421*a* are linearly lined up at regular intervals. The LED panel 42422 has a plurality of LEDs 42422*a*. These LEDs 42422*a* are disposed to correspond to the respective through holes 42421*a*, and emit light forward trough the through holes 42421*a*. The dispersing plate 42423 is formed and disposed to cover all of the through holes 42421*a*. The dispersing plate 42423 is made of synthetic resin such as acrylic resin which allows light to pass through. The front surface and the right surface of the dispersing plate 42423 are corrugated between the longitudinal ends. With this, when the light from the LED 42422*a* linearly enters from the back surface, the dispersing plate 42423 emits this light as scattered light thanks to the corrugated shape of each of the front surface and the right surface.

The dispersing plate 42423 is housed in the casing frame member 42424. The casing frame member 42424 has a through hole 42424*a*. The through hole 42424*a* is formed to expose the both side surfaces and the front surface of the dispersing plate 42423. The casing frame member 42424 is covered with a light-transmissive cover member 42425. With this, the right side illumination module 4242 illuminates mainly the front side and the right side of the upper door device 42.

(Device Main Body 4: Lower Door Device 43)

Figure 44:
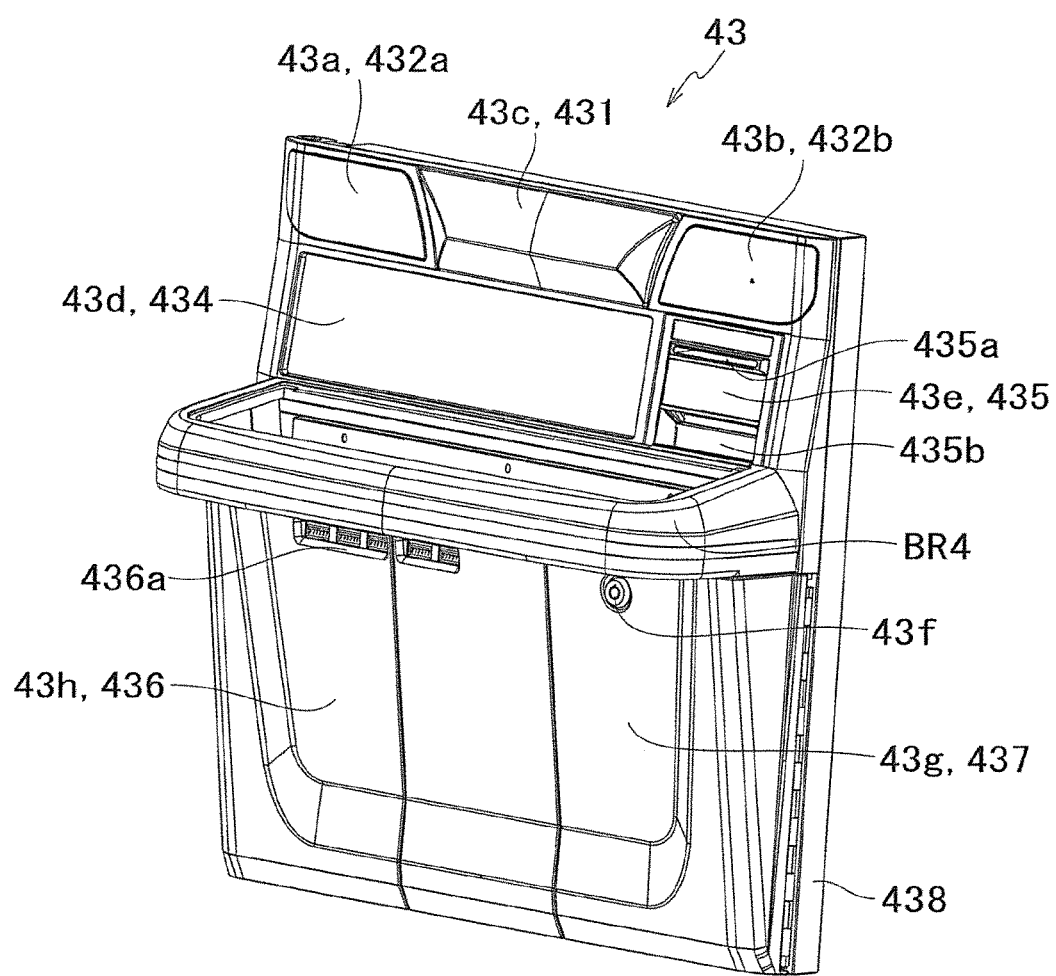
FIG. 44 is a perspective view of a lower door device.

Below the upper door device 42 structured as above, a lower door device 43 is provided. As shown in FIG. 44, the lower door device 43 has a lower door base member 438 at a central portion in the forward/backward direction. The lower door base member 438 forms the frame of the lower door device 43.

The lower door device 43 includes a front mask portion 43*c* provided at an upper central portion, speaker units 43*a* which are symmetrically provided to the left and right of the front mask portion 43*c*, a PTS unit 43*d*, and a bill unit 43*e* provided to the right of the PTS unit 43*d*. Furthermore, the lower door device 43 includes a control panel unit 43*f* provided below the PTS unit 43*d* and the bill unit 43*e*, a bill cover unit 43*g* provided below the right side of the control panel unit 43*f*, and a lower front cover unit 43*h* provided to the left of the bill cover unit 43*g*. These members 43*a* to 43*h* are formed by attaching components to the lower door base member 438.

Figure 45:
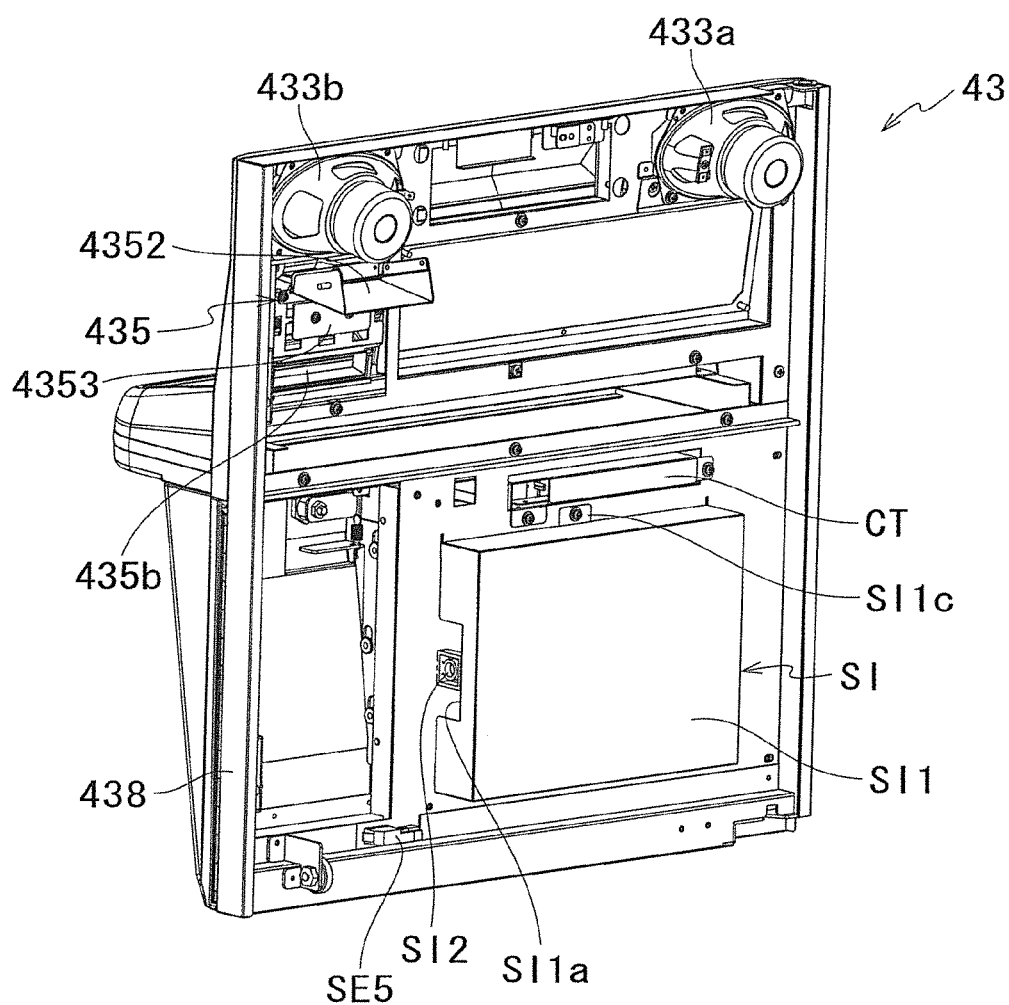
FIG. 45 is a perspective view of the lower door device.

The front mask portion 43*c* has, at the forefront, a front mask cover 431 which has an apex on the front side. The speaker units 43*a* have, at the forefront, speaker covers 432*a* and 432*b* having holes, and speakers 433*a* and 433*b* which are provided behind the speaker covers 432*a* and 432*b* as shown in FIG. 45. The PTS unit 43*d* has a PTS cover 434 at the forefront, and a not-shown PTS unit is attached in place of the PTS cover 434, according to need.

The PTS unit has a function of producing gaming effects by sound and images and updating or the like of credit data in communication with the game controller, and a function of sending necessary credit data at the time of settlement in communication with the bill validation controller. The PTS unit is connected with a management server so as to be able to communicate therewith, and the PTS unit and the management server are able to communicate with each other by two lines, i.e., a normal communication line and an additional function communication line. The PTS unit exchanges data such as cash data, identification code data, membership information of players, or the like by the normal communication line. Furthermore, the PTS unit performs communications regarding a newly-added function by the additional function communication line. To be more specific, by the additional function communication line, the PTS unit performs communications regarding an exchange function, and IC card function, a biometric function, a camera function, a RFID (Radio Frequency Identification) function which is for executing a solid-matter identification function with radio wave.

(Device Main Body 4: Lower Door Device 43: Bill Unit 43*e*)

Figure 46:
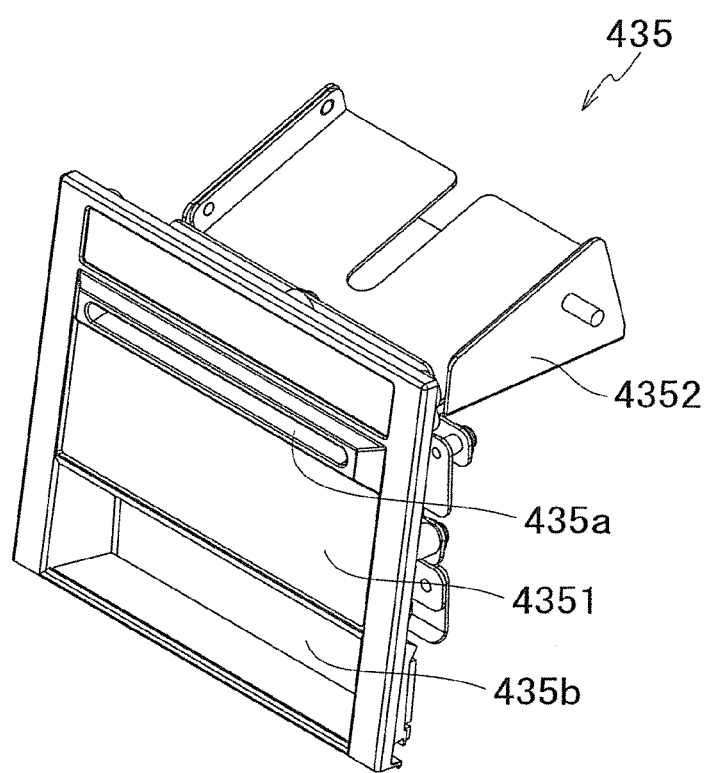
FIG. 46 is a perspective view of a bill handling mechanism.

The bill unit 43*e* includes a bill handling mechanism 435. As shown in FIG. 46, the bill handling mechanism 435 has a print discharge slot 435*a* at an upper portion of the front surface and a bill insertion slot 435*b* at a lower portion of the front surface. Between the print discharge slot 435*a* and the bill insertion slot 435*b*, a bill face plate 4351 which has a predetermined color and made of a light-transmissive material is provided. On the back side of the bill face plate 4351 is provided a light emitting substrate 4353 which includes not-shown full color LEDs or the like and is shown in FIG. 45. When the bill handling mechanism 435 is operated, the light emission substrate 4353 emits light with a color and/or blinking intervals corresponding to the content of the operation, so as to emit light forward through the bill face plate 4351.

Figure 47:
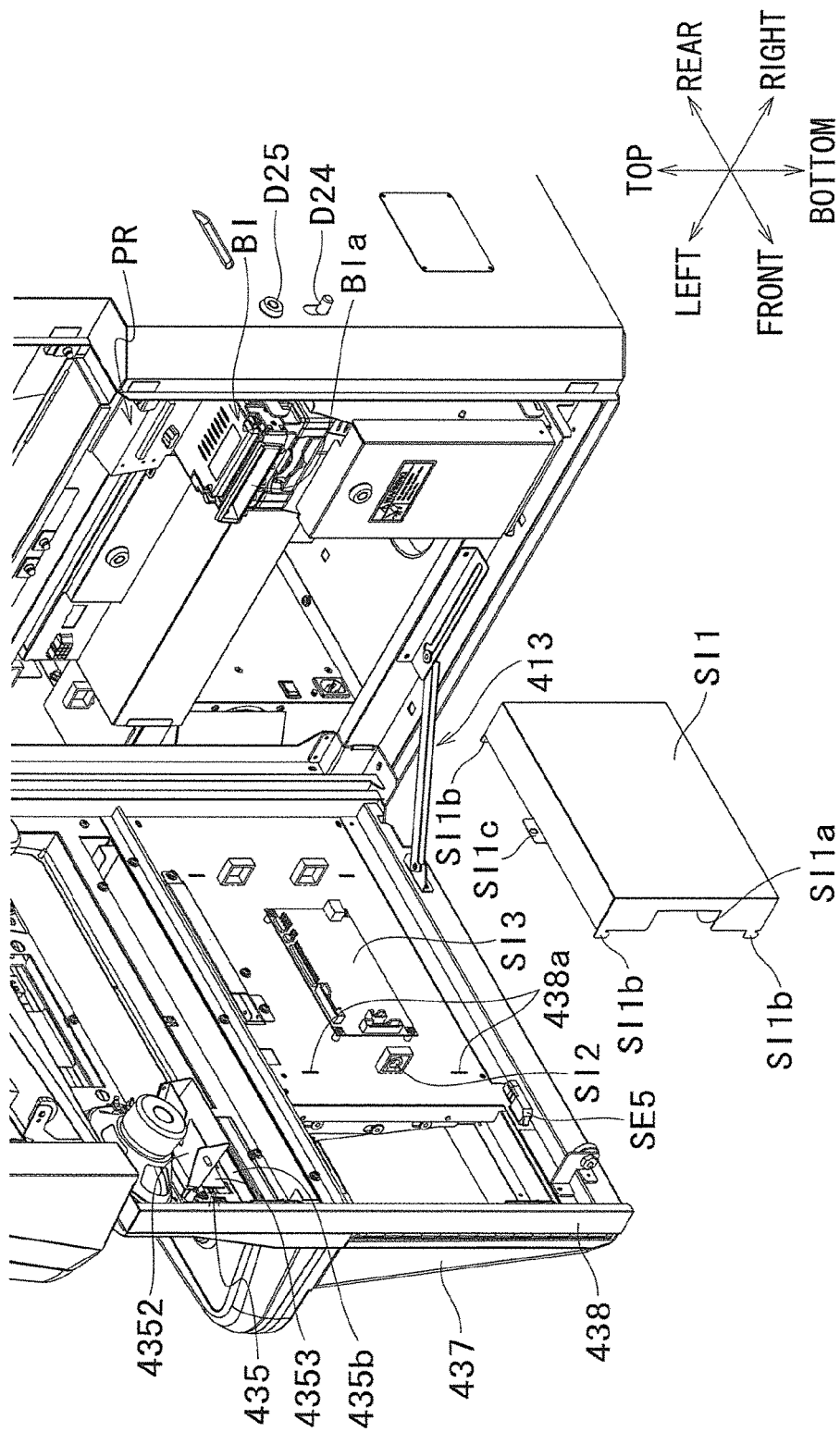
FIG. 47 is an explanatory diagram showing a state where a power source box is detached.

The print discharge slot 435*a* is connected to the front end portion of an inclined plate 4352. The inclined plate 4352 is inclined such that the front end portion is lower than the rear end portion. The rear end portion of the inclined plate 4352 communicates with a printer device PR as shown in FIG. 47. The printer device PR is arranged to print bill information such as a credit on a bill sheet and send out the bill sheet through the print discharge slot 435*a* shown in FIG. 44. The printer device PR is inclined in the same direction as the inclined plate 4352. As the direction of sending out the bill sheet is obliquely downward, the bill sheet is ejected from the print discharge slot 435*a* by utilizing the gravity in addition to the sending-out force of the printer device PR itself.

In the meanwhile, the bill insertion slot 435*b* communicates with an insertion slot BIa of a bill stocker BI. The bill stocker BI has a function of, after drawing a bill inserted into the bill insertion slot 435*b* into the inside, determining the authenticity of the bill, and ejecting the bill from the bill insertion slot 435*b* if it is not authentic or performing storing or the like of the bill in accordance with the type of the bill if it is authentic.

(Device Main Body 4: Lower Door Device 43: Control Panel Unit 43*f*)

Figure 48:
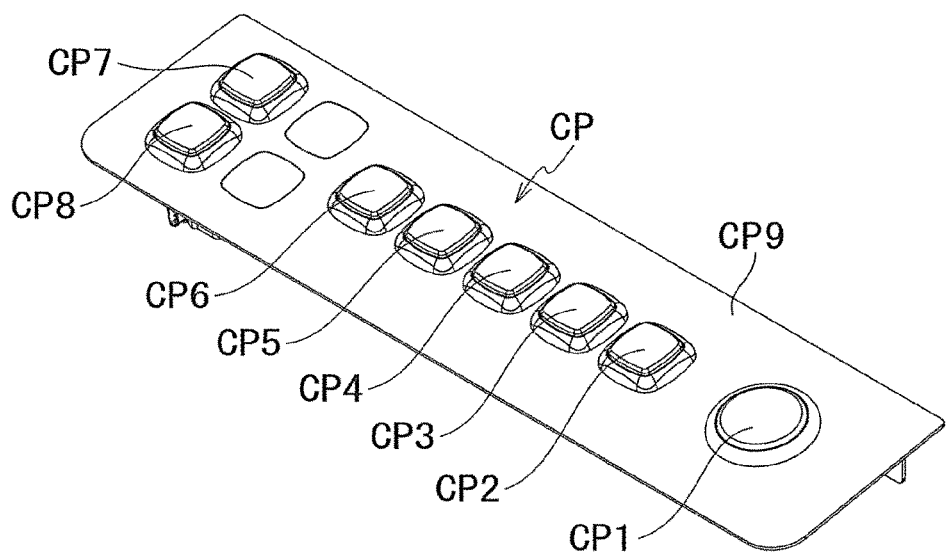
FIG. 48 is a perspective view of a control panel.

In addition to the above, as shown in FIG. 44, the control panel unit 43*f* includes a control panel CP shown in FIG. 29. As shown in FIG. 48, the control panel CP includes a flat base plate CP9 and a plurality of operation buttons CP1 to CP8 provided on the base plate CP9. The operation button CP1 is larger in size than the other buttons CP2 to CP8 and is disc-shaped, to allow the player to easily recognize and press the button. The operation button CP1 is provided at a right end portion of the base plate CP9 and has a function as a start button or a spin button which is pressed to start a game.

The operation buttons CP2, CP3, CP4, CP5, and CP6 are lined up at regular intervals to form a single line, to the left of the operation button CP1. These operation buttons CP2 to CP6 are rectangular in shape. The rightmost operation button CP2 has a function as a max-bet button which is pressed to start a game with the maximum bet number such as 10 times. The operation button CP3 has a function as a 5-bet button which is pressed to start a game with a bet number of 5 times. The operation button CP4 has a function as a 3-bet button which is pressed to start a game with a bet number of 3 times. The operation button CP5 has a function as a 2-bet button which is pressed to start a game with a bet number of 2 times. The operation button CP6 has a function as a 1-bet button which is pressed to start a game with a bet number of 1 time.

The operation buttons CP7 and CP8 are provided at a left end portion of the base plate CP9 to be lined up in the forward/backward direction. The operation button CP7 has a function as a help button which is pressed to display help information regarding how to play a game or the like on the lower display mechanism 425 of the gaming status display window 42b. The operation button CP8 has a function as a cash-out button which is pressed to cash out credits in the form of coins or bills.

(Device Main Body 4: Lower Door Device 43: Lower Front Cover Unit 43h)

As shown in FIG. 44, a lower front cover 436 is provided below the control panel unit 43f. The lower front cover 436 has a counter window 436a at an upper portion. Behind the counter window 436a, as shown in FIG. 45, a counter mechanism CT is provided. The counter mechanism CT has, for example, a function of counting the total game number after resetting and a function of displaying various measured values. The counter window 436a allows a measured value displayed on the counter mechanism CT to be viewable from the front side.

Figure 49:
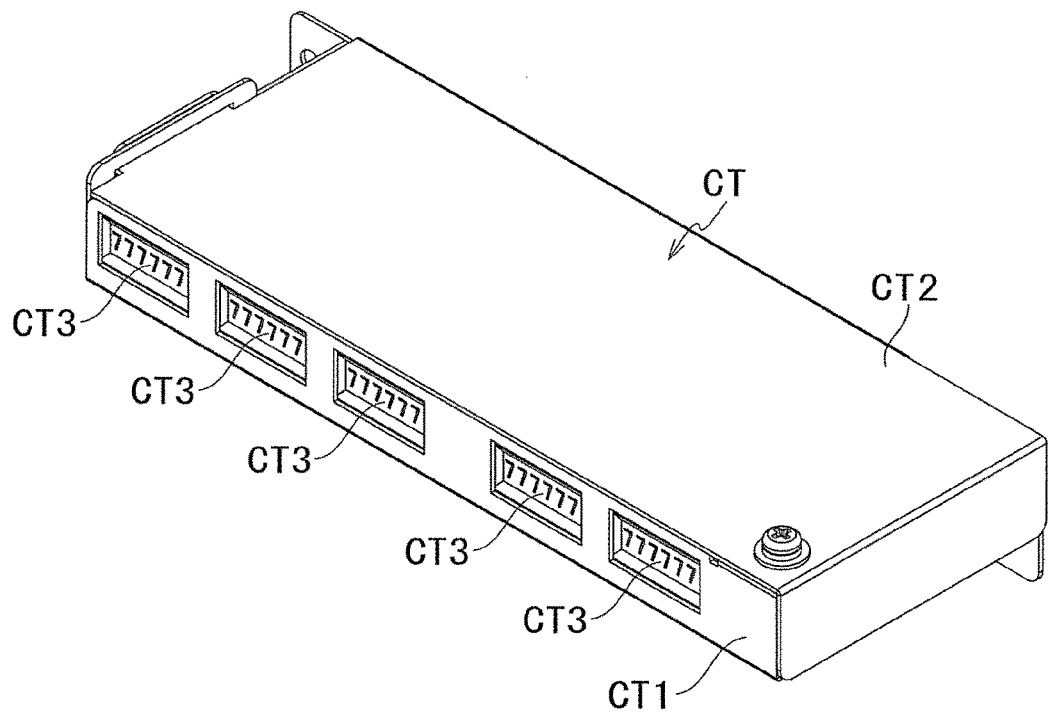
FIG. 49 is a perspective view of a counter mechanism.

As shown in FIG. 49, the counter mechanism CT includes members such as a support member CT1 and a lid member CT2 which covers the upper part of the support member CT1. The support member CT1 and the lid member CT2 form an internal housing space. In this housing space, five counters CT3 each of which can deal with 6 digits at the maximum are provided.

Furthermore, as shown in FIG. 44, below the counter mechanism CT is provided a sub I/O mechanism SI. The sub I/O mechanism SI is provided on the back surface of the lower door base member 438. The sub I/O mechanism SI has a sub substrate casing SI1. The sub substrate casing SI1 is a box which is open on the front side which is the lower door base member 438 side. At the right side surface of the sub substrate casing SI1, a concave portion SI1a is formed. At a position corresponding to the concave portion SI1a, a clamping member SI2 is provided. The clamping member SI2 bundles not-shown signal cables which are wired inside and outside the sub substrate casing SI1 via the concave portion SI1a.

In addition to the above, at each corner of the sub substrate casing SI1, a claw member SI1b is formed as shown in FIG. 47. The claw member SI1b protrudes forward from each of the front end portions of the side walls, and has a notch portion which extends upward at the root portion on the side wall side. In the meanwhile, in the lower door base member 438, engaging holes 438a are formed at positions corresponding to the respective claw members SI1b of the sub substrate casing SI1. Each engaging hole 438a is arranged to be engaged with the claw member SI1b when the claw member SI1b of the sub substrate casing SI1 is inserted from the back side and then the sub substrate casing SI1 is pressed down. As such, the sub substrate casing SI1 is maintained to be attached to the lower door base member 438 by the engagement of the claw members SI1b and the gravity on the sub substrate casing SI1, even if the sub substrate casing SI1 is not supported by an external force.

In addition to the above, the sub substrate casing SI1 has a fixing portion SI1c which extends upward from a upper middle portion of the upper end of the side wall. The fixing portion SI1c is screwable to the lower door base member 438 when the sub substrate casing SI1 is attached to the lower door base member 438 by the claw members SI1b. As such, it is impossible to detach the sub substrate casing SI1 from the lower door base member 438, unless the lower door device 43 is opened, the fixing portion SI1c provided on the back side of the lower door device 43 is unscrewed, and the claw members SI1b are disengaged.

The sub substrate casing SI1 stores a sub I/O substrate SI3. The sub I/O substrate SI3 is constituted by a printed board which functions as an interface for button operations of the control panel CP on the lower door device 43 and for electric components for illumination or the like. With this, a mechanical access to the sub I/O substrate SI3 is impossible unless the sub substrate casing SI1 is detached.

(Device Main Body 4: Lower Door Device 43: Bill Cover Unit 43g)

Figure 50:
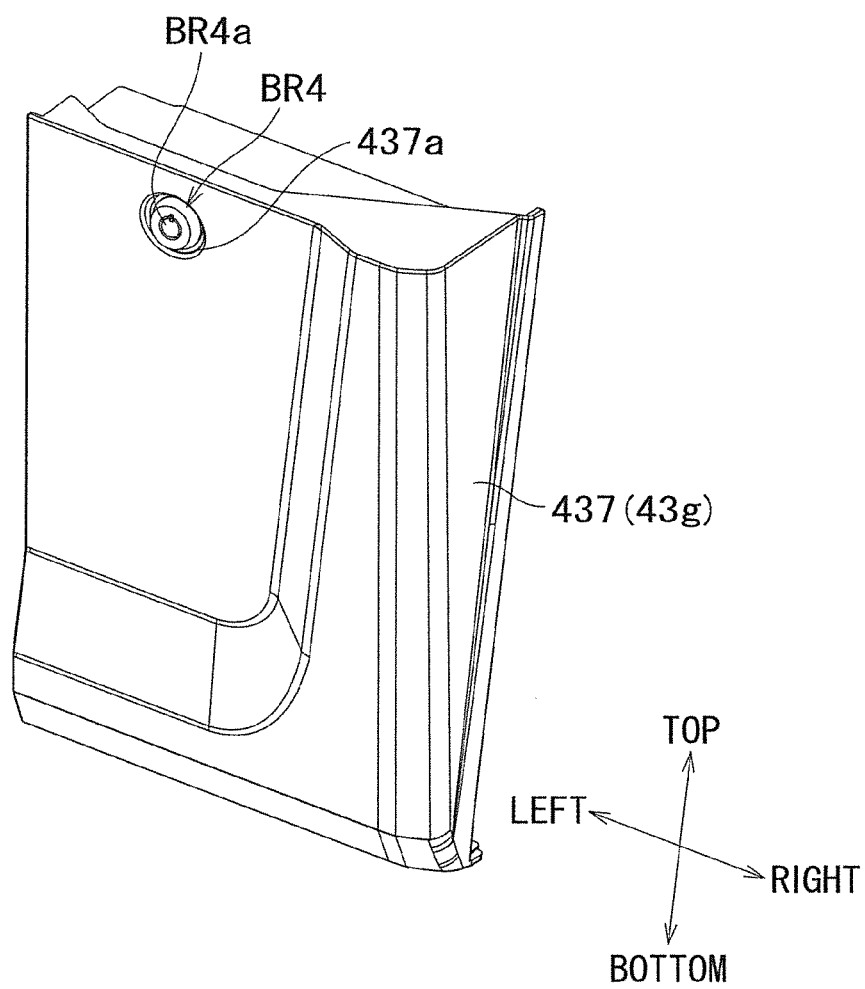
FIG. 50 is a perspective view of a bill drop door.

As shown in FIG. 44, a bill cover unit 43g is provided to the right of the lower front cover unit 43h. The bill cover unit 43g is arranged to be openable and to be lockable by a key when closed. To be more specific, as shown in FIG. 50, the bill cover unit 43g has a bill drop door 437 at the forefront. In an upper portion of the bill drop door 437 is formed a through hole 437a. The through hole 437a allows a key portion BR4a of a key cylinder BR4 in a bill cover lock mechanism BR to be exposed frontward.

Figure 51:
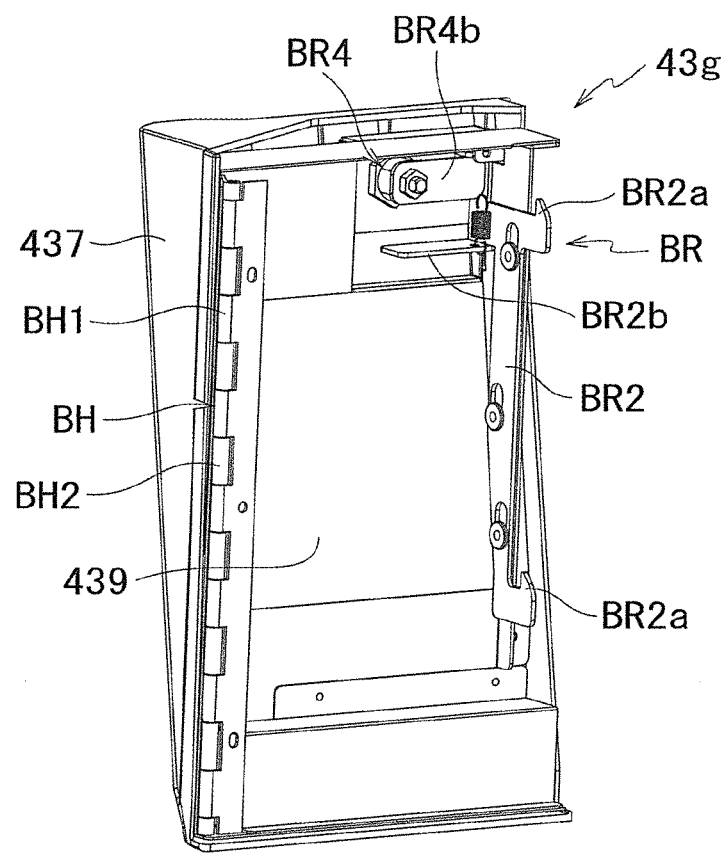
FIG. 51 is a perspective view of a bill cover lock mechanism.

As shown in FIG. 51, a bill cover base member 439 is provided on the back surface of the bill drop door 437. The bill cover base member 439 supports the bill drop door 437 by the front surface and supports a part of the bill cover lock mechanism BR and a part of the bill cover hinge mechanism BH by the back surface.

(Device Main Body 4: Lower Door Device 43: Bill Cover Unit 43g: Bill Cover Hinge Mechanism BH)

Figure 52:
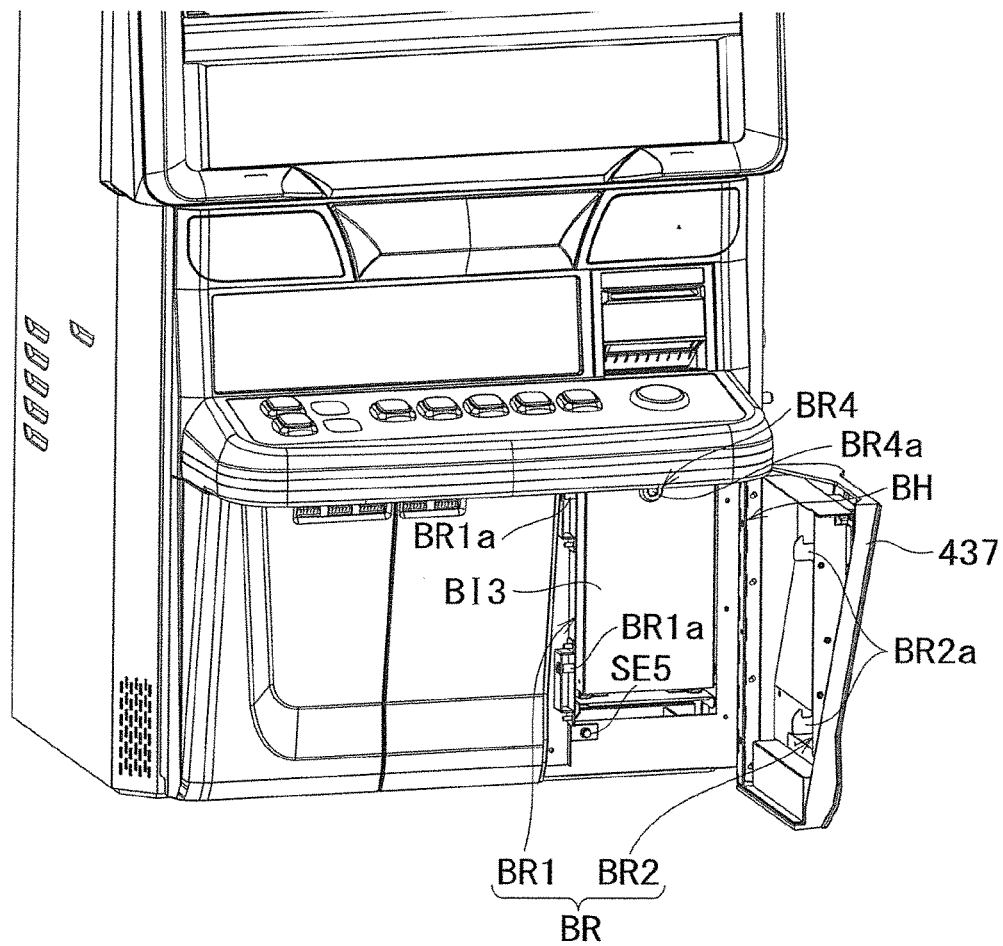
FIG. 52 is a perspective view of a bill cover lock mechanism.

As shown in FIG. 52, the bill cover hinge mechanism BH is provided at a right end portion of the bill cover base member 439. The bill cover hinge mechanism BH is formed by rotatably connecting, by an engagement pin, one hinge member BH1 fixed to the bill cover base member 439 with the other hinge member BH2 fixed to the lower door base member 438. The rotation axis of the bill cover hinge mechanism BH extends in the vertical direction, and the bill cover hinge mechanism BH supports the bill drop door 437 and the bill cover base member 439 of the bill cover unit 43g to be horizontally openable.

(Device Main Body 4: Lower Door Device 43: Bill Cover Unit 43g: Bill Cover Lock Mechanism BR)

In the meanwhile, at a left end portion of the bill cover base member 439 is provided a bill cover lock mechanism BR. The bill cover lock mechanism BR includes a locking member BR1 fixed to the lower door base member 438 and an engagement member BR2 fixed to the bill cover base member 439. The locking member BR1 includes two protrusions BR1a which protrude leftward from an upper portion and a lower portion of the bill cover unit 43g. In the meanwhile, the engagement member BR2 includes claw members BR2a which are disposed to be engaged with the protrusions BR1a. The claw members BR2a, the leading end portions of which point upward, are engaged with the protrusions BR1a when the engagement member BR2 is at a bill locking height position, and are disengaged from the protrusions BR1a when the engagement member BR2 is lowered from the bill locking height position to a bill locking cancellation height position.

As shown in FIG. 51, the engagement member BR2 is a long plate and is provided to be movable in the vertical direction with respect to the bill cover base member 439. In the engagement member BR2, the claw members BR2a are movable in a range between an upper limit position which is not lower than the bill locking height position and a lower limit position which is lower than the bill locking cancellation height position. The engagement member BR2 has, at an upper end portion, an abutting portion BR2b which extends rightward. At a root portion of the abutting portion BR2b, an end of a spring BR3 is connected. The other end of the spring BR3 is connected with the bill cover base member 439, and hence the spring BR3 biases the engagement member BR2 upward.

Above the abutting portion BR2b is provided a key cylinder BR4. The key cylinder BR4 is provided on the front wall of the bill cover base member 439. The key cylinder BR4 includes a key portion BR4a shown in FIG. 50 and a rotational portion BR4b provided behind the key portion BR4a. The rotational portion BR4b has a rotation axis which is vertical with respect to the front wall of the bill cover base member 439. When a not-shown key is inserted into the key portion BR4a and rotated, the rotational portion BR4b is rotated about the rotation axis in the rotational direction of the key.

The rotational portion BR4b is a rectangular plate and a longitudinal end portion thereof corresponds to the rotation axis. When the rotational portion BR4b is rotated so that its longitudinal direction corresponds to the vertical direction, the other end portion contacts with the engagement member BR2 to press down the engagement member BR2 to the lower limit position which is lower than the bill locking cancellation height position. In the meanwhile, when the rotational portion BR4b is rotated so that its longitudinal direction corresponds to the left/right direction, the other end portion is moved away from the engagement member BR2 so that the engagement member BR2 is elevated by the spring BR3 to the upper limit position which is not lower than the bill locking height position.

With this, when the bill cover unit 43g is closed, as the not-shown key is inserted into the key cylinder BR4 and the rotational portion BR4b is rotated to contact with and press down the abutting portion BR2b, the bill cover unit 43g is unlocked and opened. In the meanwhile, when the bill cover unit 43g is open, after the rotational portion BR4b is rotated by the not-shown key in the direction of moving away from the abutting portion BR2b, the bill cover unit 43g is locked by the biasing force of the spring BR3 when the bill cover unit 43g is closed.

The opening and closing of the bill drop door 437 are detectable by a bill drop door switch SE5. The bill drop door switch SE5 is provided at the lower door base member 438 of the lower door device 43, and is arranged to turn on when the bill drop door 437 is closed and to turn off when the bill drop door 437 is opened. The bill drop door switch SE5 is monitored based on a sensor signal from the bill drop door switch SE5.

(Device Main Body 4: Bill Stocker BI)

Figure 53:
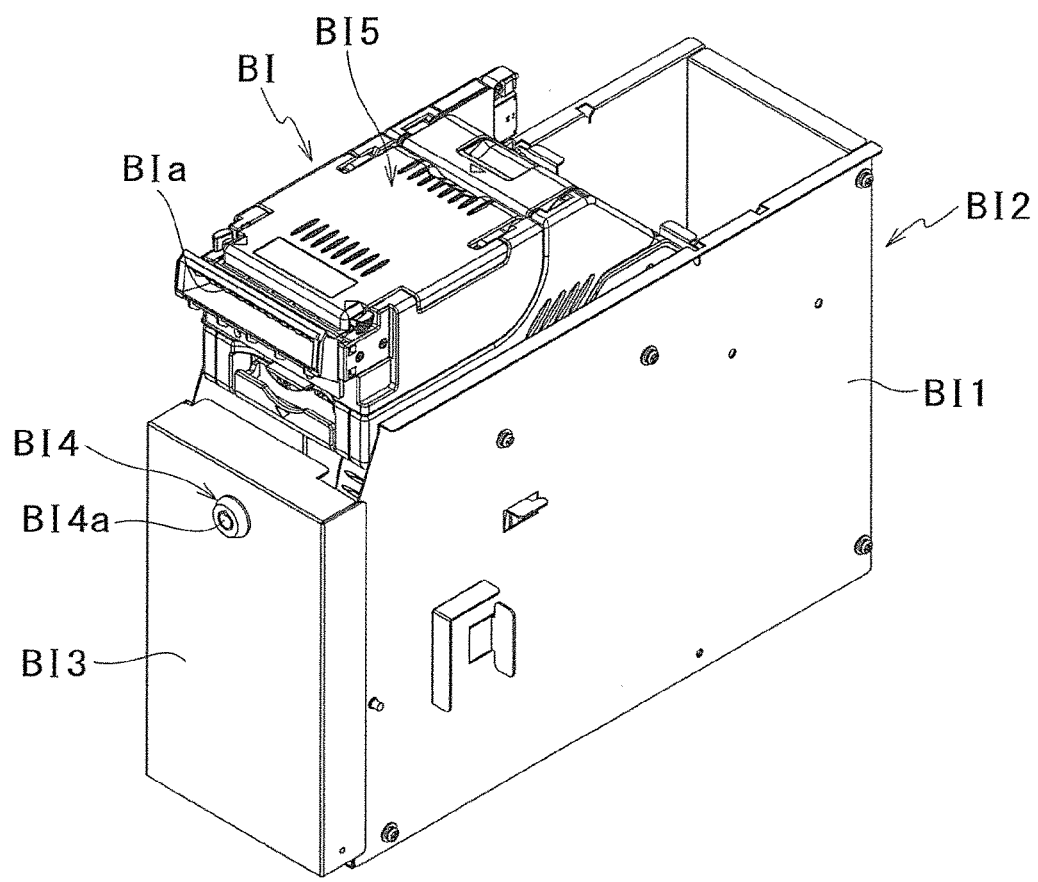
FIG. 53 is a perspective view of a bill stocker case.

When the bill cover unit 43g is opened, as shown in FIG. 52, a bill stocker case BI2 storing the bill stocker BI is exposed forward. As shown in FIG. 53, the bill stocker case BI2 includes a rectangular parallelepiped bill stocker case main body BI5 which is open at the top and at the front and a bill stocker door BI3 with which the front side of the bill stocker case main body BI5 is openable. At an opened part on the top side of the bill stocker case main body BI5, an upper mechanism BI5 having an insertion slot BIa of the bill stocker BI protrudes. At the inner surface of the back wall of the bill stocker case main body BI5, a not-shown bill stocker sensor is provided for detecting the presence of the bill stocker BI.

Figure 54B:
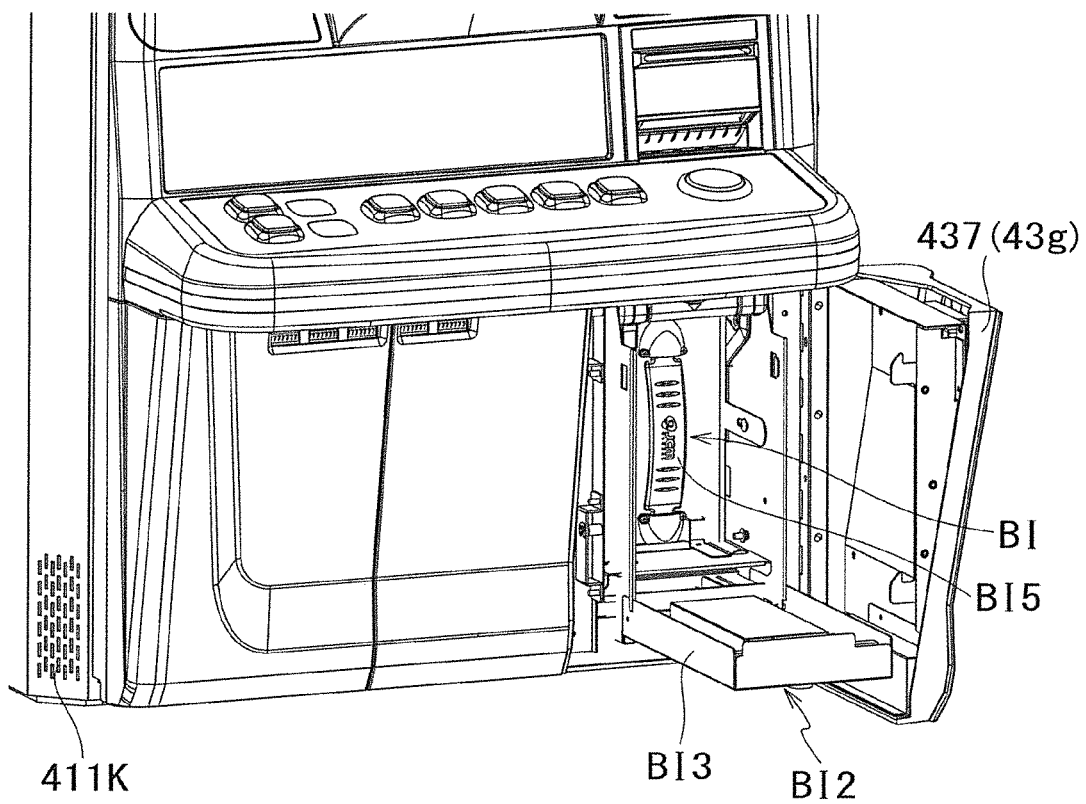
FIG. 54B is a perspective view of the bill stocker case.

At an upper central part of the front surface of the bill stocker door BI3, a key portion BI4a of a key cylinder BI4 is provided. The key cylinder BI4 includes the key portion BI4a and a rotational portion BI4b which is provided behind the key portion BI4a as shown in FIG. 54. As shown in FIG. 54, the rotational portion BI4b protrudes toward the back surface side of the bill stocker door BI3, and has a rotation axis which is vertical to the front wall of the bill stocker door BI3. With this, when the not-shown key is inserted into the key portion BI4a and rotated, the rotational portion BI4b is rotated about the rotation axis in the rotational direction of the key.

The rotational portion BI4b is formed by a rectangular plate, and a longitudinal center of this portion corresponds to the rotation axis. To longitudinal end portions of the rotational portion BI4b, one end portions of paired engagement members BI4c are connected. The engagement members BI4c and the rotational portion BI4b are rotatably connected with one another. Each engagement member BI4c is supported at its central portion to be movable in the left/right direction. With this, the engagement members BI4c are arranged such that the distances between the other end portions of the engagement members BI4c and the rotational center are changeable by the rotation of the rotational portion BI4b.

At upper front end portions of the left and right walls of the bill stocker case main body BI5, through holes BI2a are formed, respectively. These through holes BI2a are formed so that the other end portions of the engagement members BI4c can be inserted thereto. In the meanwhile, the lower parts on the front sides of the left and right walls of the bill stocker case main body BI5 rotatably support the lower end portion of the bill stocker door BI3 with the rotation axis extending in the left/right direction.

With this, as the longitudinal direction of the rotational portion BI4b of the key cylinder BI4 corresponds to the left/right direction while the bill stocker door BI3 is closed, the bill stocker door BI3 is locked as the other end portions of the engagement members BI4c are inserted into the through holes BI2a. In the meanwhile, as the not-shown key is inserted into the key cylinder BI4 and the rotational portion BI4b is rotated to draw the engagement members BI4c toward the rotational center, the locking of the bill stocker door BI3 by the key cylinder BI4 is canceled. In the meanwhile, as the upper end portion of the bill stocker door BI3 is drawn forward, the bill stocker door BI3 is tilted about the lower end portion, so that the front side of the bill stocker case main body BI5 is opened. As the front side of the bill stocker case main body BI5 is opened, as shown in FIG. 54, a gripping portion BI5 of the bill stocker BI is exposed, and hence the bill stocker BI can be drawn frontward by gripping the gripping portion BI5.

As such, because the slot machine 1 includes the openable bill cover unit 43g, a person can access the bill stocker BI no matter whether the lower door device 43 is open or closed. Furthermore, it is possible to access the bill stocker BI by performing two opening operations, i.e., an operation to open either the lower door device 43 or the bill cover unit 43g and an operation to open the bill stocker door BI3.

(Device Main Body 4: Game Mechanism Device 41: Casing 411)

Figure 55:
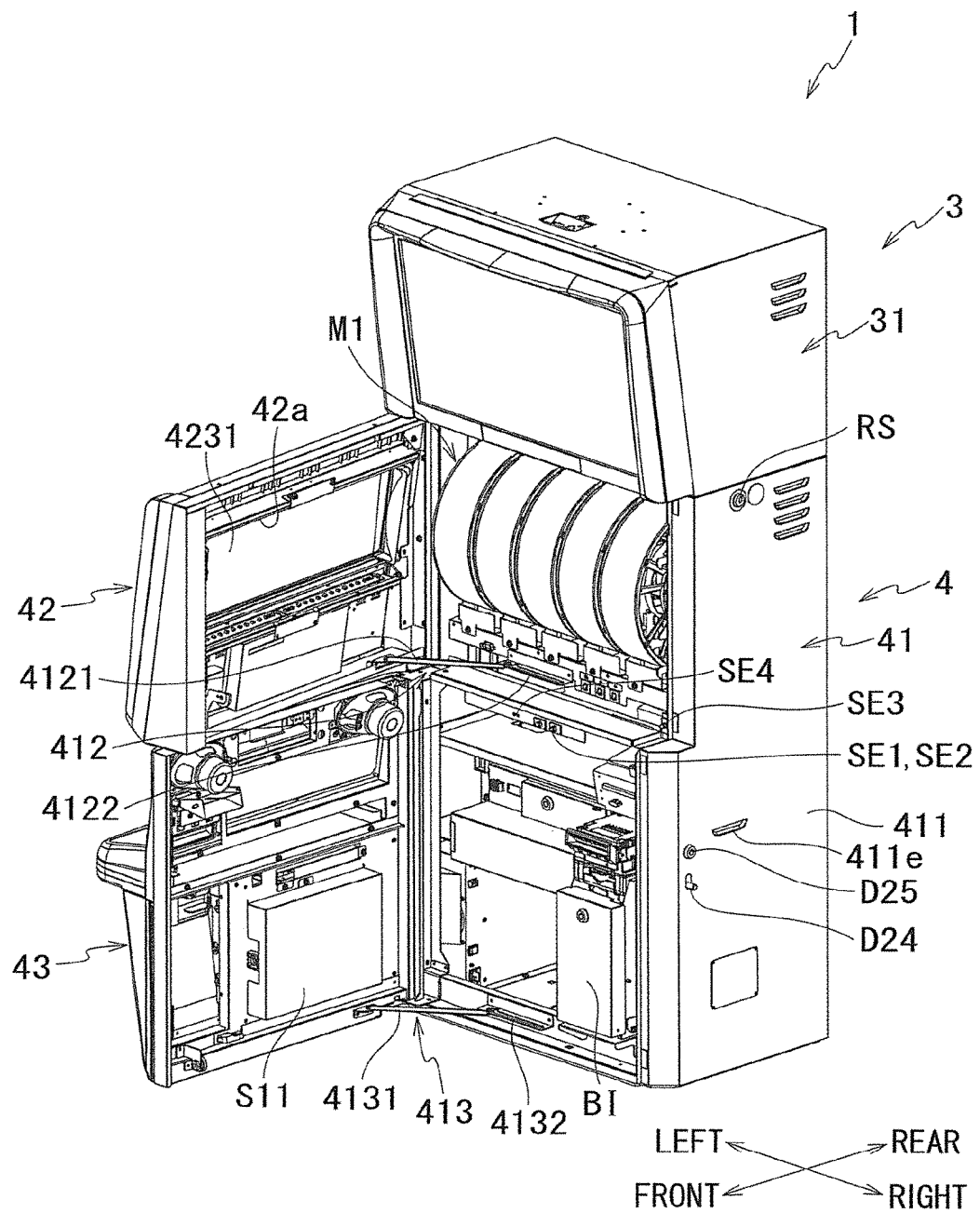
FIG. 55 is a perspective view of the slot machine.

As shown in FIG. 55, the bill stocker BI is provided at a lower right part in the game mechanism device 41. The game mechanism device 41 includes a casing 411 which houses various devices and mechanisms such as the bill stocker BI. The casing 411 is a box which is open on the front side. The upper door device 42 is provided at an upper front portion of the casing 411, whereas the lower door device 43 is provided at a lower front portion of the casing 411.

Figure 56:
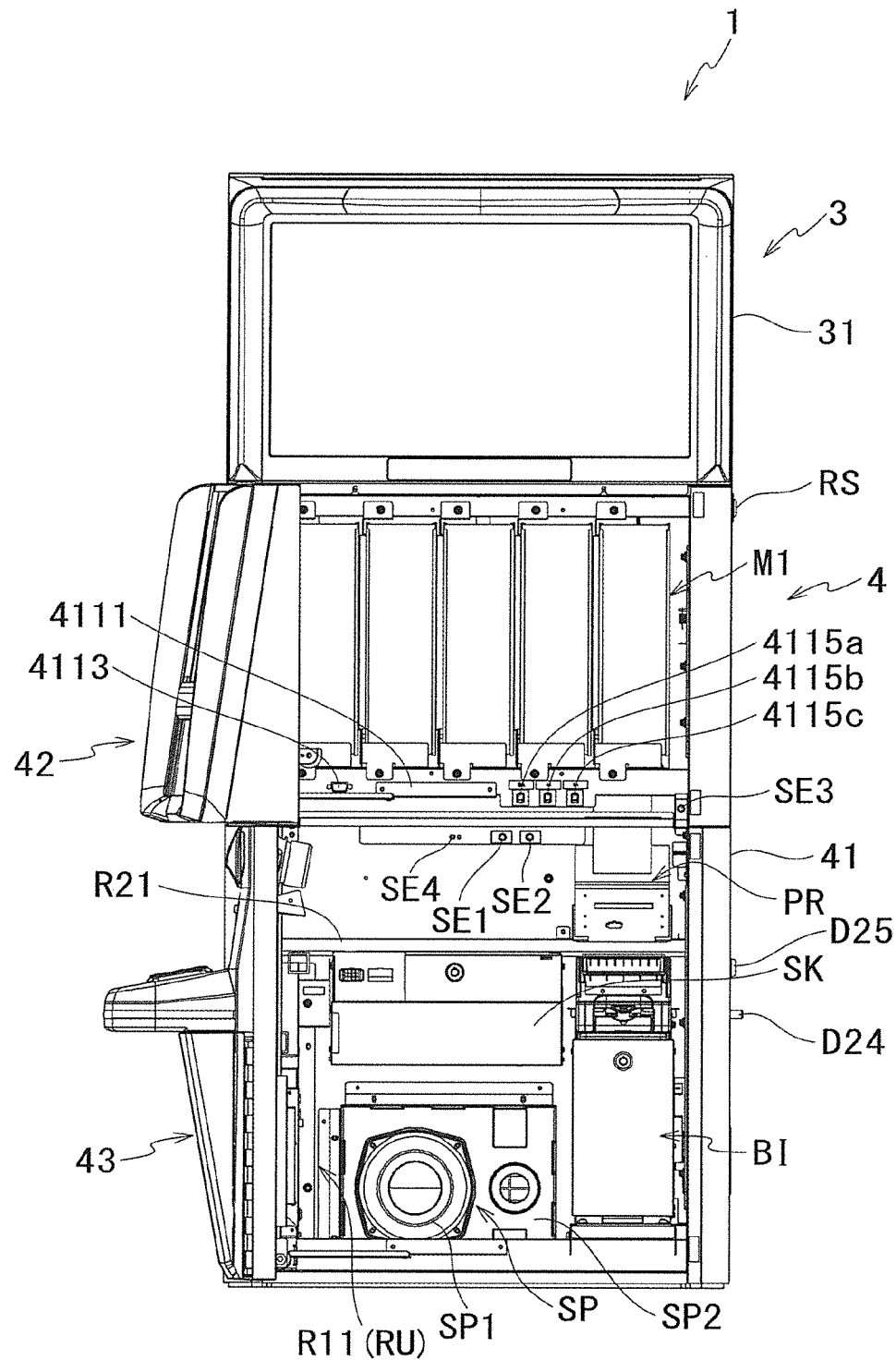
FIG. 56 is a front view of the slot machine.
Figure 57:
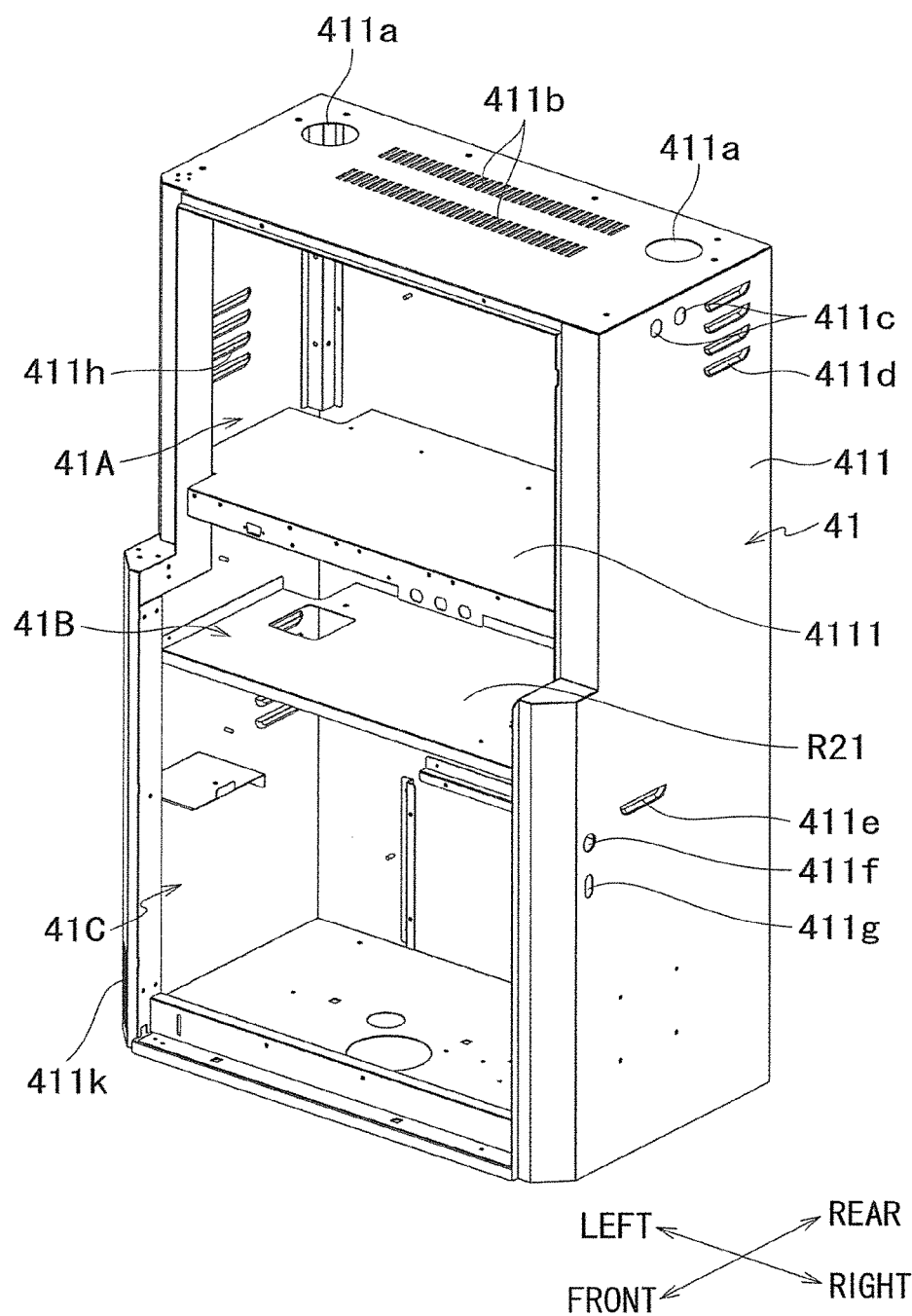
FIG. 57 is a perspective view of a casing.
Figure 59:
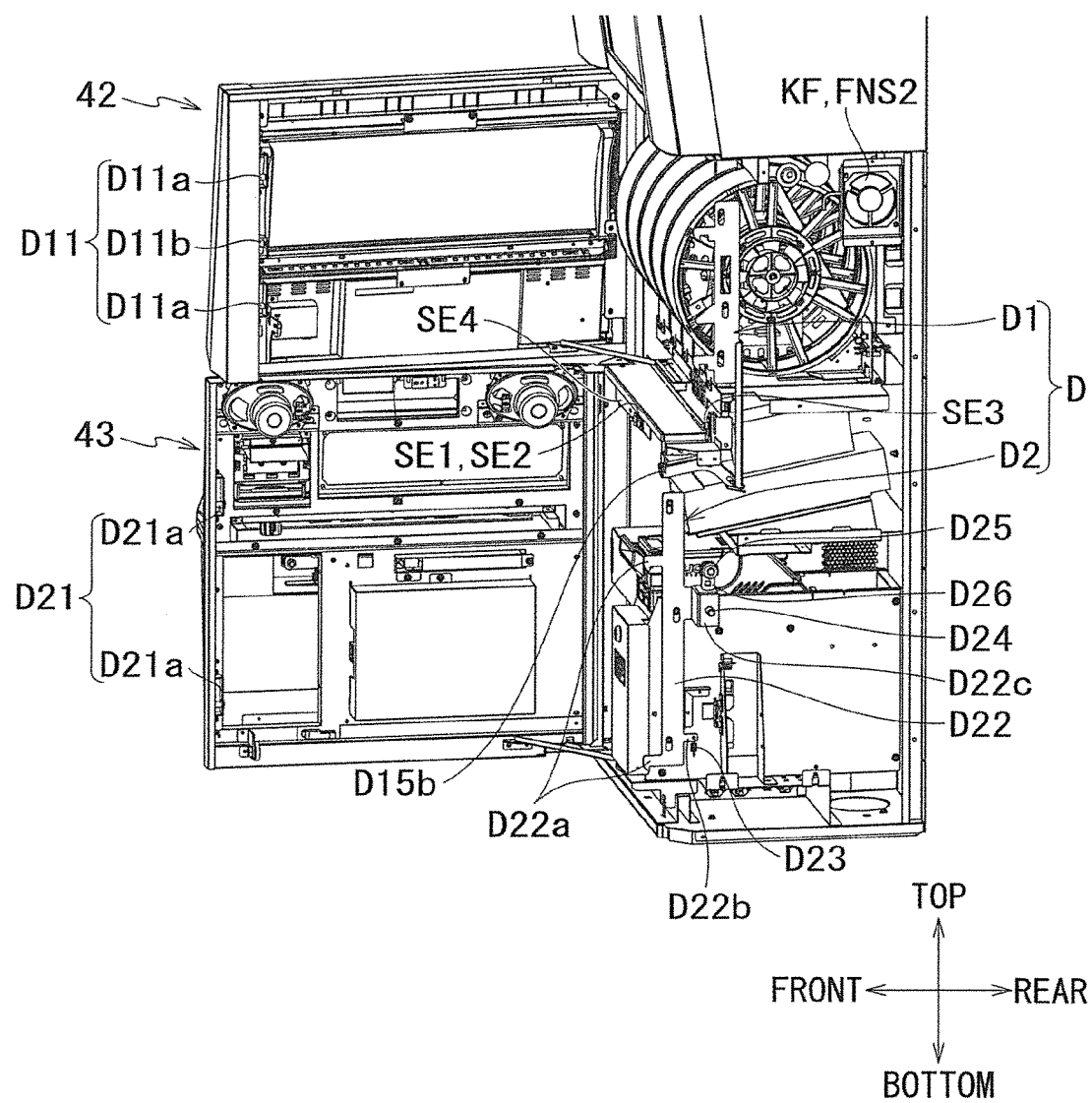
FIG. 59 is a perspective view of a main part of the slot machine.

As shown in FIG. 57, the casing 411 has, through the top wall, two through holes 411a and a plurality of slits 411b. Into the through holes 411a, not-shown signal cables, electric power cables, or the like are inserted. In the meanwhile, the slits 411b connect the internal space of the top box 31 shown in FIG. 55 and FIG. 56 with the internal space of the casing 411 to allow the air to flow between the top box 31 and the casing 411. At an upper end portion of the right side wall of the casing 411, two key switch holes 411c and a plurality of air holes 411d are formed. At one of the key switch holes 411c, a reset key switch RS for monitoring temperatures is provided. The reset key switch RS is used to cancel a power save mode when the power source unit RU is in the power save mode. On the inner side of the air holes 411d, as shown in FIG. 59, a casing fan KF is provided. The casing fan KF allows the outside air to flow into the casing 411 through the air holes 411d. The casing fan KF is provided with a not-shown casing fan sensor FNS2, and this casing fan sensor FNS2 detects the temperature of the casing fan KF and outputs a casing fan temperature signal.

In addition to the above, as shown in FIG. 57, through a central part of the right side wall of the casing 411, an air intake hole 411e, a key hole 411f, and a locking hole 411g are formed. The air intake hole 411e is connected to the internal space of the shelf board member R21 to allow the external air to flow into the security cage SK via the shelf board member R21. At the key hole 411f is provided a key cylinder D25 of a door lock mechanism D. The locking hole 411g is provided below the key hole 411f and is a long hole which is long in the vertical direction. At the locking hole 411g is provided a door lock bar D24 of the door lock mechanism D. The door lock mechanism D will be detailed later.

In the meanwhile, at an upper portion and a lower portion of the left side wall of the casing 411, as shown in FIG. 28, a plurality of air holes 411h and 411j are formed. The air holes 411h and 411j allow the outside air to flow into the casing 411. At a central part of the left side wall of the casing 411, an air intake hole 411i is formed. The air intake hole 411i is connected to the internal space of the shelf board member R21 to allow the external air to flow into the security cage SK via the shelf board member R21. Furthermore, at a lower end portion on the front side of the left side wall of the casing 411, a plurality of air holes 411k are formed for cooling the power source. In the meanwhile, the air hole 411i at the central part allows the air inside the casing 411 to flow out in cooperation with a later-described radiation mechanism R.

The above-described casing 411 has a three-layer structure such that the internal space is divided into three spaces in the vertical direction. To put it differently, the game mechanism device 41 includes a top space 41A, a middle space 41B, and a bottom space 41C. The top space 41A and the middle space 41B are divided by the upper side support member 4111. As shown in FIG. 56, at a left side portion of the front wall of the upper side support member 4111, a communication connector 4113 conforming to a communication standard such as RS232C is provided. The communication connector 4113 is connectable, via a communication cable, to an information processing terminal by which the falsification of programs or the like is checked. Furthermore, at a right side portion of the front wall of the upper side support member 4111, circuit breakers 4115a, 4115b, and 4115c for 2 amperes, 4 amperes, and 8 amperes are provided.

In addition to the above, the middle space 41B and the bottom space 41C are divided by the shelf board member R21. The shelf board member R21 functions as a security cage cooling mechanism R2 for forcibly cooling electronic components or the like in the security cage SK by air. The top space 41A houses members such as the reel device M1 and the main body substrate casing N1. The middle space 41B houses the printer device PR and is able to house a not-shown PTS unit. The bottom space 41C houses members such as the security cage SK, the bill stocker BI, a speaker unit SP, and the power source box R11 (power source unit RU). The speaker unit SP includes a speaker device SP and a baffle SP2 supporting the speaker device SP1.

(Device Main Body 4: Upper Door Opening Mechanism 412 and Lower Door Opening Mechanism 413)

Figure 58:
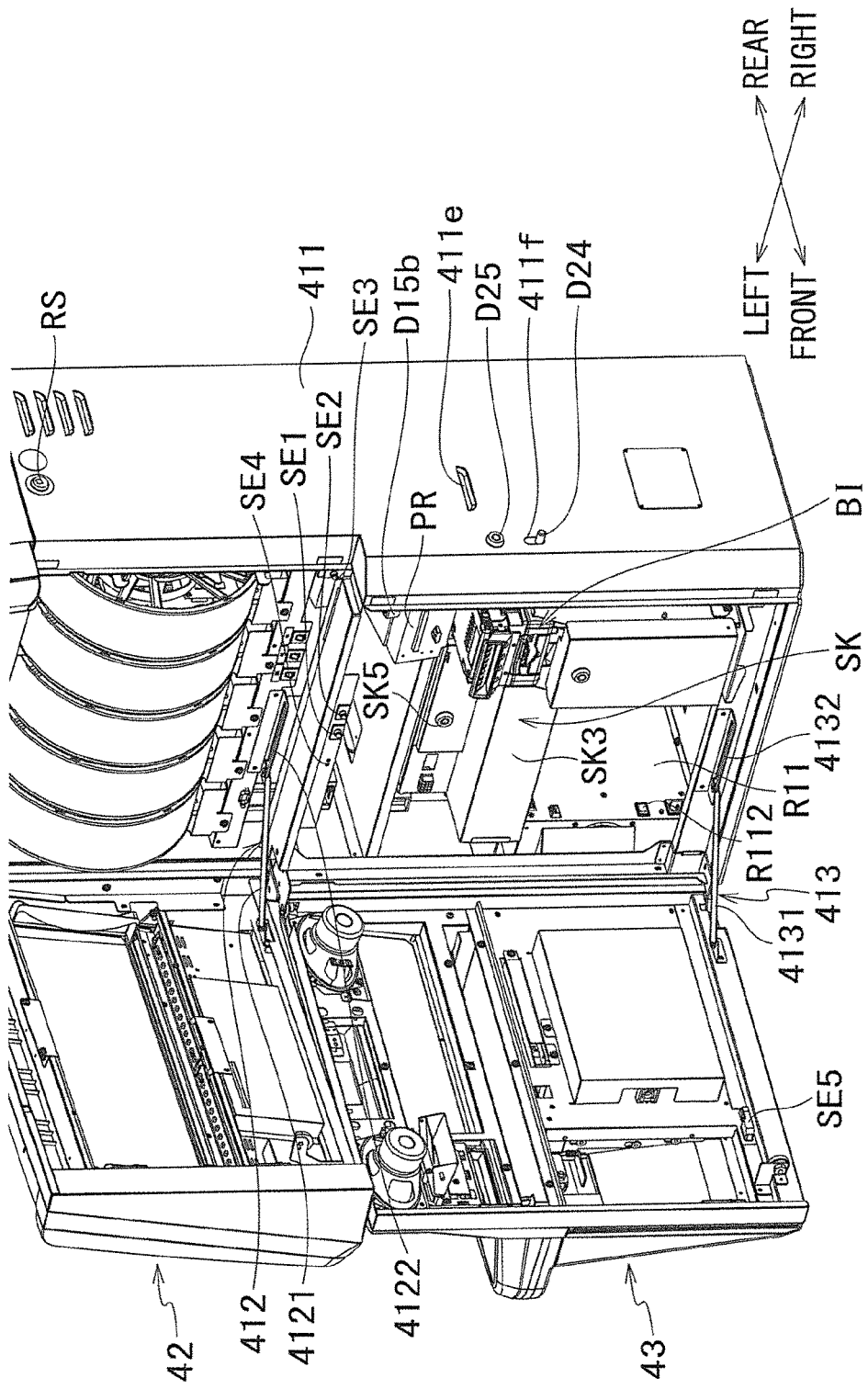
FIG. 58 is a perspective view of a main part of the slot machine.

As shown in FIG. 58, the casing 411 supports, at the left end portion, the upper door device 42 and the lower door device 43 to be rotatable. The upper door device 42 and the casing 411 are rotatably connected with each other at the upper end portion and the lower end portion of the upper door device 42, by means of the upper door opening mechanism 412. The upper door opening mechanism 412 has a stick-shaped member 4121 which is rotatably supported by the back wall of the upper door device 42 at one end portion and a sliding member 4122 which is horizontally disposed on the front side of the casing 411. The sliding member 4122 is engaged with the other end portion of the stick-shaped member 4121 to allow the stick-shaped member 4121 to be horizontally movable. The sliding member temporarily stops the upper door device 42 at a predetermined opening angle, and rotates the upper door device 42 to the closing direction when the upper door device 42 is biased by a predetermined or more external force in the closing direction.

In addition to the above, the lower door device 43 and the casing 411 are rotatably connected with each other at the upper end portion and the lower end portion of the lower door device 43 by means of the lower door opening mechanism 413. The lower door opening mechanism 413 includes a stick-shaped member 4131 rotatably supported by the back wall of the lower door device 43 at one end portion and a sliding member 4132 which is horizontally disposed on the front side of the casing 411. The sliding member 4132 is engaged with the other end portion of the stick-shaped member 4131 to allow the stick-shaped member 4131 to be horizontally movable. The sliding member temporarily stops the lower door device 43 at a predetermined opening angle, and rotates the lower door device 43 to the closing direction when the lower door device 43 is biased by a predetermined or more external force in the closing direction.

(Device Main Body 4: Door Lock Mechanism D: Lower Door Lock Mechanism D2)

In addition to the above, as shown in FIG. 59, the casing 411 has the door lock mechanism D at the right end portion. The door lock mechanism D includes an upper door lock mechanism D1 which locks the upper door device 42 to maintain a closed state and a lower door lock mechanism D2 which locks the lower door device 43 to maintain a closed state.

Figure 60:
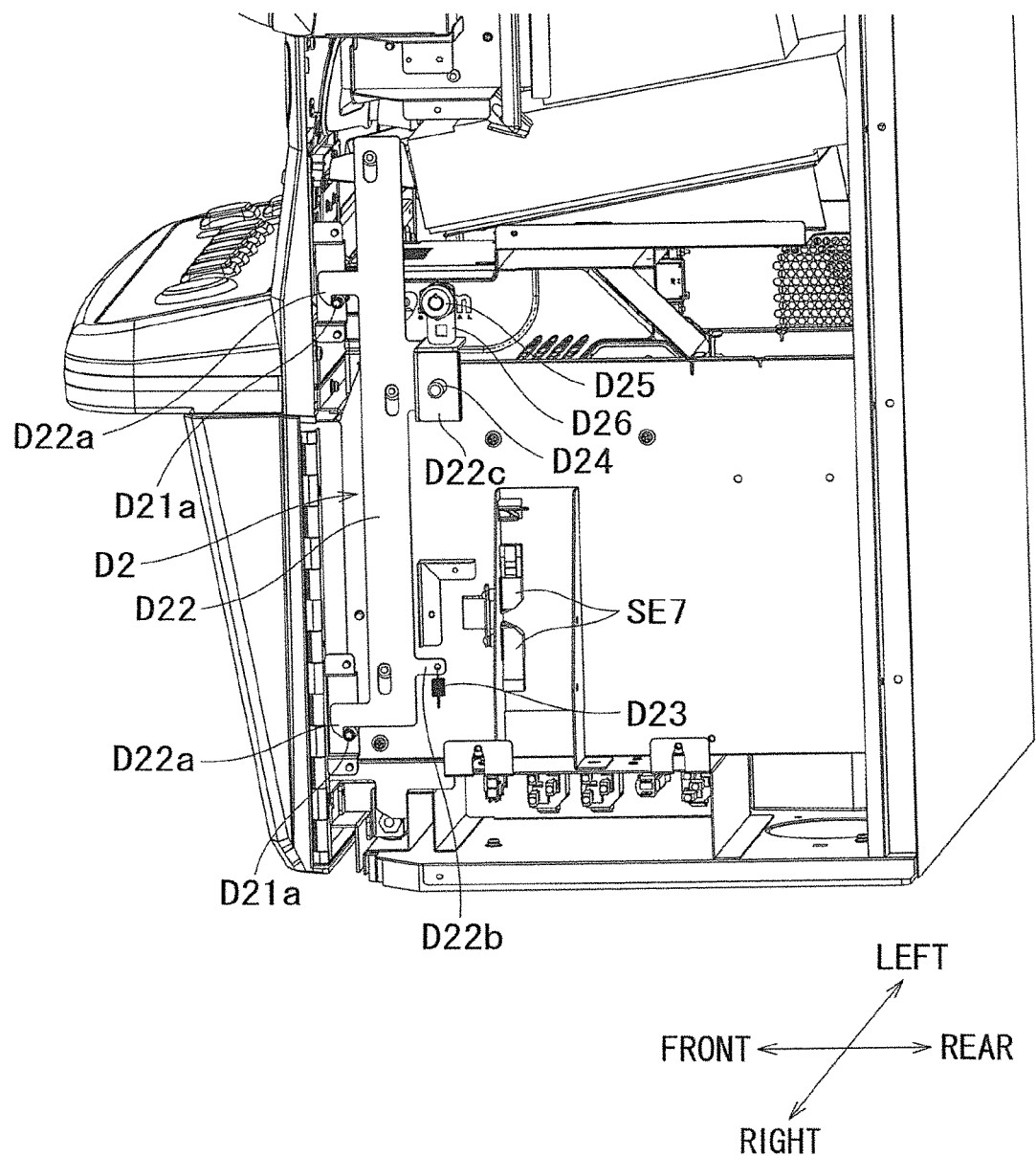
FIG. 60 is a perspective view of a lower door lock mechanism.

As shown in FIG. 60, the lower door lock mechanism D2 includes a locking member D21 which is fixed to the right end portion of the back wall of the lower door device 43 and an engagement member D22 fixed to the casing 411. The locking member D21 has, at an upper portion and a lower portion, two protrusions D21a which protrude leftward. In the meanwhile, the engagement member D22 is a long plate and is movable in the vertical direction with respect to the casing 411.

The engagement member D22 has claw members D22a which are disposed to be engaged with the protrusions D21a. The claw members D22a protrude toward the lower door device 43 (i.e., forward) while the leading end portions thereof extend downward. The claw members D22a are engaged with the protrusions D21a when the engagement member D22 is at a lower door locking height position, and are disengaged from the protrusions D21a when the engagement member D22 is elevated from the lower door locking height position to a lower door locking cancellation height position. The lower portion of the leading end face of each of the claw members D22a is inclined obliquely downward, and the claw members D22a are pushed up as they contact with the protrusions D21a.

The engagement member D22 is arranged so that each of the claw members D22a is movable between a lower limit position which is not higher than the lower door locking height position and an upper limit position which is not lower than the lower door locking cancellation height position. The engagement member D22 has a spring engagement portion D22b which protrudes backward at a lower portion. The spring engagement portion D22b is connected with one end of the spring D23. The other end of the spring D23 is connected with the casing 411, and the spring D23 biases the engagement member D22 downward.

The engagement member D22 has a pull-up portion D22c at a central portion. The pull-up portion D22c protrudes backward. On the right surface of the pull-up portion D22c, the door lock bar D24 is provided. As shown in FIG. 58, the door lock bar D24 is inserted into the key hole 411f of the casing 411, and the leading end portion of the door locking bar 24 protrudes to the outside. The door lock bar D24 allows an operator to grip the casing 411 from the outside and pulls up the casing 411. With this, as the engagement member D22 is elevated in accordance with the pull-up of the door lock bar D24, the claw members D22a are disengaged from the protrusions D21a.

Above the door lock bar D24 is provided the key cylinder D25. The key cylinder D25 is exposed to the outside at the key portion where the key is inserted, and a cylinder portion rotated by the key is positioned inside the casing 411. As shown in FIG. 59, the cylinder portion of the key cylinder D25 is provided with an abutting member D26 which is a rectangular plate.

One longitudinal end portion of the abutting member D26 is connected with the cylinder portion of the key cylinder D25, whereas the other end portion is rotatable about the key cylinder D25. When the abutting member D26 is in a locked state in which the direction from the one end portion to the other end portion corresponds to the downward direction, the pull-up portion D22c is fixed at the lower limit position which is not higher than the lower door locking height position as the other end portion contacts with the top surface of the pull-up portion D22c. In the meanwhile, when the abutting member D26 is in a locking cancellation state in which the abutting member D26 is rotated so that the direction from the one end portion to the other end portion is above the left/right direction, the other end portion is sufficiently distanced from the top surface of the pull-up portion D22c, and hence the pull-up portion D22c can be elevated to the upper limit position which is not lower than the lower door locking cancellation height position.

With this, when the abutting member D26 contacts with the pull-up portion D22c while the lower door device 43 is in the closed state, because the elevation of the door locking bar D24 is prohibited, the locking by which the closing state of the lower door device 43 is maintained is performed even if the force of pulling up the door lock bar D24 is exerted. When the not-shown key is inserted into the key cylinder D25 and the contact between the abutting member D26 and the pull-up portion D22c is canceled, the lower door device 43 is unlocked as the prohibition of the elevation of the door lock bar D24 is canceled. At this stage, on account of the weight of the engagement member D22 and the downward biasing force of the spring D23, the closed state of the lower door device 43 is maintained. Thereafter, when the door lock bar D24 is pulled up by the operator, the engagement member D22 is elevated to a position not lower than the lower door locking cancellation height position, and the right end portion of the lower door device 43 is pulled forward, the engagement between the claw members D22a and the protrusions D21a is canceled and the lower door device 43 is opened. When the lower door device 43 is closed, the protrusions D21a push up the claw members D22a and are engaged with the claw members D22a, with the result that the lower door device 43 is automatically locked.

As shown in FIG. 58, the lower door device 43 is detectable by a first lower door switch SE1 and a second lower door switch SE2, and is also detectable by two reflective lower door optical sensors SE4. The door switches SE1 and SE2 are provided to be able to contact with an upper end face on the back side of the lower door device 43, and are turned on when the lower door device 43 is closed and turned off when the lower door device 43 is opened. The lower door optical sensors SE4 are disposed to be able to detect reflected light from a reflection plate provided at an upper end face on the back side of the lower door device 43, and are turned on when the lower door device 43 is closed and turned off when the lower door device 43 is opened. As such, the door switches SE1 and SE2 and the lower door optical sensors SE4 are able detect the opening/closing state by detecting the presence of the lower door device 43.

(Device Main Body 4: Door Lock Mechanism D: Upper Door Lock Mechanism D1)

Figure 61:
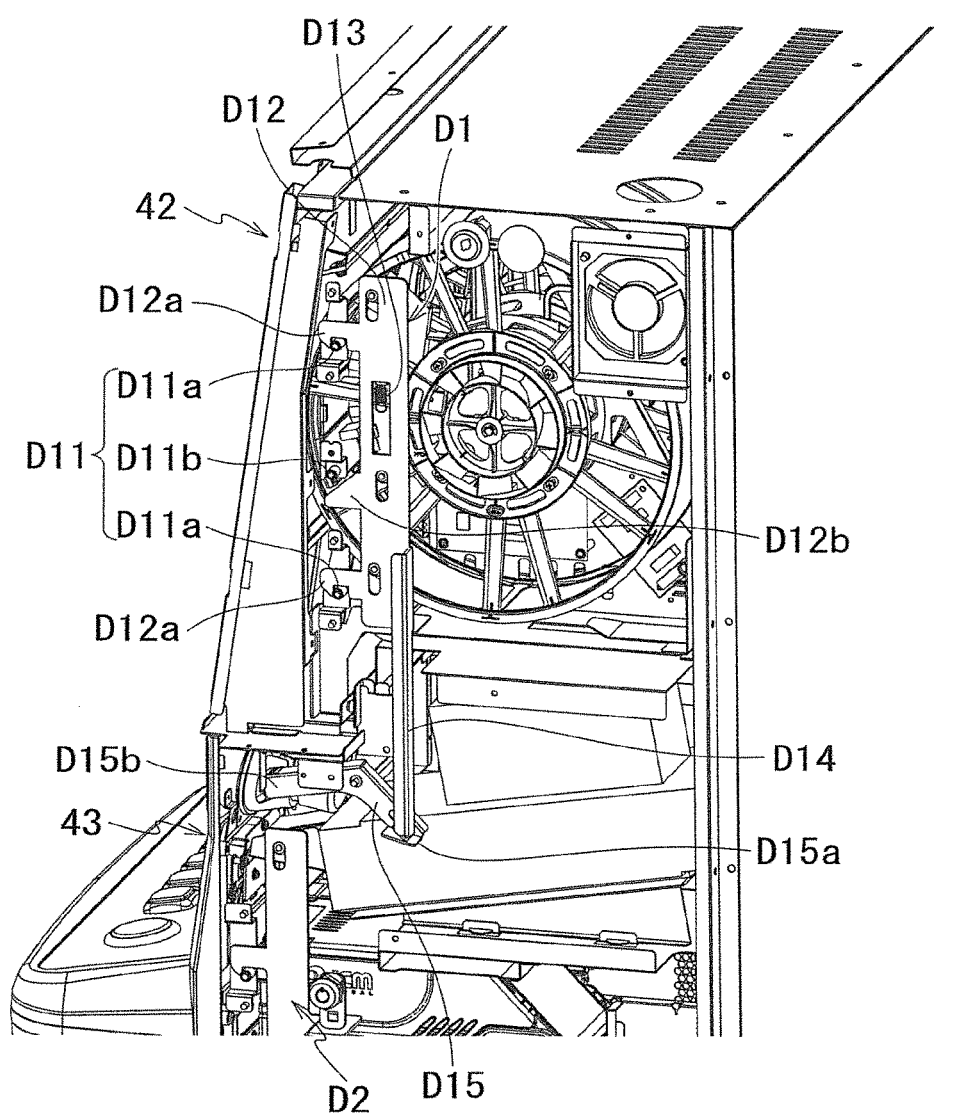
FIG. 61 is a perspective view of an upper door lock mechanism.

Above the lower door lock mechanism D2 arranged as described above, an upper door lock mechanism D1 is provided. As shown in FIG. 61, the upper door lock mechanism D1 includes a locking member D11 fixed to a right end portion of the back wall of the upper door device 42 and an engagement member D12 fixed to the casing 411. The locking member D11 has two first protrusions D11a protruding leftward at an upper portion and a lower portion and a second protrusion D11b at a central portion. The engagement member D12 is a long plate and is movable in the vertical direction with respect to the casing 411.

The engagement member D12 includes claw members D12a disposed to be engaged with the first protrusions D11a. The claw members D12a protrude toward the upper door device 42 (i.e., forward) while the leading end portions thereof extend downward, and the claw member D12a are engaged with the first protrusions D11a when the engagement member D12 is at an upper door locking height position, and are disengaged from the first protrusions D11a when the engagement member D12 is elevated from the upper door locking height position to an upper door locking cancellation height position. The lower portion of the leading end face of each of the claw members D12a is inclined obliquely downward, and the claw members D12a are therefore pushed up when contacting with the first protrusions D11a.

The engagement member D12 is arranged so that the claw members D12a are each movable in a range between a lower limit position which is not higher than the upper door locking height position and an upper limit position which is not lower than the upper door locking cancellation height position. The engagement member D12 is, at a central part, connected with one end of the spring D13. The other end of the spring D13 is connected with the casing 411, and the spring D13 biases the engagement member D12 downward.

The engagement member D12 has an abutting portion D12b. The abutting portion D12b protrudes forward (toward the upper door device 42) from a central part of the engagement member D12. The top surface of the abutting portion D12b is an inclined surface which lowers from the engagement member D12 side toward the leading end portion. The abutting portion D12b is disposed in such a way that the abutting portion D12b is distant from the second protrusion D11b when the engagement member D12 is at a height position not higher than the upper door locking height position, whereas the abutting portion D12 pushes the upper door device 42 is forward while the top surface (inclined surface) of the abutting portion D12b contacts with the second protrusion D11b, when the engagement member D12 is elevated to a position not lower than the upper door locking cancellation height position.

In addition to the above, the engagement member D12 is, at a lower portion, connected to an upper portion of a push-up member D14. The push-up member D14 is stick-shaped and is disposed such that the longitudinal direction thereof corresponds to the vertical direction. The lower end of the push-up member D14 is able to contact with a rear end portion D15a of a link member D15. The link member D15 is rotatably supported by the casing 411 such that a central part of the link member D15 is the highest position and a part between the central part and the rear end portion D15a and a part between the central part and the front end portion D15b are both sloped downward. With this, as the front end portion D15b is pushed backward, the link member D15 rotates about the supported central part, so that the rear end portion D15a is moved upward.

The link member D15 above is disposed to satisfy a first height condition in which the front end portion D15b is below the lower end portion of the push-up member D14 when the engagement member D12 is at a height position of not higher than the upper door locking height position and a second height condition in which, when the front end portion D15b is pushed backward, the link member D15 rotates about the supported central portion so that the rear end portion D15a is moved upward, and the link member D15 contacts with the lower end portion of the push-up member D14 and hence the engagement member D12 is elevated to a position not lower than the upper door locking cancellation height position.

In addition to the above, as shown in FIG. 58 and FIG. 59, the link member D15 is disposed to satisfy a third height condition in which the link member D15 is on the back side of the lower door device 43 when the front end portion D15b is at a height position lower than the upper end of the lower door device 43. In other words, the upper door lock mechanism D1 is arranged such that the front end portion D15b of the link member D15 is not exposed to the outside unless the lower door device 43 is opened.

As such, when the upper door device 42 is opened, the lower door device 43 is opened and then the front end portion D15b of the link member D15 is exposed to the outside. As the front end portion D15b is pushed in, the rear end portion D15a is elevated and the engagement member D12 is elevated together with the push-up member D14. When the engagement member D12 is elevated to a position not lower than the upper door locking cancellation height position, the claw members D12a are disengaged from the first protrusions D11a. At the same time, the abutting portion D12b contacts with the second protrusion D11b and the upper door device 42 is pushed forward, with the result that the upper door device 42 is automatically opened. When the upper door device 42 is closed, the first protrusions D11a push up the claw members D12a and are engaged with the claw members D12a, with the result that the upper door device 42 is automatically locked.

The upper door device 42 is arranged to be detectable by an upper door switch SE3. The upper door switch SE3 is disposed to be able to contact with a lower end face on the back side of the upper door device 42, and is turned on when the upper door device 42 is closed and is turned off when the upper door device 42 is opened. As such, the upper door switch SE3 is able to detect the opening/closing state by detecting the presence of the upper door device 42.

(Device Main Body 4: Game Mechanism Device 41: Reel Device M1)

Figure 62:
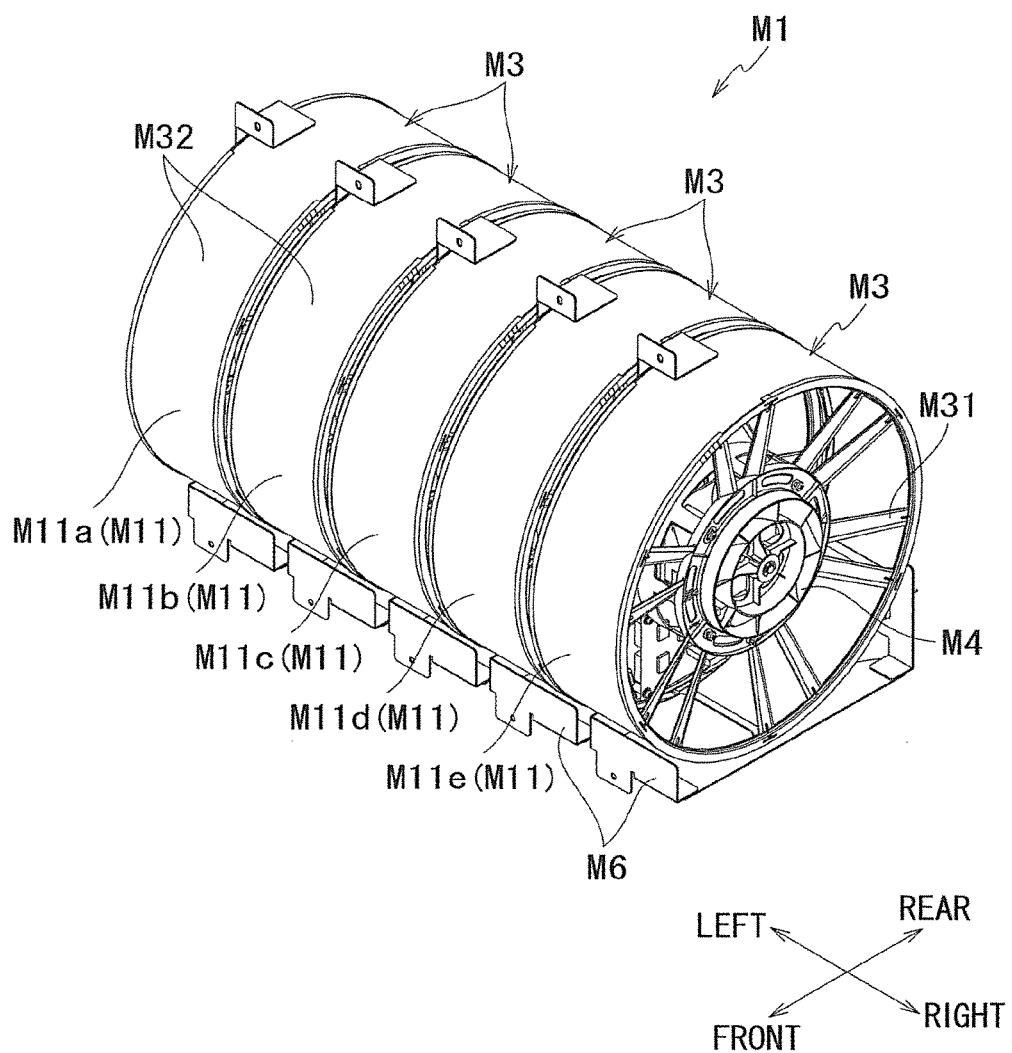
FIG. 62 is a perspective view of a reel device.

In the top space 41A of the casing 411, as shown in FIG. 55 and FIG. 56, the reel device M1 is detachably provided. As shown in FIG. 62, the reel device M1 includes reel units M11 each of which rearranges symbols by rotationally driving a reel M3 having an outer circumferential surface on which the symbols are arranged. Hereinafter, the installation locations of the reel units M11 will be specified as, from the left end, first to fifth reel units M11a to M11e.

The reel units M11 are supported by a plurality of reel supporting mechanisms M6, respectively. Each reel supporting mechanism M6 is attachable to the casing 411 of the slot machine 1 by screwing. With this, the reel device M1 is arranged such that each reel unit M11 is replaced or mounted as the reel supporting mechanism M6 is attached to or detached from the casing 411 of the slot machine 1.

Figure 63:
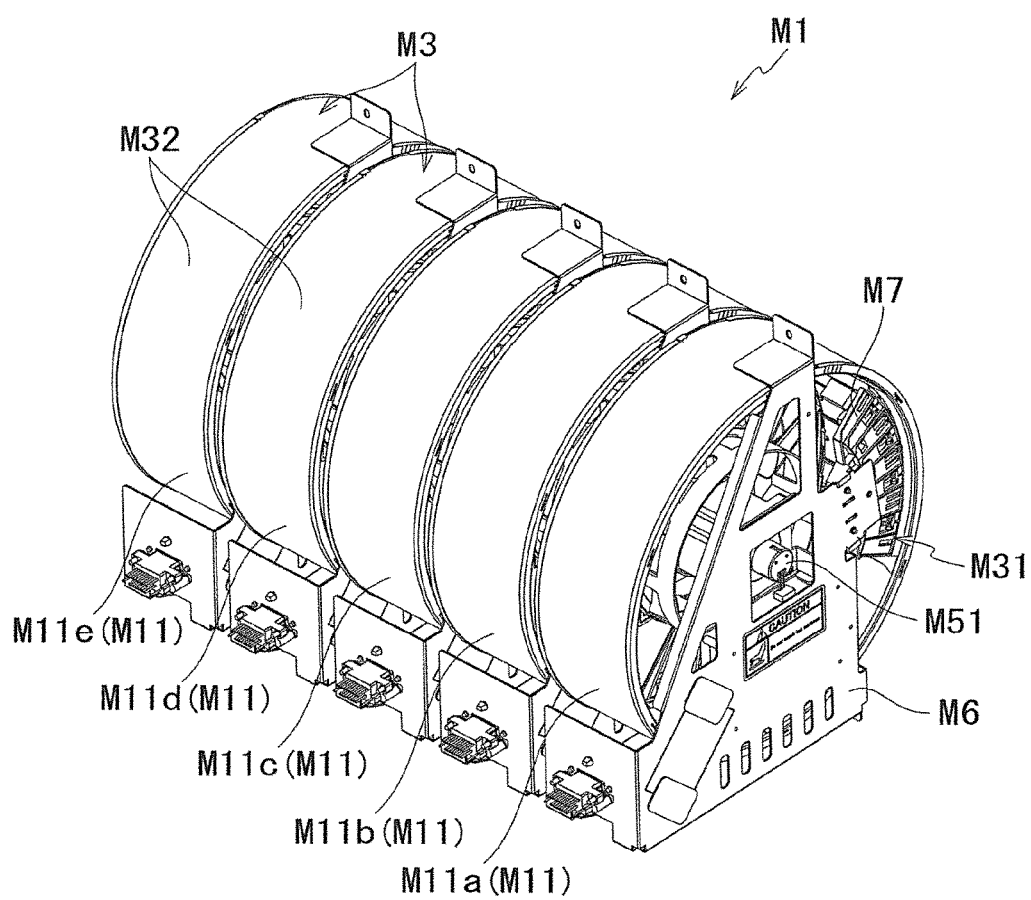
FIG. 63 is a perspective view of the reel device.

Each reel unit M11 has the reel M3 having the outer circumferential surface on which the symbols are arranged. The reel M3 includes an annular reel strip M32 on which one or more symbol is arranged and a reel frame M31 in which the reel strip M32 is provided at the outer circumferential surface. The reel frame M31 has, at a left end portion on the inner circumferential side, a blade mechanism M4 which generates air flow by rotation. Furthermore, as shown in FIG. 63, the reel frame M31 has, at a central part of the right edge, a reel motor M51 constituted by a stepping motor which rotationally drives the reel M3. The reel strip M32 supported by the reel frame M31 is made of a material such as acrylic resin which allows illumination light to pass through.

On the inner circumferential side of the reel M3, a backlight unit M7 is provided. The backlight unit M7 outputs illumination light from the inner circumferential side of the reel M3 toward the reel strip M32, and the illumination light having passed the reel strip M32 is viewable from the outside of the slot machine 1.

(Device Main Body 4: Game Mechanism Device 41: Main Body Substrate Casing N1)

Figure 64:
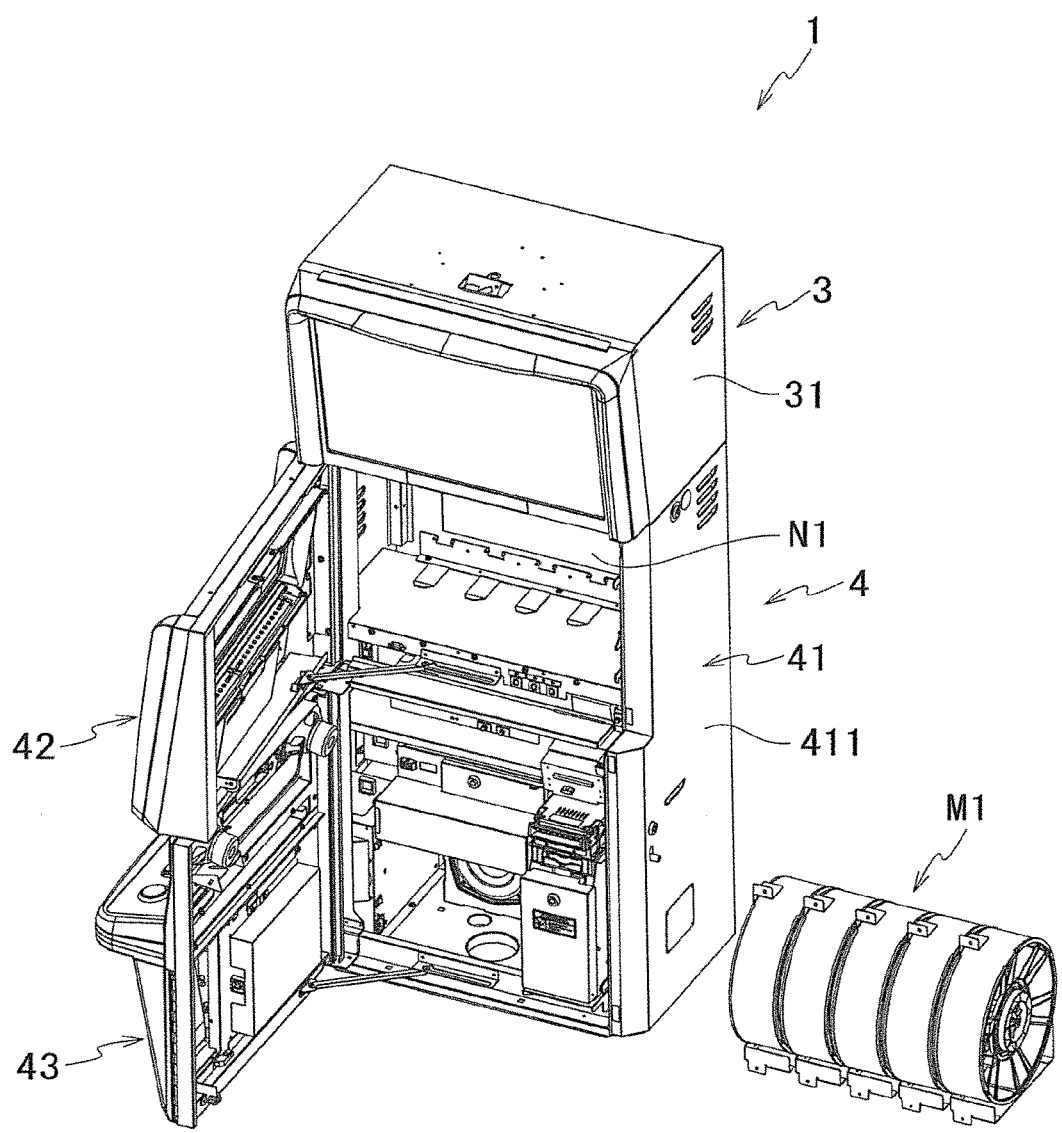
FIG. 64 is a perspective view of the slot machine.
Figure 65:
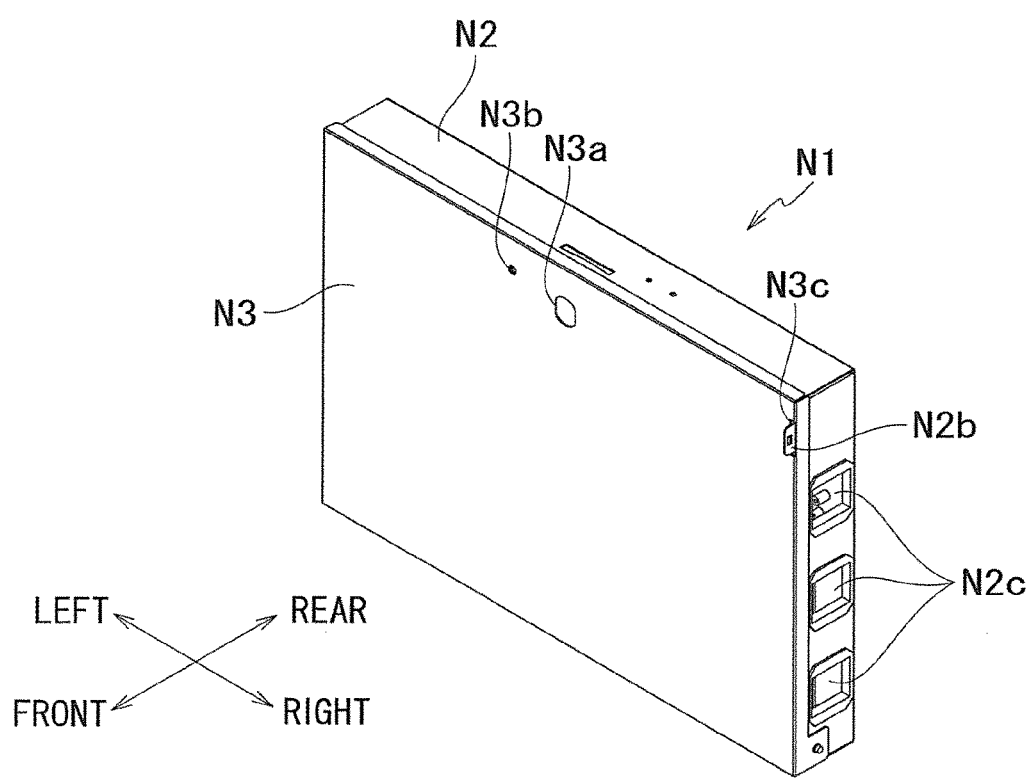
FIG. 65 is a perspective view of a main body substrate casing.

Behind the reel device M1, as shown in FIG. 64, a main body substrate casing N1 is provided. As shown in FIG. 65, the main body substrate casing N1 is formed to be rectangular when viewed from the front side, and is fixed such that the back wall thereof is screwed to the back wall of the casing 411. The main body substrate casing N1 includes a casing main body N2 which is open at the front and a lid N3 which is formed to cover the front side of the casing main body N2.

Figure 66:
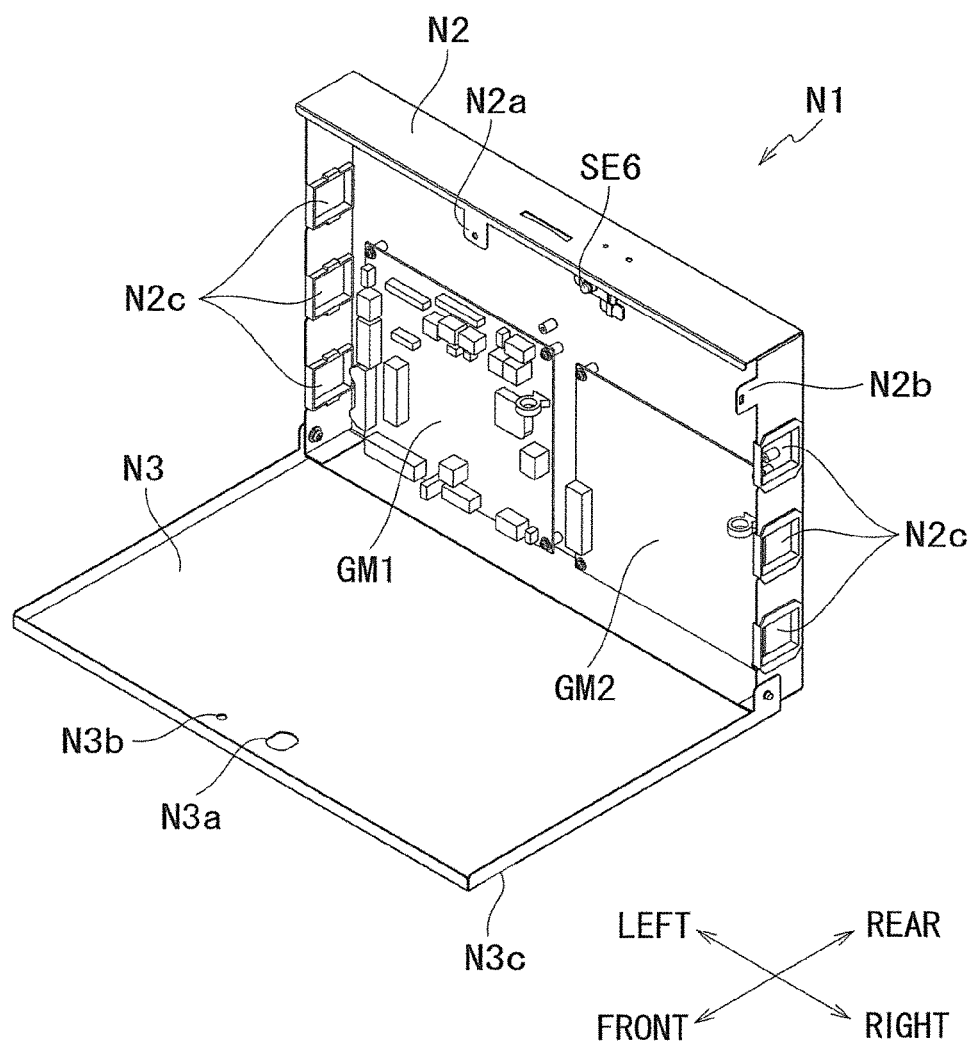
FIG. 66 is a perspective view of the main body substrate casing.

The lid N3 is rotatably supported at the lower end portions of the left side wall and the right side wall of the casing main body N2. With this, as shown in FIG. 66, the lid N3 is openable in the forward/backward direction about the lower end portions, with the upper end portion with respect to the casing main body N2 being a free end whereas the lower end portion with respect to the casing main body being a fixed end. At an upper central portion of the lid N3, a through hole N3*a* is formed. The through hole N3*a* is sized to allow a finger to be inserted therein, and is used by the operator to open or close the lid N3 with respect to the casing main body N2.

A screw hole N3*b* is formed to be horizontally adjacent to the through hole N3*a* in the lid N3. The screw hole N3*b* is disposed to oppose a fastening hole N2*a* formed in the front surface of the casing main body N2 when the lid N3 is closed. As the screw hole N3*b* is screwed to the fastening hole N2*a*, the state that the casing main body N2 is closed by the lid N3 is maintained. When the screw hole N3*b* is unscrewed from the fastening hole N2*a*, the lid N3 is opened with respect to the casing main body N2. At an upper portion of the right edge of the lid N3, a positioning hole N3*c* is formed. Into the positioning hole N3*c*, a protruding piece N2*b* formed at an upper portion of the right edge of the casing main body N2 is inserted.

Through each of the right side wall and the left side wall of the casing main body N2, cable insertion holes N2*c* are formed at three positions which are lined up in the vertical direction. Each of the cable insertion holes N2*c* is formed by fitting a wire protecting bush into a concave notch formed at the side wall of the casing main body N2. Into each cable insertion hole N2*c*, a not-shown signal cable wired in the slot machine 1 is inserted. In the main body substrate casing N1, a first GM substrate GM1 and a second GM substrate GM2 are provided. The first GM substrate GM1 and the second GM substrate GM2 will be detailed later.

Figure 67:
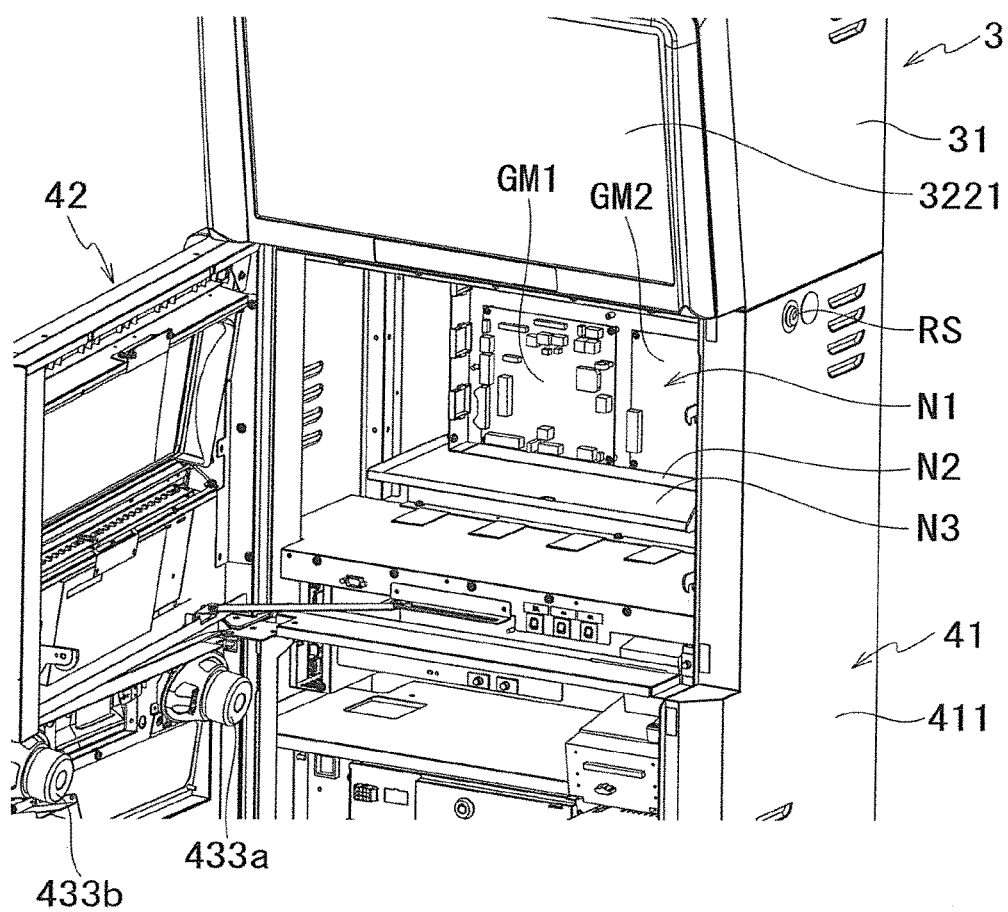
FIG. 67 is an explanatory diagram showing an open state of the main body substrate casing.

In the main body substrate casing N1 arranged as above, as shown in FIG. 67, the operator cannot access the first GM substrate GM1 and the second GM substrate GM2 unless an operation to open the upper door device 42 (a condition), an operation to remove the reel device M1 from the casing 411 (another condition), and an operation to open the lid N3 from the casing main body N2 by unscrewing (a further condition) are done.

In addition to the above, to be adjacent to the protruding piece N2*b* in the casing main body N2, a main body substrate casing switch SE6 is provided. The main body substrate casing switch SE6 is provided to be able to contact with the lid N3, and is turned on when the lid N3 is closed and is turned off when the lid N3 is opened.

(Device Main Body 4: Radiation Mechanism R)

Figure 72:
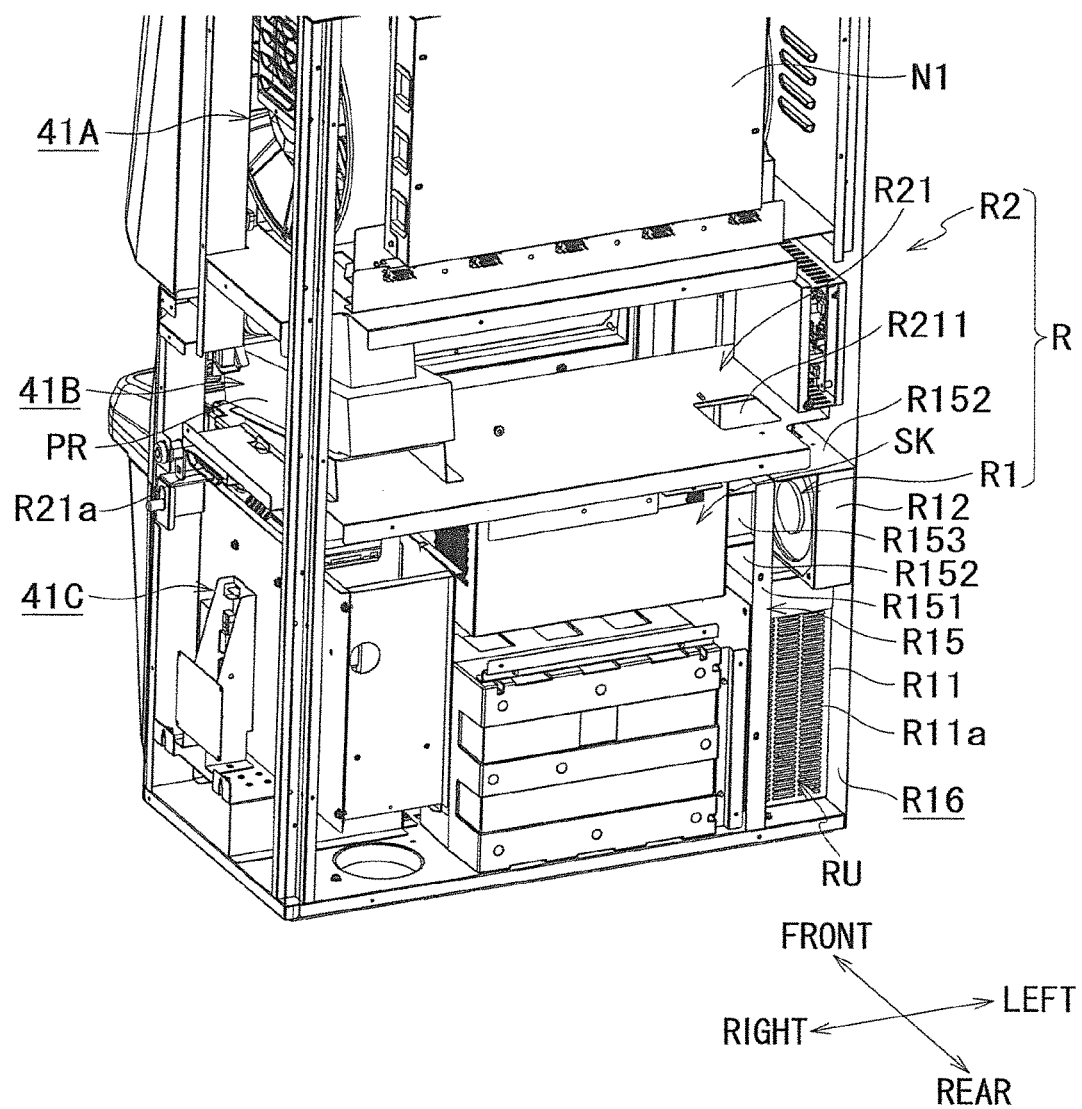
FIG. 72 is a perspective view of a radiation mechanism.

As shown in FIG. 72, the slot machine 1 includes the radiation mechanism R. The radiation mechanism R includes a first passage (security cage cooling mechanism R2) through which air heated by the heat of the CPU is exhausted, a second passage (power source cooling mechanism R1) through which air heated by the heat of the power source device is exhausted, and an exhaust port which communicates with the first passage and the second passage to exhaust air therefrom. Because in the radiation mechanism R the first passage and the second passage share a single exhaust port, the temperature distribution is uniform and the surrounding devices can be laid out in consideration of the reduction of influences on the surrounding devices.

To be more specific, the radiation mechanism R includes the power source cooling mechanism R1 and the security cage cooling mechanism R2. The power source cooling mechanism R1 is arranged to cool the inside of the power source box R11 by the external air. The security cage cooling mechanism R2 is arranged to cool the inside of the security cage SK by the external air. The radiation mechanism R includes an exhaust heat chamber R152 which simultaneously stores exhaust heat (air) exhausted after the inside of the power source box R11 is cooled by the power source cooling mechanism R1 and exhaust heat (air) exhausted after the inside of the security cage SK is cooled by the security cage cooling mechanism R2, and is arranged to exhaust the heat (air) from the exhaust heat chamber R152 to the side of the casing 411 by the exhaust fan R12.

(Device Main Body 4: Radiation Mechanism R: Power Source Cooling Mechanism R1)

Figure 68:
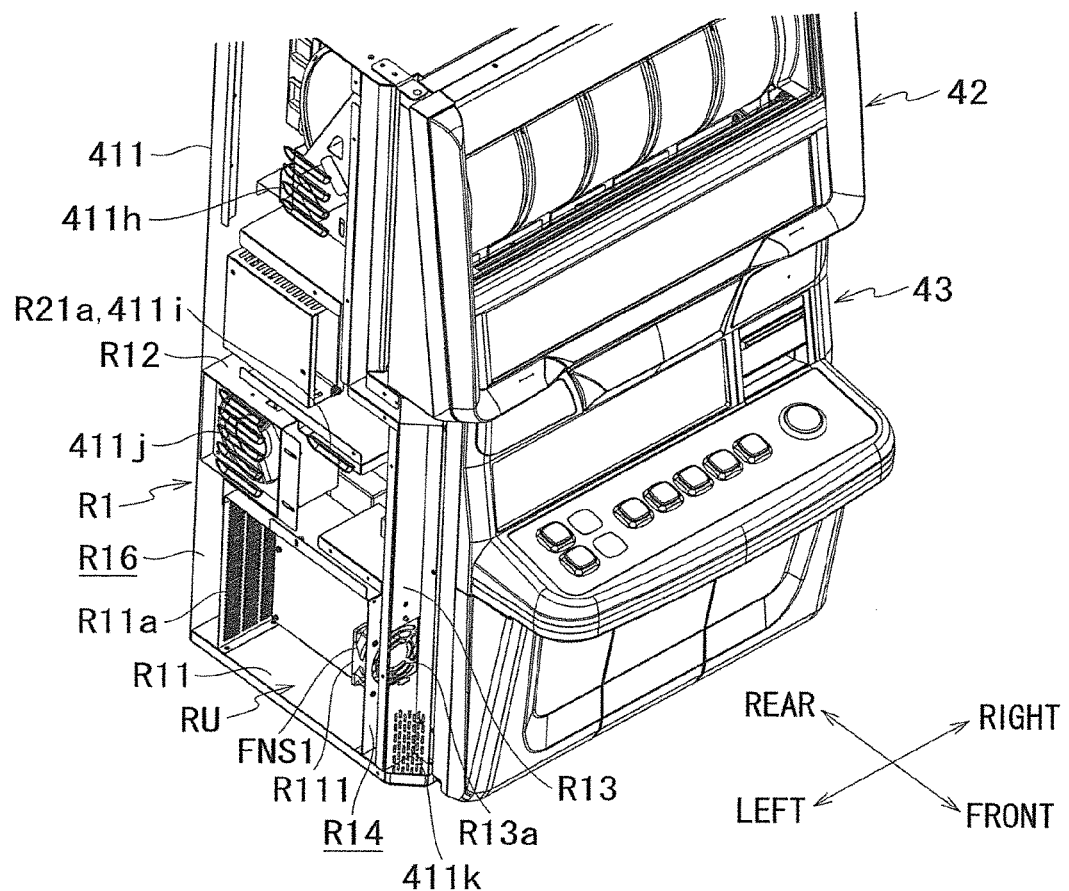
FIG. 68 is a perspective view of a power source cooling mechanism.

The power source cooling mechanism R1 constituting the radiation mechanism R will be detailed. As shown in FIG. 68, the power source cooling mechanism R1 is disposed at a lower left end portion of the casing 411. The power source cooling mechanism R1 is spatially isolated in the casing 411 so that the air flowing in the power source cooling mechanism R1 do not flow out to other parts in the casing 411.

To be more specific, the power source cooling mechanism R1 includes a power source box R11 which is provided at a lower left end portion of the casing 411. The power source box R11 is a rectangular parallelepiped box which is open at the left side, and forms an internal space with the left side wall thereof being the left side wall of the casing 411. In the internal space of the power source box R11, an not-shown power source device is provided. The power source box R11 and the power source device constitute a power source unit RU.

The power source unit RU includes a first temperature sensor and a second temperature sensor. The first temperature sensor outputs, to the second GM substrate GM2, a first power source temperature detection signal which is turned on at a temperature not lower than a first threshold temperature and is turned off at a temperature not higher than a second threshold temperature. The second temperature sensor outputs a second power source temperature detection signal which is turned on at a temperature not lower than a third threshold temperature. The second power source temperature detection signal is used by the power source unit RU to manage the temperature of itself. The power supply to the power source unit RU is forcibly shut down when the second power source temperature detection signal is turned on. The first temperature sensor and the second temperature sensor may be provided in the power source box R11 to indirectly detect the temperature of the power source device with reference to the temperature in the power source box R11, or may be provided in the power source device to directly detect the temperature of the power source device.

On the front wall of the power source box R11, a power source fan R111 is provided to send the air on the front side (sucking side) into the power source box R11. The power source fan R111 is provided with a power source box fan sensor FNS1. The power source box fan sensor FNS1 detects the temperature of the power source box R11 and outputs a power source box temperature signal. In the meanwhile, a plurality of ventilation holes R11a are made through the back wall of the power source box R11. With this, after sending the air on the front side into the internal space and cooling the not-shown power source device, the power source box R11 exhausts, through the ventilation holes R11a, the air which has been heated due to the heat exchange with the power source device.

In front of the power source fan R111, an opening R13a of the support member R13 supporting the casing 411 is formed. The support member R13 is provided to cover the inner wall surface of the entire left end portion of the front wall of the casing 411, and the support member R13 and the left end portion of the casing 411 form a first passage R14. At a lower left end portion of the front wall of the casing 411, a plurality of air holes 411k are formed. With this, the first passage R14 is arranged in such a way that, as the air in the first passage R14 is supplied into the power source box R11 by the power source fan R111, the air pressure in the passage R14 becomes lower than the external air pressure, with the result that the outside air flows into the passage R14 through the air holes 411k.

Figure 69:
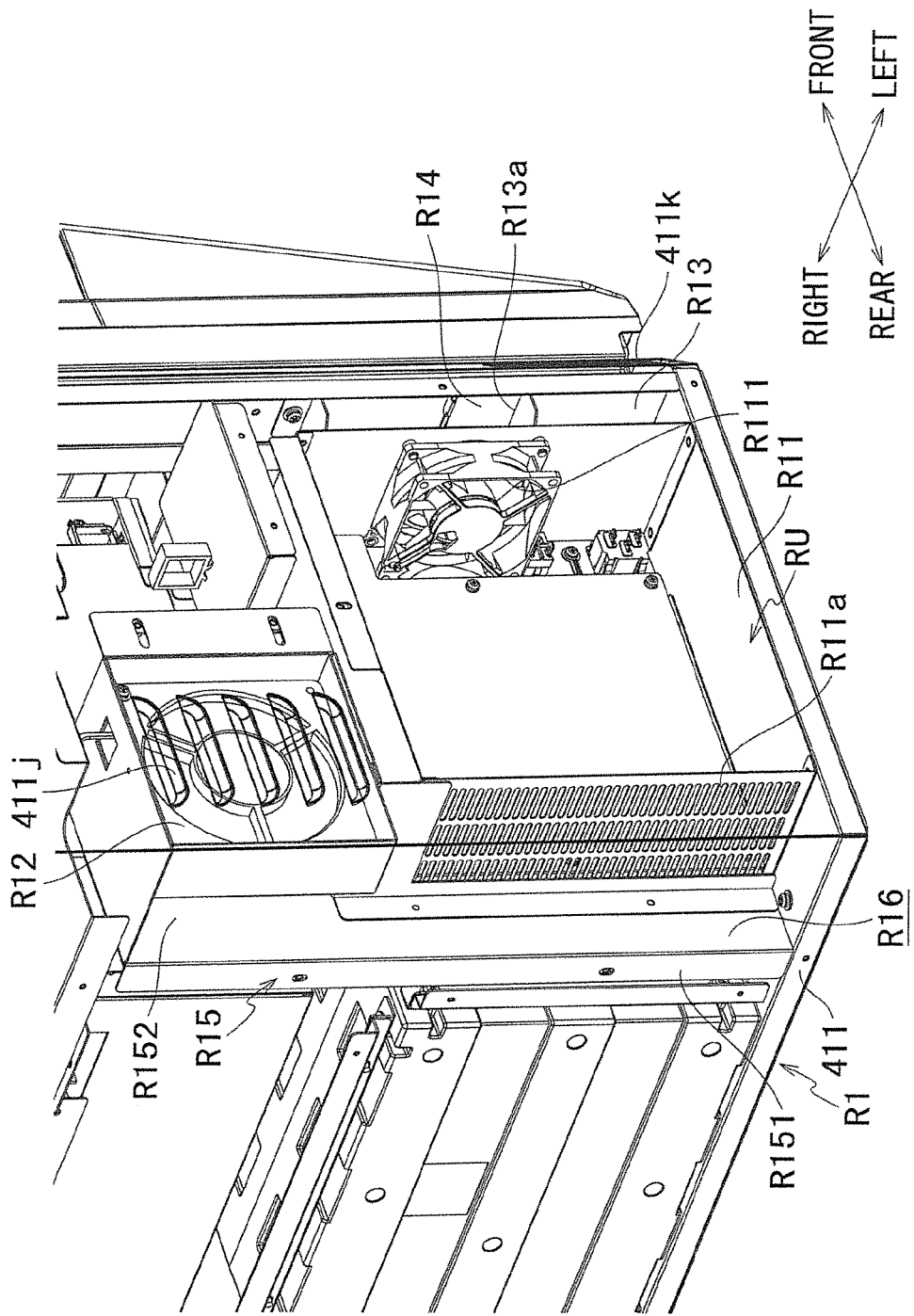
FIG. 69 is a perspective view of a power source cooling mechanism.
Figure 70:
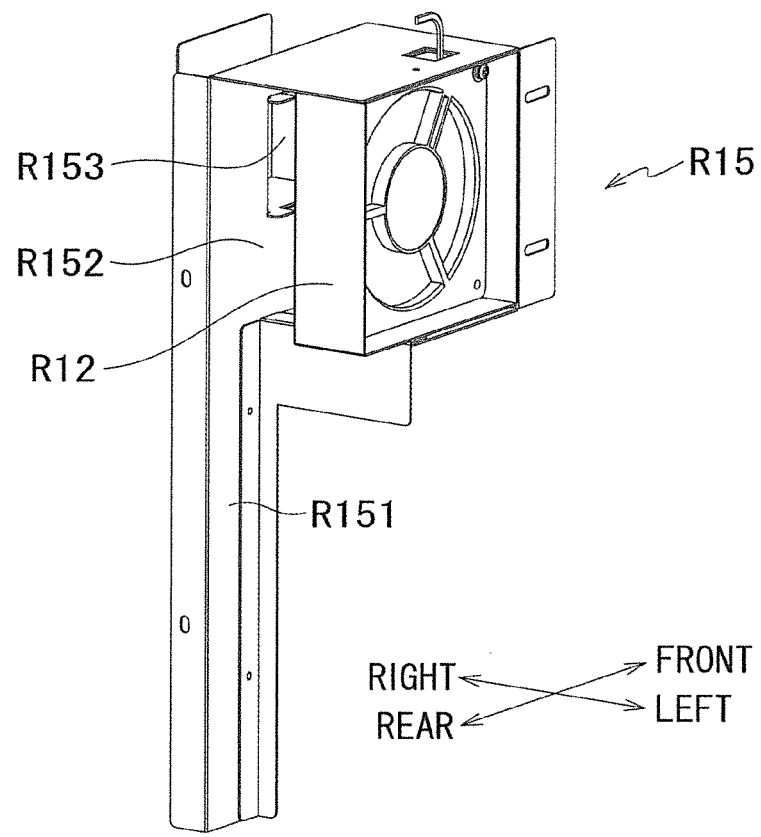
FIG. 70 is a perspective view of a fan support member.
Figure 71:
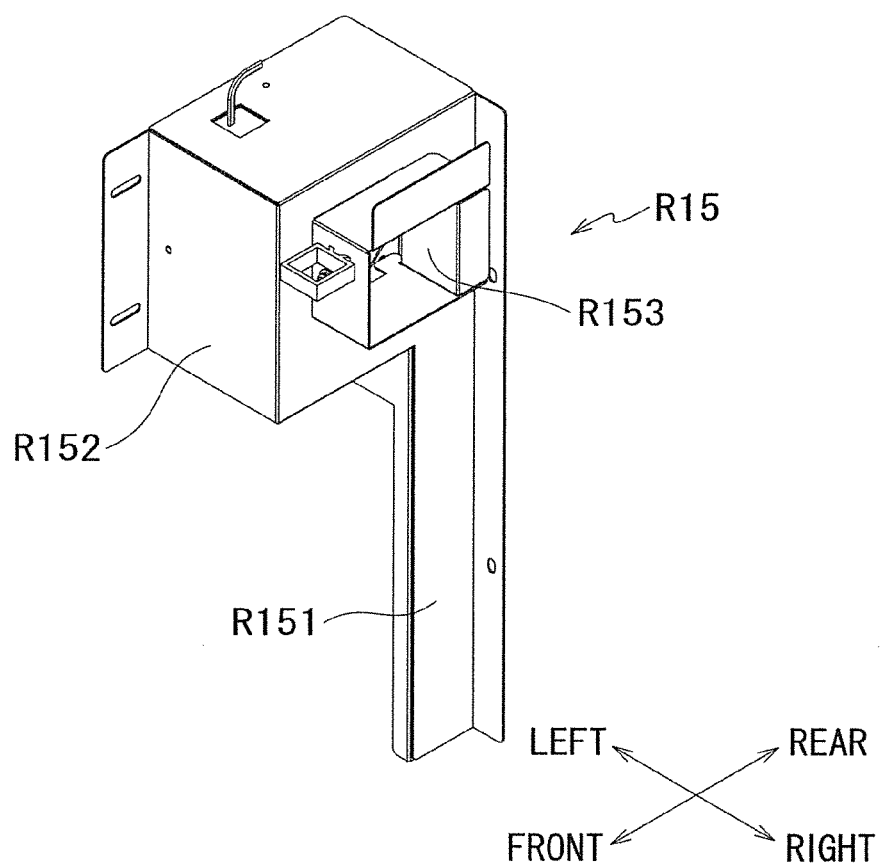
FIG. 71 is a perspective view of the fan support member.

As shown ion FIG. 69, the power source box R11 is disposed to be distant from the back wall of the casing 411. At the right side wall on the back side of the power source box R11, a fan support member R15 is provided. As shown in FIG. 70 and FIG. 71, the fan support member R15 includes a plate member R151 which extends from the bottom portion of the casing 411 to a position higher than the power source box R11 and an exhaust heat chamber R152 formed at an upper end portion of the plate member R151. The plate member R151 is joined with the back wall of the casing 411 at a part extending between the upper and lower ends of the back side, so as to be a right side surface of the gap between the power source box R11 and the back wall of the casing 411. With this, as shown in FIG. 69, the gap behind the power source box R11 is spatially defined by the side wall and the back wall of the casing 411 and the plate member R151, so that a second passage R16 extending in the vertical direction is formed.

At the exhaust heat chamber R152 of the fan support member R15, an exhaust fan R12 is provided. The exhaust fan R12 is arranged to exhaust the air in the second passage R16 through the air hole 411i of the casing 411. The second passage R16 causes the air sent out from the ventilation hole R11a of the power source box R11 by the power source fan R111 to move upward as it is sucked by the static pressure of the exhaust fan R12, so as to pass the exhaust heat chamber R152 and reach the exhaust fan R12.

With this, the power source cooling mechanism R1 performs an operation of sucking the outside air through the air hole 411k by the static pressure of the power source fan R111 and sending the air into the power source box R11 in the first passage R14 which is the sucking side of the power source box R11, and performs an operation of exhausting the air to the outside through the air hole 411i by the exhaust pressure of the power source fan R111 and the static pressure of the exhaust fan R12 in the second passage R16 which is the exhaust side of the power source box R11. As such, because the power source cooling mechanism R1 is provided to be isolated from the other components in the casing 411, the power source device is effectively cooled in the power source box R11 by a rapid air flow, without allowing the other components in the casing 411 to be heated by the air heated on account of heat exchange.

(Device Main Body 4: Radiation Mechanism R: Security Cage Cooling Mechanism R2)

The security cage cooling mechanism R2 constituting the radiation mechanism R will be detailed. The security cage cooling mechanism R2 is a mechanism for cooling the air inside the security cage SK by taking in the outside air from the both sides of the casing 411 and letting the air taken in to flow into the security cage SK from the above to generate a forced convection. That is, the shelf board member R21 is formed in a hollow shape so as to serve, in addition to serve as a shelf board, as an air intake duct communicating the both ends of the casing 411 with the security cage SK, the security cage cooling mechanism R2. The security cage cooling mechanism R2 uses the negative pressure generated by the CPU cooling fan CF to directly take in the external air and cool the security cage SK.

Figure 78:
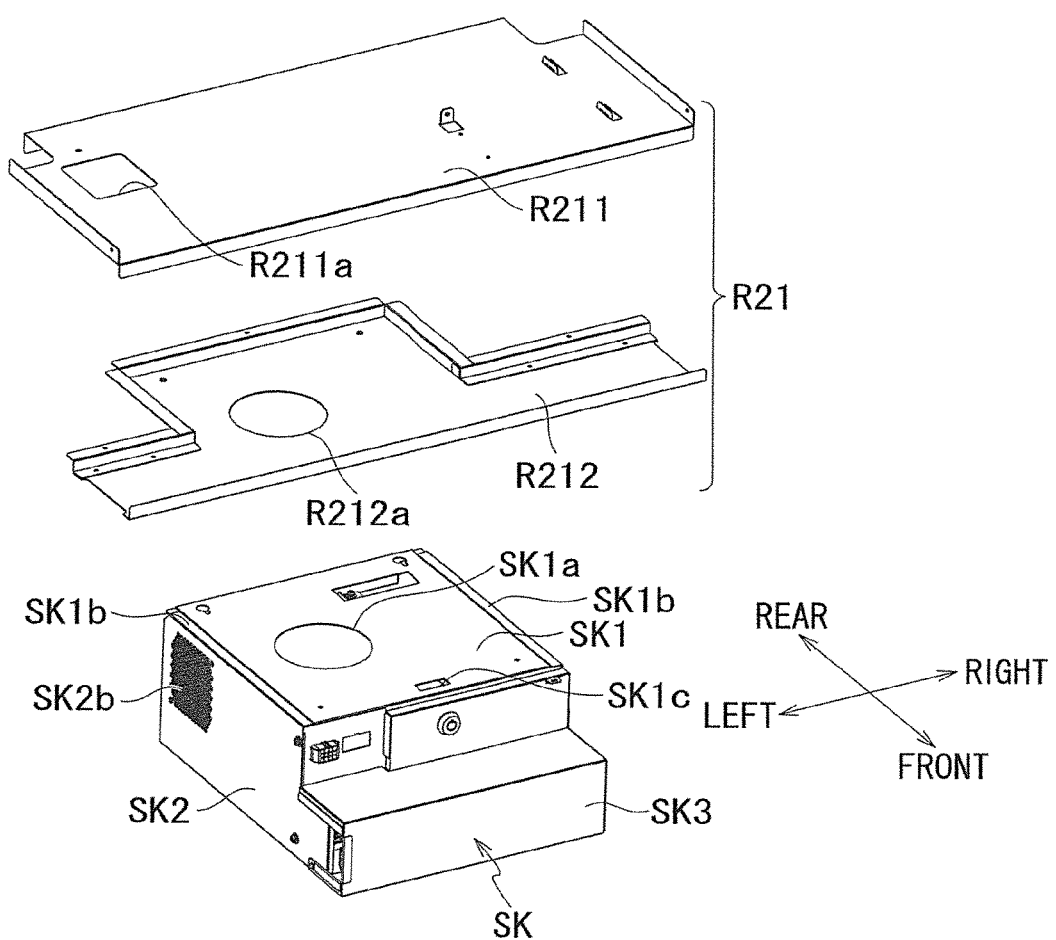
FIG. 78 is an explanatory diagram showing a relation between the shelf board member and the security cage.

It should be noted that, although the security cage SK is detailed later, the security cage SK has an opening SK1a in a middle portion of the top surface, and a plurality of through holes SK2a and SK2b on the left side surface and the right side surface, and uses the internally disposed CPU cooling fan CF to take in the air through the opening SK1a and ventilate the air from the through holes SK2a and SK2b, as shown in FIG. 78.

(Device Main Body 4: Security Cage Cooling Mechanism R2: Shelf Board Member R21)

Figure 75:
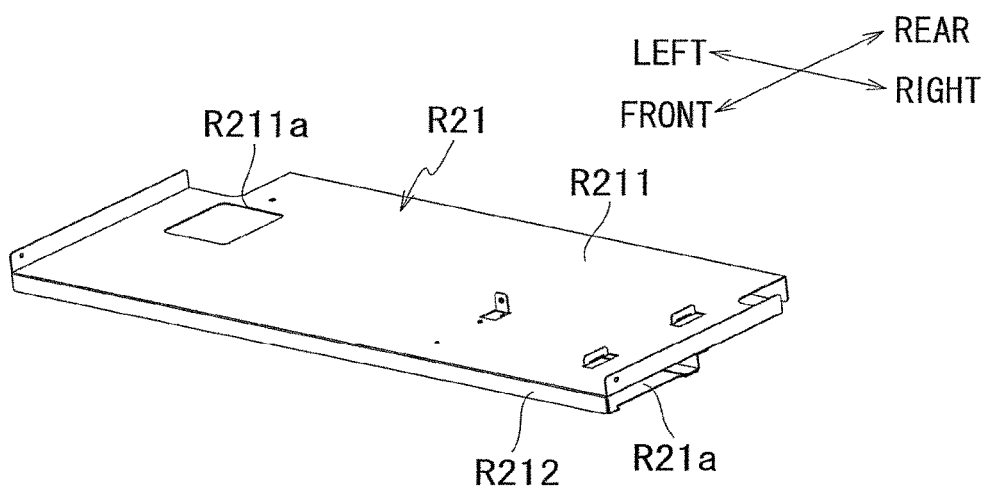
FIG. 75 is a perspective view of the shelf board member.
Figure 76:
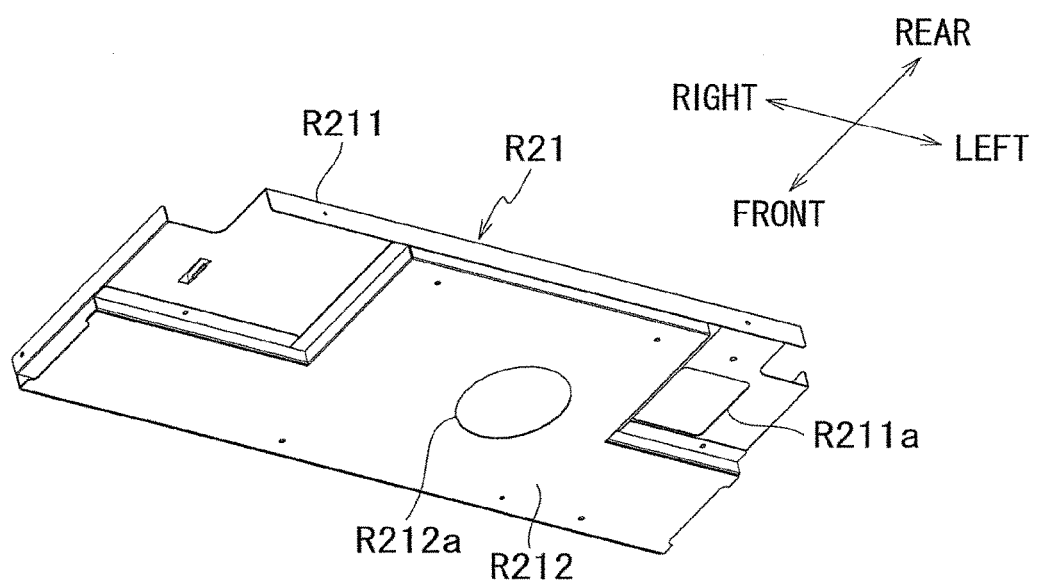
FIG. 76 is a perspective view of a main part of the shelf board member.
Figure 77:
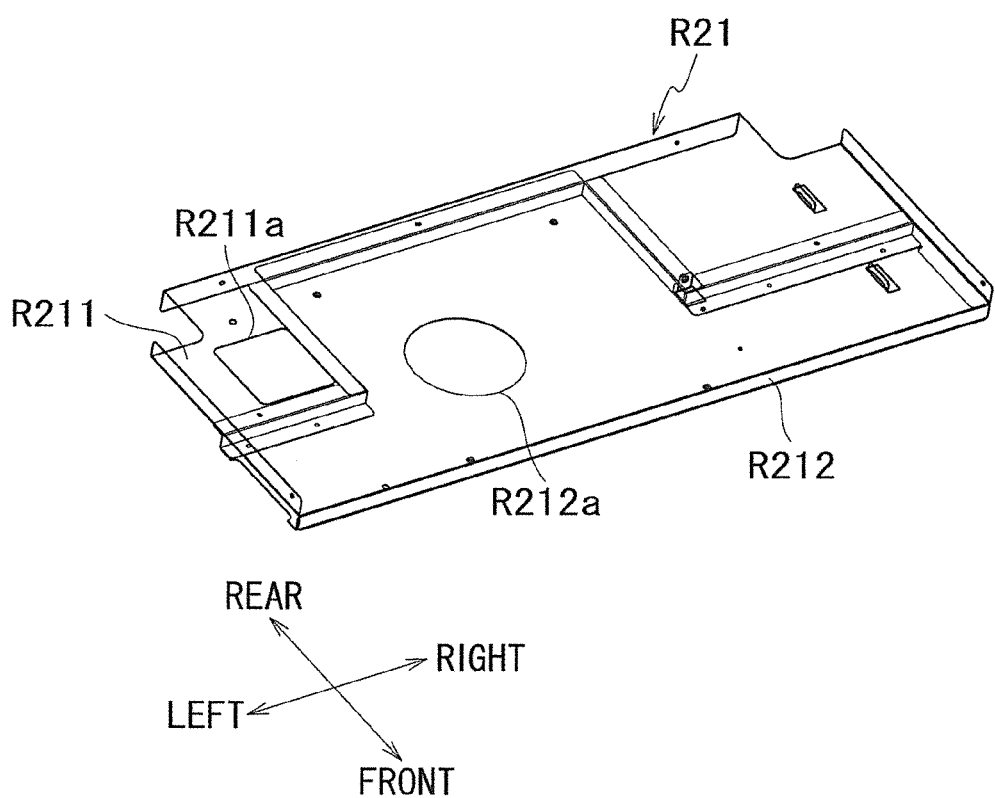
FIG. 77 is a perspective view of the shelf board member.

As shown in FIG. 72, the security cage cooling mechanism R2 has the shelf board member R21 parting the middle space 41B and the bottom space 41C from each other. The shelf board member R21 has a top surface member R211 and an under surface member R212, as shown in FIG. 75. The top surface member R211 has a through hole R211 in its left end portion. The through hole R211 communicates the middle space 41B with the bottom space 41C, and is used for a peephole to enable visual confirmation of the exhaust fan R12 and the like at a time of maintenance, while enabling to wire therethrough signal cables and the like. Further, as shown in FIG. 76, there is an air passage hole R212a formed in a middle portion of the under surface member R212. As is also shown in FIG. 77, the top surface member R211 and the under surface member R212 are combined with each other relative to the vertical directions to form the shelf board member R21 with openings R21a on its left end surface and right end surface. It should be noted that one of the openings R21a leads to an air intake hole 411e shown in FIG. 57. The other one of the openings R21a leads to an air intake hole 411i shown in FIG. 28.

The shelf board member R21 with the structure detailed above is horizontally disposed and supports a printer device PR with its top surface, as shown in FIG. 72. Further, the shelf board member R21 has its right end portion jointed to the right side wall of the casing 411, and its left end portion jointed to the left side wall of the casing 411. The openings on the left end surface and the right end surface of the shelf board member R21 are uncovered. This way, the internal space of the shelf board member R21 communicates with the outside.

Figure 73:
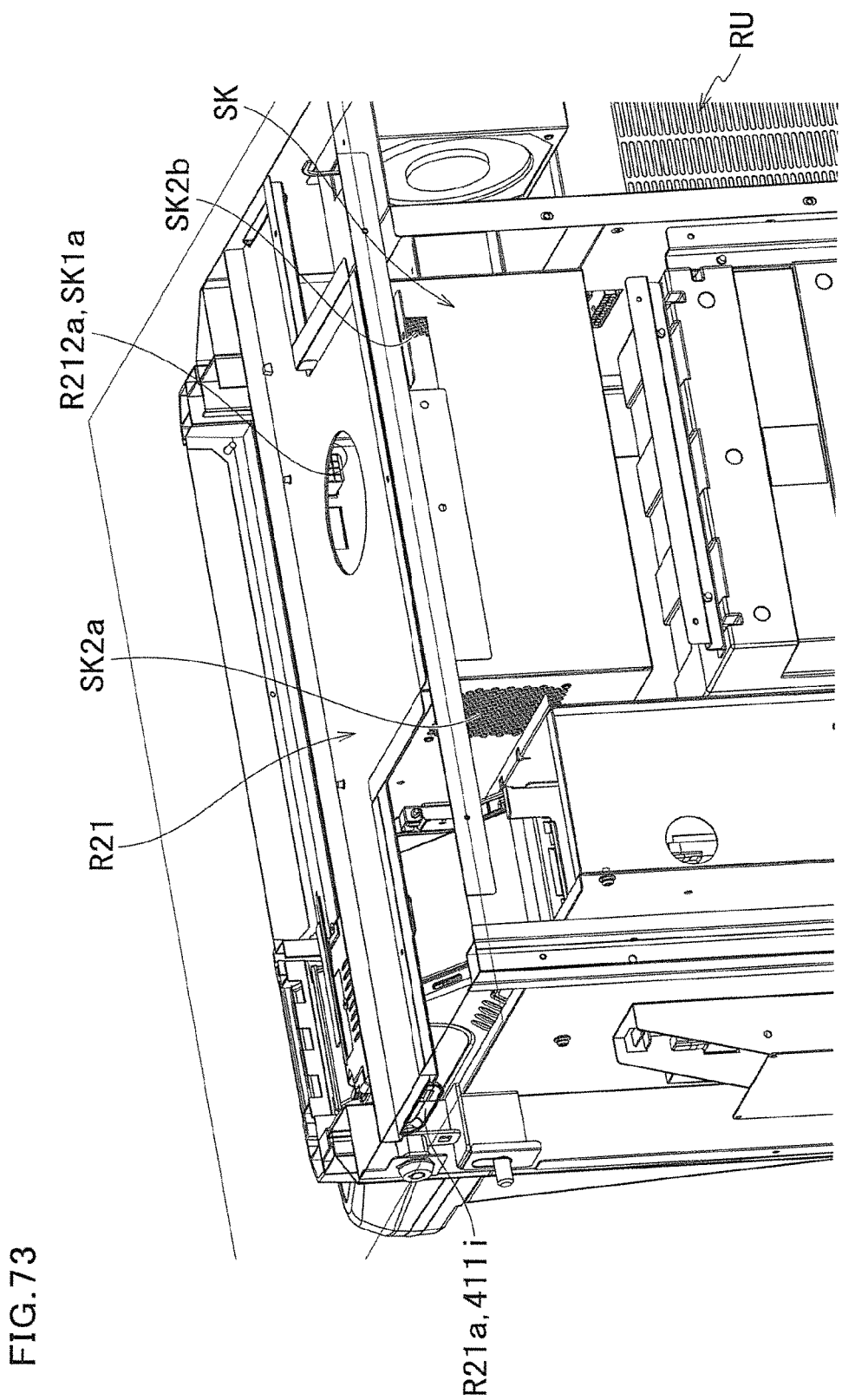
FIG. 73 is an explanatory diagram of a shelf board member.

To the middle portion on the under surface of the shelf board member R21 is provided the security cage SK. As shown in FIG. 73, the air passage hole R212a of the shelf board member R21 and the opening SK1a of the security cage SK are positioned to each other so that the inside of the security cage SK is in communication with the outside on the right side and left side of the casing 411, through a hollow portion of the shelf board member R21.

Figure 74A:
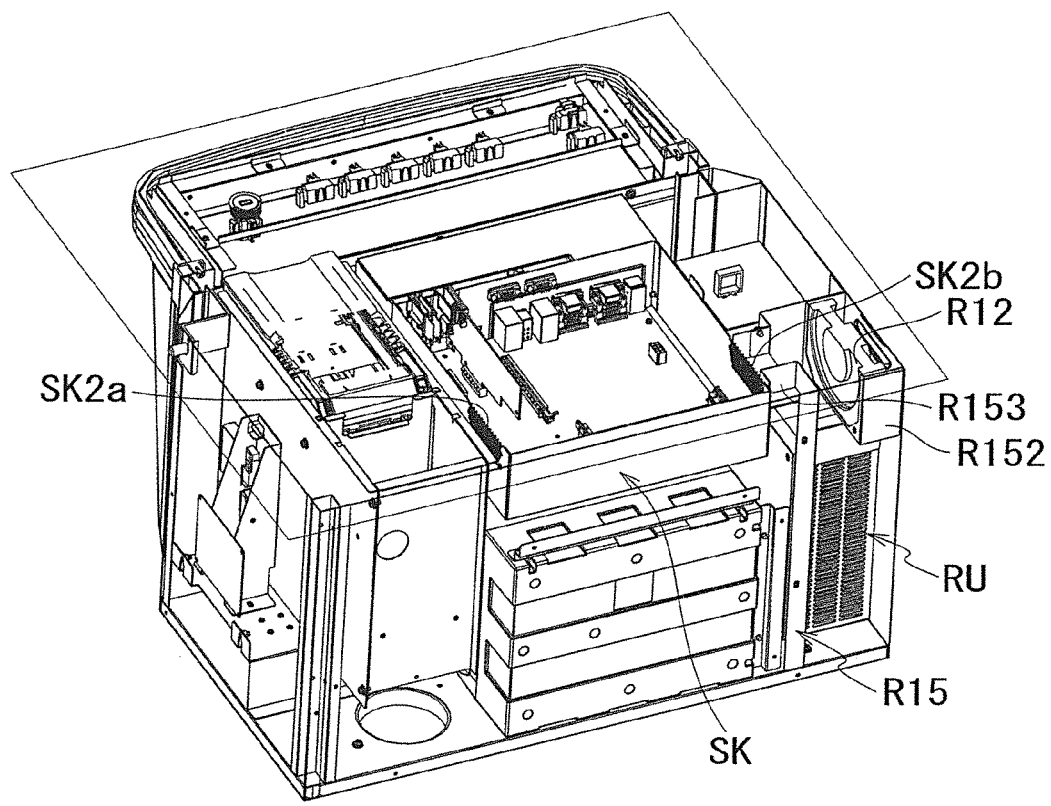
FIG. 74A is an explanatory diagram of a security cage.

The shelf board member R21 supports the security cage cooling mechanism R2 so that the security cage cooling mechanism R2 is positioned beside the exhaust fan R12. As shown in FIG. 74A, a through hole SK2b formed on the left side surface of the security cage SK is in communication with the outside via a penetration member R153 and the exhaust fan R12. Further, a through hole SK2a formed on the right side surface of the security cage SK leads to the inside the casing 411. Thus, the security cage SK is structured so that the air therein is forced out through the through hole SK2b by the exhaust fan R12.

With the security cage cooling mechanism R2 with the structure as described above, the air nearby the left side wall and the right side wall of the shelf board member R21 is taken into the hollow portion of the shelf board member R21 by the CPU cooling fan CF (see FIG. 74B and FIG. 74C) inside and the exhaust fan R12. The air taken in then flows into the security cage SK through the air passage hole R212a (opening SK1a) in the middle portion. After cooling various electric components in the security cage SK, the air taken in is ventilated through the through hole SK2b, and forced out by the exhaust fan R12 after being merged with the air from the power source cooling mechanism R1 in the exhaust heat chamber R152. The ventilating performance of the exhaust fan R12 is set higher than the intake performance of the CPU cooling fan CF. Therefore, the air inside the casing 411 flows through the through hole SK2a formed on the right side surface of the security cage SK. Thus, the electronic components in the security cage SK are cooled by the air inside the casing 411.

(Device Main Body 4: Security Cage SK)

Figure 74C:
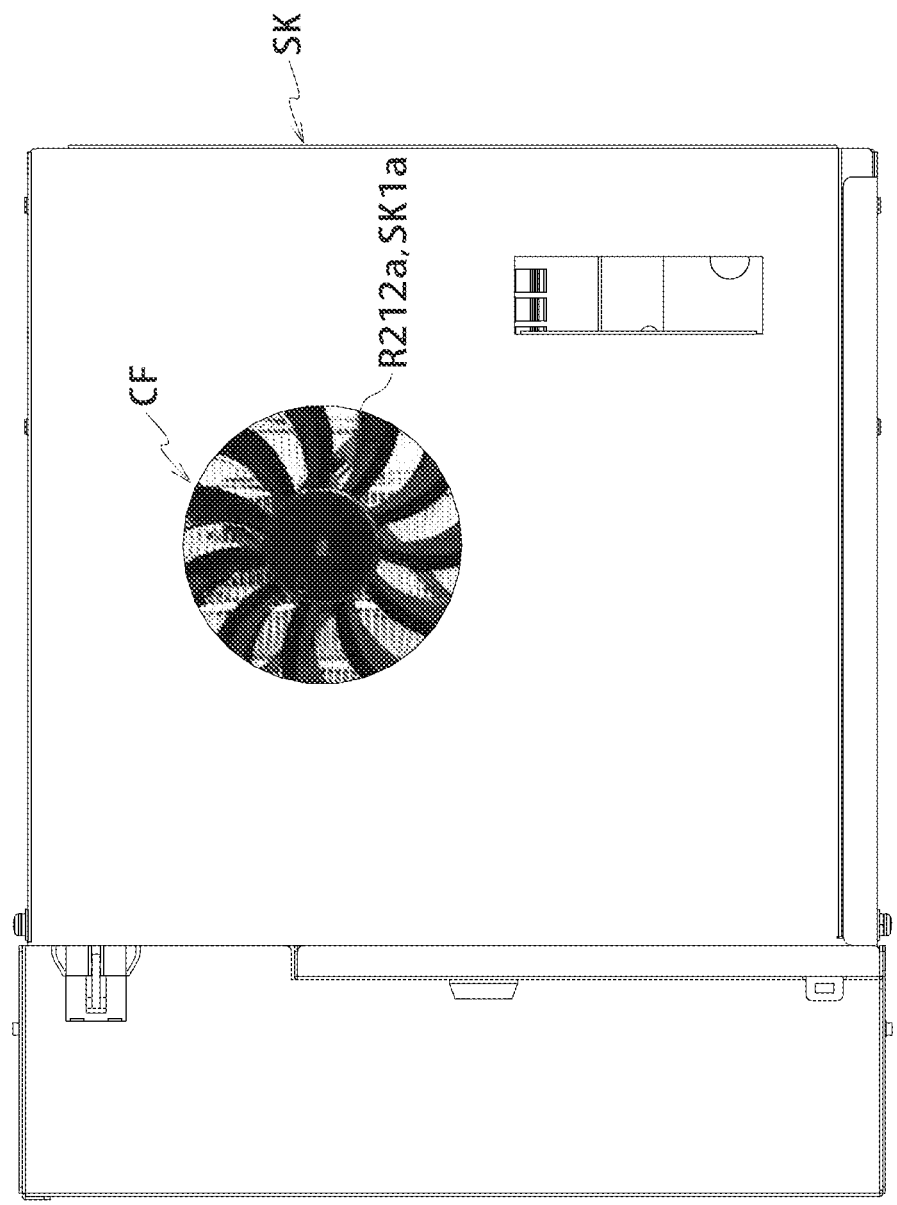
FIG. 74C is an explanatory diagram of the security cage.

The security cage SK is provided to the under surface of the shelf board member R21, as shown in FIG. 78. The security cage SK has a top wall member SK1, a main body wall member SK2, and a security cage door SK3. The top wall member SK1 has the opening SK1a in position corresponding to the air passage hole R212a of the shelf board member R21. The opening SK1a is positioned above the CPU cooling fan CF, as shown in FIG. 74B and FIG. 74C. The CPU cooling fan CF takes in the air from the opening SK1a for the not-shown CPU on the APX motherboard AM, and cools the CPU by blowing the air to the CPU. To the left side portion and the right side portion of the top wall member SK1 are formed step portions Skb1. These step portions Skb1 protrude in the horizontal direction from a high position but lower than the top surface, and difference in the levelling is relative to the vertical direction is greater than the thickness of the plate constituting the main body wall member SK2.

Figure 79:
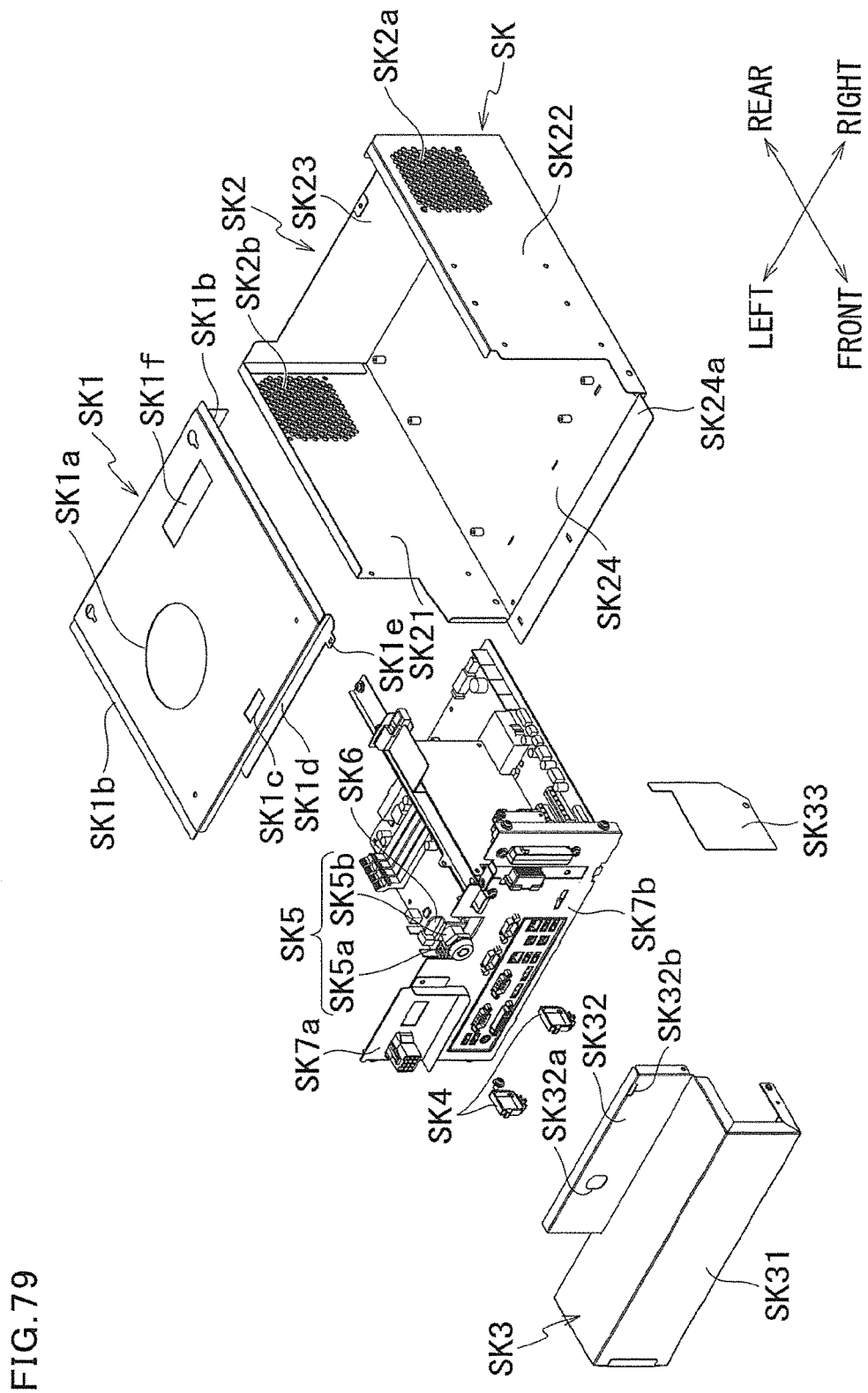
FIG. 79 is an exploded perspective view of the security cage.

Further, the top wall member SK1 has an engagement hole portion SK1c at the center of its front portion, as shown in FIG. 79. The engagement hole portion SK1c has a bent piece whose front end portion extends downward. Further, the top wall member SK1 has an engagement protrusion portion SK1d at its front end portion. The engagement protrusion portion SK1d protrudes forward at a position lower than the top surface, and has a protruding piece SK1e at its right end portion. The protruding piece SK1e is used for positioning at the time of closing the security cage door SK3. The top wall member SK1 further has a sensor abutting portion SK1f on the right side of its back side portion. The sensor abutting portion SK1f is formed by bending a part of the top wall downward, and detects whether or not the security cage SK is properly mounted. Such a top wall member SK1 with the structure described above is attachable to the under surface of the shelf board member R21 with a use of a screw.

Figure 80:
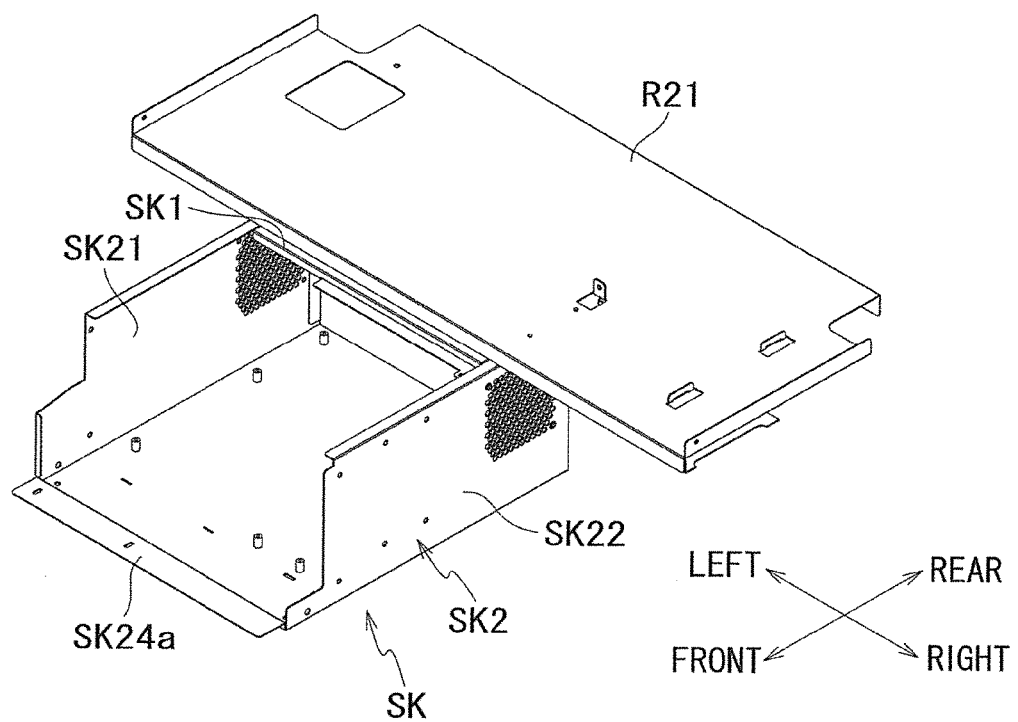
FIG. 80 is an explanatory diagram showing a relation between the shelf board member and the security cage.
Figure 81:
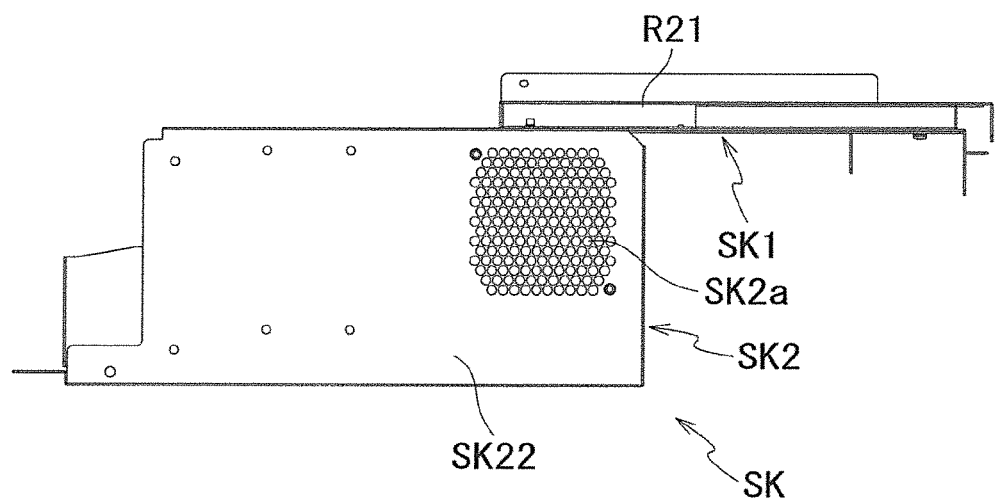
FIG. 81 is an explanatory diagram showing a relation between the shelf board member and the security cage.

The main body wall member SK2 has a side surface wall portions SK21 and SK22 which are side surfaces on the left and right, a back surface wall portion SK23 which is the back surface, and a bottom surface wall portion SK24 which is the under surface. To the side surface wall portions SK21 and SK22 are formed through holes SK2a and SK2b. Further, the upper side portions of the side surface wall portions SK21 and SK22 are bent inwardly to enable engagement with the step portions Skb1 of the top wall member SK1. Thus, as shown in FIG. 80 and FIG. 81, the security cage SK is attachable to the shelf board member R21 by attaching the top wall member SK1 to the under surface of the shelf board member R21, engaging the upper side portion of the side surface wall portions SK21 and SK22 of the main body wall member SK2 with the step portions Skb1 of the top wall member SK1, and sliding the main body wall member SK2 toward back.

Further, as shown in FIG. 79, at the lower front side of the bottom surface wall portion SK24 is formed a step portion SK24a. On the top surface of the step portion SK24a are provided two bundling members SK4. These bundling members SK4 enable drawing outside a plurality of signal cables in the security cage SK, in bundles.

The security cage door SK3 has lower wall portion SK31 having a C-shaped cross section, an uprising portion SK32 extending upward from the rear end portion of the lower wall portion SK31. The lower wall portion SK31 is formed so that there is a gap on the both left and right end portions; i.e., between the lower wall portion SK31 and the side surface wall portions SK21 and SK22 of the main body wall member SK2. The gap on the right end portion of the lower wall portion SK31 is sealed by a sealing member SK33. The gap on the right end portion of the lower wall portion SK31 is opened so as to enable drawing out of the signal cables bundled by the bundling members SK4.

Further, the lower end portion of the lower wall portion SK31 is rotatably supported by the side surface wall portions SK21 and SK22 of the main body wall member SK2. Namely with the lower end portion of the security cage door SK3 serving as the rotation axis and the upper end portion serving as the free end, the security cage door SK3 is able to swing in forward/backward directions. In other words, the security cage SK is opened by pulling forward the upper end portion of the security cage door SK3, and closed by pushing backward the upper end portion of the security cage door SK3.

The uprising portion SK32 of the security cage door SK3 extends from the right end of the security cage door SK3 towards left end, to a midway portion of the security cage door SK3. In the upper right end portion of the uprising portion SK32 is formed a through hole SK32b. The through hole SK32b enables insertion of the protruding piece SK1e of the top wall member SK1. The uprising portion SK32 has a key hole SK32a. To the key hole SK32a is attached a key cylinder SK5 and exposes a key unit SK5a to the front. To a cylinder portion SK5b of the key cylinder SK5 is provided a plate member SK6. The plate member SK6 is formed in a rectangular shape. When the cylinder portion SK5b is rotated and the plate member SK6 matches with the vertical direction, the plate member SK6 engages with the engagement hole portion SK1c of the top wall member SK1. This way, the security cage door SK3 in the closed state is locked. Meanwhile, when the cylinder portion SK5*b* is rotated and the plate member SK6 matches with the horizontal direction, the plate member SK6 disengages from the engagement hole portion SK1*c* of the top wall member SK1, thus unlocking the security cage door SK3.

Figure 82:
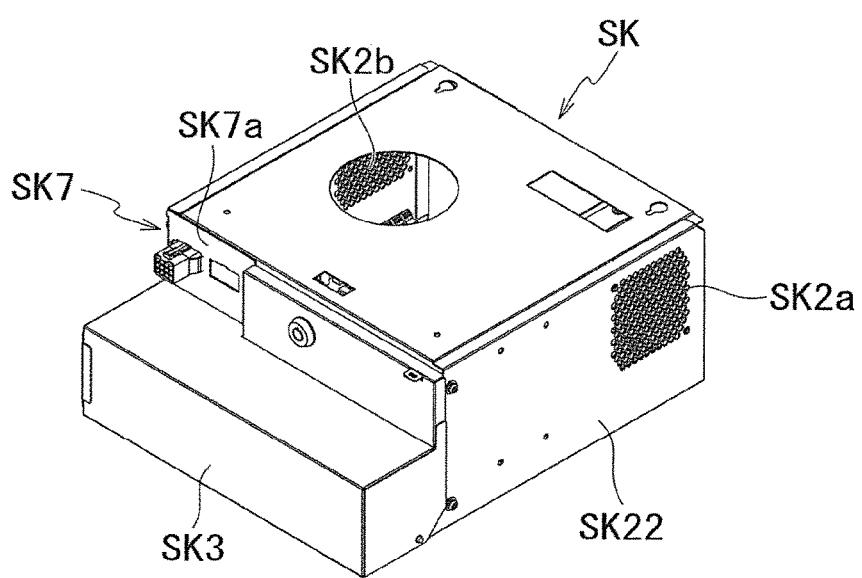
FIG. 82 is a perspective view of the security cage.
Figure 83:
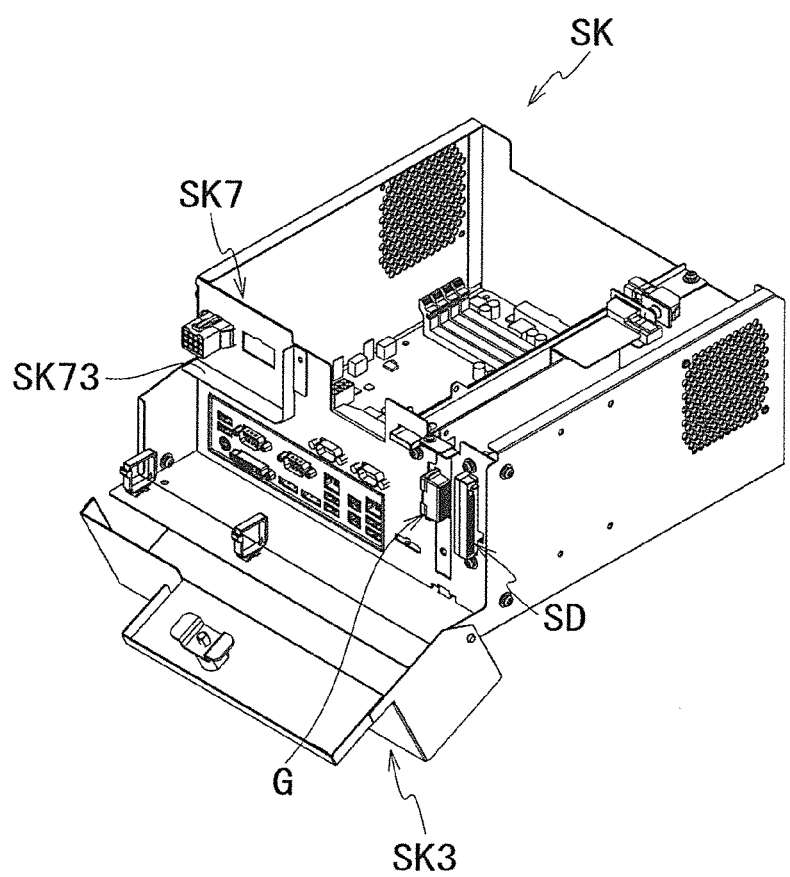
FIG. 83 is a perspective view of the security cage.

The security cage door SK3 is formed in such a manner that the upper left corner area SK7*a* of a connector attachment plate SK7 is exposed on the left side of the uprising portion SK32. Thus, when the security cage door SK3 of the security cage SK is closed, a main area SK7*b* is covered by the security cage door SK3 except for the upper left corner area SK7*a* of the connector attachment plate SK7, as shown in FIG. 82. Meanwhile, when the security cage door SK3 of the security cage SK is opened, the upper left corner area SK7*a* of the connector attachment plate SK7 and the main area SK7*b* are exposed to the outside, as shown in FIG. 83. On the connector attachment plate SK7, the upper left corner area SK7*a* and the main area SK7*b* are parted from each other by a partition plate SK73. The partition plate SK73 protrudes forward, and covers the main area SK7*b* completely from the outside, when the security cage door SK3 is closed.

(Device Main Body 4: Security Cage SK: Connector Attachment Plate SK7)

Figure 84:
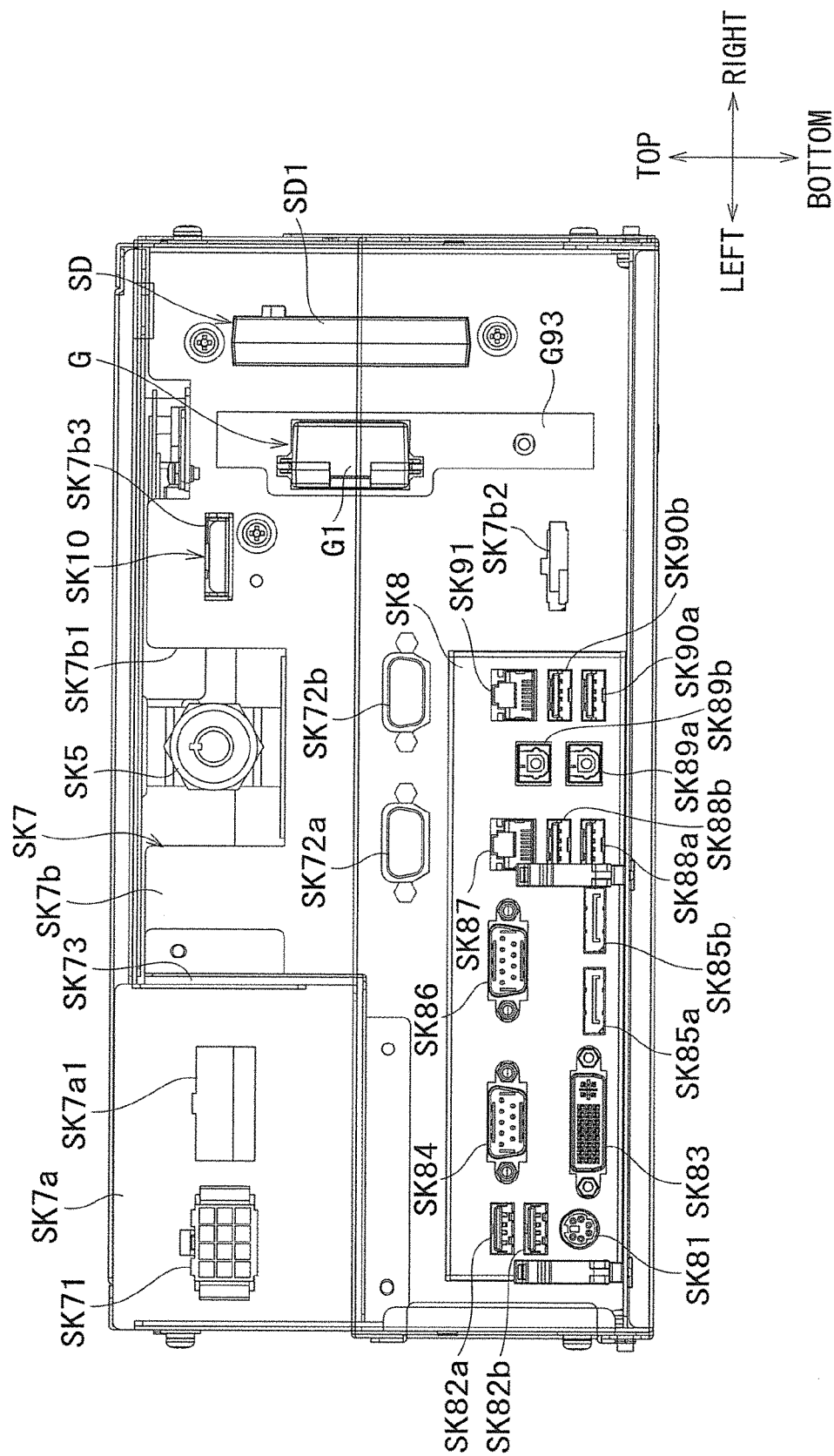
FIG. 84 is a front view of a connector attachment plate.

As shown in FIG. 84, in the upper left corner area SK7*a* of the connector attachment plate SK7, a connector SK71 for power supply is provided and a connector attaching hole SK7*a*1 is formed. To the connector SK71 for power supply is connected a power supply cable, and power is supplied from a power source device provided in the power source box R11 shown in FIG. 69.

Further, in the middle portion at the upper end of the connector attachment plate SK7 is formed a notch SK7*b*1. The notch SK7*b*1 is formed so that a key cylinder SK5 is inserted therethrough. In the main area SK7*b* of the connector attachment plate SK7 is provided a connector gathered panel SK8. The connector gathered panel SK8 is disposed below the upper left corner area SK7*a* and the notch SK7*b*1.

In a lower left corner portion of the connector gathered panel SK8 is a keyboard connector SK81. Above the keyboard connector SK81 are two USB connectors; i.e., a first USB connector SK82*a* and a second USB connector SK82*b*. The USB connectors SK82*a* and SK82*b* are aligned serially in the vertical direction. On the right side of the keyboard connector SK81 is a 30-pin DVI port connector SK83. Above the DVI port connector SK83 is a 9-pin D-Sub connector SK84. On the right side of the DVI port connector SK83 are two display port connectors; i.e., a first display port connector SK85*a* and a second display port connector SK85*b*. The display port connectors SK85*a* and SK85*b* are serially aligned in the left/right direction.

Above the display port connectors SK85*a* and SK85*b* is a 9-pin D-Sub connector SK86. On the right side of the second display port connector SK85*b* are two USB connectors; i.e., a third USB connector SK88*a* and a fourth USB connector SK88*b*. The USB connectors SK88*a* and SK88*b* are aligned serially in the vertical direction. Above the fourth USB connector SK88*b* is a LAN jack SK87.

On the right side of the USB connectors SK88*a* and SK88*b* and the LAN jack SK87 are two optical signal connectors; i.e., a first optical signal connector SK89*a* and a second optical signal connector SK89*b*. The optical signal connectors SK89*a* and SK89*b* are aligned serially in the vertical direction. On the right side of the optical signal connectors SK89*a* and SK89*b* are serially aligned, in the vertical direction, two USB connectors; i.e., a fifth USB connector SK90*a* and a sixth USB connector SK90*b*, and a LAN jack SK91 Between the connector gathered panel SK8 and the key cylinder SK5 is a 9-pin D-Sub connectors; i.e., first D-Sub connector SK72*a* and a second D-Sub connector SK72*b*.

On the right side of the connector gathered panel SK8 is formed a lower side through hole SK7*b*2. Above the lower side through hole SK7*b*2 is formed an upper side through hole SK7*b*3. The upper side through hole SK7*b*3 is provided with a cage open/close detection mechanism SK10. On the right side of the lower side through hole SK7*b*2 and the upper side through hole SK7*b*3 is a GAL mechanism G. On the right side of the GAL mechanism G is disposed an SSD mechanism SD.

(Device Main Body 4: Security Cage SK: Cage Open/Close Detection Mechanism SK10)

Figure 85:
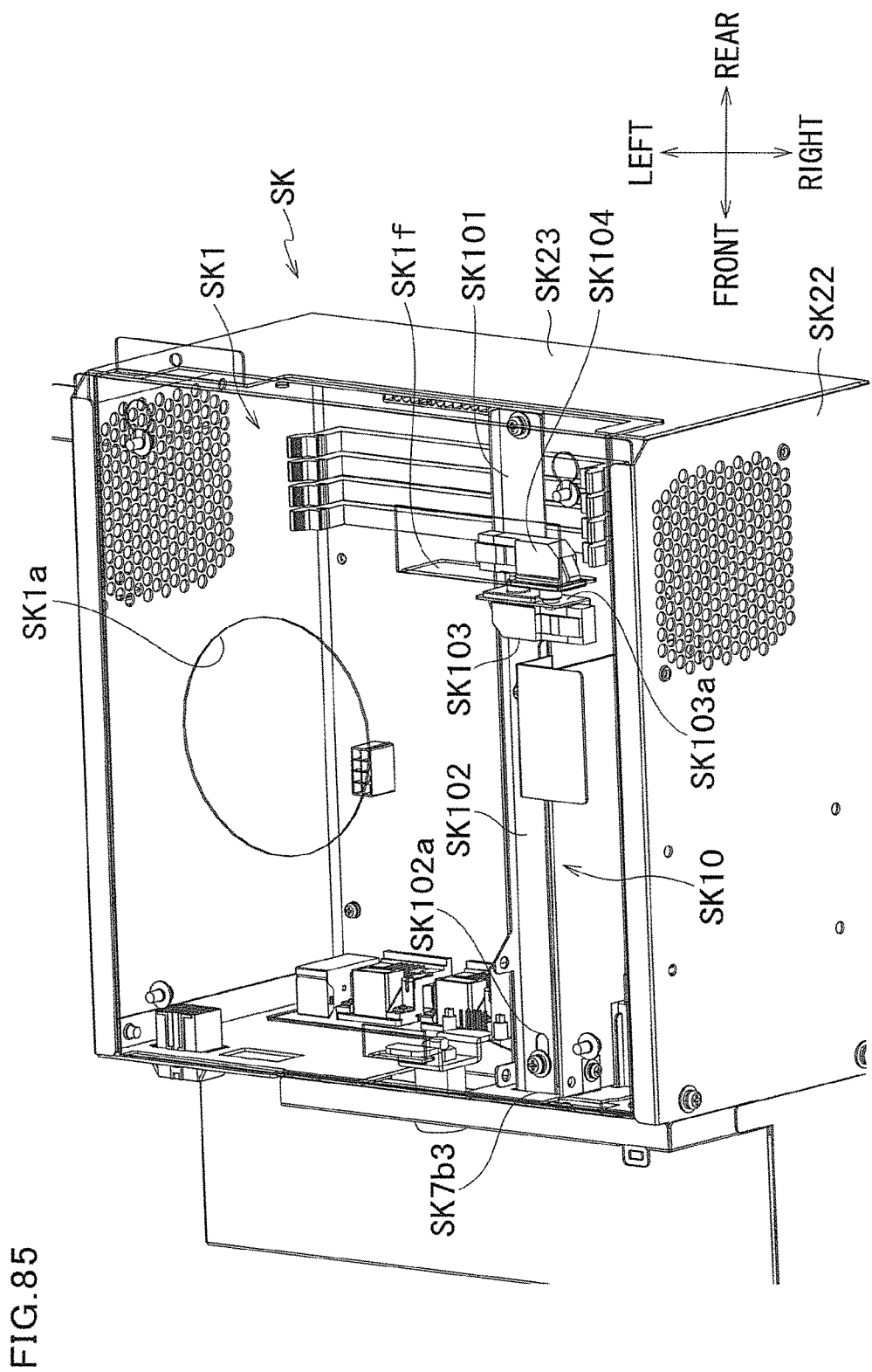
FIG. 85 is a perspective view of a main part of the security cage.

The cage open/close detection mechanism SK10 includes a long sensor support member SK101, as shown in FIG. 85. The length direction of the sensor support member SK101 matches with the forward/backward direction, and the front end portion is fastened with a screw inserted into the upper side through hole SK7*b*3, while the rear end portion is screw fastened to the back surface wall portion SK23. The sensor support member SK101 has its both ends relative to the left/right direction bent upward. On top surface of the sensor support member SK101 is moveably provided a slide member SK102. The movements of the slide member SK102 is restricted to the forward/backward directions by the both ends of the sensor support member SK101 which are bent upward. Further, the slide member SK102 has a long hole SK24*a* at its front end portion and rear end portion. The long hole SK24*a* is elongated in the forward/backward direction. The movable distance of the slide member SK102 relative to the forward/backward direction is restricted with a screw inserted in the long hole SK24*a*.

The slide member SK102 and the sensor support member SK101 are connected by a not-shown spring member. The spring member biases the slide member SK102 in the forward direction to the sensor support member SK101. The front end portion of the slide member SK102 projects towards the security cage door SK3, and is capable of abutting the security cage door SK3. With this, when the security cage door SK3 is closed, the security cage door SK3 pushes the slide member SK102 towards back side. Meanwhile, when the security cage door SK3 is opened, the spring member biases the slide member SK102 toward front side.

In the rear end portion of the slide member SK102 is provided a first sensor SK103 of a contact type. The first sensor SK103 is disposed so as to be capable of monitoring the back side, and is configured to sense abutting of the slide member SK102 to the front surface of the sensor abutting portion SK1*f* of the top wall member SK1. On the back surface of the sensor abutting portion SK1*f* is a second sensor SK104. The second sensor SK104 is disposed so as to be capable of monitoring the front side, and is configured to sense abutting of the slide member SK102 to an abutting portion SK103*a* of the first sensor SK103.

The first sensor SK103 and the second sensor SK104 functions as a security door switch. The sensor enters a sensing-state when the security cage door SK3 is closed, pushing backwards the slide member SK102, and enters a non-sensing state when the security cage door SK3 is opened and the slide member SK102 moves forward. Thus, the cage open/close detection mechanism SK10 adopts double sensing-process by the first sensor SK103 and the second sensor SK104, to monitor and confirm the open/close state of the security cage door SK3.

(Device Main Body 4: Security Cage SK: SSD (Solid State Drive) Mechanism SD)

Figure 86:
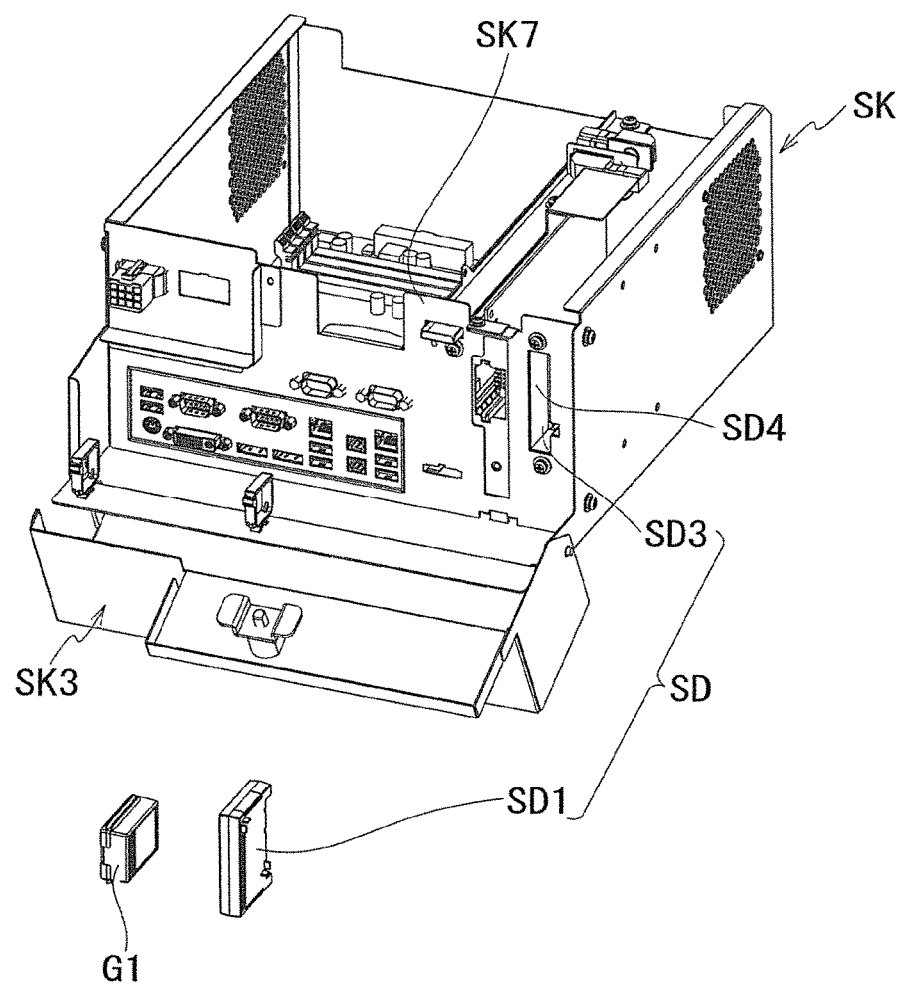
FIG. 86 is an explanatory diagram showing a process of mounting a GAL device and an SSD device.

As shown in FIG. 86, the SSD mechanism SD is disposed in the right end portion of the connector attachment plate SK7. The SSD mechanism SD is structured by making an SSD into a cartridge, and attachable and detachable to and from the APX motherboard AM. It should be noted that the SSD has a size which is a half of a 2.5 inch SSD, and adopts a connector in which a power source line and a signal line are integrated. Specifically, the SSD mechanism SD includes: an SSD device SD1 which is an SSD in the form of cartridge, and an SSD mounting device SD3 provided to the connector attachment plate SK7, to which device the SSD device SD1 is detachably mounted. With the use of an SSD which consumes less power and generates less heat than traditionally used HDDs, an increase in the temperature in the security cage SK is restrained. Further, since the SSD device SD1 is disposed in the right end portion of the security cage SK, the heat generated by the SSD device SD1 is easily radiated to the outside of the casing 411 through the security cage SK.

(Device Main Body 4: Security Cage SK: SSD Mechanism SD: SSD Device SD1)

Figure 87:
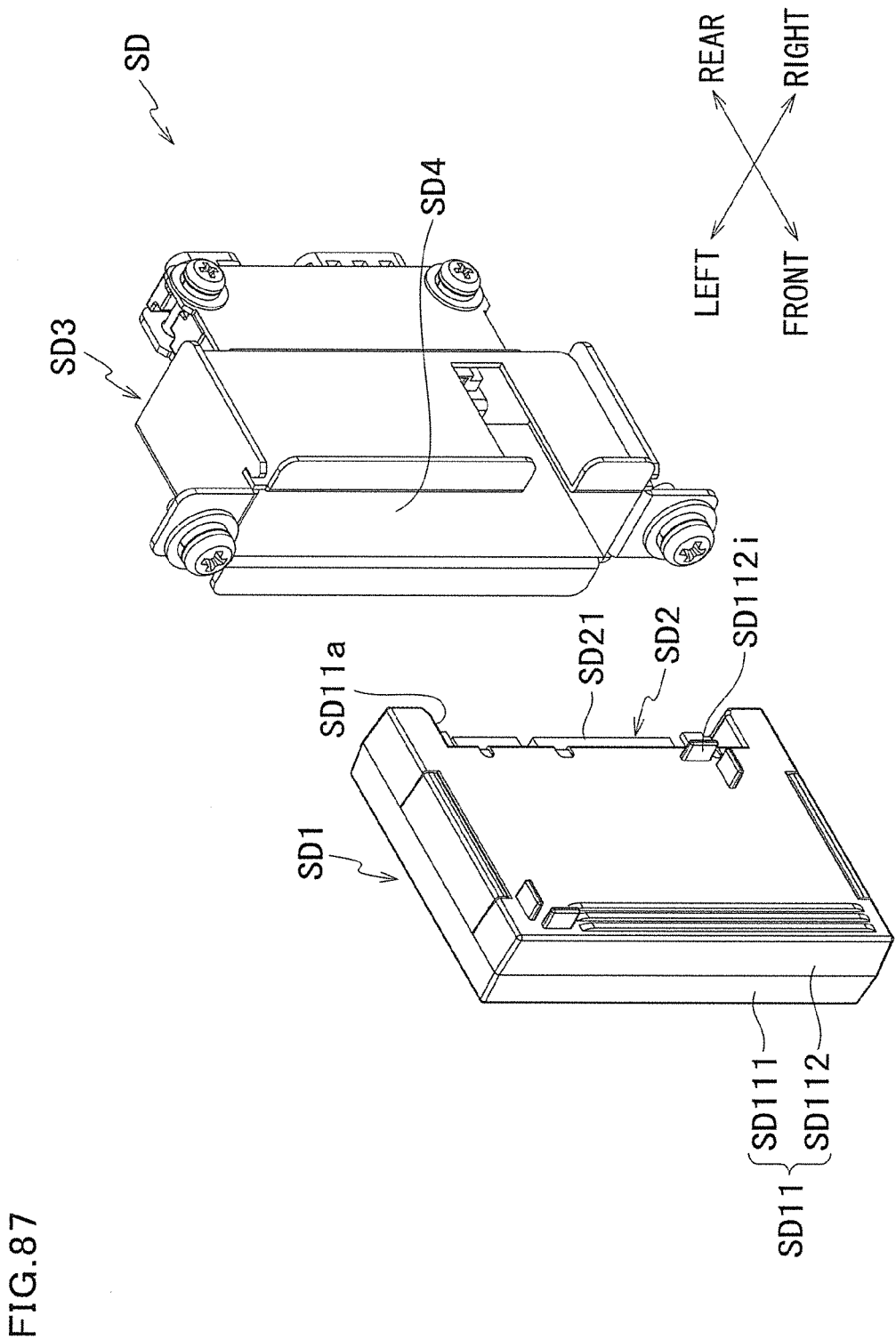
FIG. 87 is a perspective view of the SSD mechanism.
Figure 88A:
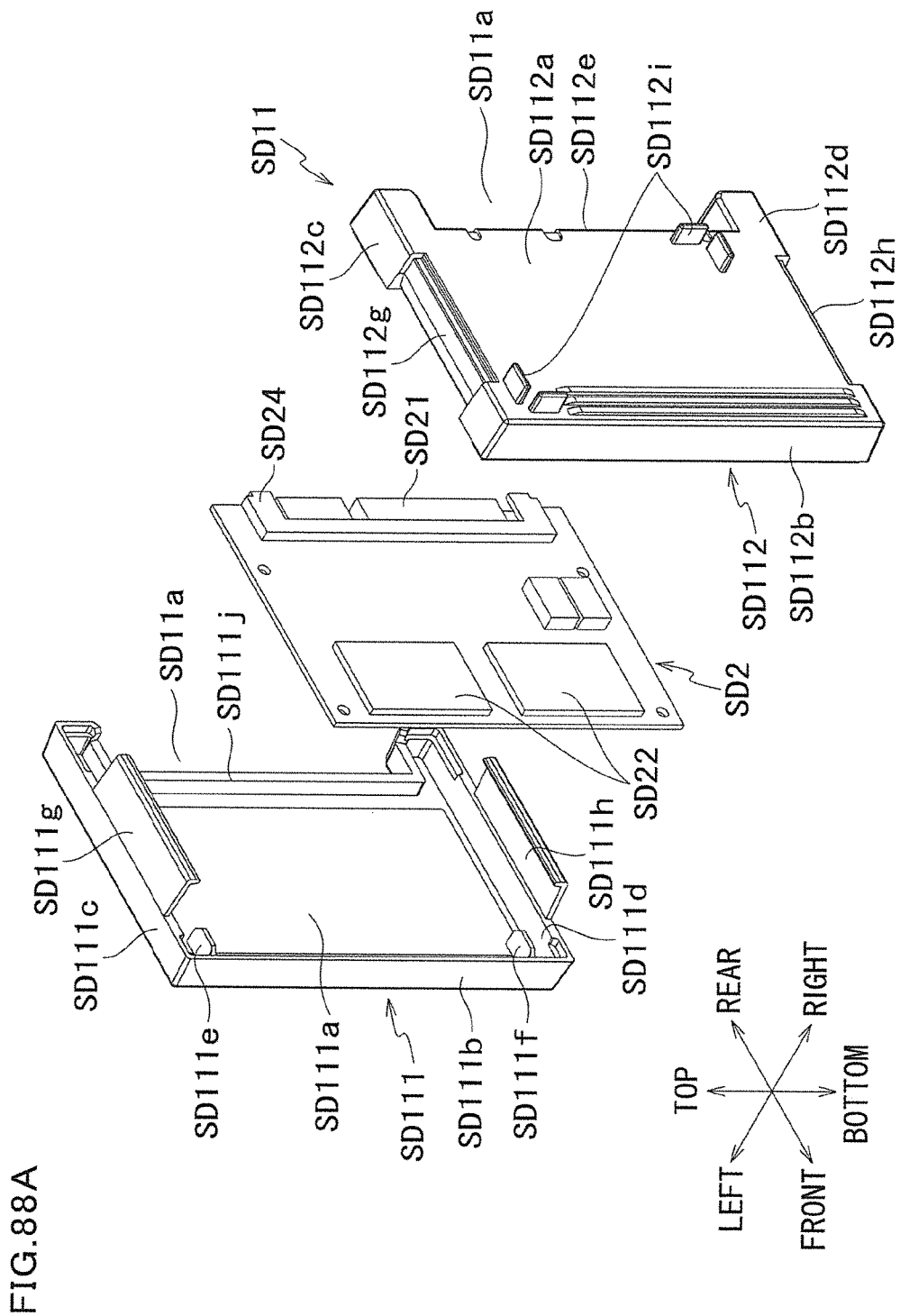
FIG. 88A is an exploded perspective view of the SSD device.
Figure 88B:
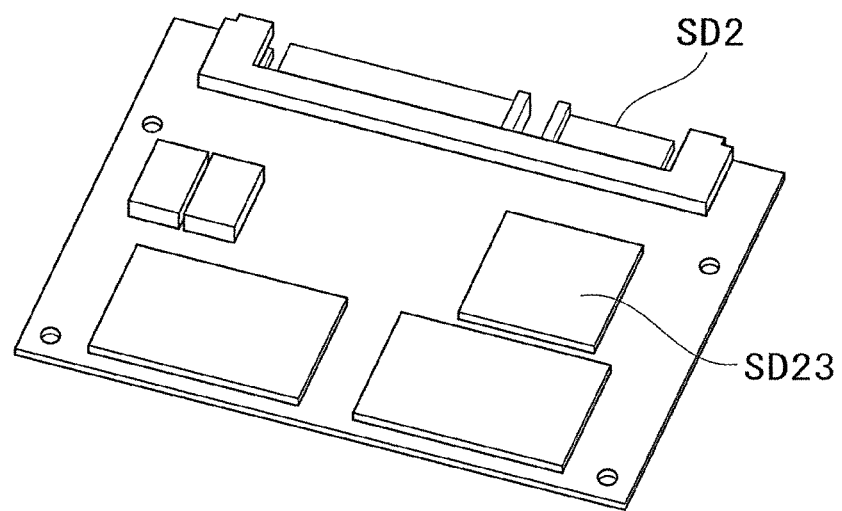
FIG. 88B is a perspective view of an SSD substrate.

As shown in FIG. 87, the SSD device SD1 includes: an SSD casing SD11 that can be divided into two in the left/right direction, and an SSD substrate SD2 accommodated and held in the SSD casing SD11. As shown in FIG. 88A, the SSD substrate SD2 includes: a flash memory SD22, and a memory controller SD23 configured to manage the flash memory SD22. The memory controller SD23 is provided on the opposite side of the flash memory SD22 on the SSD substrate SD2, as shown in FIG. 88B. It should be noted that, as the recording mode, the SSD substrate SD2 may adopt an MLC (Multi-Level Cell) mode or an SLC (Single Level Cell) mode.

The SSD substrate SD2 is formed in the form of rectangular plate, and has a connector unit SD21 at its rear end portion. The connector unit SD21 has a connector formed in compliance with the SATA standard, and enables access to the flash memory SD22 from the outside (e.g., from the CPU cores AM103a to AM103d of FIG. 100B), under control of the memory controller SD23. Specifically, the connector unit SD21 includes: a signal connector unit SD21a for transmitting data, and a power source connector unit SD21b for supplying power to the SSD device SD1. The signal connector unit SD21a and the power source connector unit SD21b are each formed in an L-shape, when viewed from a direction of mounting the same to a connector unit SD322. The signal connector unit SD21a and the power source connector unit SD21b are each formed as a projection and are aligned straight. In the SSD device SD1, the signal connector unit SD21a and the power source connector unit SD21b are integrally formed. The SSD substrate SD2 has on its left surface and the right surface a protruding portion SD24 which is formed in such a manner as to surround the connector unit SD21.

The SSD substrate SD2 described above is accommodated in the SSD casing SD11. The outline of the SSD casing SD11, formed by connecting the corner portions, is formed in a rectangular shape. In the back portion which is on the mount side of the SSD casing SD11 is formed a recess SD11a. On the recess SD11a, the connector unit SD21 of the SSD substrate SD2 is exposed.

The SSD casing SD11 includes: a first SSD casing member SD111 mainly covering the left side of the SSD substrate SD2, and a second SSD casing member SD112 mainly covering the right side of the SSD substrate SD2. The first SSD casing member SD111 has a side surface portion SD111a to face the left surface of the SSD substrate SD2, and a front surface portion SD111b, a top surface portion SD111c, a low surface portion SD111d formed to surround the GAL substrate SD2, and a back surface portion SD111e abutting the protruding portion SD24 on the left surface of the SSD substrate SD2.

In the upper front end portion and the lower front end portion of the side surface portion SD111a are formed protruding portions SD111e and SD111f. The protruding portions SD111e and SD111f are each formed to abut the left surface of the cased SSD substrate SD2. In the middle portion of each of the top surface portion SD111c and the low surface portion SD111d is formed an engagement protrusion portions SD111g and SD111h. The engagement protrusion portions SD111g and SD111h are disposed to face each other, and their leading ends are bent inwardly in a hook-like manner.

On the other hand, the second SSD casing member SD112 is disposed to face the first SSD casing member SD111, over the SSD substrate SD2. The second SSD casing member SD112 has a side surface portion SD112a to face the right surface of the SSD substrate SD2, and a front surface portion SD112b, a top surface portion SD112c, a low surface portion SD112d formed to surround the GAL substrate SD2, and a back surface portion SD112e abutting the protruding portion SD24 on the right surface of the SSD substrate SD2. Inner side portions at the leading ends of the front surface portion SD112b, the top surface portion SD112c, and the low surface portion SD112d are formed to fit with the inner side portions of the leading end portions of the front surface portion SD112b, the top surface portion SD112c, and the low surface portion SD112d of the first SSD casing member SD111, respectively.

In the upper front end portion and the front side end portion of the side surface portion SD112a are formed not-shown protruding portions. The protruding portions are each formed to abut the right surface of the cased SSD substrate SD2. Thus, the SSD casing SD11 is structured so as to sandwich the upper end portion on the front side and the front side end portion of the SSD substrate SD2 between the protruding portions SD111e and SD111f of the first SSD casing member SD111 and the protruding portions of the second SSD casing member SD112, while sandwiching the protruding portion SD24 of the SSD substrate SD2 between the back surface portions SD111j and SD112e, thus maintain the casing state of the casing main body N2.

In the middle portion of each of the top surface portion SD112c and the low surface portion SD112d of the second SSD casing member SD112 is formed an engagement recess portions SD112g and SD112h. The engagement recess portions SD112g and SD112h are formed so as to engage with the engagement protrusion portions SD111g and SD111h of the first SSD casing member SD111, when the first SSD casing member SD111 and the second SSD casing member SD112 are abutted to each other and assembled into one piece as the SSD casing SD11. With the above structure, the SSD casing SD11 is able to maintain its assembled state in one piece, without a need for screw-fastening the casing members SD111 and SD112.

Further, in the upper front end portion and the lower back end portion on the right surface of the side surface portion SD112a is formed a protruding portions SD112i. These protruding portions SD112i are disposed on one side to indicate the vertical direction of the SSD device SD1, while facilitating positioning of the SSD device SD1 at the time of mounting to the SSD mounting device SD3.

(Device Main Body 4: Security Cage SK: SSD Mechanism SD: SSD Mounting Device SD3)

As shown in FIG. 89, the SSD mounting device SD3 includes: an SSD guide member SD31 that can be divided into two in the left/right direction, and a connector member SD32 held by the SSD guide member SD31. The connector member SD32 has a rectangular parallelepiped connector main unit SD321. The length direction of the connector main unit SD321 is set in the vertical direction, and a fitting portions SD321a for screw-fastening is provided in the upper end portion and the lower end portion.

Further, the connector main unit SD321 has a connector units SD322 and SD323 disposed on the front end surface and the back end surface. The connector units SD322 and SD323 are formed in compliance with the SATA standard. The pins of the connector units SD322 and SD323 on both sides are electrically connected to each other. The connector unit SD322 on the front side is connected to the connector unit SD21 of the SSD substrate SD2.

Specifically, the connector unit SD322 is connectable to the connector unit SD21 formed in the form of a protrusion on the SSD device SD1. The connector unit SD322 has a connector unit SD322a and a power source connector unit SD322b. The connector unit SD322a and the power source connector unit SD322b are each formed in an L-shape, when viewed from a direction of mounting the same to the signal connector unit SD21a and the power source connector unit SD21b. The connector unit SD322a and the power source connector unit SD322b are each formed in the form of recess so as to engage with the signal connector unit SD21a and the power source connector unit SD21b, respectively. Further, the connector unit SD322a and the power source connector unit SD322b are aligned in positions so as to correspond to the positions of the signal connector unit SD21a and the power source connector unit SD21b, respectively. In other words, in the SSD mounting device SD3, the connector unit SD322a and the power source connector unit SD322b are integrally formed.

The connector unit SD323 includes: a connector unit SD323a corresponding to the connector unit SD322a, and a power source connector unit SD323b corresponding to the power source connector unit SD322b. The connector unit SD323a is connected to the SATA substrate connector AM2 on the APX motherboard AM, via a SATA cable. The power source connector unit SD323b is connected to the power source of the APX motherboard AM, and is given power from the APX motherboard AM. This way, the APX motherboard AM and the SSD device SD1 are connected via the connector unit SD21 and the connector main unit SD321.

The connector member SD32 described above is held by the SSD guide member SD31. The SSD guide member SD31 includes: a first guide member SD311, and a second guide member SD312. The first guide member SD311 includes: a side surface guide member SD3111 in the form of a plane, a top surface guide member SD3112 extending rightward from the upper side of the side surface guide member SD3111, i.e., towards the second guide member SD312, a low surface guide member SD3113 extending rightward, from the lower side of the side surface guide member SD3111, a front surface abutting portion SD3114 extending, from the front side of the side surface guide member SD3111, in a direction away from the second guide member SD312 (leftward), and a connector fixing portion SD3115 protruding backward from the back side of the side surface guide member SD3111.

In the front end portions of the top surface guide member SD3112 and the low surface guide member SD3113 are formed screw-fasten portions SD3112a and SD3113a. As shown in FIG. FIG. 91A, the screw-fasten portions SD3112a and SD3113a abut the back surface of the connector attachment plate SK7, and screw-fastened to fix the SSD mounting device SD3 to the connector attachment plate SK7. As shown in FIG. 89, on a side of the screw-fasten portions SD3112a and SD3113a are formed engagement notch portions SD3112b and SD3113b for use in positioning the second guide member SD312. Further, in the upper end portion and the lower end portion of the connector fixing portion SD3115 are formed screw holes SD3115a.

Meanwhile, the second guide member SD312 includes: a side surface guide member SD3121, a front surface abutting portion SD3122 extending, from the front side of the side surface guide member SD3121, in a direction away from the first guide member SD311 (rightward), and a connector fixing portion SD3123 protruding backward from the back side of the side surface guide member SD3121. In the upper end portion and the lower end portion of the side surface guide member SD3121 are formed protruding portions SD3121a. The protruding portions SD3121a are configured to engage with the engagement notch portions SD3112b and SD3113b of the SSD guide member SD31.

Further, to the side surface guide member SD3121 is formed a notch portion SD3121b. The notch portion SD3121b extends from the front end of the side surface guide member SD3121 towards back portion. The notch portion SD3121b is formed so as to engage with a protruding portion SD112i of the SSD device SD1 shown in FIG. 87. This is for preventing insertion of the SSD device SD1 upside down. Further, the rear end portion of the side surface guide member SD3121 is set at a position that realizes an appropriate insertion depth to ensure sufficient electric connection, while the protruding portion SD112i of the SSD device SD1 abuts the rear end portion. This facilitates prevention of problems attributed to insufficient insertion of the SSD device SD1. Further, in the upper end portion and the lower end portion of the connector fixing portion SD3123 are formed screw holes SD3121a.

The SSD guide member SD31 and the connector member SD32 forms the integrated SSD mounting device SD3 by: having the engagement notch portions SD3112b and SD3113b of the first guide member SD311 with the protruding portions SD3121a of the second guide member SD312 to assemble the first guide member SD311 and the second guide member SD312; inserting the connector member SD32 between the connector fixing portions SD3115 and SD3123, and screw-fastening them by using the screw holes SD3121a and SD3115a, and the fitting portions SD321a.

Figure 90:
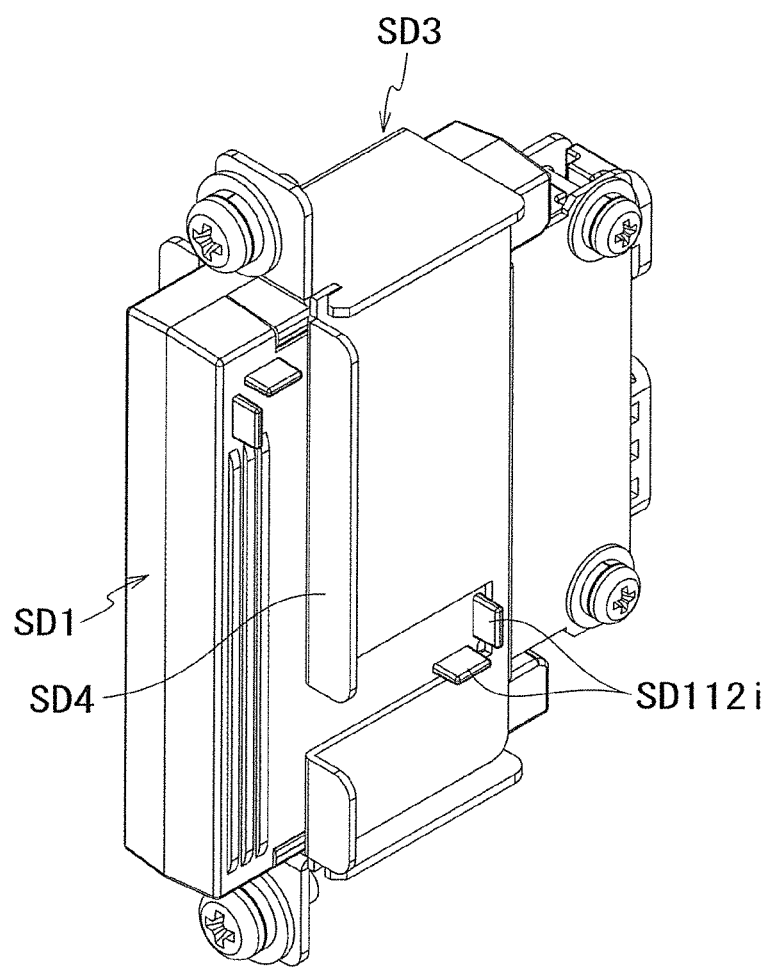
FIG. 90 is an explanatory diagram showing a process of mounting the SSD device to the SSD mounting device.

As shown in FIG. 86, with the SSD mounting device SD3 thus assembled being attached to the back surface side of the connector attachment plate SK7, there is formed to the connector attachment plate SK7 an SSD insertion hole SD4 for inserting thereinto the SSD device SD1. Thus, with the SSD mounting device SD, the SSD device SD1 is detachably mounted to the SSD insertion hole SD4, as shown in FIG. 90. Further, with the SSD substrate SD2 being cased in the SSD casing SD11 to be formed into a cartridge, replacement of the SSD substrate SD2 and updating of programs and data are made easy. It should be noted that the attachment and detachment of the SSD mounting device SD3 is monitored by the APX motherboard AM, and an alarm sound is output when the SSD mounting device SD3 is detached.

(Device Main Body 4: Security Cage SK: GAL Mechanism G)

Figure 91A:
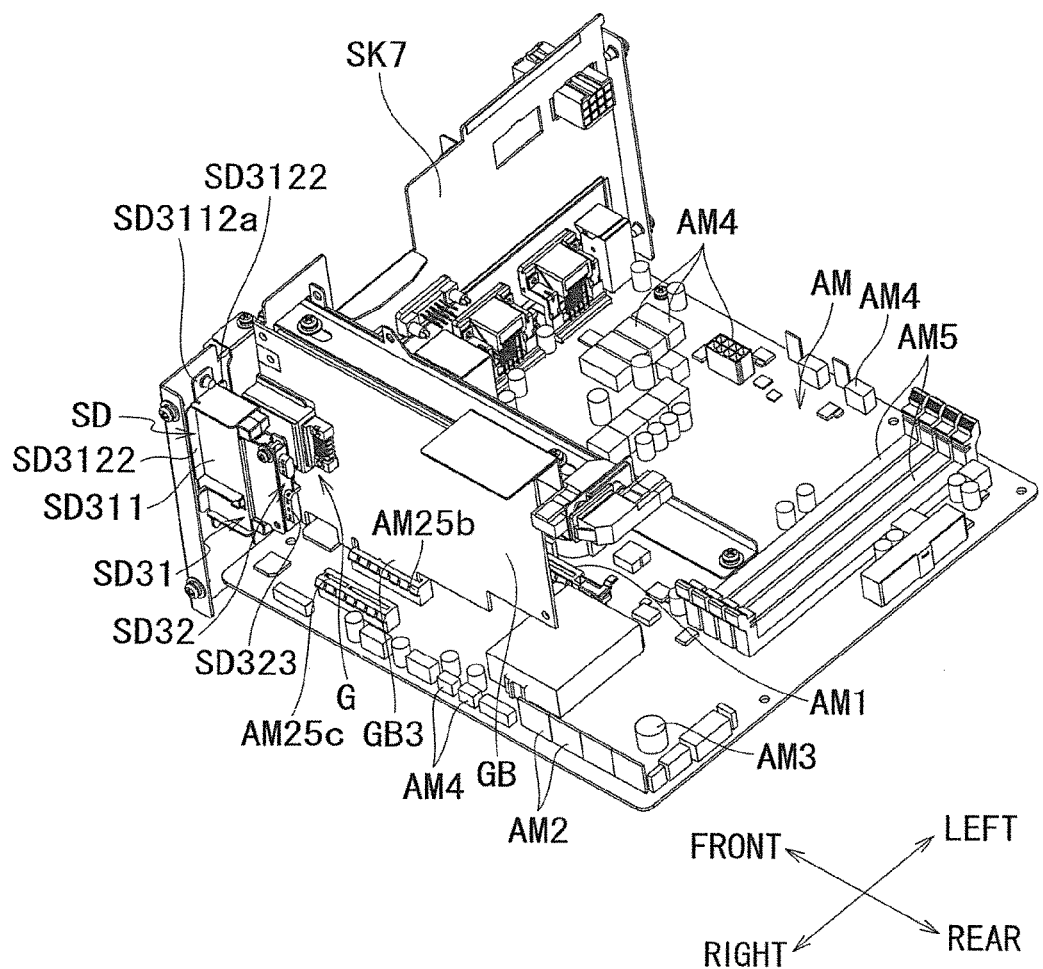
FIG. 91A is a perspective view of an APX motherboard.
Figure 92:
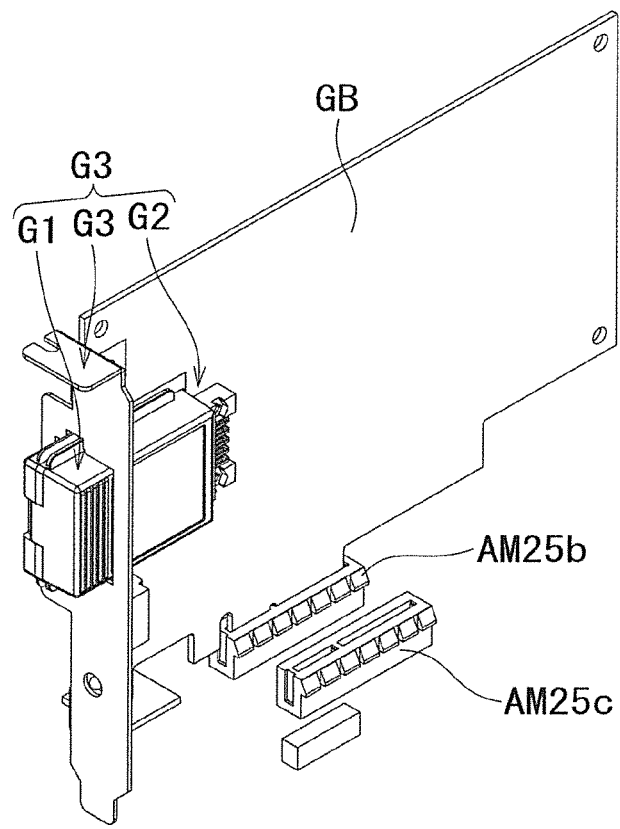
FIG. 92 is a perspective view of an AXGMEM substrate and a GAL support plate.

As shown in FIG. 91A, a GAL mechanism G is disposed on the left side of the SSD device SD1. As shown in FIG. 92, the GAL mechanism G includes: a GAL device G1 formed in the form of cartridge, a GAL mounting device G2 that enables the GAL device G1 to be detachably mounted, and a GAL support plate G3 supporting the GAL mounting device G2.

(Device Main Body 4: Security Cage SK: GAL Mechanism G: GAL Device G1)

Figure 93:
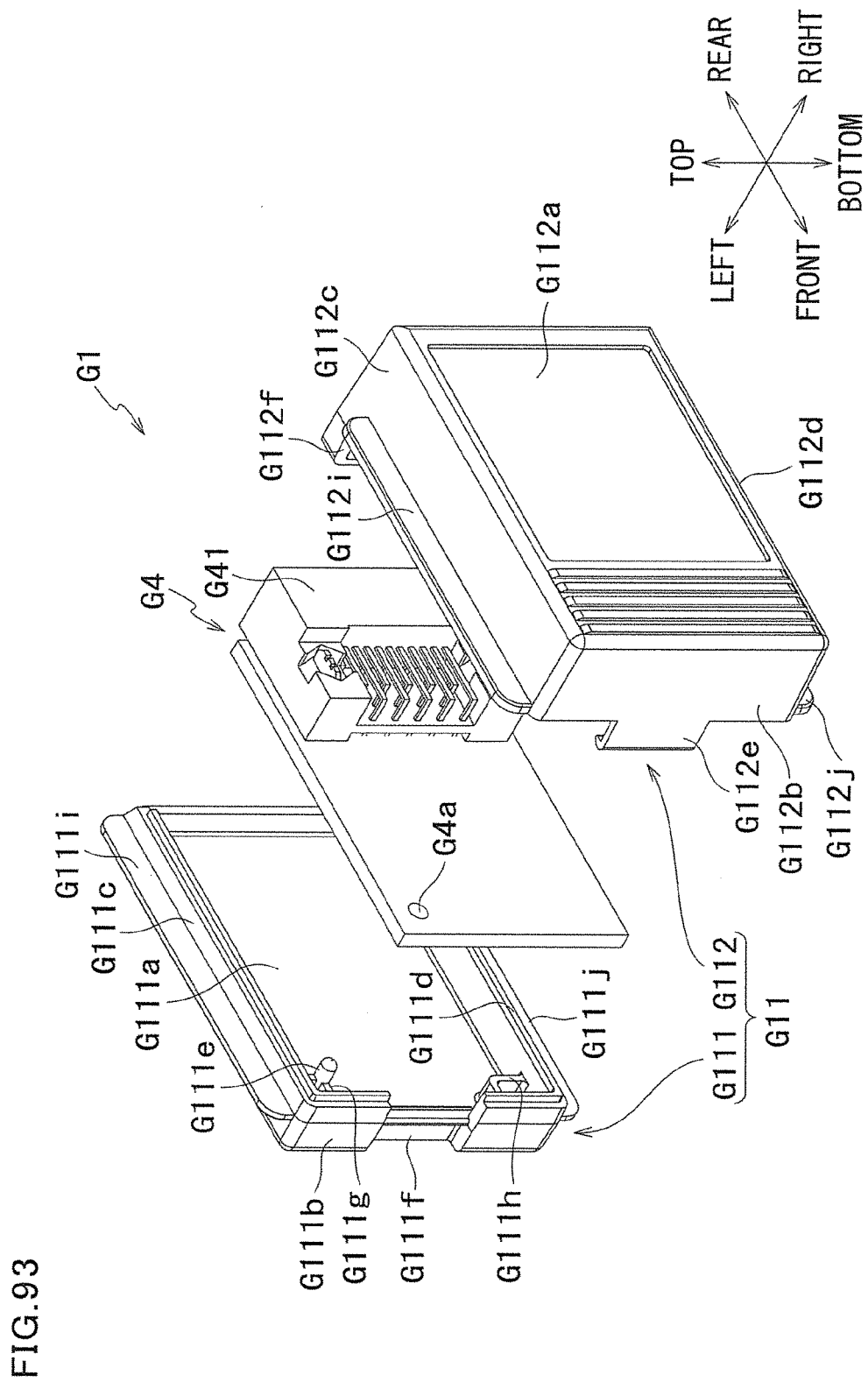
FIG. 93 is an exploded perspective view of the GAL device.

As shown in FIG. 93, the GAL device G1 includes: a GAL casing G11 that can be divided into two in the left/right direction, and a GAL substrate G4 accommodated and held in the GAL casing G11. On the GAL substrate G4 is implemented a CPLD (Complex Programmable Logic Device) circuit and a constant voltage circuit. The GAL substrate G4 is formed in the form of rectangular plate, and has a male connector unit G41 at on the right surface of its rear end portion. The connector unit SD41 is electrically connected to the CPLD circuit and the constant voltage circuit. Further, the GAL substrate G4 has a through hole G4a on its upper front end portion.

The GAL substrate G4 described above is accommodated in the GAL casing G11. The outline of the GAL casing G11, formed by connecting the corner portions, is formed in a rectangular shape. On the back portion which is on the mount side of the GAL casing G11 is exposed the connector unit G41. The GAL casing G11 includes: a first GAL casing member G111 mainly covering the left side of the GAL substrate G4, and a second GAL casing member G112 mainly covering the right side of the GAL substrate G4. The first GAL casing member G111 has a side surface portion G111a to face the left surface of the GAL substrate G4, and a front surface portion G111b, a top surface portion G111c, a low surface portion G111d formed to surround the GAL substrate G4.

Figure 94:
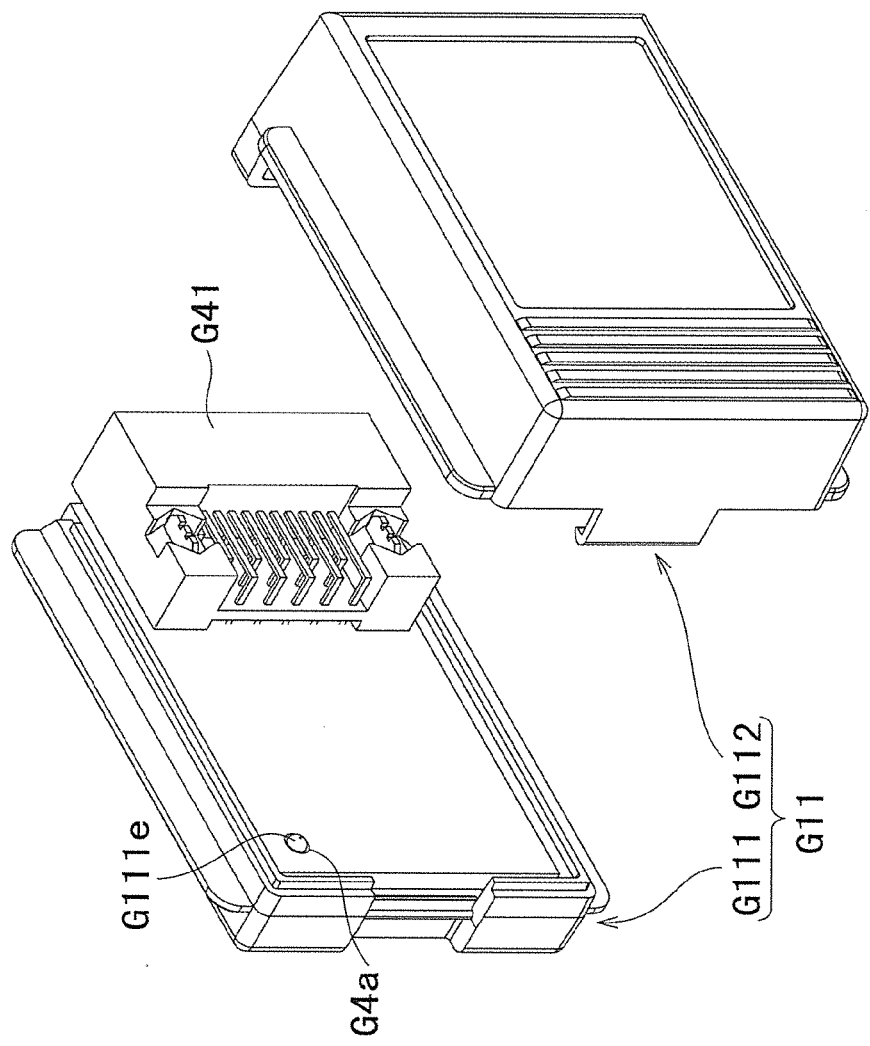
FIG. 94 is an exploded perspective view of a GAL casing.

In the upper front end portion of the side surface portion G111a is formed a protruding portion G111e. As shown in FIG. 94, the protruding portion G111e is formed so as to engage with the through hole G4a of the cased GAL substrate G4. Further, as shown in FIG. 93, in the middle portion of the front surface portion G111b is formed an engagement recess portion G111f extended in the left/right direction. In the upper front end portion and the lower front end portion of the side surface portion G111a are formed abutting portions G111g and G111h. The abutting portions G111g and G111h are each formed to abut the left surface of the cased GAL substrate G4. Further, in the top surface portion G111c and the low surface portion G111d of the first GAL casing member G111 are protruding portions G111i and G111j linearly extended from the front end portion to the rear end portion.

On the other hand, the second GAL casing member G112 is disposed to face the first GAL casing member G111 over the GAL substrate G4. The second GAL casing member G112 has a side surface portion G112a to face the right surface of the GAL substrate G4, and a front surface portion G112b, a top surface portion G112c, a low surface portion G112d formed to surround the GAL substrate G4. Inner side portions at the leading ends of the front surface portion G112b, the top surface portion G112c, and the low surface portion G112d are formed to fit with the inner side portions of the leading end portions of the front surface portion G111b, the top surface portion G111c, and the low surface portion G111d of the first GAL casing member G111, respectively.

In the upper front end portion and the lower front end portion of the side surface portion SD112a are formed not-shown protruding portions. The protruding portions are each formed to abut the right surface of the cased GAL substrate G4. Thus, the GAL casing G11 positions and holds the front portion of the GAL substrate G4 by: sandwiching the upper front end portion and the lower front end portion of the GAL substrate G4 between the protruding portions G111g and G111h of the first GAL casing member G111 and the protruding portion of the second GAL casing member G112, and engaging the protruding portion G111e with the through hole G4a. Further, in the rear end portion of the second GAL casing member G112 is formed a connector insertion hole G112f. With the rear end portion of the connector unit G41 inserted into the connector insertion hole G112f, the back portion of the GAL substrate G4 is positioned and held.

Further, in the middle portion of the front surface portion G112b of the second GAL casing member G112 is formed an engagement protrusion portion G111e. The engagement protrusion portion G111e protrudes in a direction towards the first GAL casing member G111 (leftward), and its leading end portion is bent backwardly in a hook-like manner. The engagement protrusion portion G111e is formed so as to engage with the engagement recess portion G111f of the first GAL casing member G111, when the first GAL first GAL casing member G111 and the second GAL casing member G112 are abutted to each other and assembled into one piece as the GAL casing G11. With the insertion of the connector unit G41 into the connector insertion hole G112f and engagement of the engagement protrusion portion G111e into the engagement recess portion G111f, the GAL casing G11 is able to maintain its assembled state in one piece, without a need for screw-fastening the casing members SD111 and SD112.

Figure 95:
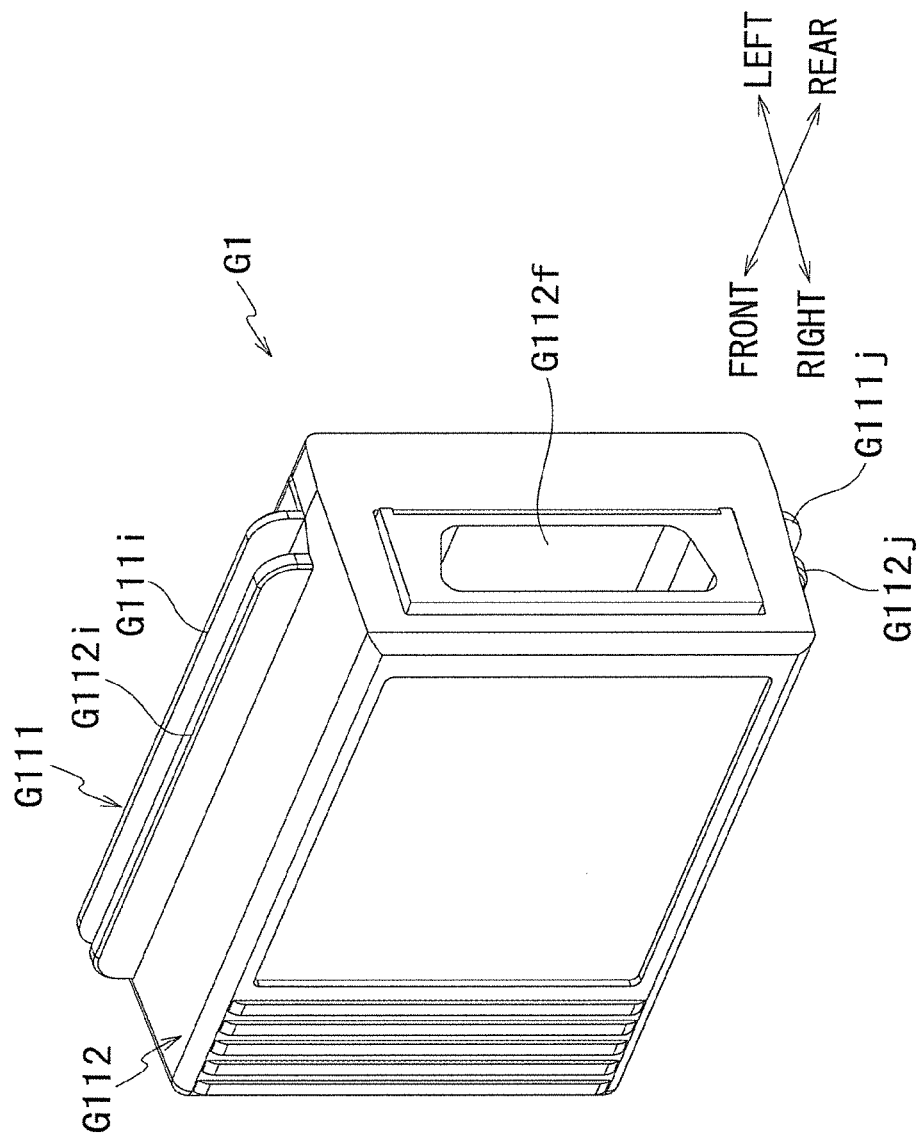
FIG. 95 is a perspective view of the GAL device.

Further, in the top surface portion G112c and the low surface portion G112d of the second GAL casing member G112 are protruding portions G112i and G112j linearly extended from the front end portion to the rear end portion. As shown in FIG. 95, these protruding portions G112i and G112j are positioned so as to face the protruding portions G111i and G111j of the first GAL casing member G111, when the GAL casing G11 is assembled into one piece. This way, the protruding portions G111i and G111j and the protruding portions G112i and G112j form a guiding space extending from the front end to the rear end, on the top surface and the low surface of the GAL device G1. Edges of the AXGMEM substrate GB are positioned in the spaces between the protruding portions G111i and G111j, and between G112i and G112j, when the GAL device G1 is mounted to the GAL mounting device G2, and the connector insertion hole G112f of the GAL device G1 is guided to the connector unit G41, FIG. 92.

(Device Main Body 4: Security Cage SK: GAL Mechanism G: GAL Mounting Device G2 and GAL Support Plate G3)

Figure 96:
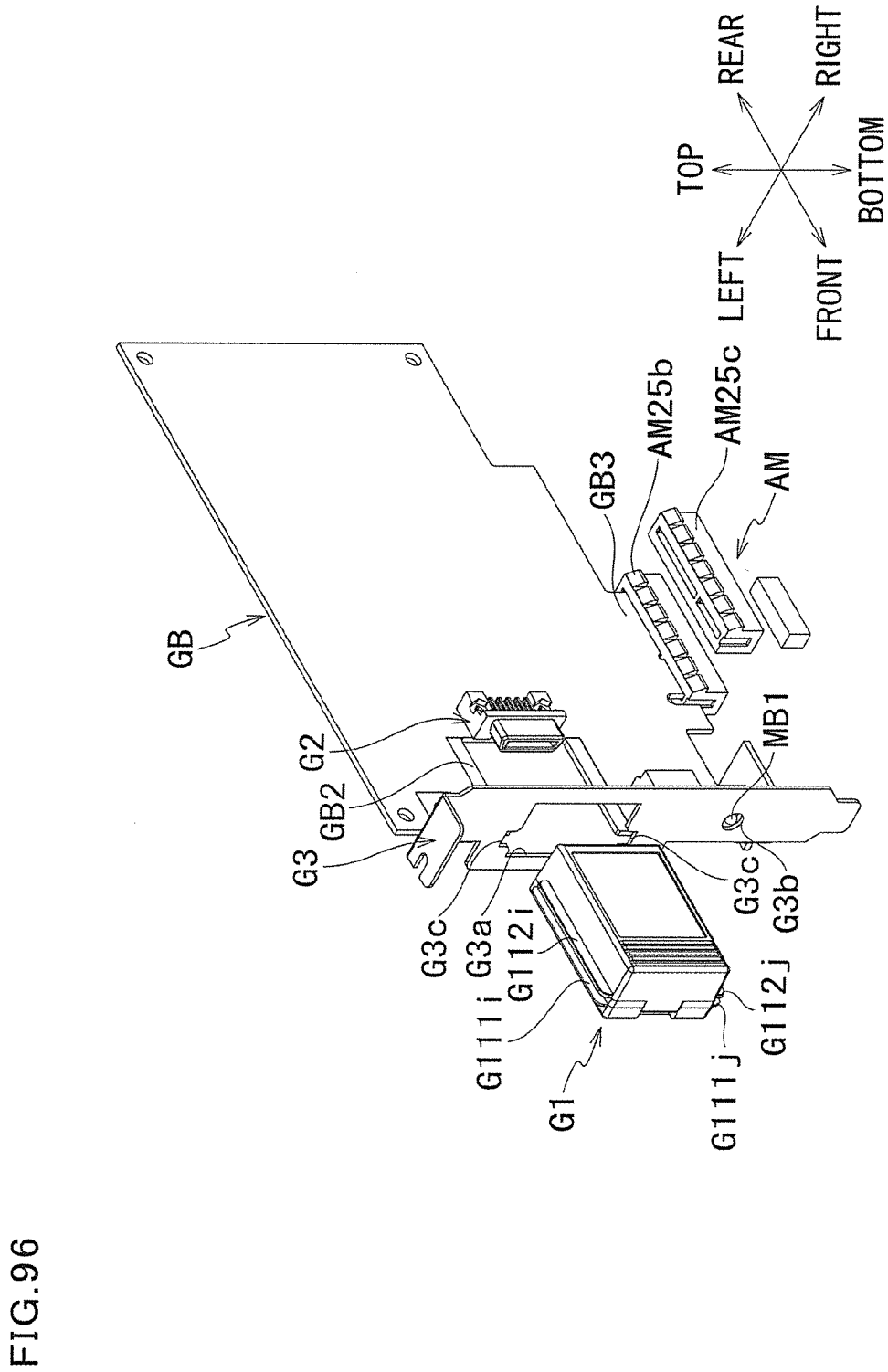
FIG. 96 is a perspective view of an AXGMEM substrate.

The GAL mounting device G2 includes: a connector to be connected to the Connector unit G41 shown in FIG. 94, and is implemented on the AXGMEM substrate GB. On the other hand, the GAL support plate G3, the GAL support plate G3 is attached to the connector attachment plate SK7 shown in FIG. 84. As shown in FIG. 96, the GAL support plate G3 has a first through hole G3a and a second through hole G3b. The first through hole G3a is formed in a shape similar to that of the front end surface of the GAL device G1, with a size slightly bigger than that of the front end surface of the GAL device G1, and has notches G3c through which the protruding portions G111$i$ and G111$j$, and the G112$i$ and G112$j$ pass are formed in the upper end portion and a lower end portion. The second through hole G3$b$ makes an LED device MB 1 visible from outside, and the LED device MB 1 indicates an operation status of the AXGMEM substrate GB by means of emitting light.

(Device Main Body 4: Security Cage SK: AXGMEM Substrate GB)

The AXGMEM substrate GB is provided in such a manner that its substrate surface is parallel to the vertical direction. The AXGMEM substrate GB has in its front end portion a notch GB2. At the rear end portion of the notch GB2 is provided the GAL mounting device G2. Further, the notch GB2 is positioned so that its upper end portion and the lower end portion are in the middle position of the notches G3$c$ relative to its width direction, in the first through hole G3$a$ of the GAL support plate G3. Thus, when the GAL device G11 is mounted to the GAL mounting device G2, the upper end portion and the lower end portion of the notch GB2 of the GAL support plate G3 are each positioned between the protruding portions G111$i$ and G111$j$ or between the protruding portions G112$i$ and G112$j$. The AXGMEM substrate GB has a PCI terminal part GB3 in its lower end portion. The PCI terminal part GB3 is mounted on the extension slot AM25$b$ of the APX motherboard AM.

(Device Main Body 4: Security Cage SK: APX Motherboard AM)

Figure 91B:
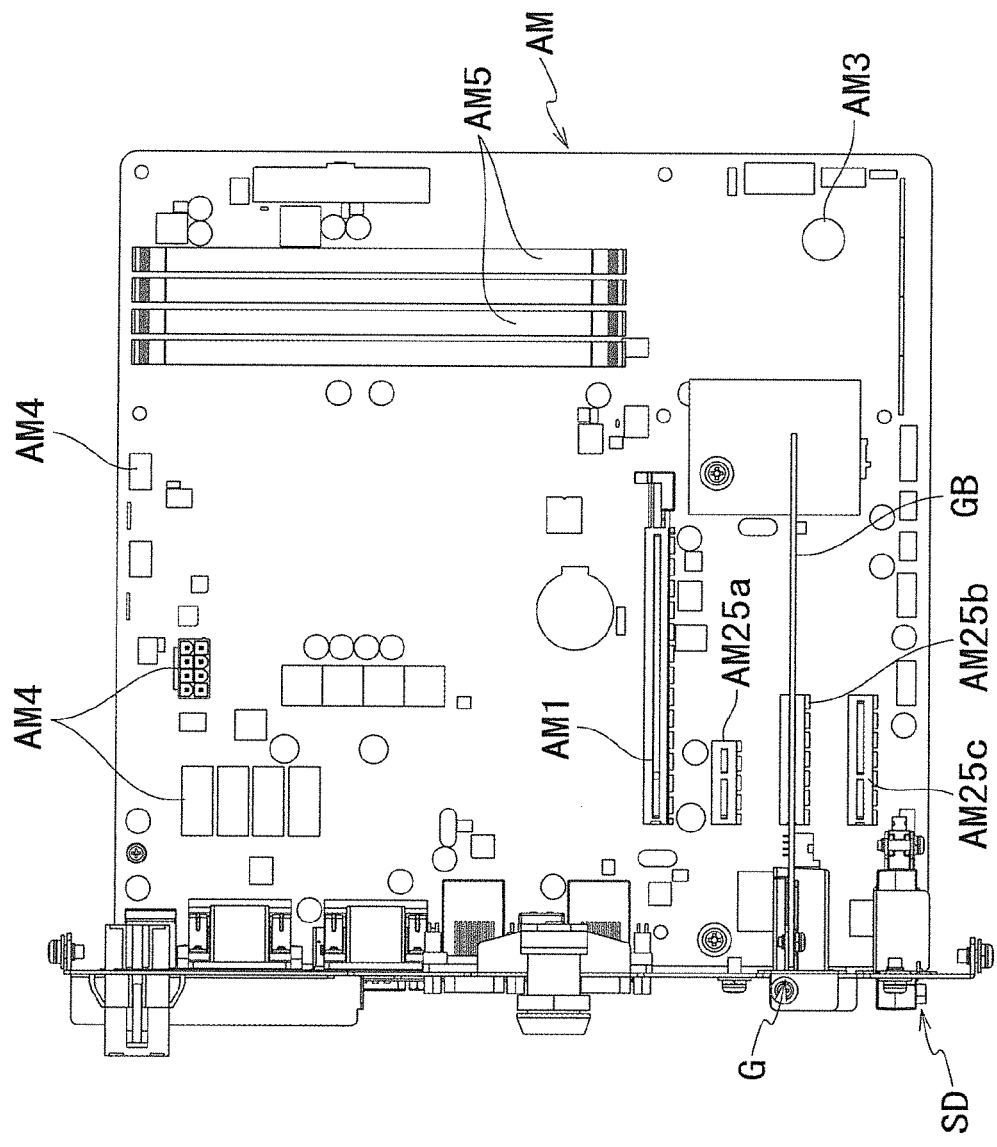
FIG. 91B is a plan view of the APX motherboard.

The APX motherboard AM is provided in the security cage SK, as shown in FIG. 91A. The front end portion of the APX motherboard AM is connected to terminals of connectors provided to the connector attachment plate SK7. As shown in FIG. 91B, the APX motherboard AM has a plurality of extension slots AM1, AM25$a$, AM25$b$, and AM25$c$. The extension slots AM1, AM25$a$, AM25$b$, and AM25$c$ are in compliance with the PCI Express bus standards, and the PCI terminal part GB3 of the AXGMEM substrate GB is mounted to the extension slot AM25$b$.

The extension slots other than the extension slot AM25$b$ to which the AXGMEM substrate GB is mounted, i.e., the extension slots AM1, AM25$a$, and AM25$c$, are vacant. Thus, simply by visually confirming the status of the extension slots AM1, AM25$a$, AM25$b$, and AM25$c$, it is possible to detect a wrong action of mounting an invalid board to any of the vacant extension slots AM1, AM25$a$, and AM25$c$.

The APX motherboard AM has a plurality of SATA substrate connectors AM2, and the SATA substrate connectors AM2 are connected to the connector unit SD323 of the SSD mounting device SD32, via a not-shown SATA cable. Further, the APX motherboard AM includes: a buzzer AM3 that outputs an alarm sound and the like, connectors AM4 that conform to various communication standards such as a display port and a comb port, a memory slot AM5 mounting thereto a DIMM substrate having a DDR3 memory, capacitors, and the like.

(Security Structure)

As hereinabove described, a slot machine 1 of the present embodiment includes an upper door device 42, a lower door device 43, and a bill drop door 437 as doors that can be opened or closed by a person from the outside. Further, the slot machine 1 has, as doors inside the casing 411, a security cage door SK3, a main body substrate casing N1, a sub substrate casing SI1, and a bill stocker door BI3. Further, the slot machine 1 includes au upper door lock mechanism D1 configured so that, of the lower door device 43 configured to open and close a bottom space 41C (lower casing portion) which accommodates equipment important for the system security and the upper door device 42 configured to open and close a top space 41A (upper casing portion) which accommodates a reel device M1 and the like, enables opening of the upper door device 42 provided that the lower door device 43 is already opened.

(Security Structure: Upper Door Device 42)

Specifically, as shown in FIG. 58, the upper door lock mechanism D1 is disposed in the bottom space 41C so that the upper door lock mechanism D1 is uncovered and operable only when the lower door device 43 is opened. Thus, by unlatching the upper door lock mechanism D1 after the lower door device 43 is opened, the upper door device 42 opens with a hinge mechanism at the left end as the fulcrum. The upper door device 42 mainly enables access to the reel device M1 and the main body substrate casing N1 in the casing 411. Opening and closing of the upper door device 42 are sensed by an upper door switch SE3, and monitoring based on the sensor signals from the upper door switch SE3 is performed. When the upper door device 42 is opened, an alarm sound is output.

(Security Structure: Lower Door Device 43)

The lower door device 43 is opened the hinge mechanism at the left end as the fulcrum, by unlocking the lock by the key cylinder D25, and then pushing up a door lock bar D24 to unlatch the lower door lock mechanism D2. The lower door device 43 mainly enables access to a power switch R112 of the power source unit RU, the security cage door SK3 of the security cage SK, the sub substrate casing SI1, the printer device PR, and the bill stocker BI in the casing 411. Further, opening and closing of the lower door device 43 are sensed by a first lower door switch SE1, a second lower door switch SE2, and reflective lower door optical sensors SE4, and monitoring based on the sensor signals from the door switches SE1 and SE2 and from the lower door optical sensors SE4 is performed. When the lower door device 43 is opened, an alarm sound is output.

(Security Structure: Bill Drop Door 437)

As shown in FIG. 50 and FIG. 51, the bill drop door 437 opens with the hinge mechanism at the left end as the fulcrum, by unlocking the lock by the key cylinder BR4, which releases the latched state of the engagement member BR2 maintained by a spring BR3. The bill drop door 437 mainly enables access to the bill stocker door BI3 in the casing 411, as shown in FIG. 52. Opening and closing of the bill drop door 437 are sensed by a bill drop door switch SE5 as shown in FIG. 58, and monitoring based on the sensor signals from the bill drop door switch SE5 is performed. When the bill drop door 437 is opened, an alarm sound is output.

(Security Structure: Security Cage SK)

The security cage SK is structured so that, the security cage door SK3 is opened with a hinge mechanism at its lower end portion, by unlocking the lock of security cage door SK3 by the key cylinder SK5, after the lower door device 43 is opened. Further, as shown in FIG. 85, opening and closing of the security cage door SK3 are sensed by the first sensor SK103 and the second sensor SK104 of the cage open/close detection mechanism SK10. The first sensor SK103 and the second sensor SK104 function as security door switches, and causes output of an alarm sound when the security cage door SK3 is opened.

Since the security cage door SK3 is disposed behind the lower door device 43 and is locked by the key cylinder SK5, two keys, one for the lower door device 43 and the other for the security cage door SK3, are required to access the APX motherboard AM and the AXGMEM substrate GB inside the security cage SK. Further, connectors of the security cage SK are all over the security cage door SK3, access to these connectors is not possible unless the security cage door SK3 is opened. The lower door device 43 and the security cage SK, when opened, causes alarming by an alarm sound. Further, the SSD mounting device SD3 having an SSD which is a program recording medium is provided over the security cage door SK3, and detaching of this SSD mounting device SD3 also causes alarming by an alarm sound.

(Security Structure: Main Body Substrate Casing N1)

As shown in FIG. 66, the main body substrate casing N1 is disposed behind the upper door device 42 and the reel device M1, and accommodates a first GM substrate GM1 and a second GM substrate GM2 which manage inputs and outputs of peripherals, motors, and illumination. This way, the main body substrate casing N1 does not allow access to the first GM substrate GM1 and the second GM substrate GM2, unless the upper door device 42 is opened, and then the reel device M1 is removed and the screw on the lid N3 is unfastened to open the lid N3 with its lower end portion as the fulcrum. Further, since the connectors are also in the main body substrate casing N1, access to these connectors is not possible unless the lid N3 is opened. Opening and closing of the main body substrate casing N1 are sensed by a main body substrate casing switch SE6, and monitoring based on the sensor signals from the main body substrate casing switch SE6 is performed. When the lid N3 of the main body substrate casing N1 is opened, an alarm sound is output.

(Security Structure: Sub Substrate Casing SI1)

As shown in FIG. 47, the sub substrate casing SI1 is disposed on the back surface of the lower door device 43, and accommodates a sub I/O substrate SI3 which manages inputs and outputs of operation buttons and illuminations. Thus, the sub substrate casing SI1 does not allow access to the sub I/O substrate SI3 unless the lower door device 43 is opened, and then the screw on a fixing portion SI1c is unfastened to remove the lower door base member 438 of the sub substrate casing SI1 is removed. Further, since the connectors are also in the sub substrate casing SI1, access to these connectors is not possible unless the sub substrate casing SI1 is removed. Further, an alarm sound is output when the lower door device 43 is opened. This alarm sound functions as an alarm sound related to detaching of the sub substrate casing SI1.

Note that opening and closing of the sub substrate casing SI1 may be sensed by a not-shown substrate casing switch provided to the sub I/O substrate SI3 and the like. When the sub substrate casing SI1 is opened, an alarm sound is output.

(Security Structure: Bill Stocker Door BI3)

As shown in FIG. 52, the sub substrate casing SI1 is opened by opening the bill drop door 437, unlocking the lock by the key cylinder BR4, and drawing out the upper end portion of the bill stocker door BI3, using the latch mechanism at the lower end portion of the bill stocker door BI3 as the fulcrum. Opening and closing of the bill stocker door BI3 are sensed by two bill stocker door switches SE7, and monitoring based on the sensor signals from the bill stocker door switch SE7 is performed, as shown in FIG. 60. When the bill stocker door BI3 is opened, an alarm sound is output.

(Electrical Structure: Overall Block Diagram)

The following describes an electrical structure of the slot machine 1 with the above structure. As shown in FIG. 97A, the slot machine 1 adopts a CPU with a built-in function of a GPU (Graphics Processing Unit) and eliminates the need of a graphic board which is an extension board. By doing so, the slot machine 1 prevents unauthorized operation via the PCIE, and restrains the power consumption and heat generation. That is, the slot machine 1 is a gaming machine adopting a CPU with a GPU built therein, and has (on a single die) a processor with a built-in GPU, a PCI Express extension slot AM25b to which an AXGMEM substrate GB connected to a GAL substrate G4 with an authentication program implemented thereon is mounted; and a display port connector SK85 connected to the GPU. The extension slots AM1, AM25a, and AM25c, are not in use (vacant).

Thus, the slot machine 1 requires no graphic board connected to the PCI Express extension slots AM1, AM25a, and AM25c. With the use of extension slot AM25b exclusively to the authentication, the extension slot AM25b in use and the extension slots AM1, AM25a, and AM25c are clearly distinguishable by their external appearances. This facilitates monitoring of wrong actions. Further, the slot machine 1 is capable of preventing problems that take place when a graphic board is connected to any of the extension slots AM1, AM25a, and AM25c not in use; e.g., processing such as interruptions and the like occurring between boards leading to unsmooth output based on video signals and/or audio signals; and an interruption occurring between boards conflicting with another interruption. In the slot machine 1, the display port connector SK85 serves as a terminal exclusive to video (or audio). This prevents interference with another board, thus leading to smooth outputs of video (audio) signals, accurately in synch with the progress of games.

The slot machine 1 reduces the possibility of having video interrupted during games, by adopting a motherboard having thereon a CPU with a built-in graphic engine that realizes a GPU function. That is, in the slot machine 1, the motherboard having thereon a CPU with a built-in graphic engine outputs to the sub-substrate video data of an effect image from the graphic engine controlled by the CPU, while the CPU outputs audio signals to the sub-substrate. With this structure, the video data and audio data output from the motherboard are under control of a single CPU with the built-in graphic engine. Therefore, unless the CPU breaks down, there will not be a situation in which presentation by the effect becomes unclear because only one of video and audio is output to the sub-substrate.

It should be noted that the slot machine 1 may adopt a structure such that the motherboard is connected, via PCI Express, to an authentication substrate (GAL substrate G4) having a flash RAM storing various boot related data of different data volumes, such as boot BIOS used for booting Slot machine 1, public key, and the like, and that the boot related data is transferred to the DRAM on the motherboard at the transfer rate according to the data volume detected for each set of boot related data, so as to execute boot processing based on the boot related data in the DRAM. The PCI Express allows dynamic variation of transfer rate from the software. This contributes to saving of power consumption unless the maximum transfer rate is required. Thus, the booting period and power consumption are automatically optimized, in cases where data volume largely changed by updating of data such as boot BIOS on the authentication board.

Further, the slot machine 1 may adopt a structure such that: the motherboard (APX motherboard AM) is connected, via PCI Express AM25b, to an authentication substrate (GAL substrate G4) having a flash RAM storing various boot related data of different data volumes, such as boot BIOS used for booting Slot machine 1, public key, and the like; that the boot related data is transferred to the DRAM (memory substrate MM6) on the motherboard; and that when the boot process is executed based on the boot related data in the DRAM, an increase in the temperature of the authentication board due to data transfer is monitored, and the transfer rate of the boot related data is controlled based on the increase in the temperature. Since the temperature of the authentication board increases proportionally to the power consumption, it is possible to execute the boot process with stable power consumption and transfer rate by, for example, controlling the transfer rate to maintain a constant increase in the temperature.

The slot machine 1 is a gaming machine that uses an SSD (SSD substrate SD2) storing an OS (Operating System) and includes an APX motherboard AM having a CPU and an SATA terminal (SATA substrate connectors AM2) and the SSD connected to the SATA terminal.

Thus, in the slot machine 1, the OS is booted from the SSD connected via the SATA terminal. This eliminates problems in cases of booting an OS from a flash memory such as an SD card; i.e., a need of an conversion adaptor, an instability in operations, and high costs. Further, when an OS is booted from a flash memory such as an SD card, recognition at the BIOS level is required, and there were some motherboards that could not boot the OS. If however the SSD is used for booting an OS, the OS is suitably and promptly booted. This improves the versatility and enables quick start up of programs for the gaming machine.

The SSD casing SD11 includes: a first SSD casing member SD111 mainly covering the left side of the SSD substrate SD2, and a second SSD casing member SD112 mainly covering the right side of the SSD substrate SD2. The first SSD casing member SD111 has a side surface portion SD111$a$ to face the left surface of the SSD substrate SD2, and a front surface portion SD111$b$, a top surface portion SD111$c$, a low surface portion SD111$d$ formed to surround the GAL substrate SD2, and a back surface portion SD111$j$ abutting the protruding portion SD24 on the left surface of the SSD substrate SD2.

In the slot machine 1, the video data and the audio data in the game are output from the display port in units of a packet, and audio and visual effects are provided in effect machines. With this structure, the video data and audio data are output through the signal line drawn out from the display port. Therefore, there will not be a problem in which one of the video data and audio data is missing. Thus, at a time of outputting the audio and video related to a result of a random determination, there will not be a situation in which only one of the audio and video is output, thus failing to give sufficient report. Further, it is possible to tie a plurality of displays in a row, facilitating provision of an additional display. Therefore, modification in the design based on an already existing slot machine 1. For example, in cases of providing a display device to the top device 3, in addition to the upper side liquid crystal display panel 32212 and a lower side liquid crystal display panel 4254, the work of connecting mechanical signal lines is done simply by connecting the signal lines from the upper side liquid crystal display panel 32212 and the like to the display device of the top device 3, and this allows an easy maintenance. Further, the data transmission is done in units of a packet, there is no need of transmitting data sequentially to a plurality of display device. Therefore modification of programs is easily done.

Specifically describing the electrical structure of the slot machine 1, the slot machine 1 has an APX motherboard AM accommodated in a security cage SK. The APX motherboard AM has not-shown fourth Generation Intel® Core Processor, and has an improved power source management function (C-state). Further, integration of a VR (Voltage Regulator) to the package/die of the processor allows simple power source design of the entire platform, thus realizing reduction of power consumption including the motherboard. It should be noted that the fourth Generation Intel Core Processor supports up to 20 EUs (Execution Units) each of which is an image processing unit in the GPU core. This way significant improvement in the performance as compared with the third Generation Intel Core Processor is achieved. Further, a chip set of the fourth Generation Core i series has a plurality of SATA6 Gb/s (SATA3.0) ports serving as a high speed interface, and supports the PCI Express 3.0 for performing smooth data transfer with a high performance video card, and DDR3-1600 Standard which is a high-speed memory standard.

In the upper front end portion and the front side end portion of the side surface portion SD112$a$ are formed not-shown protruding portions. The protruding portions are each formed to abut the right surface of the cased SSD substrate SD2. Thus, the SSD casing SD11 is structured so as to sandwich the upper end portion on the front side and the front side end portion of the SSD substrate SD2 between the protruding portions SD111$e$ and SD111$f$ of the first SSD casing member SD111 and the protruding portions of the second SSD casing member SD112, while sandwiching the protruding portion SD24 of the SSD substrate SD2 between the back surface portions SD111$j$ and SD112$e$, thus maintain the casing state of the casing main body N2.

The "PCI Express" is a serial transfer interface for personal computers which is substituted for a PCI bus. Though the PCI Express is not compatible physically with the PCI bus adopting a parallel transmission scheme, the communication protocol and the like are the same. The transmission path (so-called "lane") which is the minimum configuration of the PCI Express enables full duplex communication of 5.0 Gbps (2.5 Gbps for one way). However, to transfer 8 bit data, there will be additional 2 bits for clock signals and the like, which sums up to 10 bits. Therefore, the effective data transfer rate is 2.0 Gbps for one way (250 MB/s), and 4.0 Gbps (500 MB/s) for two ways. The extension slots AM1, AM25$a$, AM25$b$, and AM25$c$ of the APX motherboard AM are each structured by bundling a plurality of lanes of the PCI Express port.

"SATA (Serial AT Attachment)" is an extension specification of the IDE (ATA) standards for connections between a personal computer with a storage device such as a HDD and an optical drive. SATA is an ATA specification which adopts serial transmission scheme in place of the parallel transmission scheme, and allows a high transfer rate with a simple cable.

"Display port" is a full digital video interface and adopts a micropacket scheme utilizing a built-in clock. The micropacket scheme enables transmission of secondary digital audio data in addition to the main video data, and adopts a scheme that transmits in bundle picture elements and audio signals in the form of packets so-called micropackets. In other words, in the micropacket scheme, the entire audio and visual data is divided into micropackets called "Transfer Units", and serially transfer them to the destination devices.

The "display port" generates clock from the data without using an external clock. This facilitates acceleration of data transfer and expansion of functions. Further, since the "display port" is a video output interface designed for display devices, it allows reduction of the number of components by adopting a liquid crystal display as the display device, and has a transmission distance of approximately 15 meters.

The "display port" defines the output end as "source device" and the input end as "sink device". With the source device and the sink device communicating with each other, the resolution, color depth, refresh rate, and the like are automatically optimized. When video data and audio data are transferred, the transfer rate is variable by a combination of 1, 2, or 4 channels called "lanes" and 2 data rates (1.62 Gbps and 2.7 Gbps). For example, the minimum configuration is 1 lane, and 1.62 Gbps, and the maximum configuration is 4 lanes times 2.7 Gbps, i.e., 10.8 Gbps. The main data channel of the "display port" is configured by 1, 2, or 4 high speed SerDes lane(s), and the bandwidth of each lane is 2.7 Gbps or 1.62 Gbps.

The "display port" includes a hot plug detection (HPD) signals. The hot plug detection is for not only confirming connection with a display device, but also for establishing a link. The hot plug detection includes a process of requesting the transmission end to establish a link through a process called link training. During this process, whether or not all of the 4 lanes are necessary is checked in both the transmission end and the reception end. Further, the "display port" also has an AUX (Auxiliary) channel. The AUX is a low-speed "side channel" which serves as a communication channel for managing a link based on information from the transmission end, and for controlling the status and configuration. The AUX channel enables bidirectional communications of video and audio.

The "display port" allows a use of multiple display devices unlimitedly from a single digital output port without restriction by a display application, and maximizes the performance of displays without any delay. Further, the "display port" is a plug-in-and-play type port, which requires no manual setting by a user. Thus, for example, if an additional display device is provided without using the "display port", an additional graphic card or additional provision of a multiple head graphic card having a plurality of output ports is needed. These cards lead to an increase in the power consumption, and lead to difficulties in adding these cards. These cards lead to an increase in the power consumption, and lead to difficulties in adding these cards. To the contrary, these problems will not be a concern when the "display port" is used. As the result, the "display port" enables addition of a display and the like without a need of opening the security cage SK of a slot machine 1 requiring a high confidentiality.

The "display port" adopts the micropacket scheme, to enable simultaneous transmission of a plurality of audio and video streams, and the other types of data. Therefore, a plurality of videos and audio packets are transmitted through a single cable. Thus, the "display port" allows transmission of a picture-in-picture and activating a plurality of daisy-chained display devices, via a single connection, at the link speed same as that in cases of a hub-connection.

It should be noted that a daisy-chain connection is such that an input port and an output port of the display port are implemented on each display device, and connecting the output port of a source end to the input port of a display device in the subsequent stage (sink end) on a single link, and connecting the output port of that display device as the source end is connected to an input port of another display device in the subsequent stage (sink end). On the other hand, in the hub-connection, there are a plurality of output ports for a single input port, and the input ports of a plurality of display devices are connected to the output ports.

As shown in FIG. 86, with the SSD device SD1 thus assembled being attached to the back surface side of the connector attachment plate SK7, there is formed in the connector attachment plate SK7 an SSD insertion hole SD4 for inserting thereinto the SSD device SD1. Thus, with the SSD mounting device SD3, the SSD device SD1 is detachably mounted to the SSD insertion hole SD4, as shown in FIG. 90. Further, with the SSD substrate SD2 being cased in the SSD casing SD11 to be formed into a cartridge, replacement of the SSD substrate SD2 and updating of programs and data are made easy. It should be noted that the attachment and detachment of the SSD mounting device SD3 is monitored by the APX motherboard AM, and an alarm sound is output when the SSD mounting device SD3 is detached.

The SATA substrate connectors AM2 is connected to the SSD substrate SD2 so as to enable two-way data communications. The first display port connector SK85a is connected to the upper side liquid crystal display panel 32212 so as to enable one-way data communications. The second display port connector SK85b is connected to the DPDAMP substrate DD so as to enable one-way data communications. The DPDAMP substrate DD is an audio amplifier substrate for the display port. The DPDAMP substrate is connected to the lower side liquid crystal display panel 4254, and the speakers 433a, 433b, and SP1 so as to enable one-way data communications.

A first LAN jack SK87 is an interface of an SAS (Serial Attached SCSI) which is an SCSI standard with a serial transmission scheme, and is used for data communications with the PTS device GG1 having the SAS interface. A second LAN Jack SK91 is used for data communications with an information processing device GG2 called "GAT3" for checking. A first sub-connector SK86 is connected to the bill stocker BI so as to enable one-way data communications. A second sub-connector SK84 is connected to the printer device PR so as to enable one-way data communications.

A first USB connector SK82a is connected to the sub I/O substrate SI3 so that the sub I/O substrate SI3 is able to receive data transferred in one-way communications. To the sub I/O substrate SI3 are connected a maximum of 16 button switches CP1a of the control panel CP, and a button LEDCP1b. Further, the sub I/O substrate SI3 is connected to a light emission substrate 4353 and a counter mechanism CT.

A second USB connector SK82b is connected to the first GM substrate GM1 so that the first GM substrate GM1 is able to receive data transferred in one-way communications. The first GM substrate GM1 is connected to a GMR driver M103 which controls the rotation and drive of the reel device M1 To the GMR driver M103 are connected reel motor M51 of each reel unit M11, a backlight unit M7, an index sensor M101, a magnetic encoder M102, and the like. Further, the first GM substrate GM1 is connected to the upper side light source substrate 4263 and a lower side light source substrate 4273.

A third USB connector SK88a is connected to the second GM substrate GM2 so that the second GM substrate GM2 is able to receive data transferred in one-way communications. The second GM substrate GM2 is connected to the casing fan sensor FNS2 shown in FIG. 59 and a power source box fan sensor FNS1 shown in FIG. 68. The fan sensors FNS are each configured to output fan temperature signals indicative of the temperature of the fan. Further, the second GM substrate GM2 is connected to the main body substrate casing switch SE6, the upper door switch SE3, optical sensors SE4, a line light source member 2134, and an LED substrate LDP for driving the line light source member 2134, the illumination mechanism 424, and the like.

Further, a fourth USB connector SK88b is used as a spare USB connector. A fifth USB connector SK90a is connected to the upper side touch panel 32211 so as to enable two-way data communications. A sixth USB connector SK90b is connected to the lower side touch panel 4251 so as to enable two-way data communications.

To the APX motherboard AM is mounted a memory substrate MM6 having a DDR3 memory. Memory substrate MM6 performs an OS authentication process in cooperation with the SSD substrate SD2, and the other processes. The OS authentication process is detailed later.

Thus, the slot machine 1, with the SSD, achieves a longer life. That is, the slot machine 1 stores various programs for booting and operating the slot machine 1, has an SSD structured by a flash memory, transfers the programs read out from the SSD to the DRAM of the motherboard, and executes the programs in the DRAM to boot and operate the gaming machine.

The above described structure brings about the following effects. Namely, in the SSD device SD1, there will be no driving mechanism such as a bearing and a motor for spinning the disk of an HDD. This greatly reduces the mechanical failure due to wearing off taking place in the driving mechanism, and the like. The SSD device SD1 in general, the oxide film serving as the insulator of the storage cells in the flash memory is deteriorated by electrons with an increase in the number of rewriting and deleting data. In the above structure however, the access to the SSD device SD1 is mainly for reading out the programs. Therefore, the deterioration of the storage cells is restrained as compared to cases where flash memory is accessed to rewrite and delete data. Thus, as in the case of accessing the HDD, the SSD is used without causing wearing off of the storage cell. This reduces the chances of malfunctions such as effect screen and audio interrupted in the middle of game, to a level lower than cases of adopting an HDD. That is, the life of the gaming machine is made longer with the provision of SSD device SD1.

The slot machine 1 further enables prevention of breakdown during a game, with the provision of the SSD device SD1. That is, the slot machine 1 stores various programs for booting and operating the slot machine 1, has an SSD device SD1 structured by a flash memory, grasps, at a predetermined timing such as booting, the number of rewriting and deleting performed in relation to the SSD device SD1, and prompts replacement of the SSD device SD1 and the like, when the number of rewriting and deleting has reached a threshold or more meaning that the storage cells may break down.

Even if there is no data saving intentionally performed in the SSD device SD1, data of some kind such as boot information and a data-reading status is always written in. Therefore, even if the SSD device SD1 is accessed only for reading in data therefrom, the storage cells are deteriorated as used. If the gaming machine is used for a long period of time, the storage cells are deteriorated to the extent that breakdown easily occurs. The above described structure however prompts replacement of the SSD device SD1 and the like, when the number of rewriting and deleting has reached a threshold or more meaning that the storage cells may break down. This prevents occurrence of breakdown in the middle of game.

It should be noted that, in Embodiment 1, one display port connector SK85*a* is connected to the upper side liquid crystal display panel 32212, another display port connector SK85*b* is connected to the lower side liquid crystal display panel 4254 via the DPDAMP substrate DD. This way, a plurality of displays are controlled via a plurality of display port terminals. However, the present invention is not limited to this. A plurality of displays may be controlled via a single display port terminal.

Figure 97B:
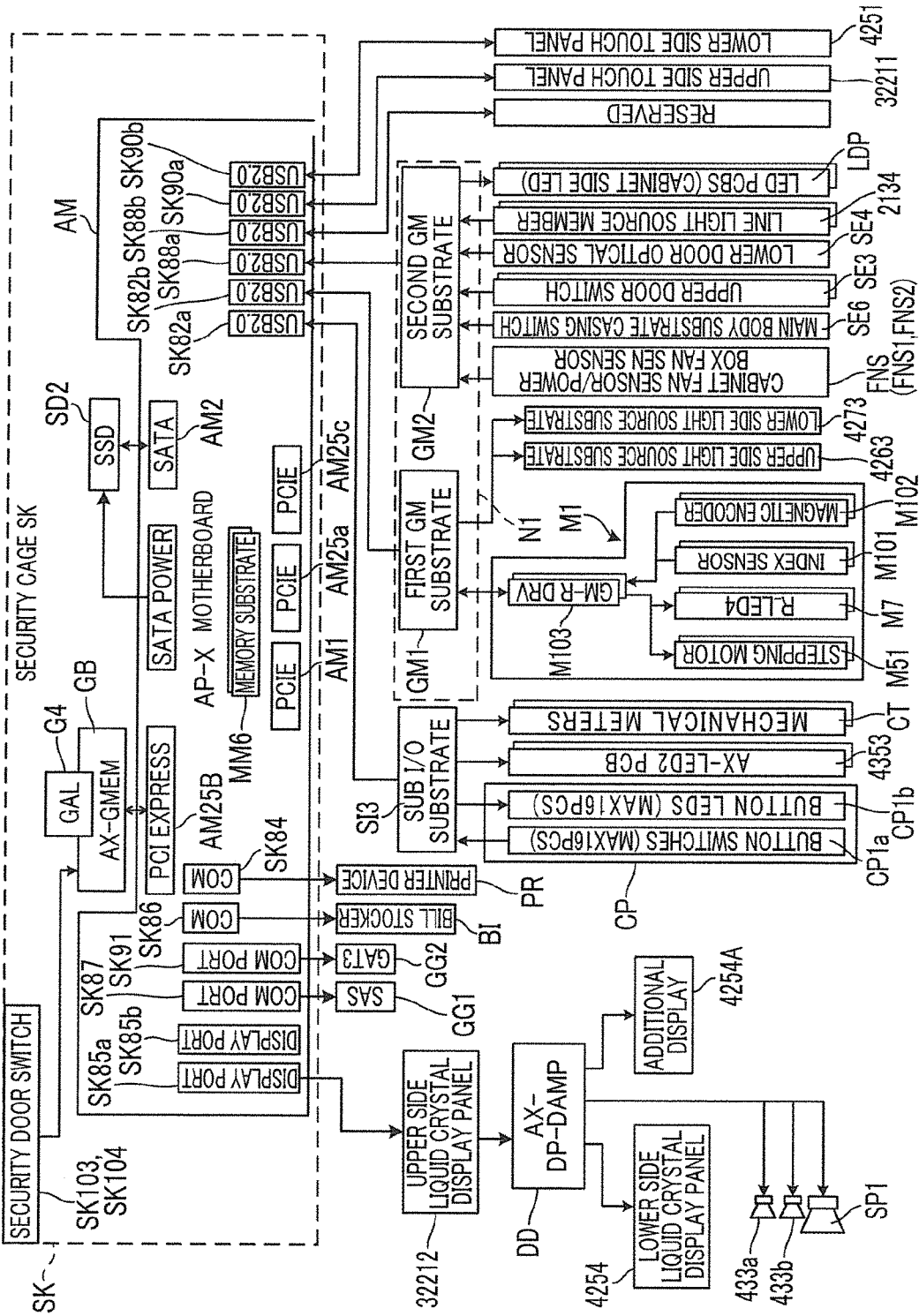
FIG. 97B is a block diagram showing the circuit structure of the slot machine.

For example, as shown in FIG. 97B, the upper side liquid crystal display panel 32212 may be provided with a display port having an input/output port. Further, the output port of the display port of the upper side liquid crystal display panel 32212 may be connected to the DPDAMP substrate DD. By doing so, the upper side liquid crystal display panel 32212 and the lower side liquid crystal display panel 4254 may be connected in a daisy-chain mode. Alternatively, the lower side liquid crystal display panel 4254 may be provided with an output port of a display port, and the upper side liquid crystal display panel 32212 may be connected to this output port. Alternatively, at a time of additionally providing a display 4254A, the display 4254A may be connected to the output port of the upper side liquid crystal display panel 32212 or the lower side liquid crystal display panel 4254.

(Electrical Structure: GAL Substrate G4)

Figure 98:
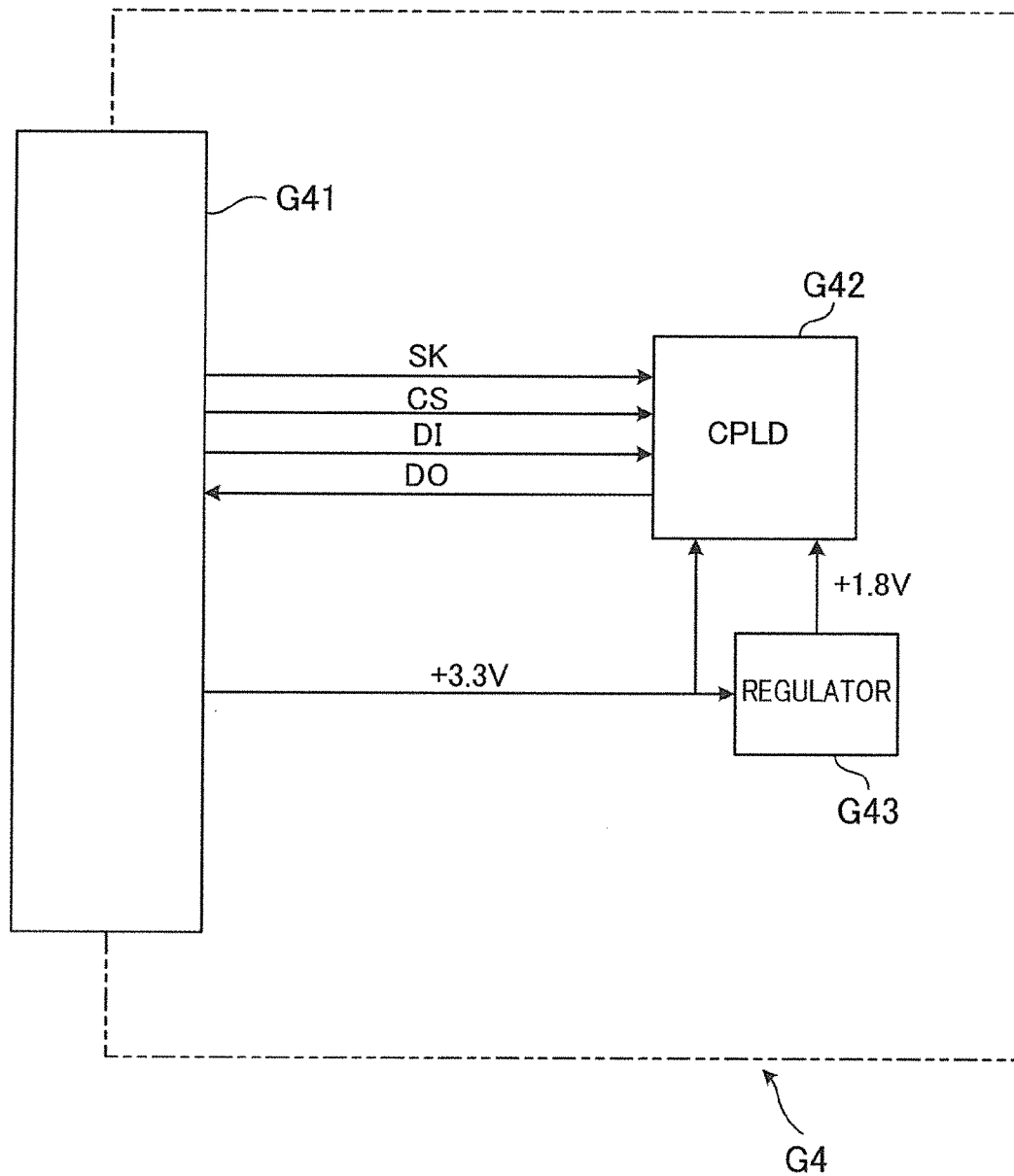
FIG. 98 is a block diagram showing a circuit structure of the GAL substrate.

Next, the following describes an electrical structure of the GAL substrate G4. As shown in FIG. 98, the GAL substrate G4 has a connector unit (AXGMEM PCB) G41. On the GAL substrate G4 is mounted a CPLD circuit G42 and a constant voltage circuit G43. The connector unit SD41 is electrically connected to the CPLD circuit G42 and the constant voltage circuit G43. The connector unit SD41 is connected to a FPGA (Field-Programmable Gate Array) circuit GB5 of the AXGMEM substrate GB shown in FIG. 99 in such a manner as to enable two-way data communications, and is configured to perform Boot BIOS self-authentication process and the like with the AXGMEM substrate GB and the GAL substrate G4.

The CPLD circuit G42 is connected to the AXGMEM substrate GB so as to enable two-way data communications. From the AXGMEM substrate GB, SK (Serial Clock) signals, CS (Chip Select) signals, DI (Data Input) signals are transmitted to the CPLD circuit G42, and DO (Data Output) signals are transmitted from the CPLD circuit G42 to the AXGMEM substrate GB. Further, the constant voltage circuit G43 is a +3.3V regulator. With the constant voltage circuit G43, a constant voltage of +1.8 V is supplied to the CPLD G42.

The "CPLD circuit" is a type of programmable logic device, whose degree of integration is between those of PAL and FPGA, and has characteristics of the both PAL and FPGA. Blocks created by the CPLD circuit are macro cells.

(Electrical Structure: AXGMEM Substrate GB)

Figure 99:
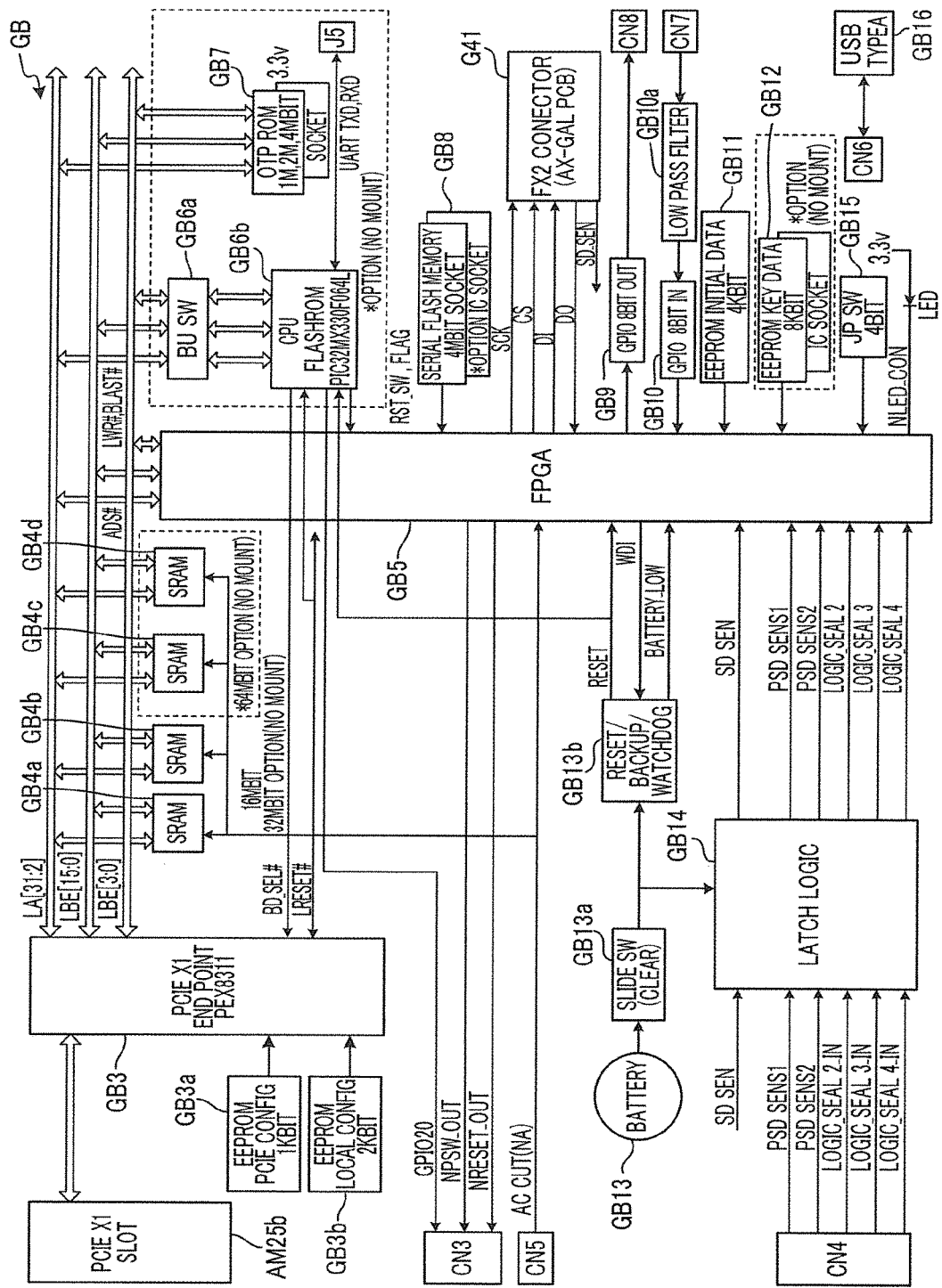
FIG. 99 is a block diagram showing a circuit structure of the AXGMEM substrate.

Next, the following describes an electrical structure of the AXGMEM substrate GB. As shown in FIG. 99, the AXGMEM substrate GB has a PCI terminal part (PCIE x1 End Point PEX8311) GB3 which is connected to the extension slot (PCIE x1 Slot) AM25*b* of the APX motherboard AM. For example, as the PCI terminal part GB3, PEX8311 in compliance with specification 1.0a of a PCI Express to Local Bridge is adopted. The PCI terminal part GB3 is mounted to the extension slot AM1, and two-way data communications is performed with a bus of the PCI Express x1 standard. Further, the PCI terminal part GB3 has 2 EEPROM I/Fs, and is connected to an EEPROM (Electrically Erasable Programmable Read-Only Memory) GB3*a* and an EEPROM GB3*b* which is a type of nonvolatile storage. The EEPROM GB3*a* has a volume of 1 kbit, and stores PCIe ConFIG. The EEPROM GB3*b* has a volume of 2 kbit, and stores Local ConFIG.

The PCI terminal part GB3 is connected to SRAMs (Static Random Access Memory) GB4*a* to GB4*d*, and to an FPGA circuit GB5, via a local bus. To the SRAMs GB4*a* to 4*d*, power is supplied from a power source GB13 via a slide switch GB13*a* which selects the powering destination. The local bus enables transmission and reception of control signals such as local address input signals LA[31:2], local data input signals LD [15:0], local bus byte enable input signals LBE [3:0]. The SRAMs GB4a to 4d each has a volume of 16 Mbit. At least one of the SRAMs GB4a to 4d is connected, and as an option, two or four of them may be connected to ensure a volume of 33 Mbit or 64 Mbit.

Further, as an option, a micro controller GB6b and a ROM GB7 may be connected to the local bus, via a bus switch (BU SW) GB6a for switching the bus lines of the local bus at a high speed. As the micro controller GB6b, for example, PIC32MX330F064L having a CPU and a Flash ROM may be adopted. To the micro controller GB6b, power is supplied from the power source GB13, via the slide switch GB13a. Further, between the slide switch GB13a and the micro controller GB6b, the voltage monitor ICGB13b for monitoring the voltage is connected, and the power supplied from the power source GB13 is monitored. When signals indicative of abnormal drop in the power source (Battery Low) and the like is detected, a reset function resets the system to prevent an uncontrollable error. Further, the micro controller GB6b is connected to a connector J5 and a connector CN3. With an UART interface, the connector J5 is connected so as to enable two-way communications using a TXD for transmission and an RXD for reception. The connector CN3 is connected so as to enable one-way communications through a GPIO (General Purpose Input/Output) 20 Interface. It should be noted that the micro controller GB6b receives a reset signal (RESET) from the voltage monitor ICGB13b, and outputs a reset switch flag (RST-SW, FLAG) to the FPGA circuit GB5. The ROM GB7 is selected from 1M, 2M, and 4 Mbit, and is mountable to a socket.

The AXGMEM substrate GB has the FPGA circuit GB5. The FPGA circuit GB5 is connected to the PCI terminal part GB3 via a local bus. The FPGA circuit GB5 is connected to the connector unit G41 of the GAL substrate G4 so as to enable two-way data communications. From the FPGA circuit GB5, SCK (Serial Clock) signals, CS (Chip Select) signals, DI (Data Input) signals are transmitted to the connector unit G41, and DO (Data Output) signals, and SD-SEN (Shut Down Output) signals are transmitted from the connector unit G41 to the FPGA circuit GB5.

The FPGA circuit GB5 is connected to a serial flash memory (Serial FLAXH Memory) GB8 which is a nonvolatile semiconductor memory. Data stored in the semiconductor memory GB 8 is output to the FPGA circuit GB5 as needed. It should be noted that the serial flash memory GB8 may be also mounted to an IC socket.

The FPGA circuit GB5 has a GPIO interface GP9 which outputs 8-bit signals to the connector CN8. The FPGA circuit GB5 has a GPIO interface GP10 which receives 8-bit signals from a connector CN7, via a low pass filter GB10a.

The FPGA circuit GB5 has a 4-kbit EEPROM GB11, and stores initial data. The FPGA circuit GB5 may further have an 8-kbit EEPROM GB12 mounted to an IC socket, and may store key data.

To the FPGA circuit GB5, power is supplied from a power source GB13 via a slide switch GB13a which selects the powering destination. Further, between the slide switch GB13a and the FPGA circuit GB5, the voltage monitor ICGB13b for monitoring the voltage is connected, and the power supplied from the power source GB13 is monitored. The voltage monitor ICGB13b has a reset function which, when signals indicative of abnormal drop in the power source (Battery Low) and the like is detected, resets the system to prevent an uncontrollable error, and has a watch dog function which monitors the normal operation of the system, and resets the system upon detection of a signal indicative of abnormality (WDI pulse signal) from the FPGA circuit GB5. Further, the voltage monitor ICGB13b includes a backup function, and monitors the voltage at the power source terminal. When the voltage detected falls below a threshold, the power source terminal is switched to a backup power source terminal.

The FPGA circuit GB5 is connected to the connector CN4 so as to enable one-way data communications from the connector CN4 via a latch circuit (Latch Logic) GB14. From the connector CN4, SD-SEN (Shut Down Output) signals, PSD-SENS1, 2 signals, LOGIC-SEAL 2 to 4 signals are transmitted to the FPGA circuit GB5 via the latch circuit GB14. To the latch circuit GB14, power is supplied from a power source GB13 via a slide switch GB13a which selects the powering destination.

The FPGA circuit GB5 is connected to the connector CN4 so as to enable reception of data transferred in one-way communications, and transmits push switch output (nPSW-OUT) signals and reset output (nRESET-OUT) signals. Further, the FPGA circuit GB5 is connected to the connector CN5 so as to enable reception of data transferred in one-way communications, and receives AC/CUT signals. Further, the FPGA circuit GB5 is connected to a 4-bit JP switch GB15.

The AXGMEM substrate GB has a USB terminal (Type A) GB16 connected to a connector CN6 so as to enable two-way data communications.

(Electrical Structure: APX Motherboard AM)

Next, the following describes an electrical structure of the APX motherboard AM. As shown in FIG. 100A and FIG. 100B, the APX motherboard AM has fourth Generation Intel® Core Processor (Haswell) AM10, with 20 EUs which are each an image process execution unit in a GPU core. It should be noted that the processor AM10 is mounted to a LGA1150 CPU socket produced by Intel Corporation.

The processor AM10 has therein a memory controller, the PCI Express controller, and the like, and has a function corresponding to the northbridge (MCH). This way, the APX motherboard AM achieves a lower power consumption than a case of having a function corresponding to the northbridge (MCH) in the form of sub chip. The processor AM10 has a PCI-E bus (100 MHz) with 16 lanes, and is connected to an extension slot AM1 of PCI-EX16 Slot (Gen3) standard via this PCI E bus (See FIG. 97A).

Further, the APX motherboard AM is powered by 8+24-pin connector AM6.

Further, the processor AM10 is connected to in total of 4 dual-channel memory slots (memory slot AM5 of FIG. 91) of 128-bit, i.e., Channel A slots AM11a and AM12a, and Channel B slots AM11b and AM12b so as to enable two-way data communications. In each of the memory slots, a DDR3 SRAM of DDR3-1333 or DDR3-1600 standard is mounted. Further, the processor AM10 is connected to DP (Display ports) connectors SK85a and SK85b via digital ports C and D so as to enable one-way data communications. The processor is further connected, via a digital port B, to DVI-I connector AM13 capable of transmitting both analog and digital video signals so as to enable one-way data communications.

The APX motherboard AM has a PCH (Linux Point B85) chipset AM20, an Intel produced chipset. The PCH chipset AM20 has a function of southbridge that controls I/O-related devices such as Serial ATA and USB. The PCH chipset AM20 and the processor AM10 are connected, and are capable of performing two-way data communications via a bus AM15 with the connection mode of DMI (Direct Media Interface) and a bus AM16 with a connection mode of FDI (Flexible Display Interface).

The PCH chipset AM20 is connected to a plurality of high-speed USB ports AM21 of the USB2.0 standards with a transfer rate of 480 Mb/s, in such a manner that two-way data communications is possible. Of the high-speed USB port, there are 6 high-speed USB ports (USB connectors SK82a, SK82b, SK88a, SK88b, SK90a, SK90b shown in FIG. 97A).

The PCH chipset AM20 is connected to an audio codec chip (ALC892 produced by Realtek) AM22 of 24 Mhz so as to enable two-way data communications. The audio codec chip AM22 is connected to two SPDIF of channels ChA and ChB. The SPDIF is a standard for digital transfer of audio signals in an audio visual apparatuses. The PCH chipset AM20 is connected, via PCIEx1 buses, to two network controller chips (RTL8111E10/100/1000 produced by Realtek) AM23a and AM23b of 100 MHz so as to enable two-way data communications. The PCH chipset AM20 is further connected, via an analog port AM13a, to DVI-I connector AM13 so as to enable one-way data communications.

The PCH chipset AM20 is further connected, via buses of SATA3 standard, to four SATA3 ports (connectors for SATA substrate shown in FIG. 97A) AM2 so as to enable one-way data communications. The PCH chipset AM20 is further connected, via SPI (Serial Peripheral Interface) bus, to SPI FLASH port AM24 so as to enable one-way data communications at 64 Mb. The PCH chipset AM20 is further connected, via a plurality of PCIEx1 buses, to a plurality of PCIEx1 Slots AM25a, AM25b, AM25c so as to enable two-way data communications. The PCIEx1 slot AM25b is connected to the PCI terminal part GB3 on the AXGMEM substrate GB shown in FIG. 99. With this, the AXGMEM substrate GB is connected to the processor AM10 via the PCH chipset AM20, the buses AM15 and AM16.

The APX motherboard AM has an SIO (Super I/O: NCT6627UD produced by Nuvoton) chip AM30. The SIO chip AM30 is an I/O integrated circuit for a motherboard, and is a combination of interfaces of various low bandwidth devices. The PCH chipset AM20 and the SIO chip AM30 are connected so as to enable two-way data communications at 33 MHz, by an LPS (Low Pin Count) bus AM25 for connecting low bandwidth devices (legacy devices connected by the SIO chip). It should be noted that the LPS bus AM25 is connected to the TPM (Trusted Platform Module) header AM26 so as to enable one-way data communications. The TPM is a security chip having a hardware tamper resistance, for the sake of security.

The SIO chip AM30 is connected to the RS232C COM ports SK87 and SK91 (see FIG. 97A) via ports A and B so as to enable two-way data communications. The SIO chip AM30 is connected to the PS2 KB/MS combo con AM31 via a KB/MS bus so as to enable two-way data communications. The SIO chip AM30 is further connected to the DGIO header AM 32 via a GPIOx8 bus so as to enable two-way data communications. The SIO chip AM30 is further connected to the COM ports AM33a to 33d of RS232, RXD, TXD, and GND via internally arranged ports C, D, E, and F, respectively, so as to enable two-way data communications. The SIO chip AM30 is further connected to the CPU or the fan AM34 disposed inside the casing via a FAN bus so as to enable two-way data communications. The fan AM34 is usually connected to a 3-pin connector.

(Electrical Structure: Sub I/O Substrate SI3)

Figure 101:
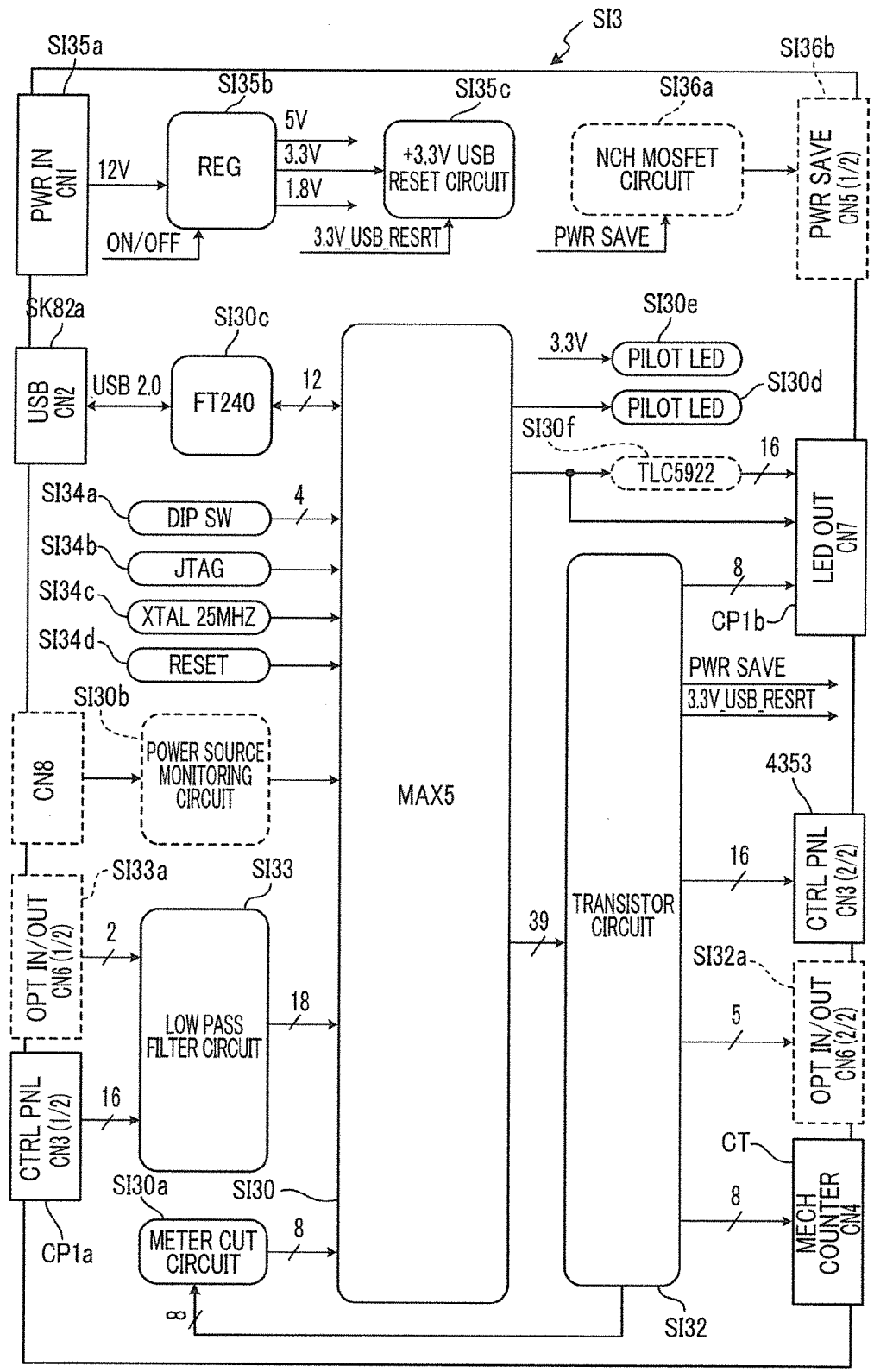
FIG. 101 is a block diagram showing a circuit structure of a sub I/O substrate.

Next, the following describes an electrical structure of the sub I/O substrate SI3. As shown in FIG. 101, the sub I/O substrate SI3 has a power source connector (CN1) 5135a. From this power source connector 5135a, a voltage of 12 V is input to a regulator 5135b having an ON/OFF function. From the regulator 5135b is output voltages of 5v, 3.3V, and 1.8V. Of these voltages, 3.3V voltage is input to a USB reset circuit 5135C. Further, the sub I/O substrate SI3 has a USB connector (CN2) SK82a. The USB connector SK82a is connected to a memory expansion module (MAX5) S130, via ferrite core (FT240) SI30c based on the USB2.0 standard, so as to enable two-way data communications.

Here, the memory expansion module S130 is connected to DIP (Dual In-line Package) switch SI 34a, JTAG SI34b, 25 MHz XTAL 5134c, and a reset signal 5134d (reset unit) so as to enable one-way data communications.

The sub I/O substrate S13 further has a connector CN8, and as an option, may further have a power source monitoring circuit SI30b. The power source monitoring circuit SI30b is connected to the memory expansion module S130 so as to enable one-way data communications.

The sub I/O substrate S13 has a control panel connector (CN3 (1/2)) CP1a, and is connected to the memory expansion module S130 via a low pass filter circuit S133 so as to enable one-way data communications. It should be noted that the sub I/O substrate S13 may have an I/O connector (CN6 (1/2)) SI33a, and may be connected to the memory expansion module S130 via the low pass filter circuit S133 so as to enable one-way data communications.

The memory expansion module S130 is connected to a pilot LED SI30d so as to enable one-way data communications. It should be noted that the sub I/O substrate S13 has a pilot LED SI30e to which power of 3.3V is input. The memory expansion module S130 is connected to a transistor circuit S132 so as to enable one-way data communications. Further, the memory expansion module SI30 and the transistor circuit SI32 are connected to an LED output connector (CN7) CP1b so as to enable one-way data communications. It should be noted that the memory expansion module SI30 is connected to the LED output connector (CN7) CP1b via an LED driver (TLC5922) SI30f so as to enable one-way data communications. Further, the transistor circuit SI32 is connected to the memory expansion module SI30 via a meter cut circuit SI30a so as to enable one-way data communications.

The transistor circuit SI32 outputs power save signals and 3.3V USB restart signals. Further, the transistor circuit SI32 is connected to a control panel connector (CN3 (2/2)) 4353 and a mechanical counter connector (CN4) CT so as to enable one-way data communications. It should be noted that the transistor circuit SI32 may be optionally connected to an I/O connector (CN6 (2/2)) so as to enable one-way data communications.

It should be noted that there may be optionally provided a power save connector (CN5 (1/2)) SI36b connected to an NchMOSFET circuit SI36a to which power save signals are input so as to enable one-way data communications.

(Electrical Structure: DPDAMP Substrate DD)

Figure 102A:
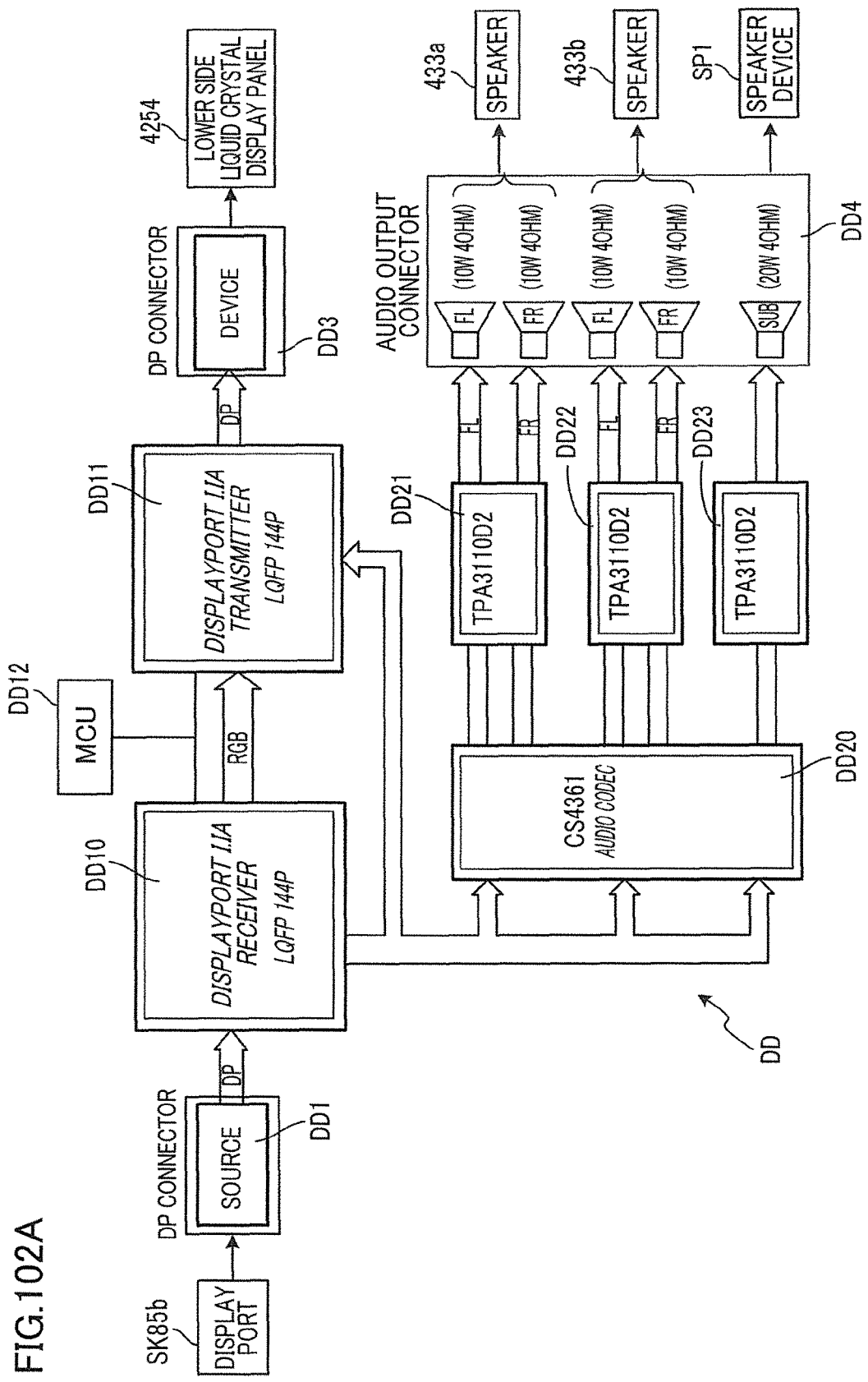
FIG. 102A is a block diagram showing a circuit structure of the DPDAMP substrate.

Next, the following describes an electrical structure of the DPDAMP substrate DD. As shown in FIG. 102A, the DPDAMP substrate DD includes: an input end DP connector DD1, a video output DP connector DD3, and an audio output connector DD4. The input end DP connector DD1 is connected to the second display port connector SK85b shown in FIG. 97A so as to enable one-way data communications.

The input end DP connector DD1 is connected to a receiver (LQFP144P) DD10 serving as a video output interface in compliance with a display port 1.1a standard so as to enable one-way data communications, and receives audio and video sources. Further, the receiver DD10 is connected to a transmitter (LQFP144P) DD11 in compliance with the display port 1.1a standard, via an RGB cable and a bus, so as to enable one-way data communications, and outputs video signals. From the receiver DD10 is transmitted analog RGB output signals. Further, between the receiver DD10 and the transmitter DD12 is connected a memory control unit (MCU) DD12, and memory related controls are performed. To the transmitter DD11 is connected a video output DP connector DD3 via a DP (display port) cable so as to enable one-way data communications, and a video is output to the lower side liquid crystal display panel 4254.

The receiver DD10 is connected to an audio codec (CS4361) DD20 so as to enable one-way data communications. The audio codec DD20 extracts audio signals from the audio and video sources. The audio codec DD20 is connected to three audio power amplifiers (TPA3110D2) DD21 to DD23 so as to enable one-way data communications, and digital signals are converted into analog signals. The audio power amplifiers DD21 and DD22 are connected to an audio output connector DD4. The audio output connector DD4 is connected to speakers 433a and 433b, and to the speaker device SP1.

Figure 102B:
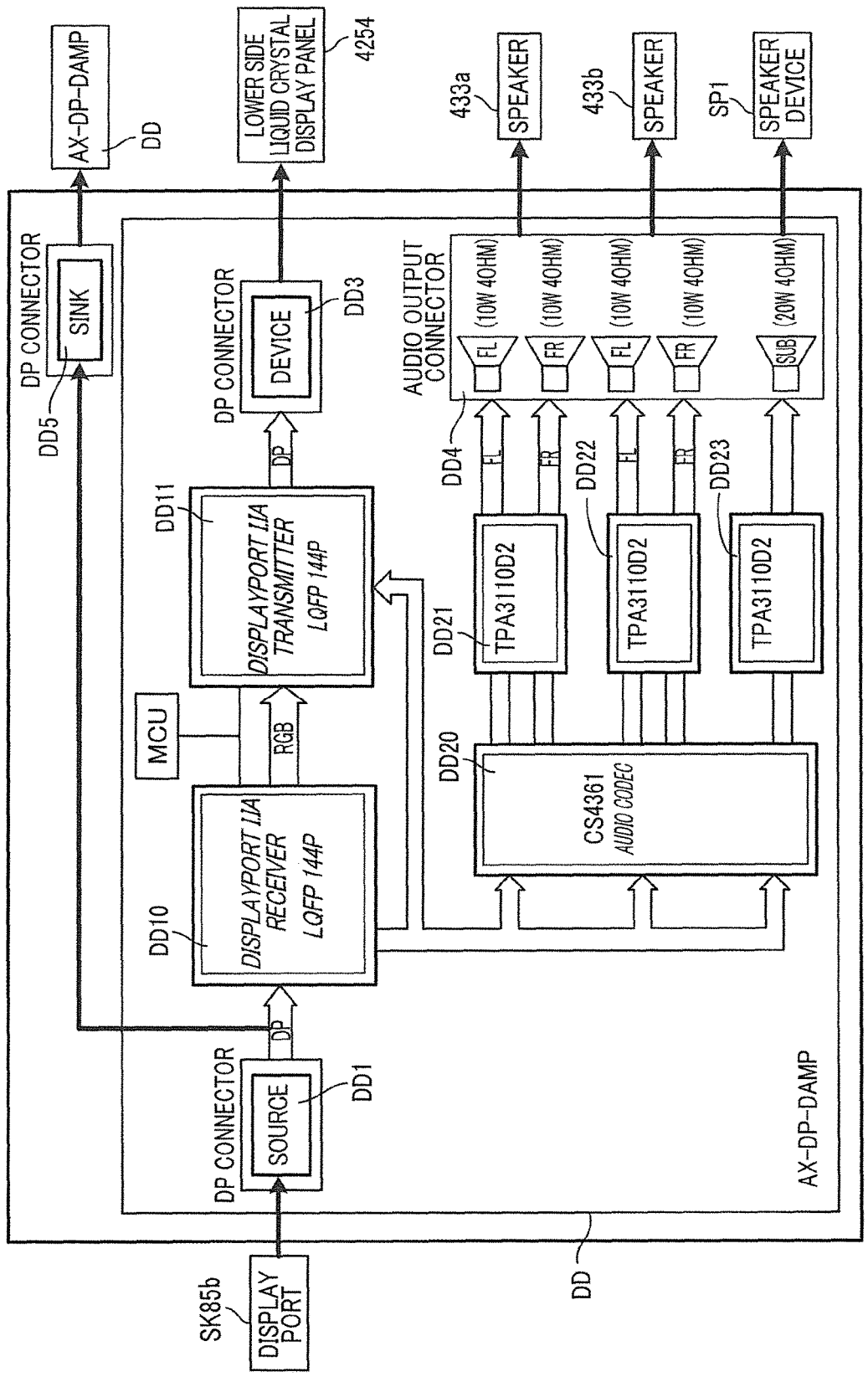
FIG. 102B is a block diagram showing the circuit structure of the DPDAMP substrate.

It should be noted that the DPDAMP substrate DD may have an output end DP connector DD5, as shown in FIG. 102B. In this case, DPDAMP substrate DD is daisy chained to the output end DP connector DD5 as shown in FIG. 97B. Therefore, an additional display device or an additional speaker is easily provided.

(Data Structure in SSD Substrate SD2)

The SSD substrate SD2 has a memory volume of 4 GB. The SSD substrate SD2 stores, in the form of digital data, base codes and game codes needed for running games, and a system for satisfying special matters defined by an organization for official applications (medium audit and identification). The SSD substrate SD2 is connected to the APX motherboard AM in compliance with SATA. Public keys are used for authentication, in which signatures of each region is used for authenticating another region successively to authenticate the OS/game system (program/SSD authentication described with reference to FIG. 110A).

It should be noted that the SSD substrate SD2, provided that the power is supplied from the power source device, may store door-open/close log to keep the record of time when the doors such as the upper door device 42 are opened. The SSD substrate SD2 may also store the door-open/close log even when the power supply from the power source device is stopped due to breakdown or shutting down.

Figure 103A:
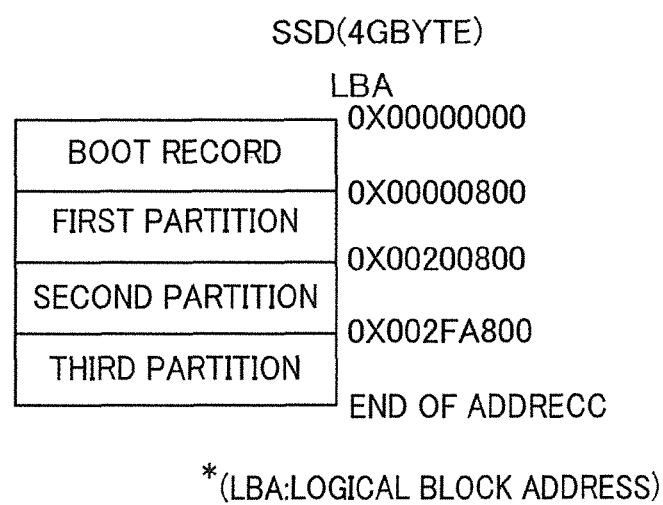
FIG. 103A is an explanatory diagram showing data arrangement of the SSD substrate.

The data arrangement of flash memory SD22 (see FIG. 88A) in the SSD substrate SD2 is sorted into a boot region and a data region. The data region is parted by three partitions as shown in FIGS. 103A and 103B. The SSD substrate SD2 is divided in units of 512 bytes per sector. To each of the sectors is assigned an address of LBA (Logical Block Address).

Figure 104:
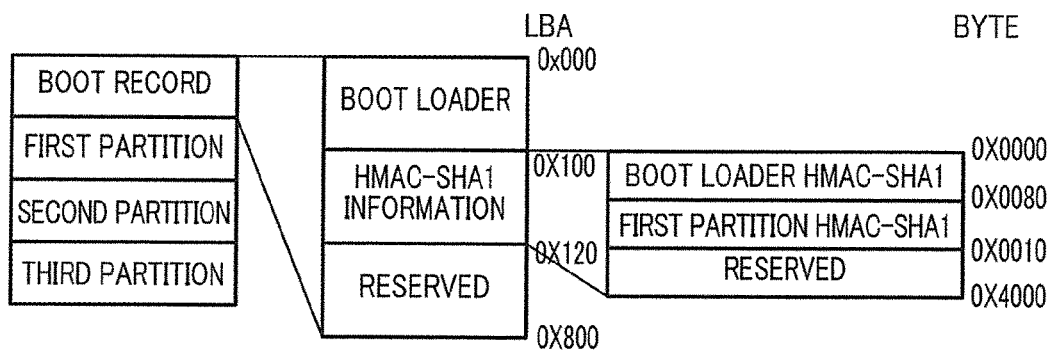
FIG. 104 is an explanatory diagram showing data arrangement of a boot region.

The following details specification of each region of the SSD substrate SD2. To the boot loader region are placed boot loader and HMAC-SHA1 information. The HMAC-SHA1 information is saved in a designated address. FIG. 104 shows data placement of the boot region. Non-used portions are filled with zeros (Reserved).

Figure 105:
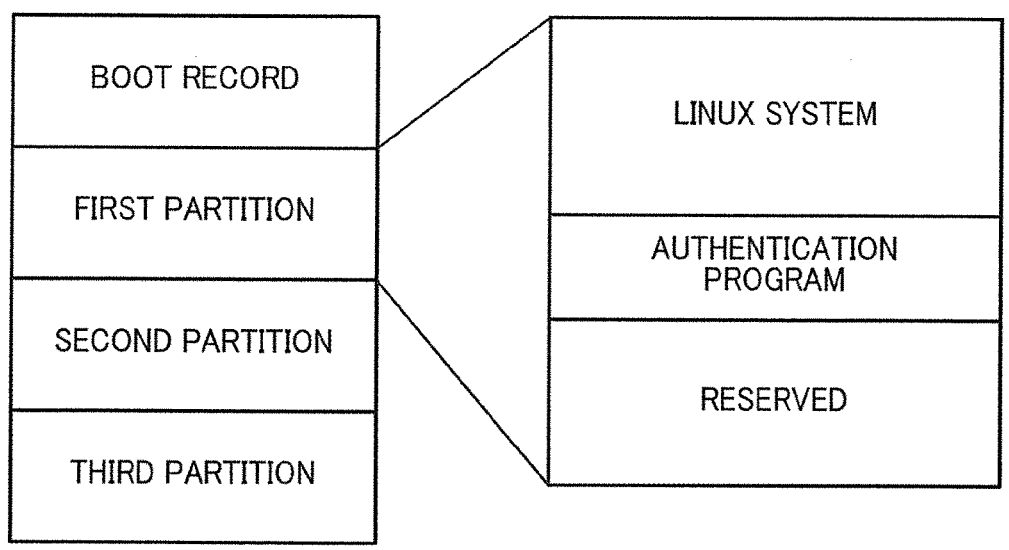
FIG. 105 is an explanatory diagram of a first partition region.

As shown in FIG. 105, the boot loader is used for executing a main boot loader in a first partition region. The boot loader region includes a partition table defining the starting position and the size of each partition. These pieces of data are placed according to commonly used MBR (Master Boot Record).

(Data Structure in SSD Substrate SD2)

The flash memory SD22 (see FIG. 88A) of the SSD substrate SD2 has a memory volume of 4 GB. The SSD substrate SD2 (flash memory SD22) stores, in the form of digital data, base codes and game codes needed for running games, and a system for satisfying special matters defined by a governmental organ (medium audit and identification). The SSD substrate SD2 is connected to the APX motherboard AM in compliance with SATA. Public keys are used for authentication, in which signatures of each region is used for authenticating another region successively to authenticate the OS/game system (later described program/SSD authentication).

It should be noted that the SSD substrate SD2, provided that the power is supplied from the power source device, may store door-open/close log to keep the record of time when the doors such as the upper door device 42 are opened. The SSD substrate SD2 may also store the door-open/close log even when the power supply from the power source device is stopped due to breakdown or shutting down.

The following details specification of each region of the SSD substrate SD2 (flash memory SD22). To the boot loader region are placed boot loader and HMAC-SHA1 information. The HMAC-SHA1 information is saved in a designated address. FIG. 104 shows data placement of the boot region. Non-used portions are filled with zeros (Reserved).

As shown in FIG. 105, the boot loader is used for executing a main boot loader in a first partition region. The boot loader region includes a partition table defining the starting position and the size of each partition. These pieces of data are placed according to commonly used MBR (Master Boot Record).

The HMAC-SHA1 information is used for auditing SSD substrate SD2. This region stores HMAC-SHA1 value of each partition, and non-used portions are filled with zeros (Reserved). The HMAC-SHA1 value of 20 bytes is RSA-encrypted and stored in a bit string of 128 bytes.

The boot loader is used for executing a main boot loader in a first partition region. The boot loader region stores the partition table defining the starting position and the size of each partition. These pieces of data are placed according to commonly used MBR (Master Boot Record).

The HMAC-SHA1 information is used for auditing SSD substrate SD2. This region stores HMAC-SHA1 value of each partition, and non-used portions are filled with zeros (Reserved). The HMAC-SHA1 value of 20 bytes is RSA-encrypted and stored in a bit string of 128 bytes. The boot loader HMAC-SHA1 is intended only for the boot loader region, and stores the RSA-encrypted HMAC-SHA1 value from the 0x0000 bytes at the leading end of the information portion. A first partition HMAC-SHA1 is intended only for the first partition region, and stores the HMAC-SHA1 value RSA-encrypted into 128 bytes from the 0x0080 bytes at the leading end of the information portion.

As shown in FIG. 105, the first partition region adopts a file system format (SquashFS) readable by Linux kernel, and stores a Linux operating system (Hereinafter, OS) and a self-authentication program PR1 for checking the OS. FIG. 105 shows data placement of the first partition region. Non-used portions are filled with zeros (Reserved).

A Linux system is a main component of the OS including a main boot loader, Linux kernel, and boot codes, and manages inputs/outputs and processes of various devices needed for executing base codes and game codes. The main boot loader is software directly executed by the boot loader placed in the boot record. In the main component of the boot loader, the Linux kernel and the boot codes are loaded to the main memory to activate the Linux®.

The Linux kernel is a kernel used in a Linux system, and is loaded to the main memory and executed by the main boot loader. The boot codes are initializing codes executed by the Linux kernel, and is loaded to the main memory by the main boot loader and executed by the Linux kernel. The self-authentication program (authentication program PR1) is used at a time of booting, and is a program for verifying a signature by comparing the HMAC-SHA1 value stored with a calculated HMAC-SHA1 value.

The authentication program PR1 contains an authentication key KE2 as an internal variable. The authentication key KE2 is information identical to the reference key already stored by the time of shipping in the reference key storage unit SD 231 of the memory controller SD23 described later with reference to FIG. 109B. The authentication key KE2 is used along with the reference key KE1 in the later-described program/SSD authentication, to determine whether or not the SSD device SD1 is a legitimate one (not a pirated or an illegitimate SSD device).

Figure 106:
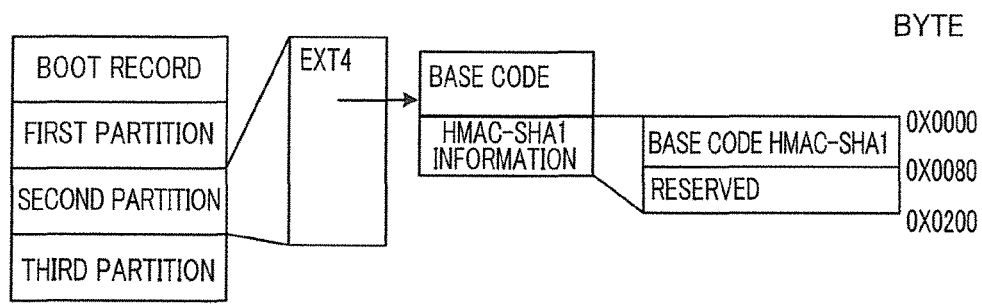
FIG. 106 is an explanatory diagram of a second partition region.

As shown in FIG. 106, the second partition region adopts a file system format (Ext4) readable by Linux kernel. In this file system, base codes are filed in the form of file. FIG. 106 shows data placement of the second partition region.

The base codes are software for controlling basic operations of a gaming machine, and provides functions needed for operations based on the game codes. A 128 byte bit string which is RSA encryption of the HMAC-SHA1 value, i.e., the base codes without the last 512 bytes, is stored in the 0x0000 bytes which is the leading end of the HMACSHA1 information portion.

Figure 107:
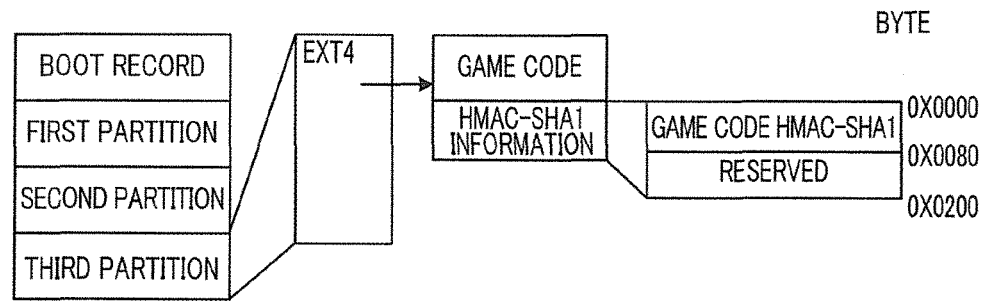
FIG. 107 is an explanatory diagram of a third partition region.

As shown in FIG. 107, a third partition region adopts a file system format (Ext4) readable by Linux kernel. In this file system, game codes (corresponding to game program PR2 of the present invention) are filed in the form of file. FIG. 107 shows data placement of the third partition region.

The game codes are software that controls operations of a game, and various games are run by changing this software. All the game codes are executable by common base codes. A 128 byte bit string which is RSA encryption of the HMAC-SHA1 value, i.e., the game codes without the last 512 bytes, is stored in the 0x0000 bytes which is the leading end of the HMAC-SHA1 information portion.

Figure 109A:
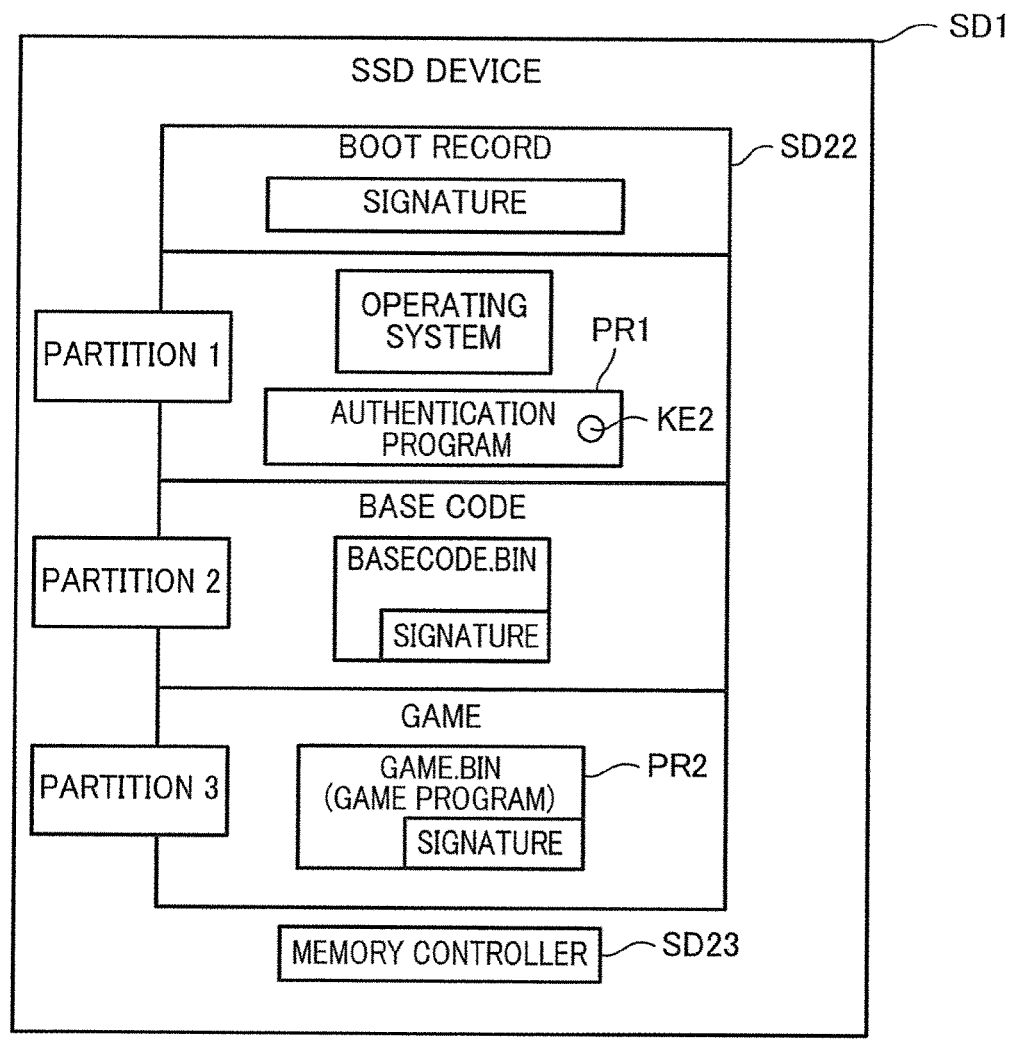
FIG. 109A is an explanatory diagram of program/SSD authentication.
Figure 109B:
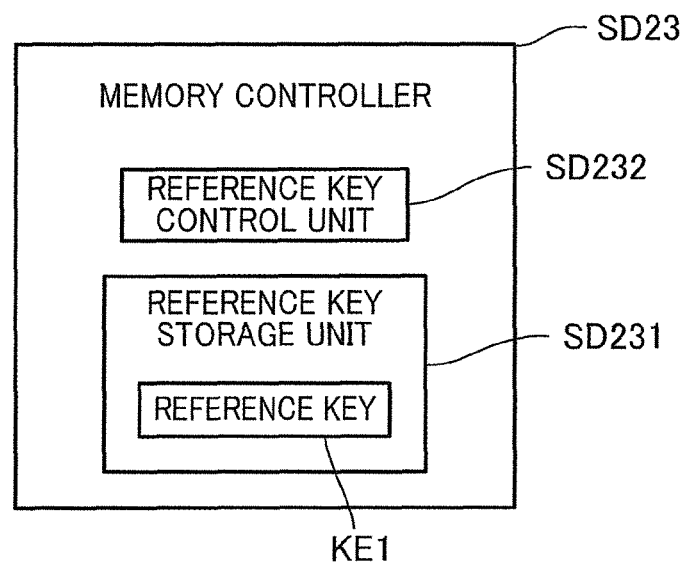
FIG. 109B is an explanatory diagram of program/SSD authentication.

Next, the following describes with reference to FIG. 109B data stored in the memory controller SD23 (see FIG. 88A). The memory controller SD23 is provided with a nonvolatile reference key storage unit SD 231 in which the reference key KE1 is embedded (stored) by the time the SSD device SD1 is shipped out. The reference key KE1 indicates unique identification information of the SSD device SD1; e.g., manufacturer's serial number. The information stored in the reference key storage unit SD 231 is not directly accessible from outside (e.g., from the CPU cores AM103a to AM103d of FIG. 100B). Retrieving the reference key KE1 stored in the reference key storage unit SD 231 from outside requires a use of the memory controller SD23. Therefore, even in attempt to manufacture an illegitimate SSD device by copying thereto the data in the SSD device SD1, copying the reference key will be difficult.

In the later-described program/SSD authentication, the reference key KE1 is compared with the authentication key KE2 which is stored as an internal variable in the authentication program PR1 stored in the flash memory SD22 of the SSD device SD1. Only when the reference key KE1 matches with the authentication key KE2, the SSD device SD1 is determined as to be the legitimate one (not a pirated or illegitimate SSD device SD1). As hereinabove described, the reference key KE1 is difficult to copy. Therefore, an illegitimate SSD device SD1 stores a reference key which has been stored by the time of its shipment. Therefore, in the later-described program/SSD authentication, the reference key stored in the illegitimate SSD device SD1 does not match with the authentication key KE2 in the authentication program PR1 of the illegitimate SSD device SD1. This enables accurate authentication of whether or not the SSD device SD1 is a legitimate one, and enables prevention of reading and running of a game program PR2 in an illegitimate SSD device SD1.

(Program/SSD Authentication)

Figure 108:
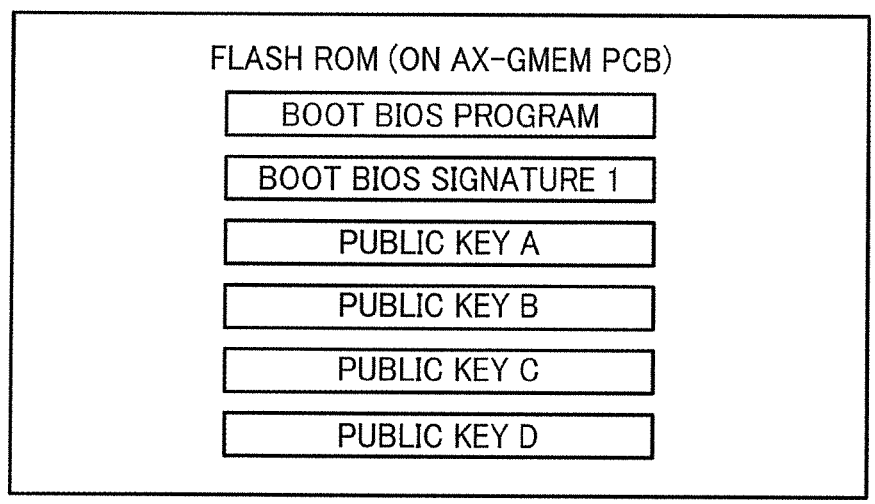
FIG. 108 is an explanatory diagram of program/SSD authentication.

The program/SSD authentication is detailed referring to FIG. 108, FIG. 109A and FIG. 109B. Namely, the "Boot BIOS self-authentication" includes the following steps A1 to A5. Step A1: The Boot BIOS program in the Flash ROM is loaded to the main memory and started, after powering ON. Step A2: The Boot BIOS program reads in a public key A. Step A3: The Boot BIOS program reads in a signature 1 of the Flash ROM region (hash value of data in the Flash ROM region), and decodes the same with the public key A. Step A4: The Boot BIOS program calculates the HMAC-SHA1 value (hash value) of the Flash ROM region. Step A5: The value decoded in Step A3 is compared with the value calculated in Step A4. If these values are equal to each other, the process proceeds to the OS authentication. On the other hand, an error is output if the values are different, and the booting process is stopped.

The "OS authentication" includes the following steps B1 to B5. Step B1: The Boot BIOS program reads in a public key B from the Flash ROM. Step B2: The Boot BIOS program reads in two signatures of the boot record region (encrypted data of boot loader HMAC-SHA1, and encrypted data of first partition HMAC-SHA1), and decodes the same with the public key B thereby obtaining two sets of decrypted data. It should be noted that the two sets of decrypted data are: decrypted data of the boot loader HMAC-SHA1, and decrypted data of the first partition HMAC-SHA1. Step B3: The Boot BIOS program calculates the HMAC-SHA1 value (hash value) of the boot record region. Step B4: The Boot BIOS program calculates the HMAC-SHA1 value (hash value: "reference data" of the present invention) of the partition 1. Step B5: The decrypted data of the boot loader HMAC-SHA1 decrypted in the step B2 is matched (compared) with the HMAC-SHA1 value of the boot record region calculated in the step B3. Further, the decrypted data of the first partition HMAC-SHA1 decrypted in the step B2 is matched (compared) with the HMAC-SHA1 value of the partition 1 region calculated in the step B4. When these sets of data match with the values respectively, the OS in the partition 1 is loaded to the main memory to boot the OS. If they do not match on the other hand, an error is output if the values are different, and the booting process is stopped. It should be noted that, since the partition 1 stores the authentication program (authentication program PR1), the authentication program PR1 is authenticated in the OS authentication. This way, it is possible to check if the game program PR2 is modified or not, prior to running of the game program PR2.

The "SSD authentication" includes the following steps X1 and X2. Step X1: The authentication program PR1 in the partition 1 reads, via the memory controller SD23, the reference key KE1 stored in the reference key storage unit SD 231 of the memory controller SD23 of the SSD device SD1. Step X2: The authentication program PR1 compares the reference key KE1 read in the step X1 with the authentication key KE2 contained as an internal variable in the authentication program PR1. When they are identical to each other, the SSD device SD1 is determined as to be a legitimate SSD device SD1, and the "Flash ROM Authentication" is executed. If they do not match on the other hand, an error is output if the values are different, and the booting process is stopped. This way, it is possible to prevent reading and running of the game program PR2 in an illegitimate SSD device SD1.

The "Flash ROM Authentication" includes the following steps C1 to C4. Step C1: The authentication program PR1 in the partition 1 reads in the public key A from the Flash ROM. Step C2: The authentication program PR1 in the partition 1 reads in a signature 2 of the Flash ROM region (hash value of the Flash ROM region), and decodes the same with the public key A. Step C3: The authentication program in the partition 1 calculates the HMAC-SHA1 value (hash value) of the Flash ROM region. Step C4: The value decoded in Step C2 is compared with the value calculated in Step C3. If these values are equal to each other, the process proceeds to the base code authentication. If they do not match on the other hand, an error is output if the values are different, and the booting process is stopped.

The "Base code authentication" includes the following steps C5 to C9. Step C5: The authentication program PR1 in the partition 1 checks if there is any file other than Base-Code.bin in the partition 2. If there is no other file, the process proceeds to Step C2. On the other hand, an error is output if there is another file, and the booting process is stopped. Step C6: The authentication program PR1 reads in a public key C from the Flash ROM. Step C7: The authentication program PR1 reads in a signature (hash value of data of BaseCode.bin) embedded at the end of the BaseCode.bin in the partition 2, and decodes the same with the public key C. Step C8: The authentication program PR1 calculates the HMAC-SHA1 (hash value) of the BaseCode.bin in the partition 2. Step C9: The value decoded in Step C3 is compared with the value calculated in Step C4. If these values are equal to each other, the process proceeds to the Game Authentication.

The "Game Authentication" includes the following steps D5 to D9. Step D1: The authentication program PR1 in the partition 3 checks if there is any file other than Game.bin in the partition 3. If there is no other file, the process proceeds to Step D2. On the other hand, an error is output if there is another file, and the booting process is stopped. Step D2: The authentication program PR1 reads in a public key D from the Flash ROM. Step D3: The authentication program PR1 reads in a signature (hash value of data of partition 3) embedded at the end of the Game.bin in the partition 3, and decodes the same with the public key D. Step D4: The authentication program PR1 calculates the HMAC-SHA1 (hash value) of the Game.bin in the partition 3. Step D5: The value decoded in Step D3 is compared with the value calculated in Step D4. If these values are equal to each other, transition to the boot sequence occurs.

(Boot Sequence)

Figure 110A:
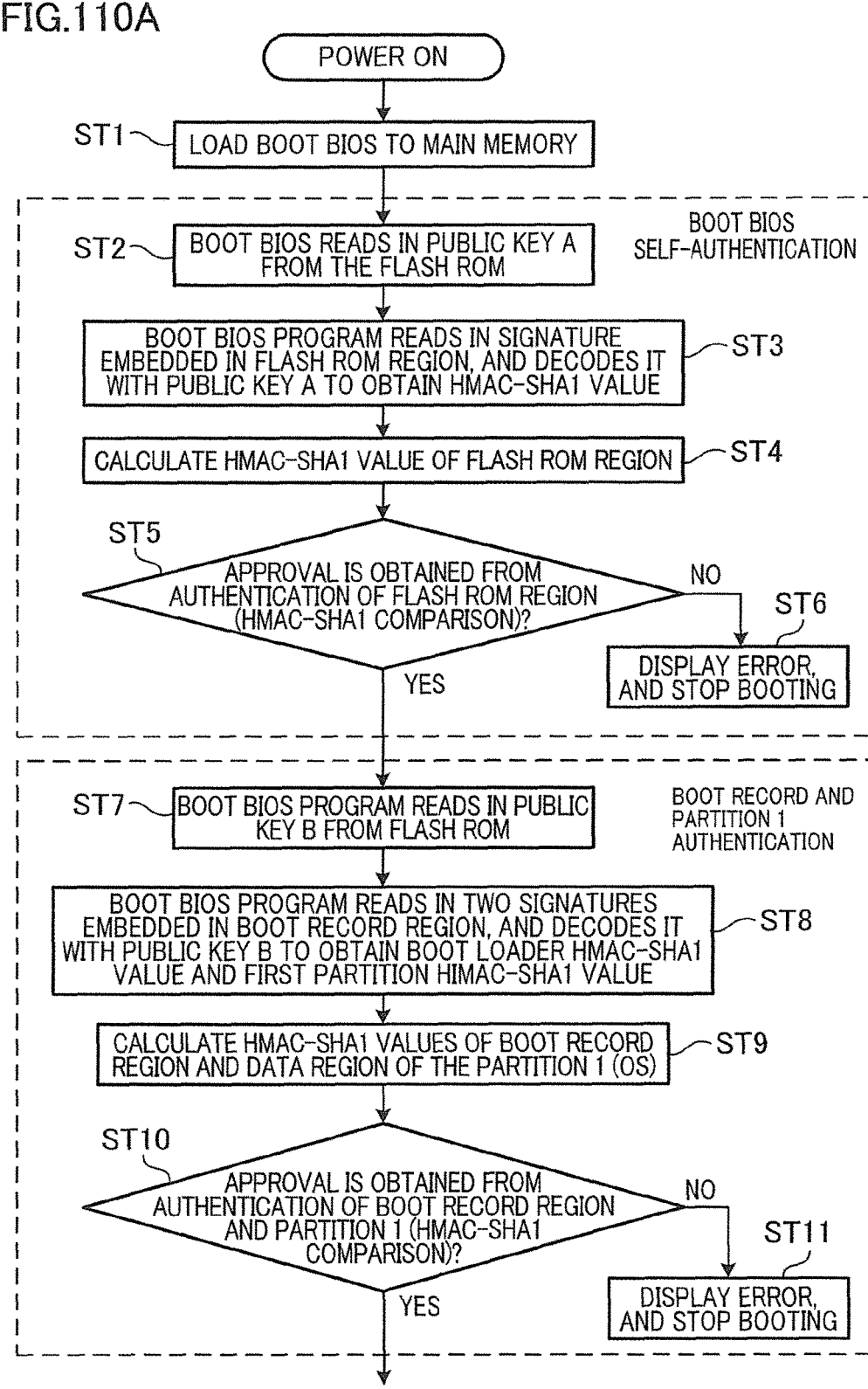
FIG. 110A is a flowchart of a boot sequence.

Next, the following details the boot sequence which performs the program/SSD authentication. It should be noted that the boot sequence is executed when booting the slot machine 1, by the main processor (CPU cores AM103a to AM103d of FIG. 100B) having the CPU function. As shown in FIG. 110A, the Boot BIOS self-authentication runs upon powering on. Specifically, the Boot BIOS is loaded to the main memory (ST1). The Boot BIOS reads in a public key A from the Flash ROM (ST2). The Boot BIOS program reads in a signature embedded in the Flash ROM region, and decodes the same with the public key A to obtain an HMAC-SHA1 value (ST3). The HMAC-SHA1 value of the Flash ROM region is calculated (ST4). Whether or not the approval is obtained from the authentication of the Flash ROM region (HMAC-SHA1 comparison) is determined (ST5). If approval is not obtained (ST5: NO), an error is displayed, and the booting process is stopped (ST6).

On the other hand, if the approval is obtained (ST5: YES), a Boot Record and Partition Authentication process is executed. Specifically, the Boot BIOS program reads in a public key B from the Flash ROM (ST7). The Boot BIOS program reads in two signatures embedded in the Boot Record region, and decodes them with the public key B to obtain a boot loader HMAC-SHA1 value and first partition HMAC-SHA1 value ("decrypted data" of the present invention) (ST8). The Boot BIOS program calculates the HMAC-SHA1 values of the Boot Record region and the data region of the partition 1 (OS) (ST9). Whether or not the approval (successful result) is obtained from the authentication of the Boot Record region and the partition 1 is determined (ST10). In this step, the boot loader HMAC-SHA1 value derived in the step ST8 is compared with the HMAC-SHA1 value of the Boot Record region calculated in the step ST9, and the first partition HMAC-SHA1 value derived in the step ST8 is compared with the HMAC-SHA1 value of the data region of the partition 1 (OS), which is calculated in the step ST9. When the values match with each other, Boot Record region and the partition 1 is approved (authentication successful). If the Boot Record region and the partition 1 are disapproved (i.e., authentication failed) (ST10: NO), an error is displayed, and the booting process is stopped (ST11).

On the other hand, as shown in FIG. 110B, if the approval is obtained (ST10: YES), the OS in the SSD substrate SD2 is loaded to the main memory (ST12). The OS is then started (ST13).

After that, the authentication program PR1 stored in the partition 1 is executed to execute the process of comparing the authentication key. To be more specific, the main processor (CPU cores AM103a to AM103d of FIG. 100B) having the CPU function causes the memory controller SD23 of the SSD device SD1 to read the reference key KE1 stored in the authentication key storage unit SD231 in the memory controller SD23 (FIG. 109B) of the SSD device SD1, and to transmit the reference key KE1 read out, thereby obtaining the reference key KE1 from the memory controller SD23 (ST14).

Using this reference key KE1 thus obtained, whether or not the SSD device SD1 is a legitimate SSD device is determined (ST15). In this step, specifically, the reference key KE1 read from the authentication key storage area SD231 of the SSD device SD1, via the memory controller SD23, is compared with the authentication key KE2 contained as an internal variable in the authentication program PR1 stored in the partition 1. When the reference key KE1 and the authentication key KE2 are not identical to each other as the result of the step, the mounted SSD device SD1 is determined as not to be a legitimate SSD device (ST15: NO). In this case, an error is indicated and the booting is stopped (ST16).

On the other hand, when these keys are identical to each other, the mounted SSD device SD1 is determined as to be a legitimate SSD device (ST15: Yes), and the Boot BIOS Authentication process is executed. Specifically, the authentication program PR1 in the partition 1 reads in the public key A from the Flash ROM (ST17). The authentication program PR1 in the partition 1 reads in a signature embedded in the Flash ROM region, and decodes the same with the public key A to obtain an HMAC-SHA1 value (ST18). The HMAC-SHA1 value of the Flash ROM region is calculated (ST19). Whether or not the approval is obtained from the authentication of the Flash ROM region (HMAC-SHA1 comparison) is determined (ST20). If approval is not obtained (ST20: NO), an error is displayed, and the booting process is stopped (ST21).

On the other hand, if the approval is obtained (ST20: YES), a partition 2 authentication process is executed. Specifically, whether or not the partition 2 contains only BaseCode.bin is determined (ST22). If there is data other than BaseCode.bin (ST22: NO), an error is displayed, and the booting process is stopped (ST23). On the other hand, if there is only BaseCode.bin (ST22: YES), the self-authentication program PR1 reads in a public key C from the Flash ROM (ST24). The self-authentication program PR1 reads in a signature embedded at the end of the BaseCode.bin in the partition 2, and decodes the same with the public key C to obtain an HMAC-SHA1 value (ST25). The HMAC-SHA1 value of the BaseCode.bin excluding the size of the signature is calculated (ST26). Whether or not the approval is obtained from the authentication of the BaseCode.bin (HMAC-SHA1 comparison) is determined (ST27). If approval is not obtained (ST27: NO), an error is displayed, and the booting process is stopped (ST28).

Figure 110C:
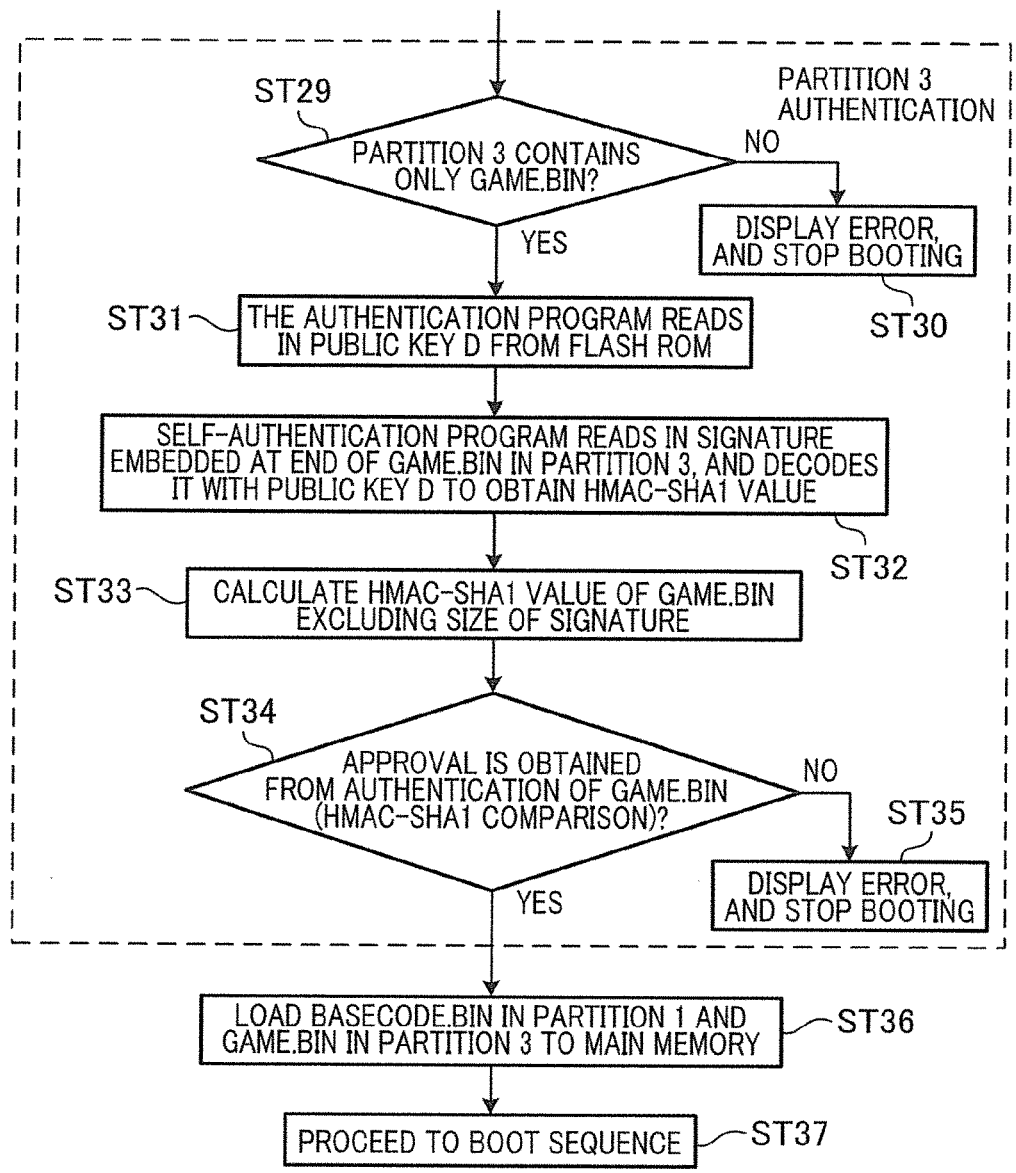
FIG. 110C is a flowchart of the boot sequence.

On the other hand, if the approval is obtained (ST27: YES), a partition 3 authentication process is executed, as shown in FIG. 110C. Specifically, whether or not the partition 3 contains only Game.bin is determined (ST29). If there is data other than Game.bin (ST29: NO), an error is displayed, and the booting process is stopped (ST30). On the other hand, if there is only Game.bin (ST29: YES), the self-authentication program PR1 reads in a public key D from the Flash ROM (ST31).

The self-authentication program PR1 reads in a signature embedded at the end of the Game.bin (game program PR2) in the partition 3, and decodes the same with the public key D to obtain an HMAC-SHA1 value (ST32). The HMAC-SHA1 value of the Game.bin excluding the size of the signature is calculated (ST33). Whether or not the approval is obtained from the authentication of the Game.bin (HMAC-SHA1 comparison) is determined (ST34). If approval is not obtained (ST34: NO), an error is displayed, and the booting process is stopped (ST35). On the other hand, if the approval is obtained (ST34: YES), the BaseCode.bin (game program PR2) in the partition 3 and the Game.bin in the partition 3 are loaded to the main memory (ST36). The process then proceeds to boot sequence (ST37). Then, after the work memory and sensors in the memory substrate MM6, the driving mechanism, illumination, and the like are checked in the boot sequence, the game program PR2 is executed to display a demo screen and to cause transition to a game running process, thus running a game on the slot machine 1.

(Game Running Process)

Figure 111:
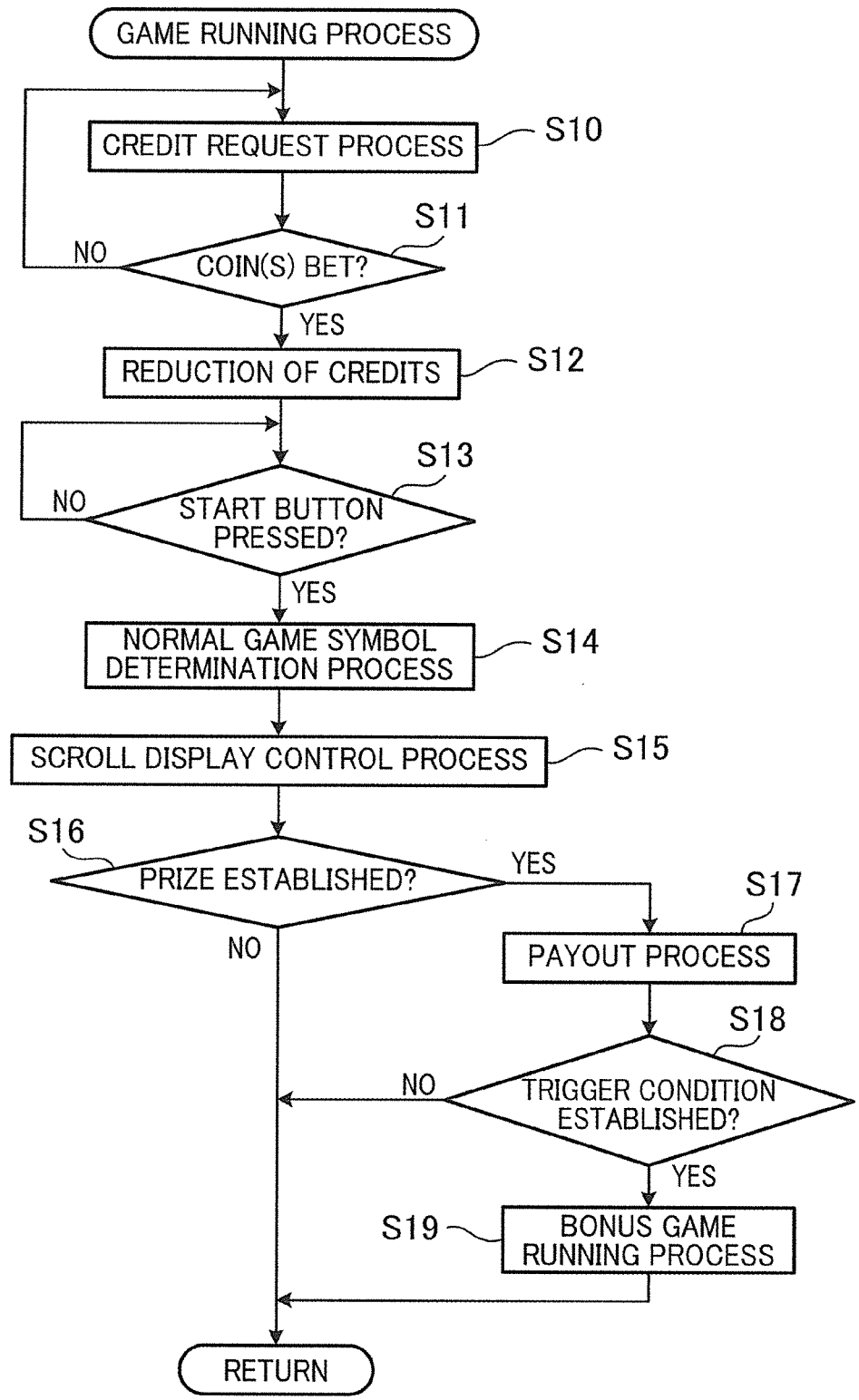
FIG. 111 is a flowchart of a game running process.

As shown in FIG. 111, when the game running process starts, the main CPU executes a credit request process (S10). In this process, the player determines how many credits are used from the credits stored in the IC card.

Then whether a coin is bet is determined (S11). When it is determined that no coin is bet (S11: NO), the process goes back to S10. In the meanwhile, if it is determined in S11 that a coin is bet (S11: YES), a process of decreasing the number of credits stored in the RAM 73 in accordance with the number of coins bet is executed (S12). When the number of coins bet is larger than the number of credits, the step of decreasing the number of credits is not carried out and the process goes back to S11. When the number of coins bet is larger than the maximum number of coins on one game, the step of decreasing the number of credits stored in the RAM 73 is not carried out and the process proceeds to S13.

Then whether the button switch CP1 (start button) is pressed is determined (S13). When the start button is not pressed (S13: NO), the process goes back to S13. It is noted that, when the start button is not pressed (e.g., when an instruction to end a game is input while the start button is not pressed), the reduction result in S12 is canceled.

In the meanwhile, if it is determined in S13 that the start button is pressed (S13: YES), a normal game symbol determination process is executed (S14). In the normal game symbol determination process, code numbers when the symbols are stopped are determined. More specifically, a random number is sampled, and the code number when each symbol array of the reel device M1 stops is determined based on the sampled random number and a normal game symbol table.

Then a scroll display control process is executed. In this process, the display control is conducted so that, after the start of the scroll of the symbols by rotating each reel M3 of the reel device M1, the symbols determined in S14 are rearranged.

Thereafter, whether a prize is established is determined (S16). Regarding the symbols rearranged in accordance with S15, the number of symbols of each type rearranged on each payline L is counted. Then whether the number of the symbols of each type is at least two is determined. Furthermore, whether a predetermined number or more of trigger symbols such as scatter symbols are rearranged irrespective of the paylines L is determined.

When a prize is not established in S16 (S16: NO), the routine is terminated. When it is determined that a prize is established (S16: YES), a step concerning the payout of coins is executed (S17). In this step, for example, a payout rate is determined with reference to odds data and based on the number of symbols rearranged on a payline L. The odds data indicates the relationship between the number of symbols rearranged on a payline L and a payout rate. Each time one "WILD" is displayed on a payline L where winning is established, the payout is doubled. That is to say, when three "WILD" are displayed on a payline L where winning is established, the payout is multiplied eight times.

A prize may be established when at least one type of two or more symbols are rearranged on a payline L, or, when no payline L is provided, a prize may be established when at least one type of two or more symbols are rearranged.

Subsequently, whether a trigger condition is established as a result of the rearrangement of a predetermined number or more of trigger symbols such as scatter symbols is determined (S18). When the trigger condition is not established (S18: NO), the routine is terminated. In the meanwhile, when the trigger condition is established (S18: YES), a bonus game execution process is executed (S19).

(Temperature Management Process)

When the game is being run by the game running process as above, a temperature management process is being executed. In the temperature management process, a first temperature sensor and a second temperature sensor with different monitored temperatures are provided in the power source unit RU, and an error process (error leaving, lockup, or the like) is performed during a game upon the detection by the first temperature sensor with a low temperature setting, and immediate shutdown is performed upon the detection by the second temperature sensor with a high temperature setting. The monitored temperatures of the first temperature sensor are a first threshold temperature and a second threshold temperature which is lower than the first threshold temperature. The monitored temperature of the second temperature sensor is a third threshold temperature which is higher than the first threshold temperature. The first temperature sensor is arranged to output a first power source temperature detection signal which is turned on when the temperature is not lower than the first threshold temperature and is turned off when the temperature is not higher than the second threshold temperature. The second temperature sensor outputs a second power source temperature detection signal which is turned on when the temperature is not lower than the third threshold temperature.

While in the present embodiment the first temperature sensor and the second temperature sensor output sensor signals indicating the first threshold temperature and the like, the disclosure is not limited to this arrangement. For example, the following arrangement may be employed: the first temperature sensor and the second temperature sensor output sensor signals of voltage or current values in proportion to a sensed temperature, as digital or analog amounts, and a control device determines the first threshold temperature based on the sensor signals and a first threshold, determines the second threshold temperature based on the sensor signals and a second threshold, and determines the third threshold temperature based on the sensor signals and a third threshold.

Figure 112:
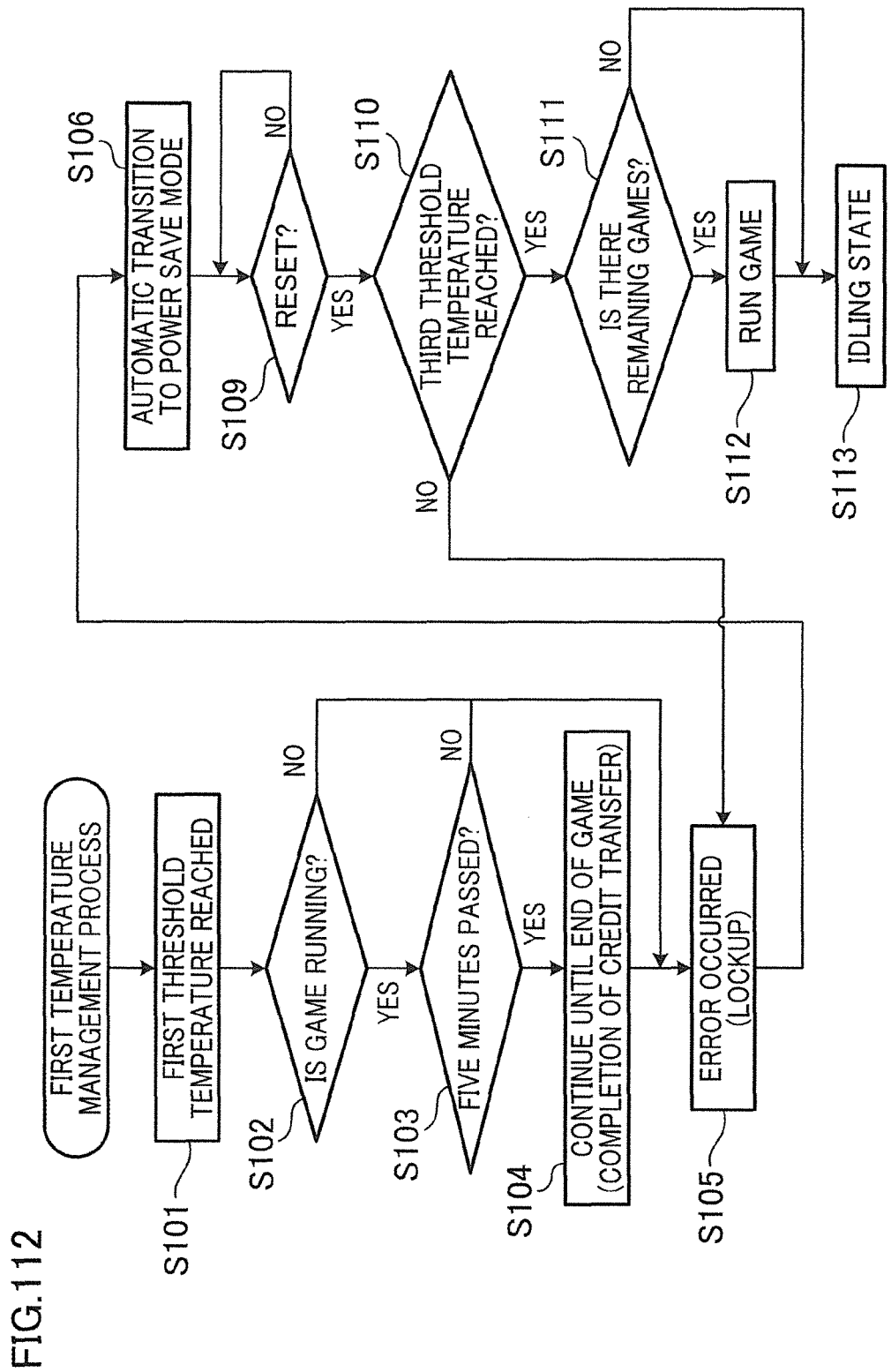
FIG. 112 is a flowchart of a first temperature management process.
Figure 113:
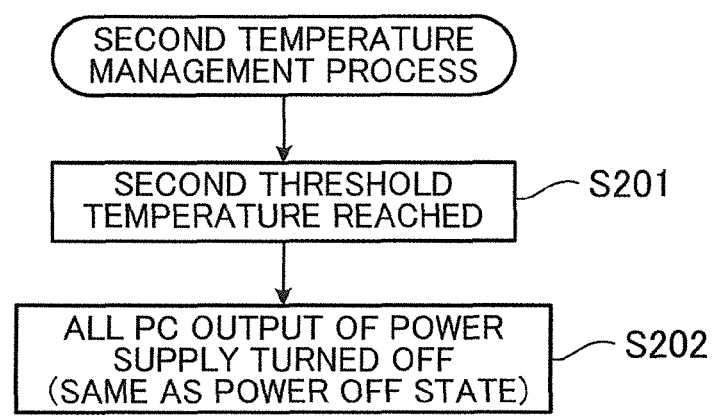
FIG. 113 is a flowchart of a second temperature management process.

The temperature management process includes a first temperature management process shown in FIG. 112 and a second temperature management process shown in FIG. 113, and is executed in parallel to the game running process. The first and second temperature management processes are not executed before the game activation with which the game running process starts, and are executed once before an idle state is set and then executed repeatedly at intervals of one minute or shorter, after the game activation with which the game running process starts.

(Temperature Management Process: First Temperature Management Process)

In the first temperature management process, an error process and an error cancellation process are executed based on a signal from the first temperature sensor mounted on the power source device. The error process is executed when the first temperature sensor outputs the first power source temperature detection signal in the off state. The error cancellation process is executed when the first temperature sensor outputs the first power source temperature detection signal in the on state. When the error process is being executed, the occurrence of an error in the power source device is notified to the player or the like as a power source device error is displayed on an error meter.

To be more specific, the first power source temperature detection signal output from the first temperature sensor of the power source device is monitored by the second GM substrate GM2, and the second GM substrate GM2 executes the first temperature management process based on the first power source temperature detection signal.

As shown in FIG. 112, to begin with, whether the first power source temperature detection signal is in the on state is determined. The error process is executed when the signal is turned on, i.e., when the temperature of the power source device reaches the first threshold temperature (S101). Thereafter, whether a game is in progress is determined (S102). When the game is in progress (S102: YES), whether five minutes have passed after the first threshold temperature is reached is determined (S103). When five minutes have not passed (S103: NO), the steps are executed until the end of the game (completion of credit transfer) to finish the game which is currently run (S104). Then an error occurrence process (lockup state) is executed (S105). When the game is not in progress in S102 (S102: NO), the error occurrence process (lockup state) is executed (S105).

Subsequently, shifting to a power save mode is automatically done (S106), and whether resetting is to be executed based on a reset signal which is output in response to the pressing of the reset key switch RS is determined (S109). When the resetting is not executed (S109: NO), the device is on standby in the power save mode.

In the meanwhile, when the resetting is executed (S109: YES), whether the first power source temperature detection signal is in the off state is determined, and whether the temperature of the power source device has reached the second threshold temperature due to temperature decrease is determined (S110). When the temperature has not reached the second threshold temperature (S110: NO), shifting to S105 is executed and the error process is continued. In the meanwhile, when the temperature has reached the second threshold temperature (S110: YES), the error process is canceled, and whether there is a not-yet-run game is determined (S111). When there is such a not-yet-run game (S111: YES), the game is run (S112) and then shifting to the idle state is executed (S113). In the meanwhile, when there is no not-yet-run game (S111: NO), shifting to the idle state is executed (S113).

(Temperature Management Process: Second Temperature Management Process)

In the second temperature management process, the power source substrate executes a shutdown process based on a signal from the second temperature sensor mounted on the power source device. The shutdown process is executed when the second temperature sensor outputs the second power source temperature detection signal in the on state.

To be more specific, the second power source temperature detection signal output from the second temperature sensor of the power source device is monitored by the power source substrate, and the power source substrate executes the second temperature management process based on the second power source temperature detection signal. As shown in FIG. 113, whether the second power source temperature detection signal is in the on state is determined. When the signal is turned on, i.e., when the temperature of the power source device reaches the third threshold temperature (S201), the output of the electric power from the power source device to all substrates is turned off, and the state becomes identical with the power off state (S202).

If there is a not-yet-run game when the temperature reaches the third threshold temperature, the output of the electric power from the power source device to all substrates may be turned off after the game which is currently run is finished. Furthermore, it is preferable to arrange the operation not to be stopped due to the error process, until a credit is recorded in response to the insertion of a bill or a ticket. This is because, without such an arrangement, the inserted bill or ticket is not recorded as a credit. Furthermore, preferably, the error process is not executed while the cash out button is pressed and a ticket is being issued, and the error process starts after the completion of the issuance of the ticket. Furthermore, preferably, the error process immediately starts during another error or when a door is open.

Embodiment 2

Next, Embodiment 2 of the present invention is described below. It should be noted that the following description of Embodiment 2 mainly deals with the topper device 2 which is a difference from the slot machine 1, and the members identical to those described in Embodiment 1 are given the same reference symbols.

(Outline of Topper Device T2)

Figure 114:
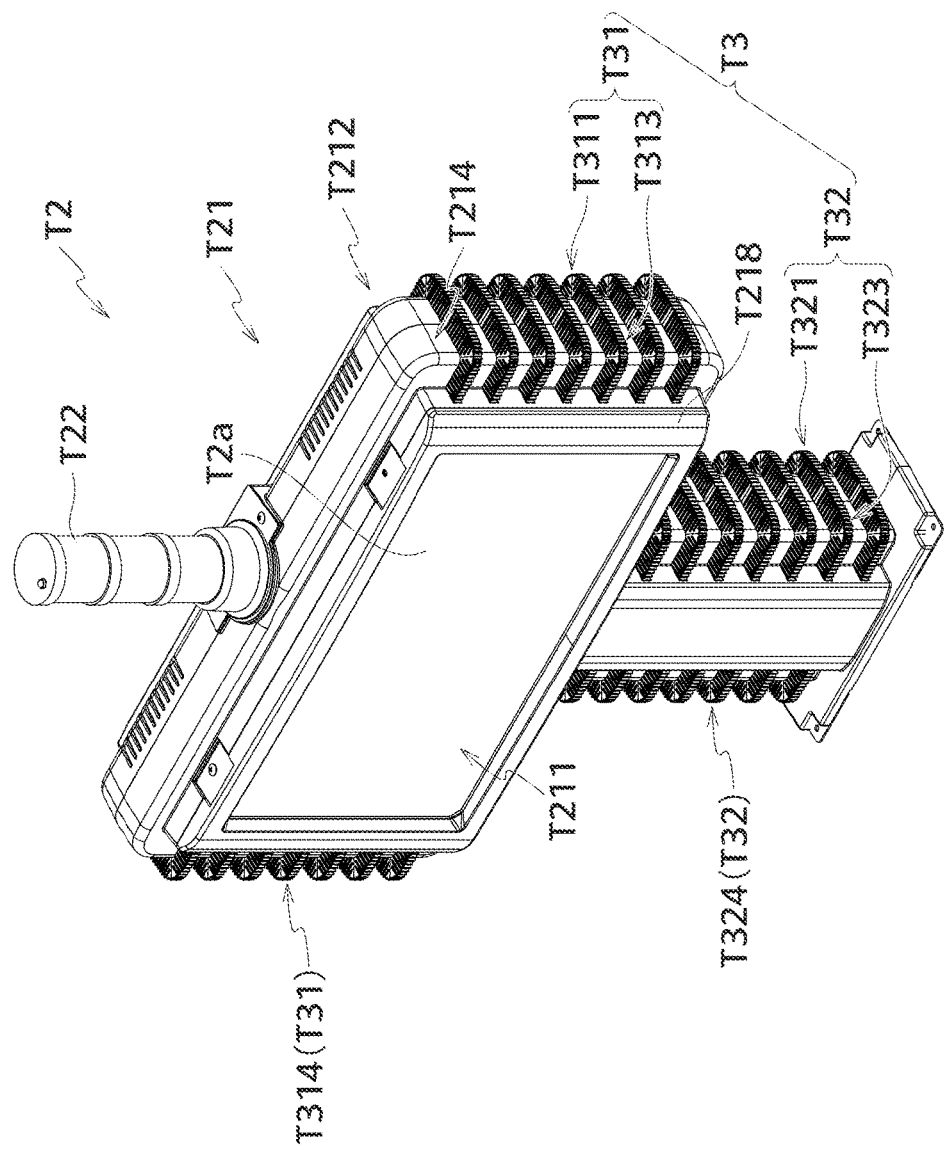
FIG. 114 is a perspective view of a topper device.

As shown in FIG. 114, the topper device T2 is provided on the top wall of the top device 3 (gaming machine main body 5) shown in FIG. 1 so as to be in the highest position of the slot machine 1. The topper device T2 has an illumination mechanism T3 for emitting illumination light to the surrounding environment. The topper device T2 has a function of making the slot machine 1 noticeable from a distant position, which is exerted in relation to the forward, while exerting the same to the sides and the back.

(Detailed Structure of Topper Device T2)

As shown in FIG. 114, the topper device T2 has a topper main body T21 having a display surface T2a, and a tower member T22 provided on the top wall of the topper main body T21. The tower member T22 has a cylindrical cover made of a transparent resin, and has therein a light emitting device such as LED. At the uppermost part of the slot machine 1, the tower member T22 lights in a single color or in a plurality of colors, thereby improving the visibility of the slot machine 1 from a distant position.

Figure 115:
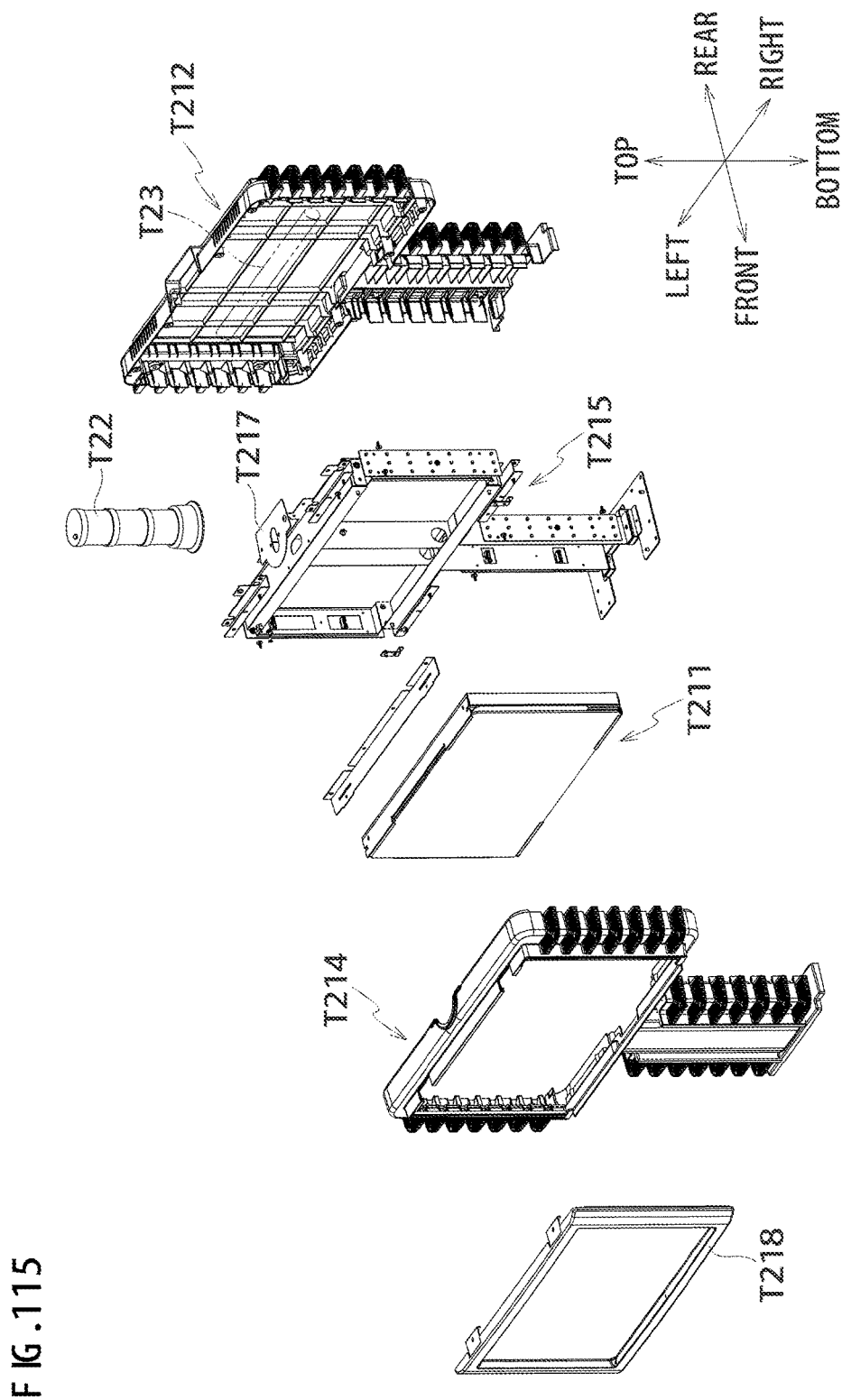
FIG. 115 is an exploded perspective view of the topper device.

As shown in FIG. 115, the topper main body T21 includes: a topper support mechanism T215 supporting the topper device T2 on top of the top device 3; a topper display device T211 disposed on the front side of the topper support mechanism T215 and configured to display the game content and a game title of the slot machine 1; a topper front cover T214 accommodating therein the topper display device T211; a frame member T218 disposed on the front side of the topper front cover T214 and decorates the periphery of the topper display device T211; a topper rear cover T212 disposed on the back side of the topper support mechanism T215 and jointed to the topper front cover T214; and an illumination mechanism T3 provided to the topper front cover T214 and the topper rear cover T212 and configured to emit illumination light to the surrounding environment.

(Topper Support Mechanism T215)

Figure 116:
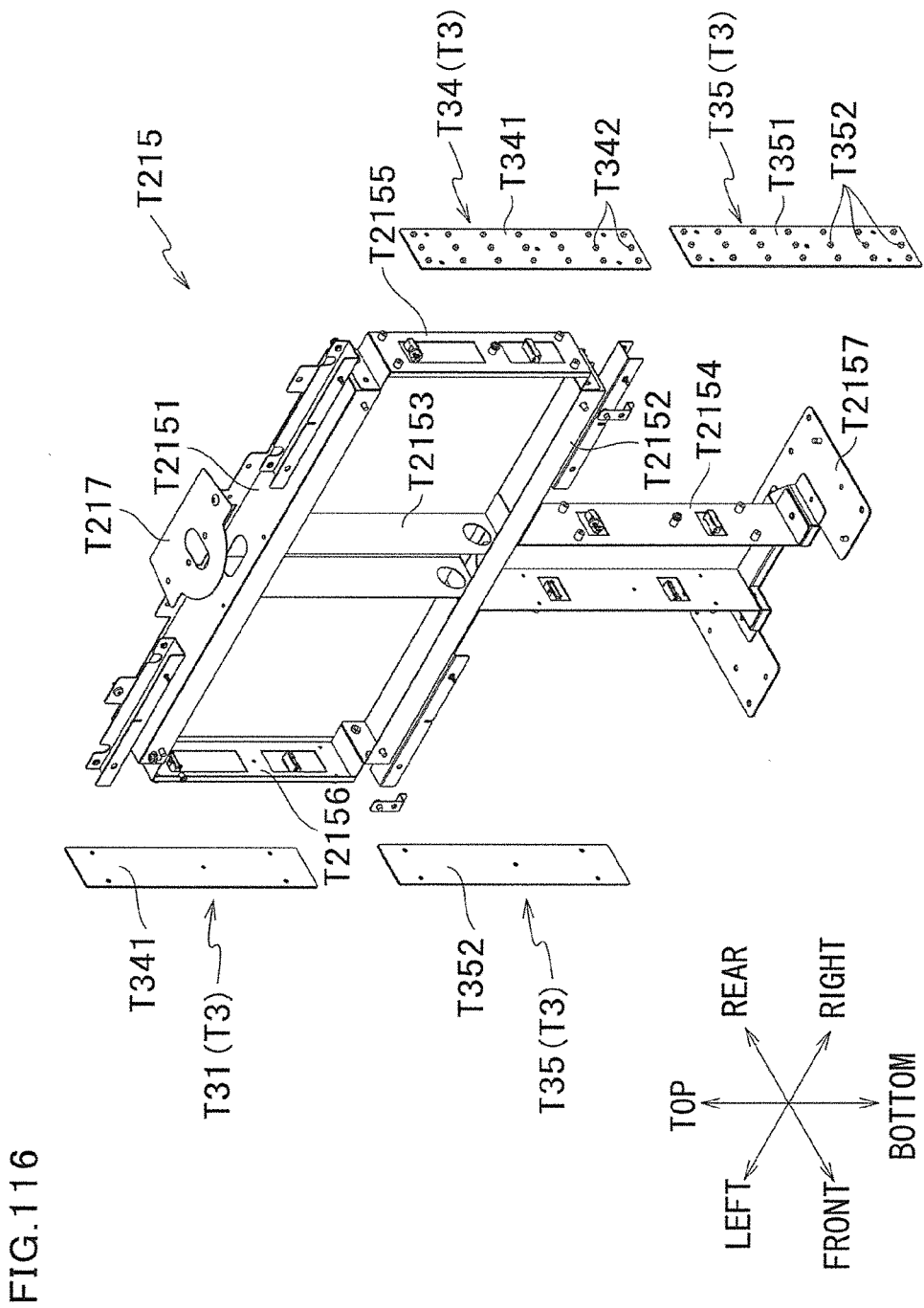
FIG. 116 is an exploded perspective view of the topper support mechanism.

As shown in FIG. 116, the topper support mechanism T215 includes: an upper sideway member T2151 horizontally displayed; a lower sideway member T2152 horizontally disposed below the upper sideway member T2151; an upper upright member T2153 linking middle portions of the upper sideway member T2151 and the lower sideway member T2152; a right upright member T2155 linking right end portions of the upper sideway member T2151 and the lower sideway member T2152; a left upright member T2156 linking left end portions of the upper sideway member T2151 and the lower sideway member T2152; a lower upright member T2154 whose upper end portion is jointed to the middle portion of the under surface of the lower sideway member T2152; and a fixing member T2157 jointed to the lower end portion of the lower upright member T2154 and fixed to the Top device 3 shown in FIG. 1 by screw fastening.

Figure 117:
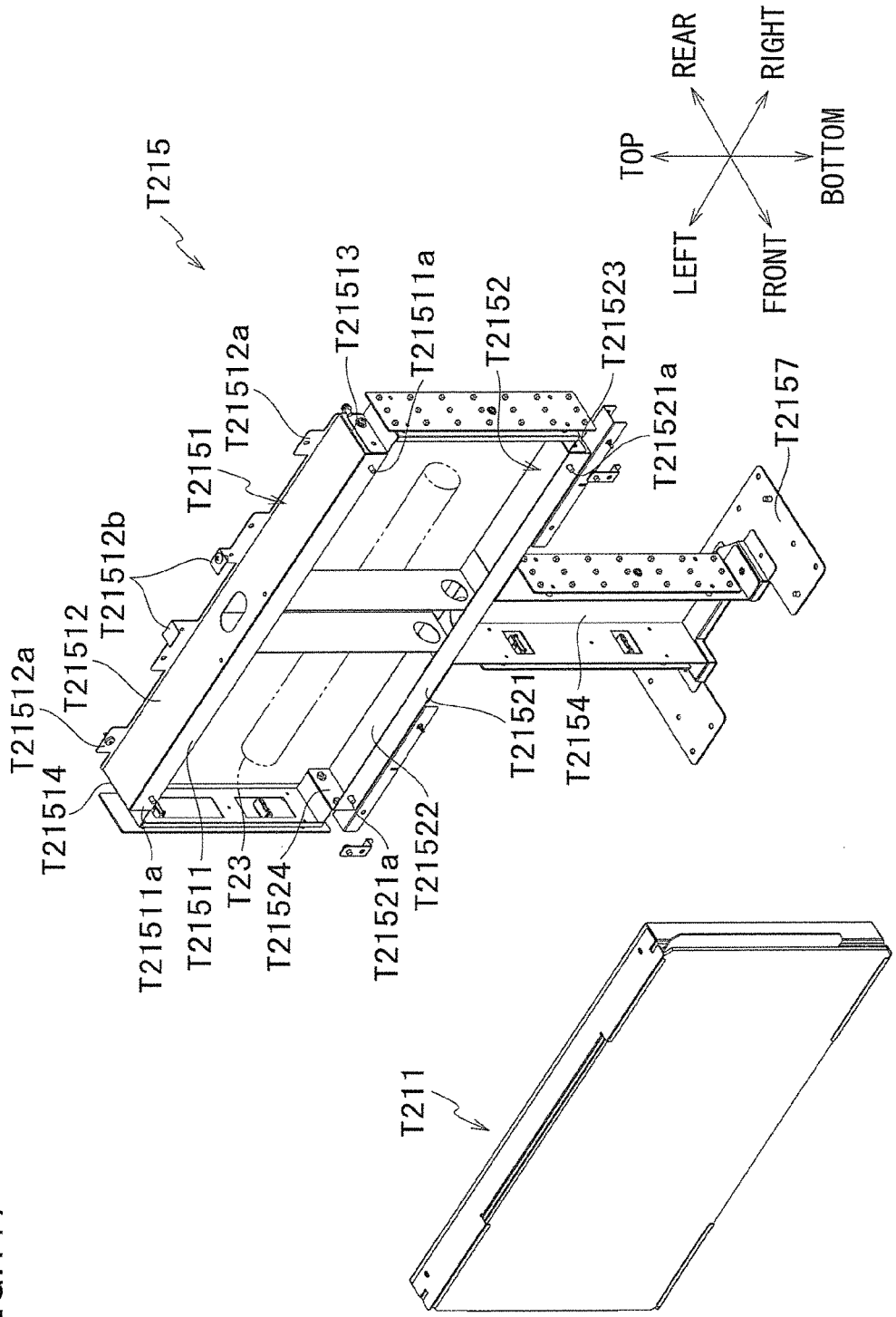
FIG. 117 is a perspective view of the topper support mechanism and the topper display device.

As shown in FIG. 117, the upper sideway member T2151 includes a front wall T21511, a top wall T21512, a right side wall T21513, and a left side wall T21514 which form a rectangular shape. To both end portions of the front wall T21511 are formed through holes T21511a. To both end portions of the front wall T21511 are formed through holes T21511a. The through holes T21511a are each used as a screw hole for screw fastening the topper display device T211. To the middle portion of the under surface of the top wall T21512 is jointed the upper end of the upper upright member T2153. To both end portions of the back side of the top wall T21512 are formed first fastening portions T21512a which are screw-fastened to the topper rear cover T212. To the middle portion of the back side of the top wall T21512 are formed first fastening portions T21512a which are screw-fastened to the topper rear cover T212.

The lower sideway member T2152 includes a front wall T21521, a bottom wall T21522, a right side wall T21523, and a left side wall T21524 which form a rectangular shape. To both end portions of the front wall T21521 are formed through holes T21521a. The through holes T21521a are each used as a screw hole for screw fastening the topper display device T211. To the top surface of the bottom wall T21522 is jointed the lower end of the upper upright member T2153. To the under surface of the bottom wall T21522 is jointed the upper end of the lower upright member T2154.

On the right upright member T2155 and the left upright member T2156, upper light source substrates T34 are symmetrically provided on the left and right with respect to the upper upright member T2153. On the right side surface and the left side surface of the lower upright member T2154 are provided lower light source substrates T35. These upper light source substrates T34 and the lower light source substrates T35 constitute a part of the illumination mechanism T3. The details of the illumination mechanism T3 are provided later.

(Topper Display Device T211)

Figure 118:
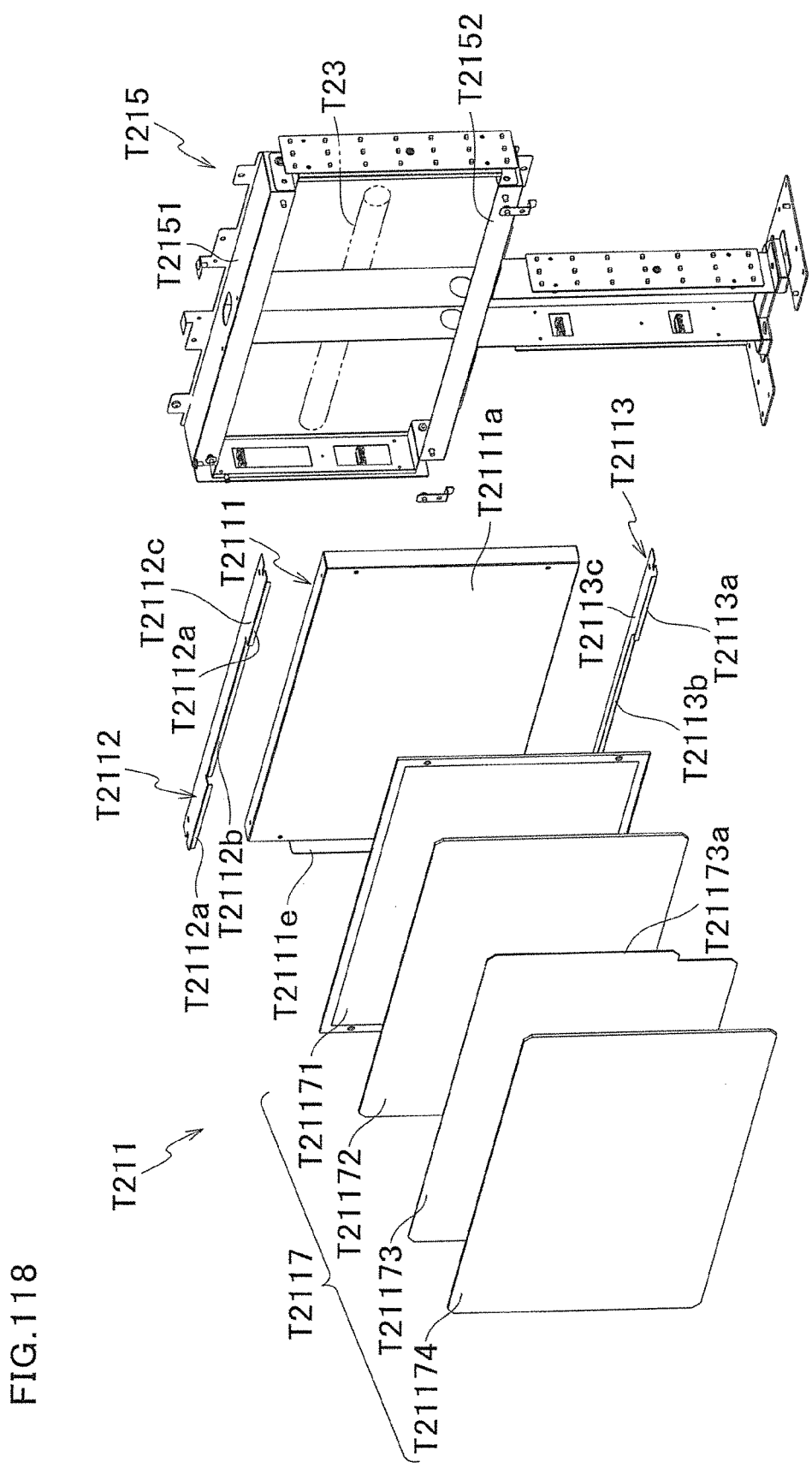
FIG. 118 is an exploded perspective view of the topper display device.

As shown in FIG. 118, the topper display device T211 includes: a TP light guide base T2111 fixed to the topper support mechanism T215, and a display plate module T2117 disposed on the front surface of the TP light guide base T2111. The TP light guide base T2111 is disposed in front of the backlight unit 23 shown in FIG. 115. The TP light guide base T2111 is made of a transparent resin, and is capable of letting pass light from the backlight unit T23. The TP light guide base T2111 includes: a front surface portion T2111a having a rectangular shape when viewed from the front side, and a first abutting portion T2111e protruding forward from the left-side middle portion of the front surface portion T2111a. The first abutting portion T2111e is formed so as to protrude by a length longer than the thickness of the display plate module T2117, and abuts the left end of the display plate module T2117.

Figure 119:
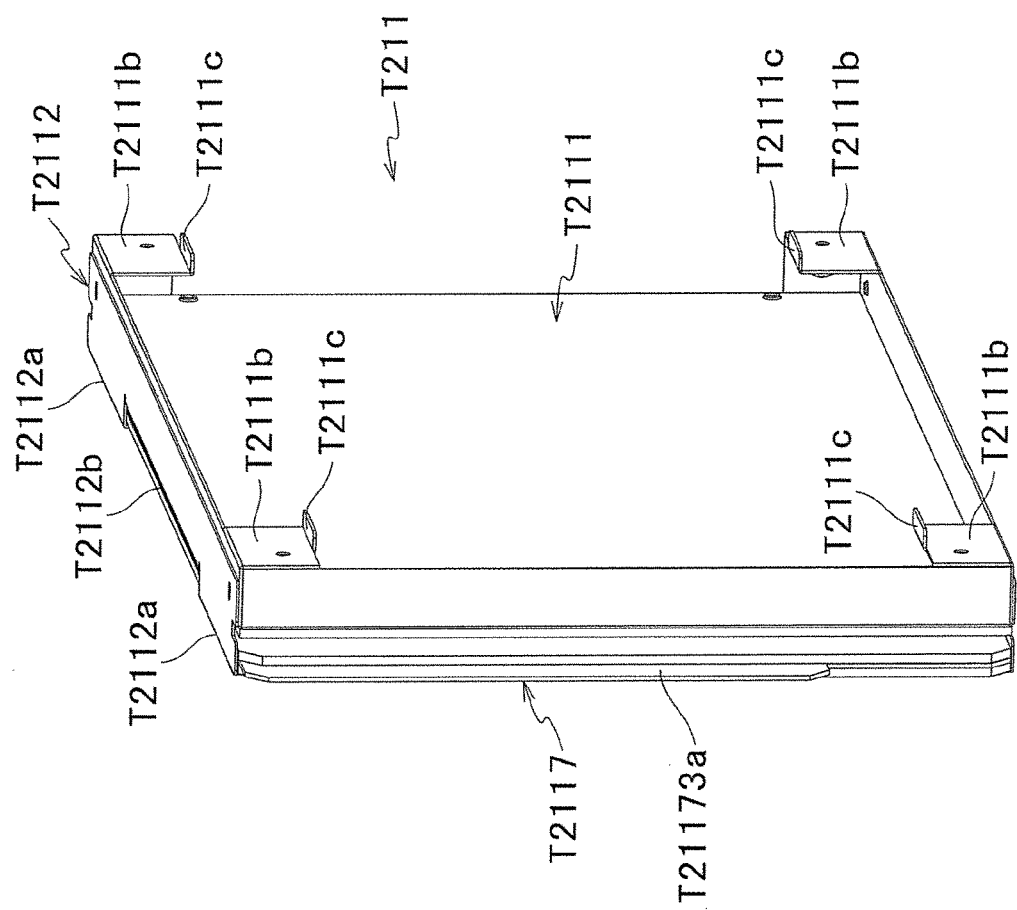
FIG. 119 is a perspective view of the topper display device.
Figure 120:
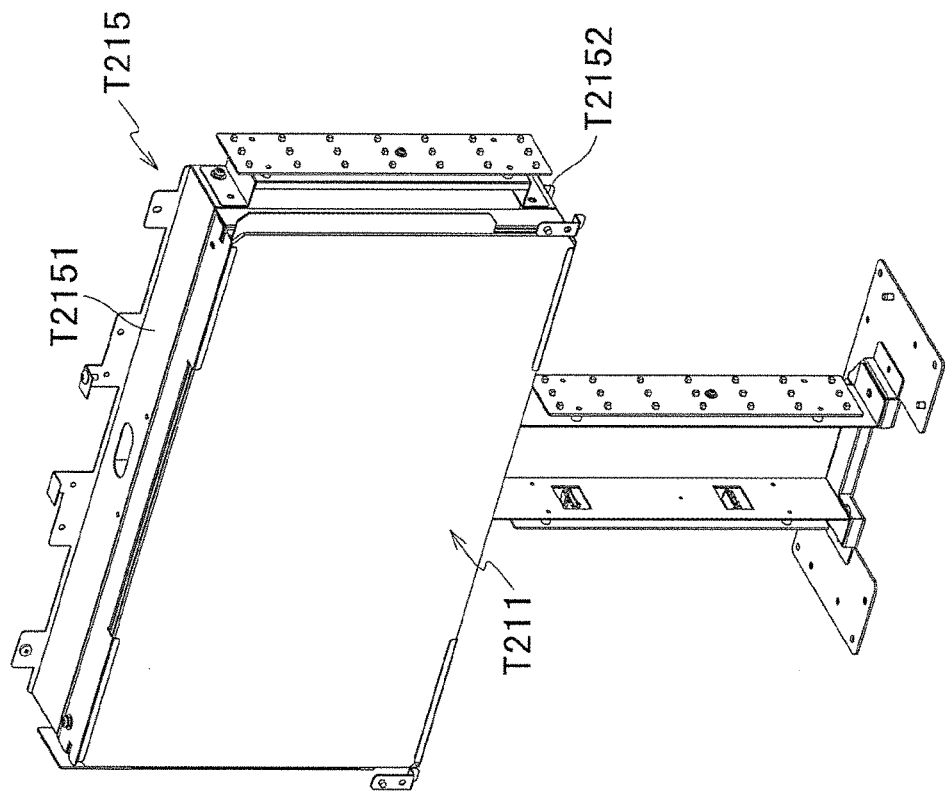
FIG. 120 is a perspective view of the topper support mechanism.

As shown in FIG. 119, the TP light guide base T2111 has an attachment portion T2111b in each corner portion on its back surface side. The attachment portion T2111b has a through hole for screw-fastening and its leading end portion T2111c is bent to extend backwards. With the leading end portions T2111c inserted between the upper sideway member T2151 and the lower sideway member T2152 shown in FIG. 118, the TP light guide base 2111 is easily attached to the topper support mechanism T215 of the topper display device T211, as shown in FIG. 120.

As shown in FIG. 118, to the upper end surface of the TP light guide base T2111 is provided an upper side plate holder T2112. The upper side plate holder T2112 includes: a planar portion T2112c horizontally disposed along the upper side of the TP light guide base T2111, first holding portions T2112a disposed on the left side portion and the right side portion at the front side of the planar portion T2112c, and a second holding portion T2112b disposed in the middle portion on the front side of the planar portion T2112c. The first holding portions T2112a are formed so as to stick out forward than the second holding portion T2112b, and forms a holding space parting the display plate module T2117 between the first holding portions T2112a and the second holding portion T2112b in side view.

To the lower end surface of the TP light guide base T2111 is provided a lower side plate holder T2113. The lower side plate holder T2113 has the same structure as that of the above described upper side plate holder T2112, and is disposed vertically symmetrical to the upper side plate holder T2112. That is, the lower side plate holder T2113 has a planer portion T2113c, first holding portions, and a second holding portion T2113b, and forms a holding space between the first holding portions T2113a and the second holding portion T2113b in side view.

(Topper Display Device T211: Display Plate Module T2117)

The upper side plate holder T2112 and the lower side plate holder T2113 holds the display plate module T2117 in the vertical direction and the forward/backward direction. Further, the display plate module T2117 has its left end abut the first abutting portion T2111e of the TP light guide base T2111, so that the first abutting portion T2111e restricts leftward movements.

The display plate module T2117 includes a light guiding plate T21171, a first base plate T21172, a design plate T21173, and a second base plate T21174. The light guiding plate T21171 has a function of emitting light forward, from its front surface side. The first base plate T21172 and the second base plate T21174 are made of a transparent material and are formed into the same rectangular shape of the same size. The design plate T21173 has an image suggestive of the game of the slot machine 1.

Figure 121:
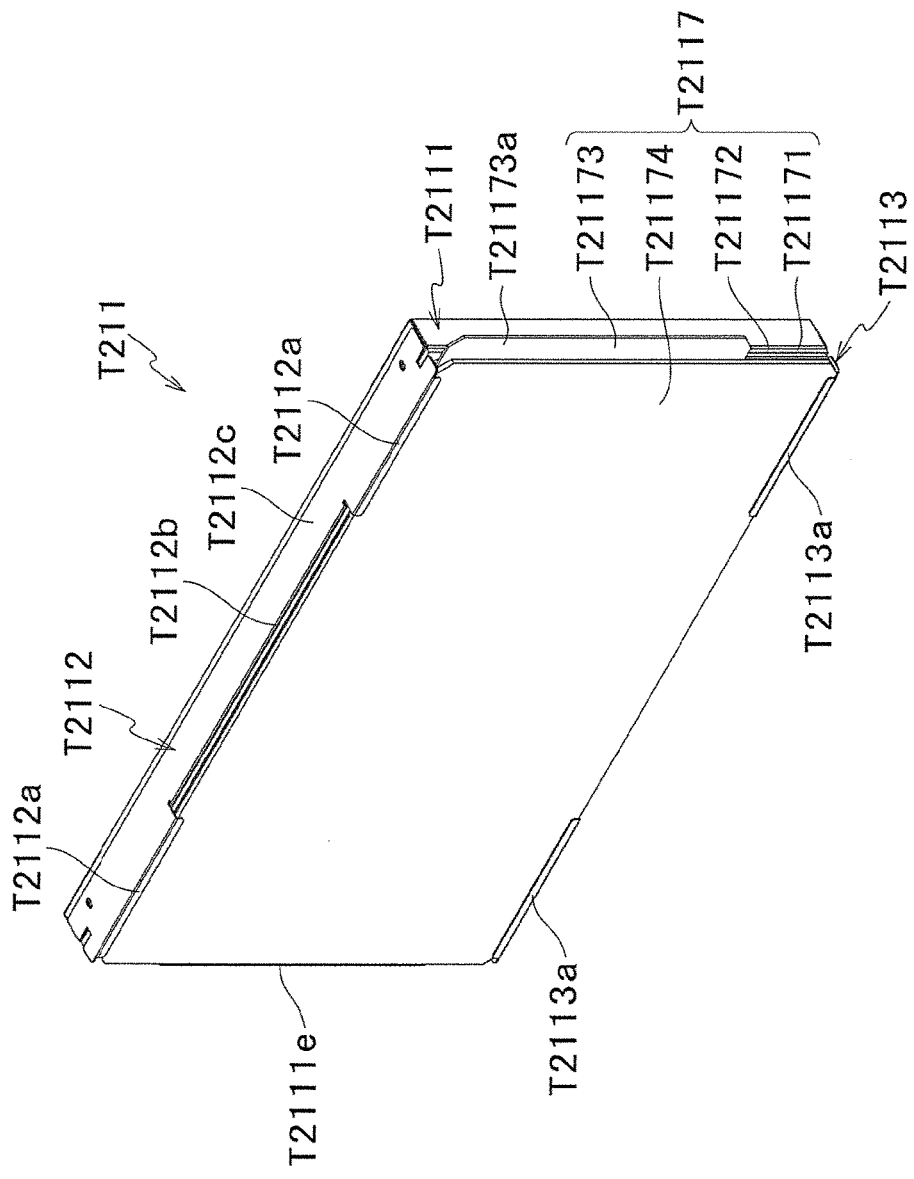
FIG. 121 is a perspective view of the topper display device.
Figure 122A:
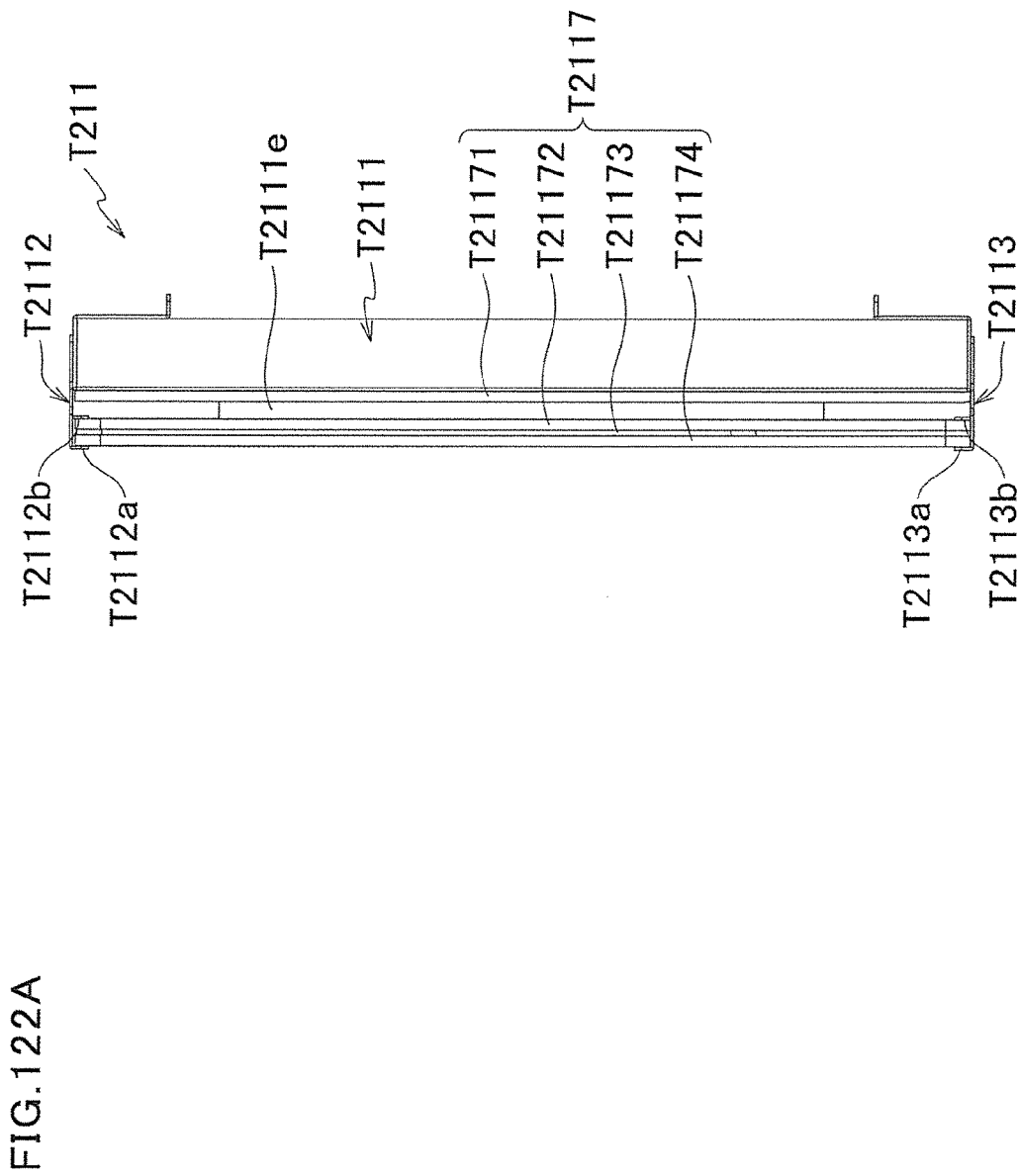
FIG. 122A is a side view of the topper display device.
Figure 122B:
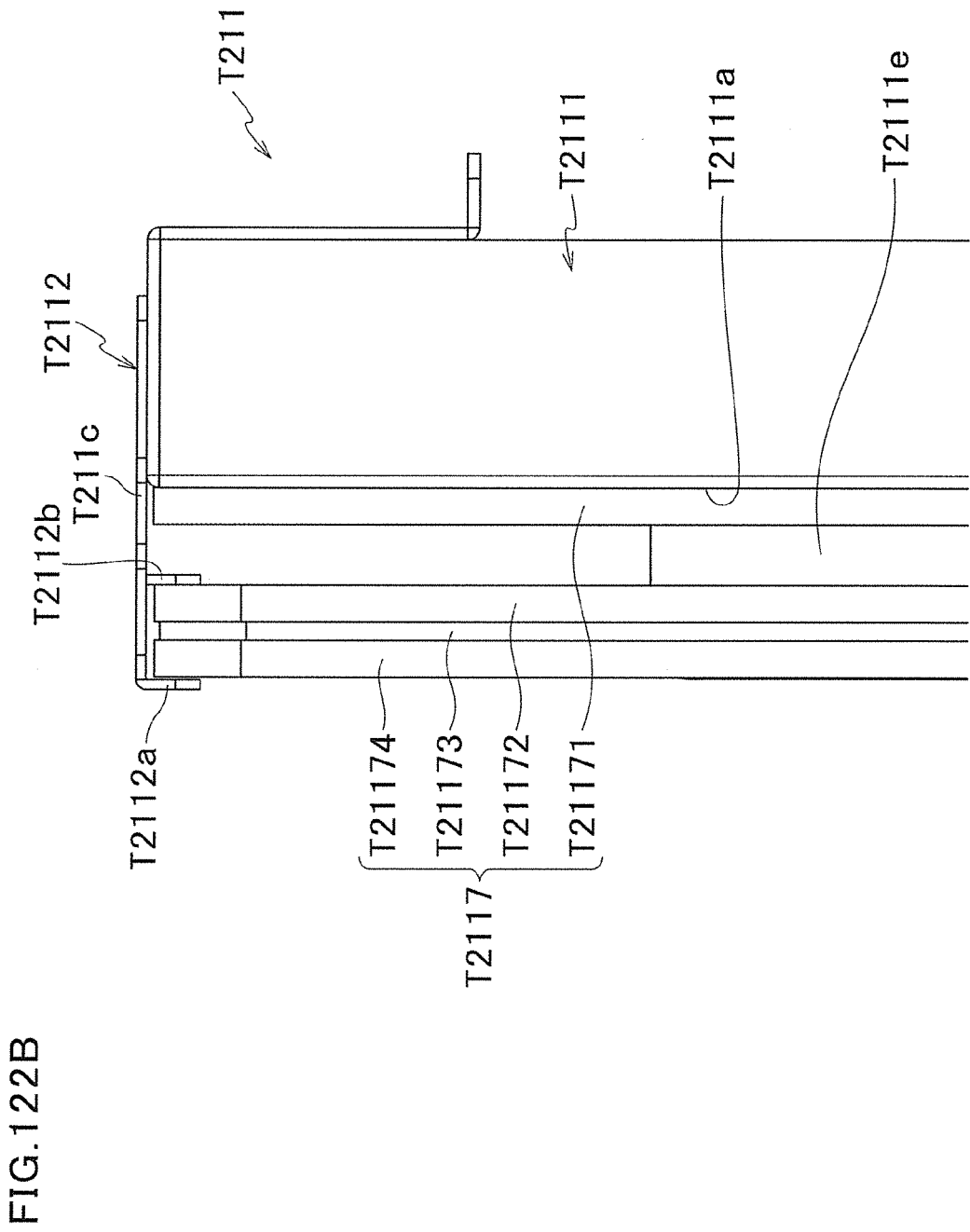
FIG. 122B is a side view of a main part of the topper display device.

The light guiding plate T21171 is attached to the front surface portion T2111a of the TP light guide base T2111, as shown in FIG. 121. As shown in FIG. 122A and FIG. 122B, on the front side of the light guiding plate T21171 are disposed the first base plate T21172, the design plate T21173, and the second base plate T21174. The light guiding plate T21171 emits a planer illumination light forward, from its entire front surface side. This makes the image on the design plate T21173 visible from outside via the second base plate T21174.

The upper side portions of these plates T21172, T21173, T21174 are sandwiched by the first holding portions T2112a and the second holding portion T2112b of the upper side plate holder T2112, and are held relative to the forward/backward directions in the holding space. The lower side portions of these plates T21172, T21173, T21174 on the other hand are sandwiched by the first holding portions T2113a and the second holding portion T2113b, and are held relative to the forward/backward directions in the holding space.

The design plate T21173 abuts the first base plate T21172 and the second base plate T21174 and is capable of moving. As shown in FIG. 121, to the right side of the design plate T21173 is an overhang portion T21173a. The overhang portion T21173a protrudes to the right side beyond the second base plate T21174. Thus, it is possible to detach or attach only the design plate T21173 from and to the topper display device T211, by using one hand to hold the second base plate T21174 at the forefront position of the display plate module T2117, while using the other hand to hold the overhang portion T21173a and move the same in the left/right direction. It should be noted that, in the topper display device T211, the display plate module T2117 may be a display device such as a liquid crystal display device.

(Topper Rear Cover T212)

Figure 123:
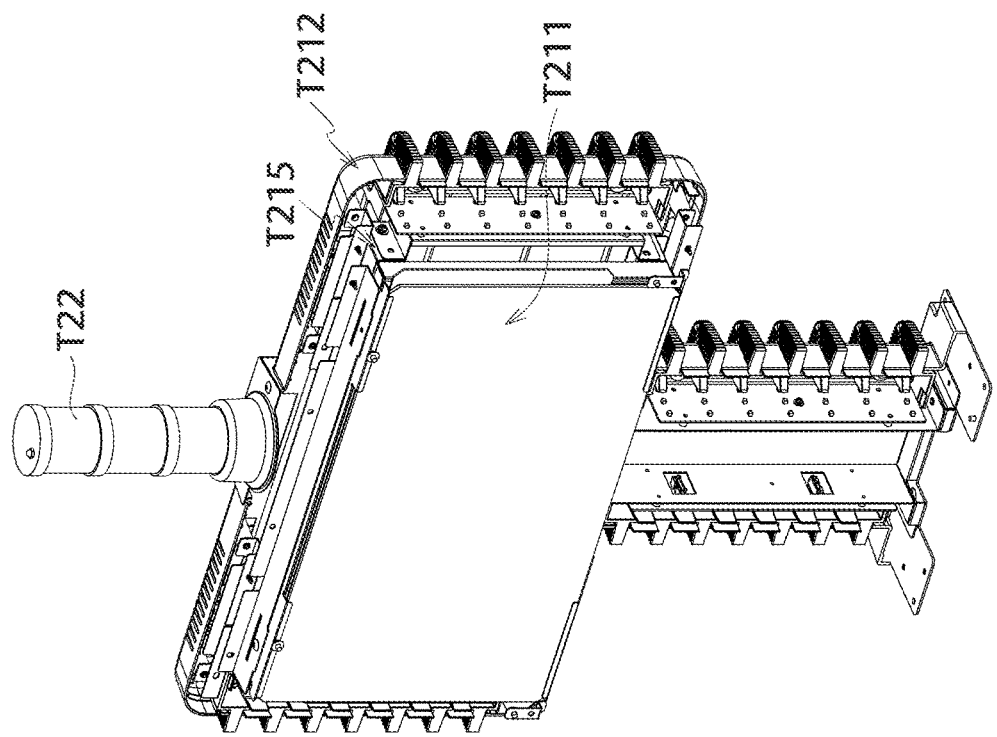
FIG. 123 is an explanatory diagram showing a state where the topper display device is attached.
Figure 124:
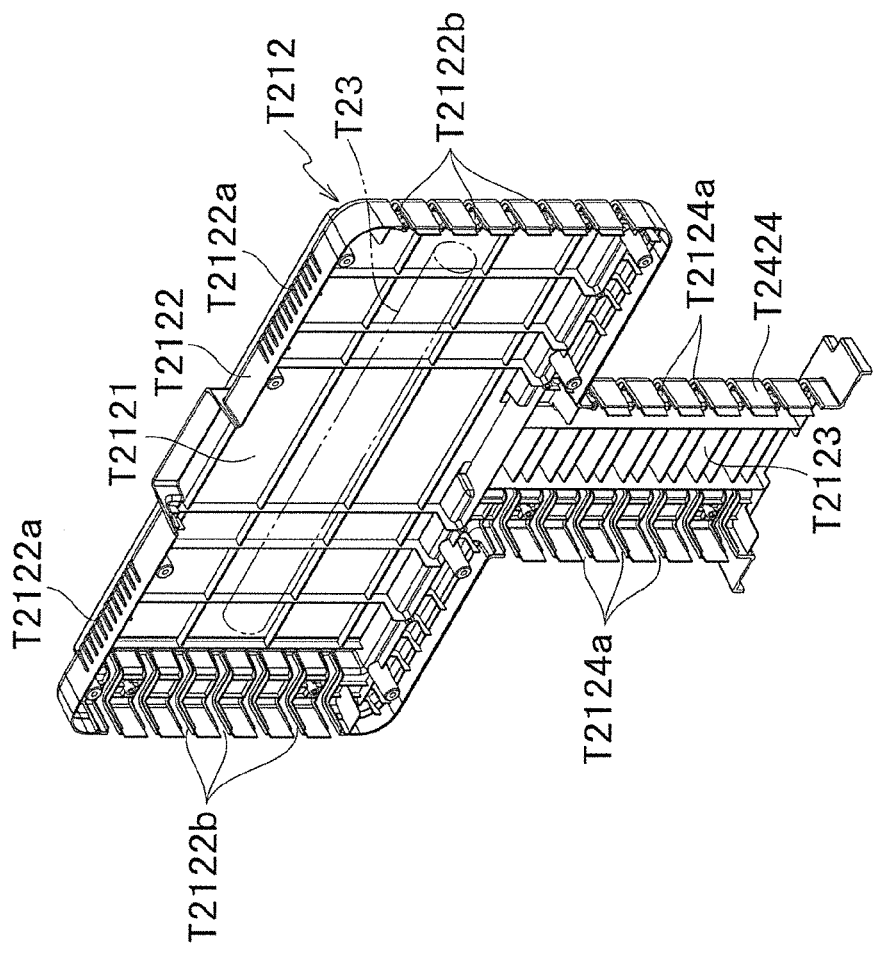
FIG. 124 is a perspective view of the topper rear cover.

As shown in FIG. 123, after the display plate module T211 is attached to the topper support mechanism T215, the topper rear cover T212 is subsequently attached while the tower member T22 is attached. As shown in FIG. 124, the topper rear cover T212 has a housing frame member T2121 whose front surface is in a rectangular shape, and an upper rim portion T2122 protruding from the peripheral edge of the housing frame member T2121 towards the front side. To the housing frame member T2121 of the topper rear cover T212 are arranged a backlight unit T23 such as a cold cathode tube and a fluorescent tube, and the like. On the left and right regions on the top wall of the upper rim portion T2122 are formed a plurality of ventilation holes T2121a. Through the ventilation holes T2121a, the air inside the topper device T2 heated by the backlight unit T23 flows out, while the outside air flows inside the topper device T2. This way, cooling of the topper device T2 is made possible.

Figure 125:
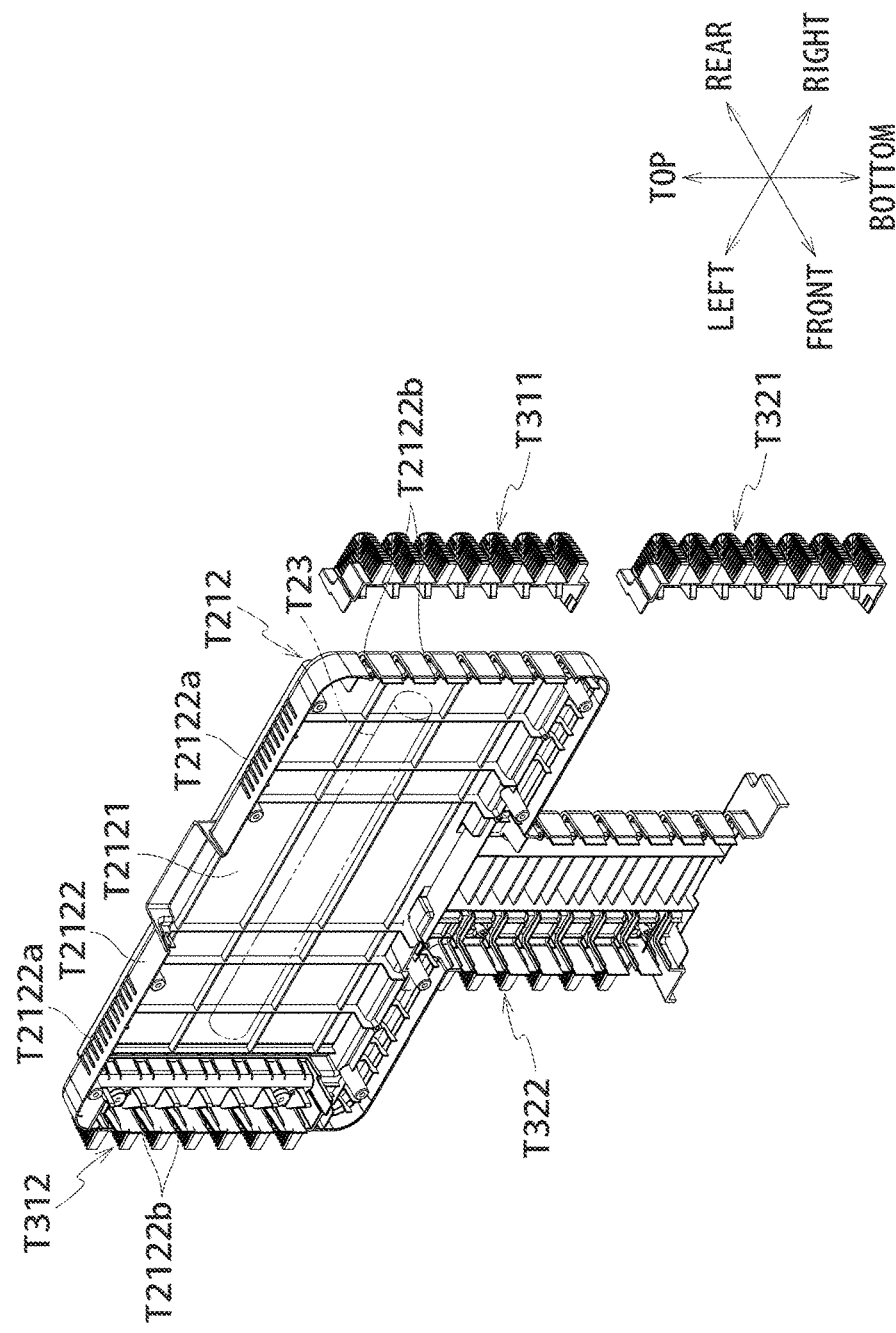
FIG. 125 is a perspective view of the topper rear cover, an upper rear illumination member, and a lower rear illumination member.

On the left surface and the right surface of the upper rim portion T2122 are formed a plurality of engagement portions T2122b. The engagement portions T2122b are notches of a predetermined width on the upper rim portion T2122, which extends in the horizontal direction from its front end to the back end. The engagement portions T2122b are formed at equal intervals in the vertical direction. As shown in FIG. 125 and FIG. 126, these engagement portions T2122b allow engagement therewith the upper rear illumination members T311 and T312 of the illumination mechanism T3.

As shown in FIG. 124, the topper rear cover T212 includes: a support frame portion T2123 jointed to the lower middle portion of the housing frame member T2121 and the upper rim portion T2122; and a lower rim portion T2124 protruding forward from the peripheral edge of the support frame portion T2123. On the left surface and the right surface of the lower rim portion T2124 are formed a plurality of engagement portions T2124b. The engagement portions T2124b are notches of a predetermined width on the lower rim portion T2124, which extends in the horizontal direction from its front end to the back end. The engagement portions T2124b are formed at equal intervals in the vertical direction. As shown in FIG. 125 and FIG. 126, these engagement portions T2124b allow engagement therewith the lower rear illumination members T321 and T322 of the illumination mechanism T3.

(Topper Front Cover T214)

Figure 127:
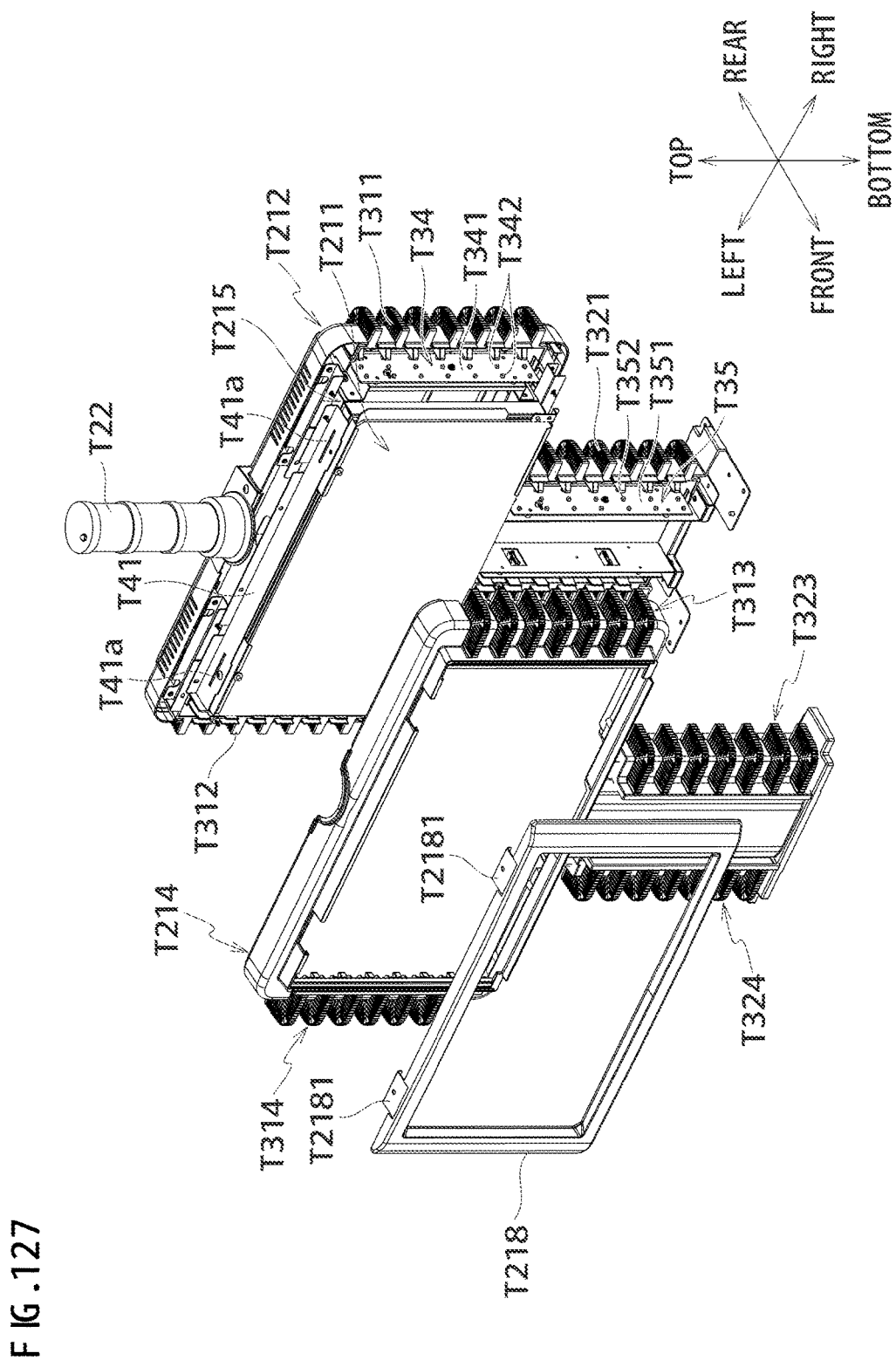
FIG. 127 is an exploded perspective view of the topper device.

After the upper rear illumination members T311 and T312 and the lower rear illumination member T321 and T322 are attached to the topper rear cover T212, the topper rear cover T212 is attached to the topper support mechanism T215 from behind, as shown in FIG. 127. After this, the topper front cover T214 is attached to the topper support mechanism T215 from the front.

Figure 128:
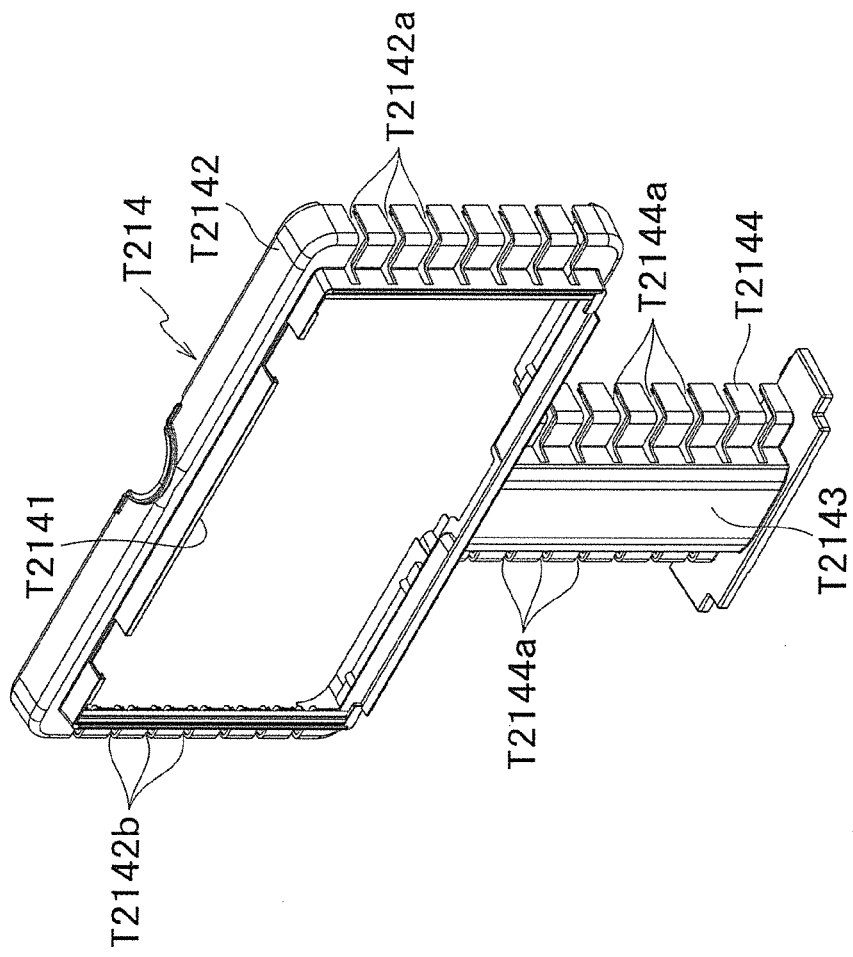
FIG. 128 is a perspective view of the topper rear cover.
Figure 129:
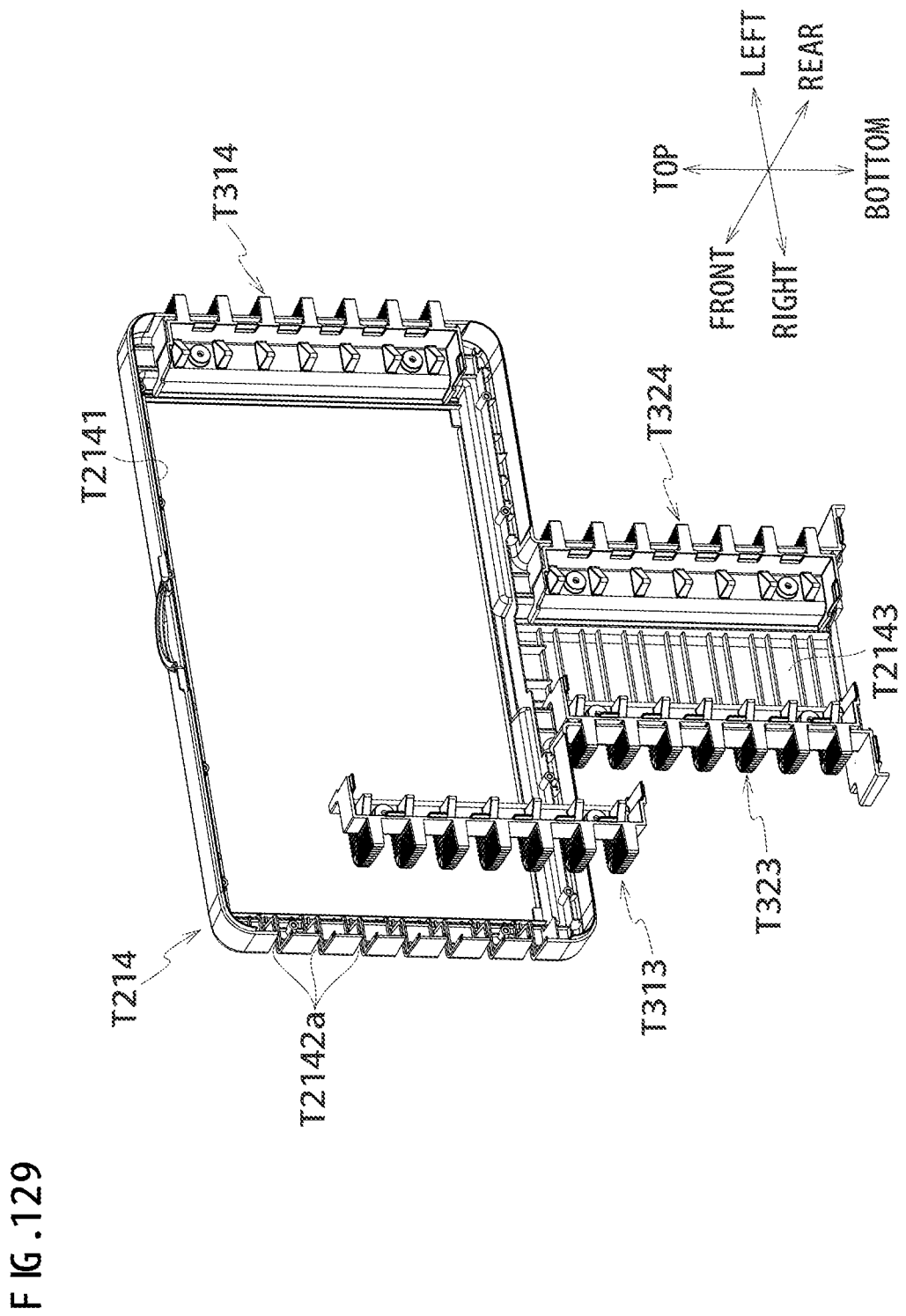
FIG. 129 is an explanatory diagram showing a process of attaching the topper rear cover to an upper front illumination member.
Figure 130:
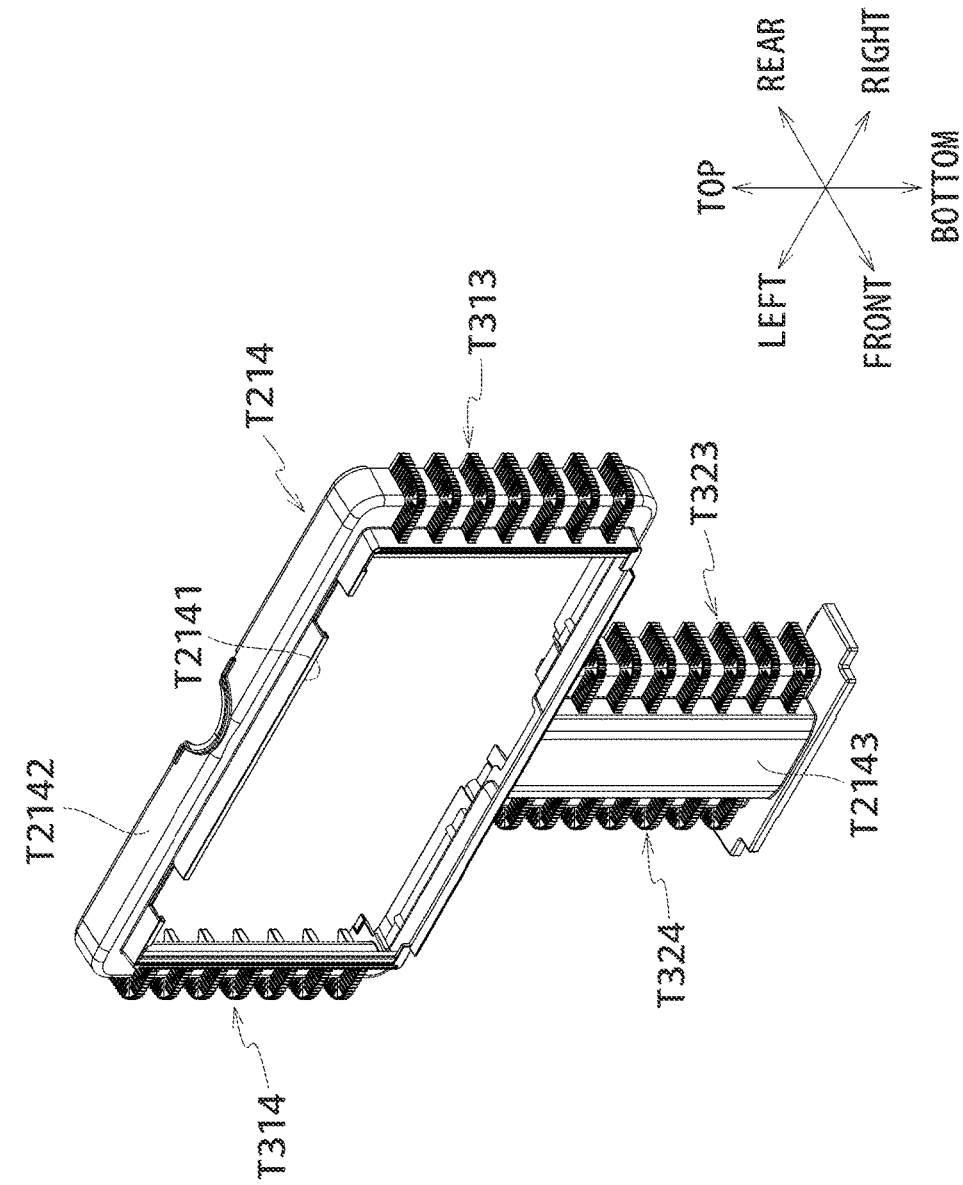
FIG. 130 is a perspective view of the topper front cover.

As shown in FIG. 128, the topper front cover T214 includes: a window frame portion T2141 which makes the topper display device T211 visible from the front; and an upper rim portion T2142 protruding backward from the peripheral edge of the window frame portion T2141. On the left surface and the right surface of the upper rim portion T2142 are formed a plurality of engagement portions T2142a. The engagement portions T2142a are notches of a predetermined width on the upper rim portion T2142, which extends in the horizontal direction from its front end to the back end. The engagement portions T2142a are formed at equal intervals in the vertical direction. As shown in FIG. 129 and FIG. 130, these engagement portions T2142a allow engagement therewith the upper front illumination members T313 and T314 of the illumination mechanism T3.

As shown in FIG. 128, the topper front cover T214 includes: a support frame portion T2143 jointed to the lower middle portion of the window frame portion T2141 and the upper rim portion T2142; and a lower rim portion T2144 protruding forward from the peripheral edge of the support frame portion T2143. On the left surface and the right surface of the lower rim portion T2144 are formed a plurality of engagement portions T2144a. The engagement portions T2144a are notches of a predetermined width on the lower rim portion T2144, which extends in the horizontal direction from its front end to the back end. The engagement portions T2144a are formed at equal intervals in the vertical direction. As shown in FIG. 129 and FIG. 130, these engagement portions T2144a allow engagement therewith the lower front illumination members T323 and T324 T323 and T324 of the illumination mechanism T3.

(Frame Member T218)

Figure 131:
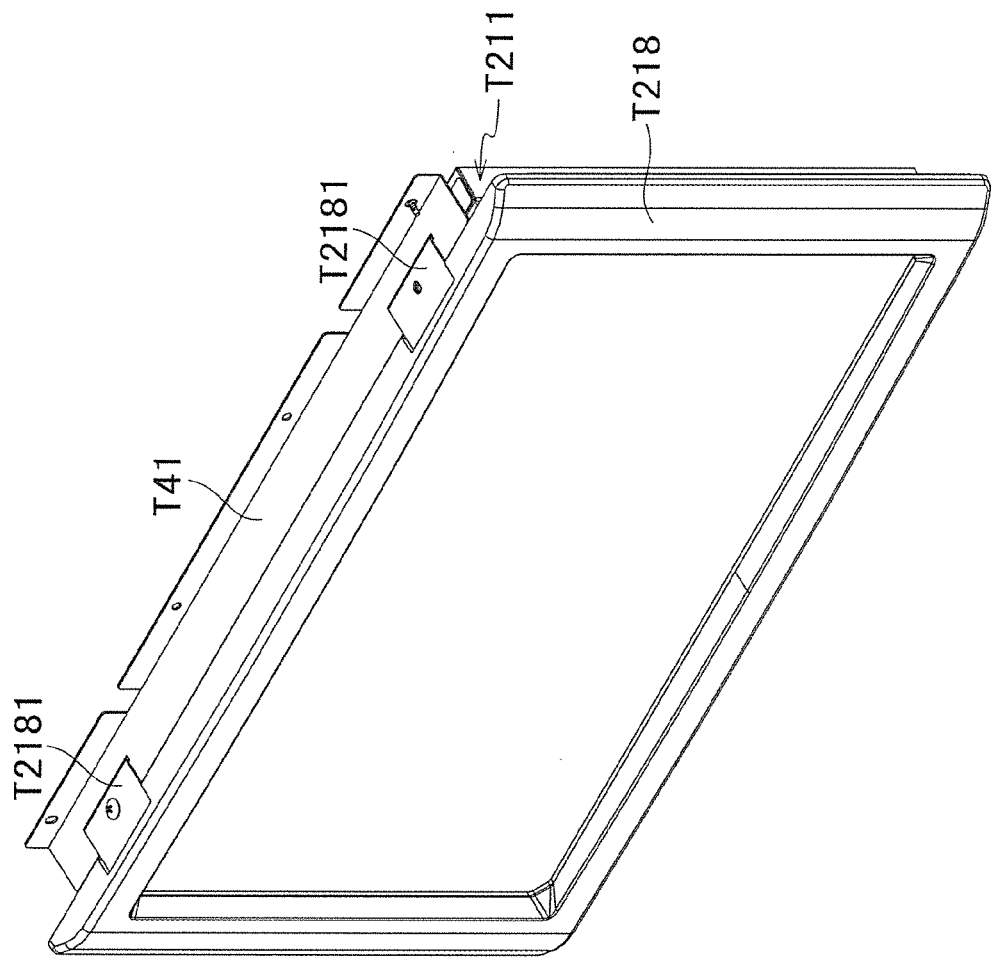
FIG. 131 is a perspective view of the topper display device.

After the upper front illumination members T313 and T314 and the lower front illumination members T323 and T324 are attached to the topper front cover T214, the topper front cover T214 is attached to the topper support mechanism T215 from behind, as shown in FIG. 127. After this, the frame member T218 is attached to the topper front cover T214 from the front. The frame member T218 is formed so as to surround the peripheral edge of the topper display device T211. On the left side and the right side at the upper end portion of the frame member T218 are provided hook members T2181 whose leading end portions (rear end portions) extend downward. As shown in FIG. 131, the hook members T2181 are disposed above the topper display device T211, and engages with a key hole portion T41a of the first support member T41 which is screw-fastened to the topper front cover T214, thereby enabling easy attachment of the frame member T218.

(Illumination Mechanism T3)

Now, the following will describe an illumination mechanism T3. As shown in FIG. 127, the illumination mechanism T3 includes upper rear illumination members T311 and T312, upper front illumination members T313 and T314, lower rear illumination members T321 and T322, and lower front illumination members T323 and T324. The illumination mechanism T3 further includes upper light source substrates T34 and lower light source substrates T35.

(Illumination Mechanism T3: Upper Light Source Substrate T34 and Lower Light Source Substrate T35)

The upper light source substrates T34 are provided on the right side surface of a right upright member T2155 and the left side surface of a left upright member T2156, respectively. The lower light source substrates T35 are provided on the left side surface and the right side surface of a lower upright member T2154, respectively. As shown in FIG. 116, each upper light source substrate T34 includes a flat printed board T341 and a plurality of light sources T342 mounted on the outer surface of the printed board T341. The light sources T342 are light emitting members such as mono color or full color LEDs. The light sources T342 are disposed in such a way that, seven light source groups, each of which includes three light sources T342 provided at regular intervals between the horizontal end portions, are provided at regular intervals between the vertical end portions. To put it differently, the light sources T342 are mounted on the printed board T341 to form a matrix of 7 rows and 3 columns.

The lower light source substrates T35 are constructed to be identical with the upper light source substrates T34. In other words, each lower light source substrate T35 includes a flat printed board T351 and light sources T352 which are mounted on the outer surface of the printed board T351 to form a matrix of 7 rows and 3 columns.

(Illumination Mechanism T3: Upper Illumination Members T31 and Lower Illumination Members T32)

The upper light source substrates T34 are covered with the upper rear illumination members T311 and T312 and the upper front illumination members T313 and T314. The upper rear illumination members T311 and T312 and the upper front illumination members T313 and T314 are integrated to form upper illumination members T31. In the meanwhile, the lower light source substrates T35 are covered with the lower rear illumination members T321 and T322 and the lower front illumination members T323 and T324. The lower rear illumination members T321 and T322 and the lower front illumination members T323 and T324 are integrated to form lower illumination members T32.

Therefore, as shown in FIG. 114, the topper device T2 is arranged such that, while the upper illumination members T31 protrude from an upper right portion and an upper left portion of the topper device T2, the lower illumination members T32 are provided to protrude from a lower right side portion and a lower left side portion of the topper device T2. With this, the topper device T2 is able to emit illumination light in directions including forward, sideward, backward, and upward.

Figure 132:
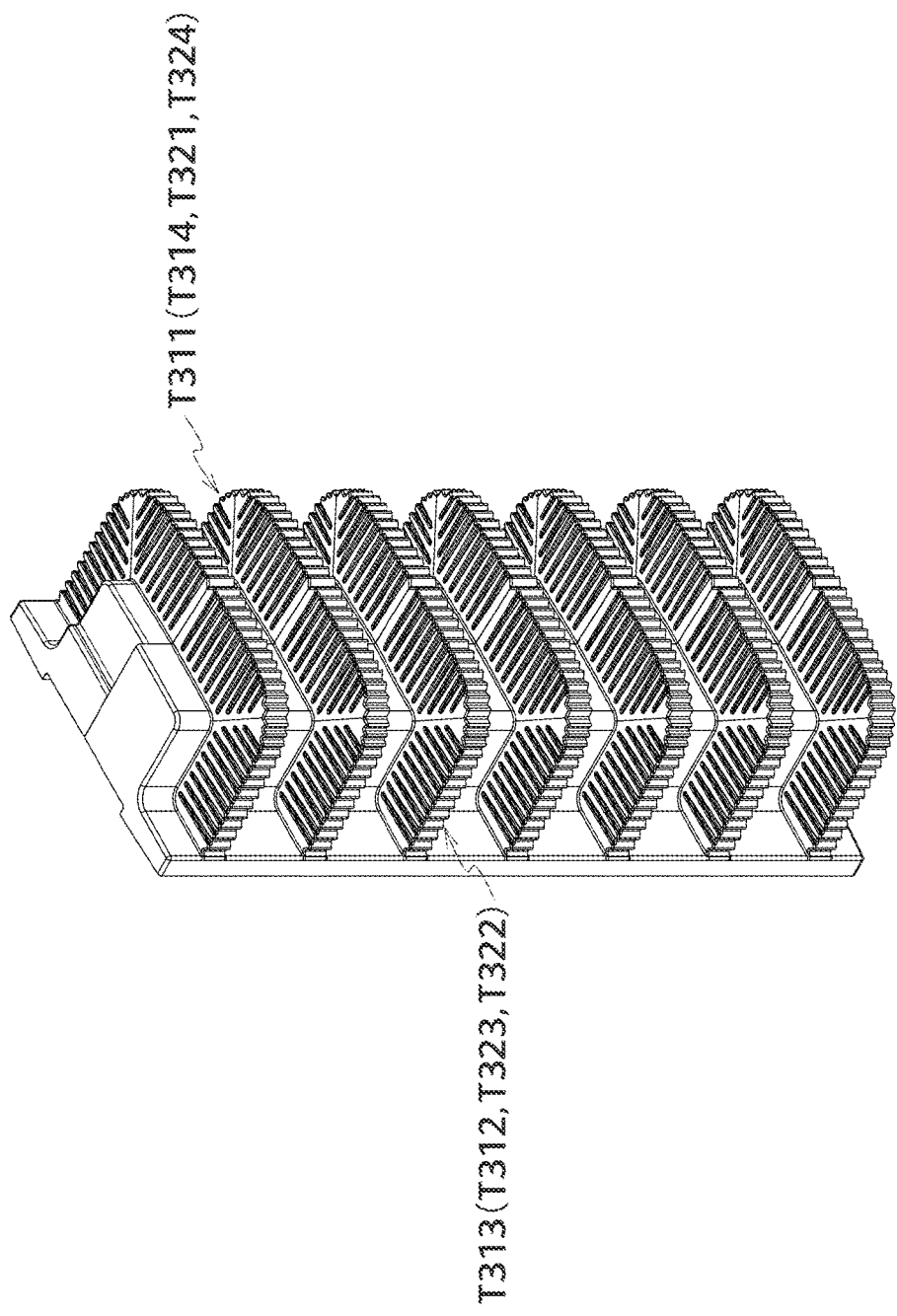
FIG. 132 is a perspective view of the upper front illumination member and the upper rear illumination member.

As shown in FIG. 132, the upper illumination members T31 provided at the upper left portion and the upper right portion and the lower illumination members T32 provided at the lower left side portion and the lower right side portion are identical with one another in shape and structure, but the opposing sets of the illumination members are arranged to be horizontally symmetrical with each other. With this, in the topper device T2, the upper front illumination member T313 and the upper rear illumination member T312 constituting the upper illumination members T31 on the one side are interchangeable with the lower front illumination member T323 and the lower rear illumination member T322 constituting the lower illumination members T32 on the one side. Furthermore, in the topper device T2, the upper front illumination member T311 and the upper rear illumination member T312 constituting the upper illumination members T31 on the other side are interchangeable with the lower front illumination member T321 and the lower rear illumination member T324 constituting the lower illumination members T32 on the other side.

(Illumination Mechanism T3: Upper Front Illumination Member T313)

Figure 133:
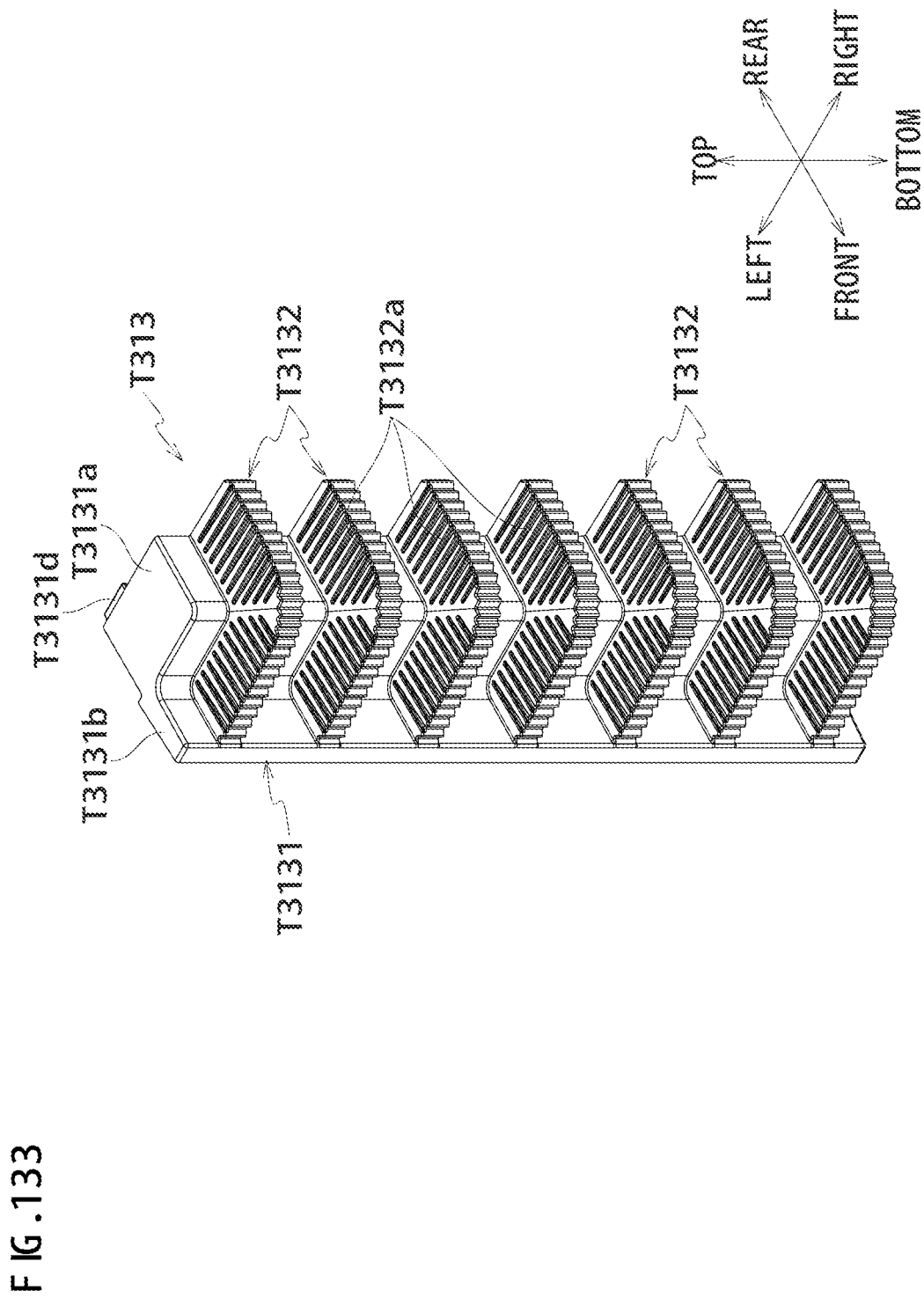
FIG. 133 is a perspective view of the upper front illumination member.
Figure 145:
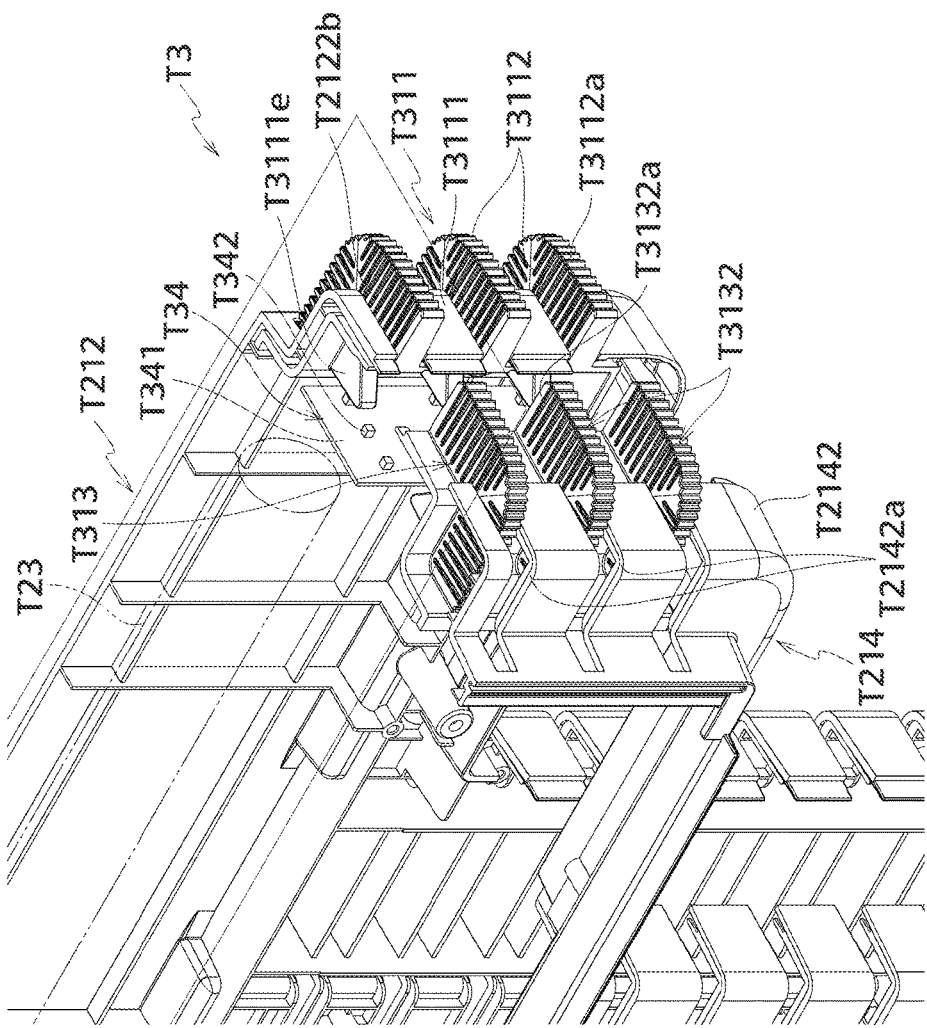
FIG. 145 is an explanatory diagram showing a process of assembling the upper front illumination member and the upper rear illumination member.
Figure 146:
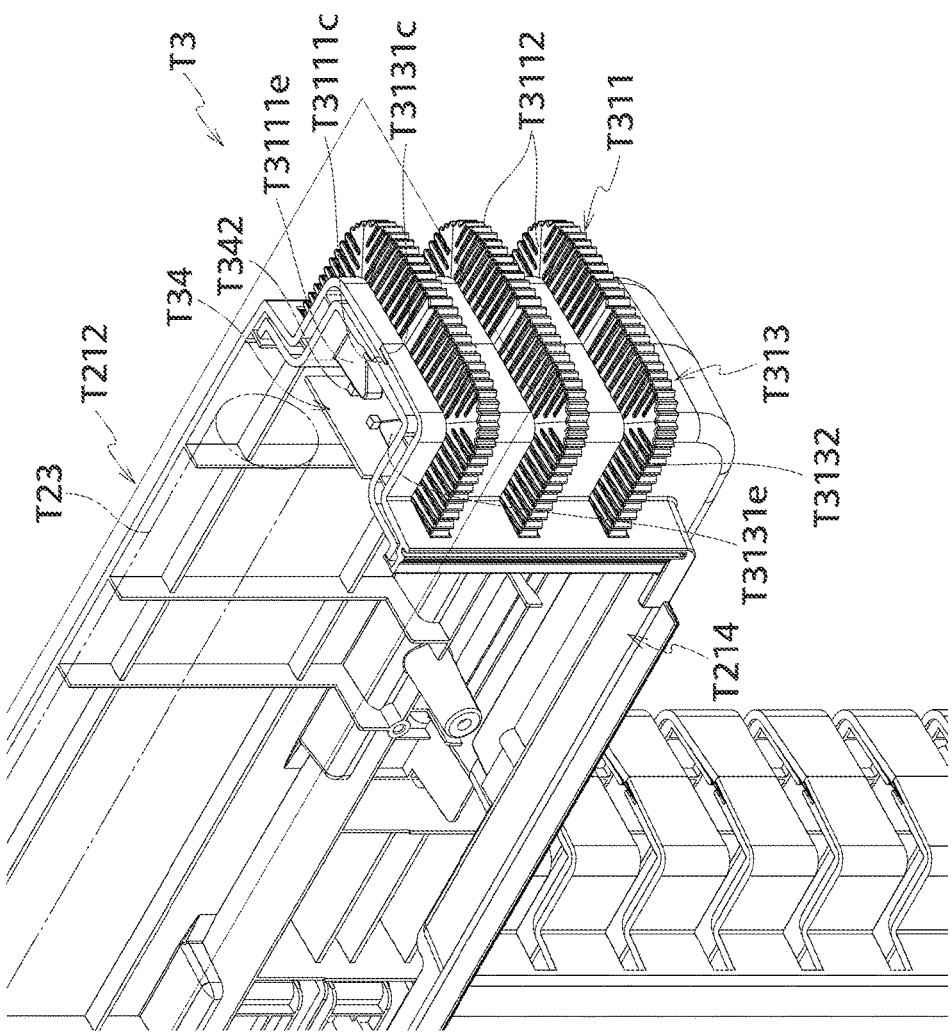
FIG. 146 is an explanatory diagram showing a process of assembling the upper front illumination member and the upper rear illumination member.

The upper front illumination member T313 is made of synthetic resin such as acrylic resin which transmits light, and includes, as shown in FIG. 133, a long base body T3131 which is longitudinally in parallel to the vertical direction and a plurality of light scattering members T3132 which horizontally protrude from the base body T3131. In the upper front illumination member T313, as shown in FIG. 145 and FIG. 146, the base body T3131 contacts with the inner side surface of the topper front cover T214, and as the light scattering members T3132 protrude from engagement portions T2142a, the attachment to the topper front cover T214 and the exposure of the light scattering members T3132 to the outside are done.

Figure 134:
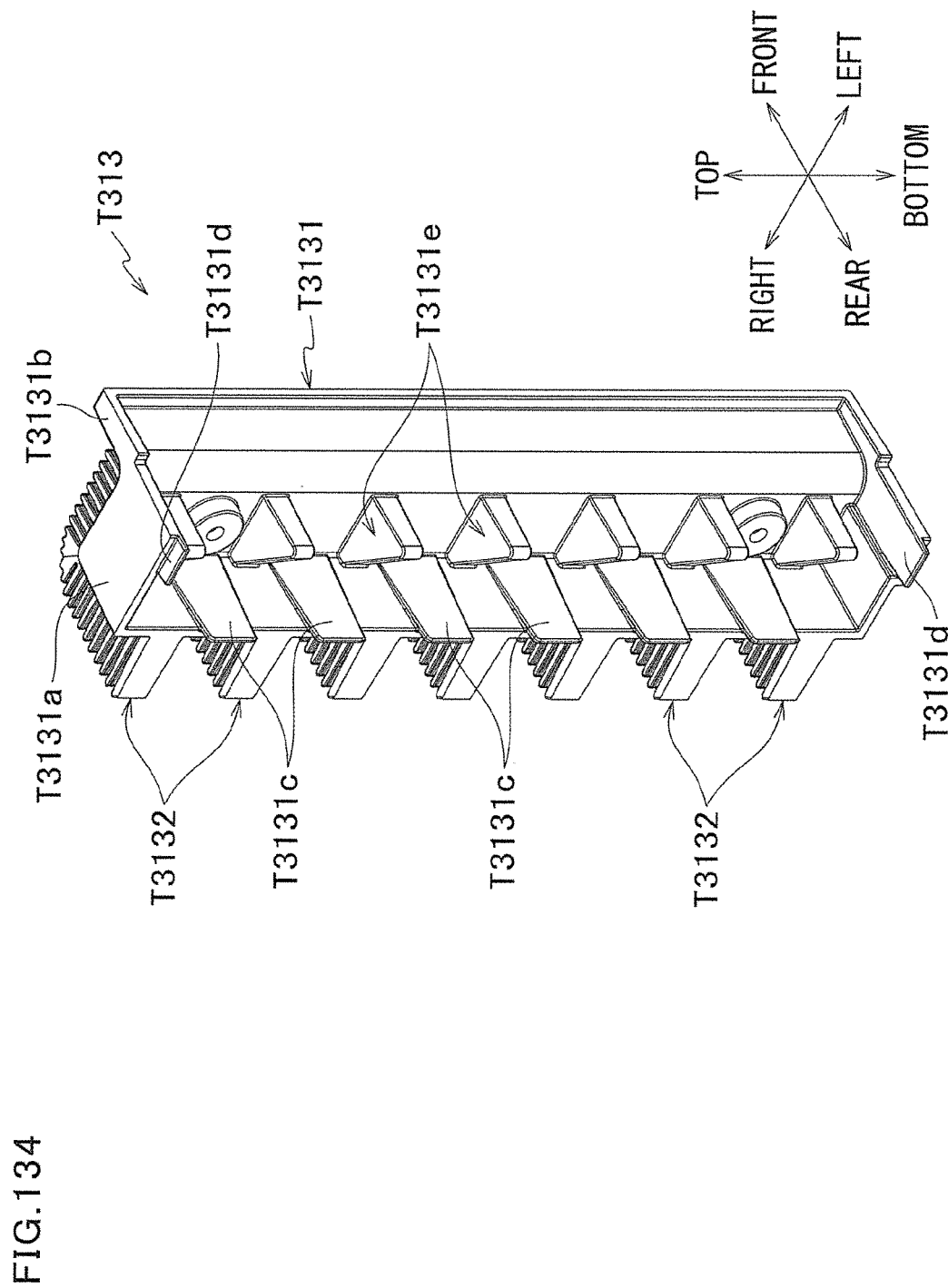
FIG. 134 is a perspective view of the upper front illumination member.

The base body T3131 includes, as shown in FIG. 134, a base main body portion T3131a which is a quadrangular prism in shape and a plate member T3131b which protrudes from a front left end portion of the base main body portion T3131a. The base main body portion T3131a is open at the left side and the back side, and has claw members T3131d which are provided at the inner sides of the top wall and the bottom wall (i.e., on the upper light source substrate T34 side in FIG. 127) to be vertically symmetrical with each other. The claw members T3131d partly protrude backward from the back sides of the top wall and the bottom wall.

Figure 135:
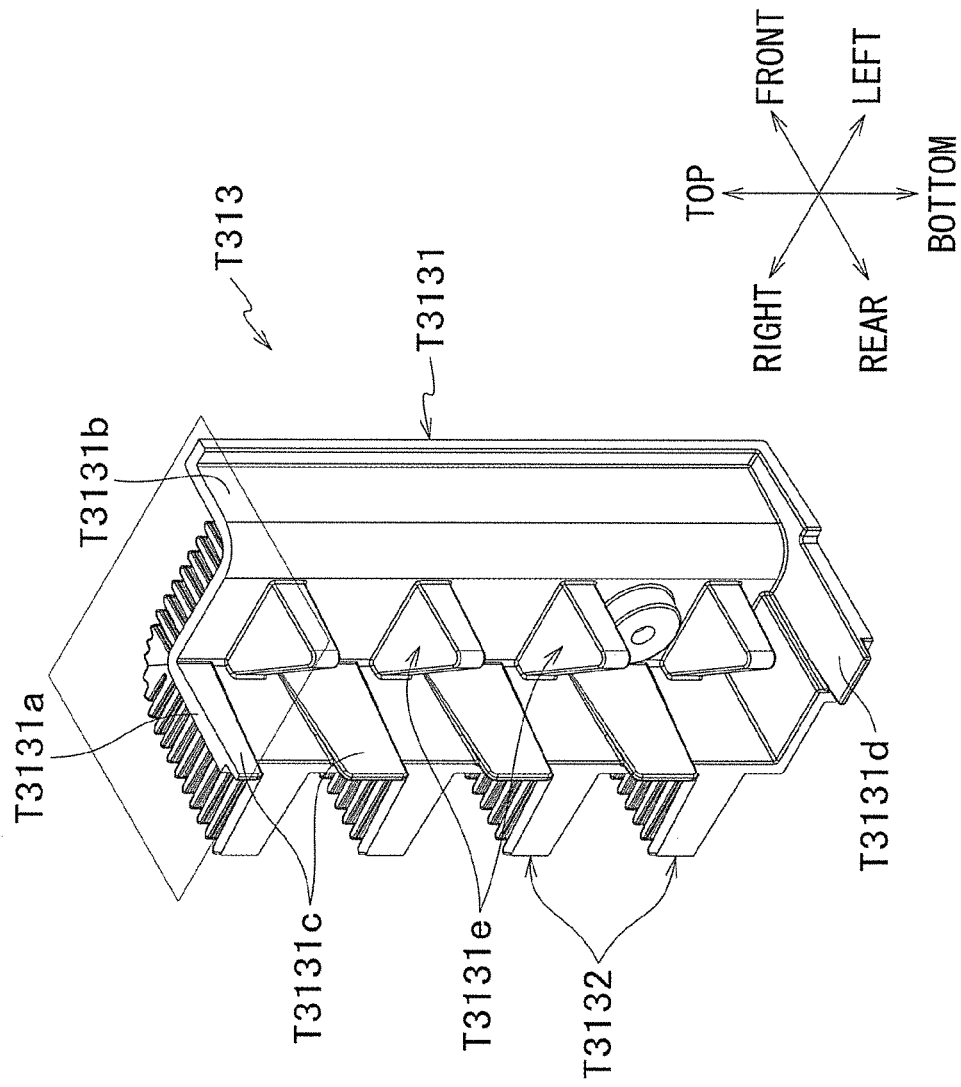
FIG. 135 is a cross sectional perspective view of the upper front illumination member.

In addition to the above, on the inner side of the right wall of the base main body portion T3131a are provided plural (six) claw members T3131c. These claw members T3131c are provided at regular intervals in the vertical direction, and partly protrude backward from the back side of the base main body portion T3131a as shown in FIG. 135. Each claw member T3131c is disposed between the light sources T342 of each column, the light sources T342 being arranged in a matrix manner on the printed board T341. The claw members T3131d on the top wall and the bottom wall and the claw members T3131c on the right wall are used for positioning and provisional tacking, when the upper front illumination member T313 is joined with the upper rear illumination member T311.

Figure 138:
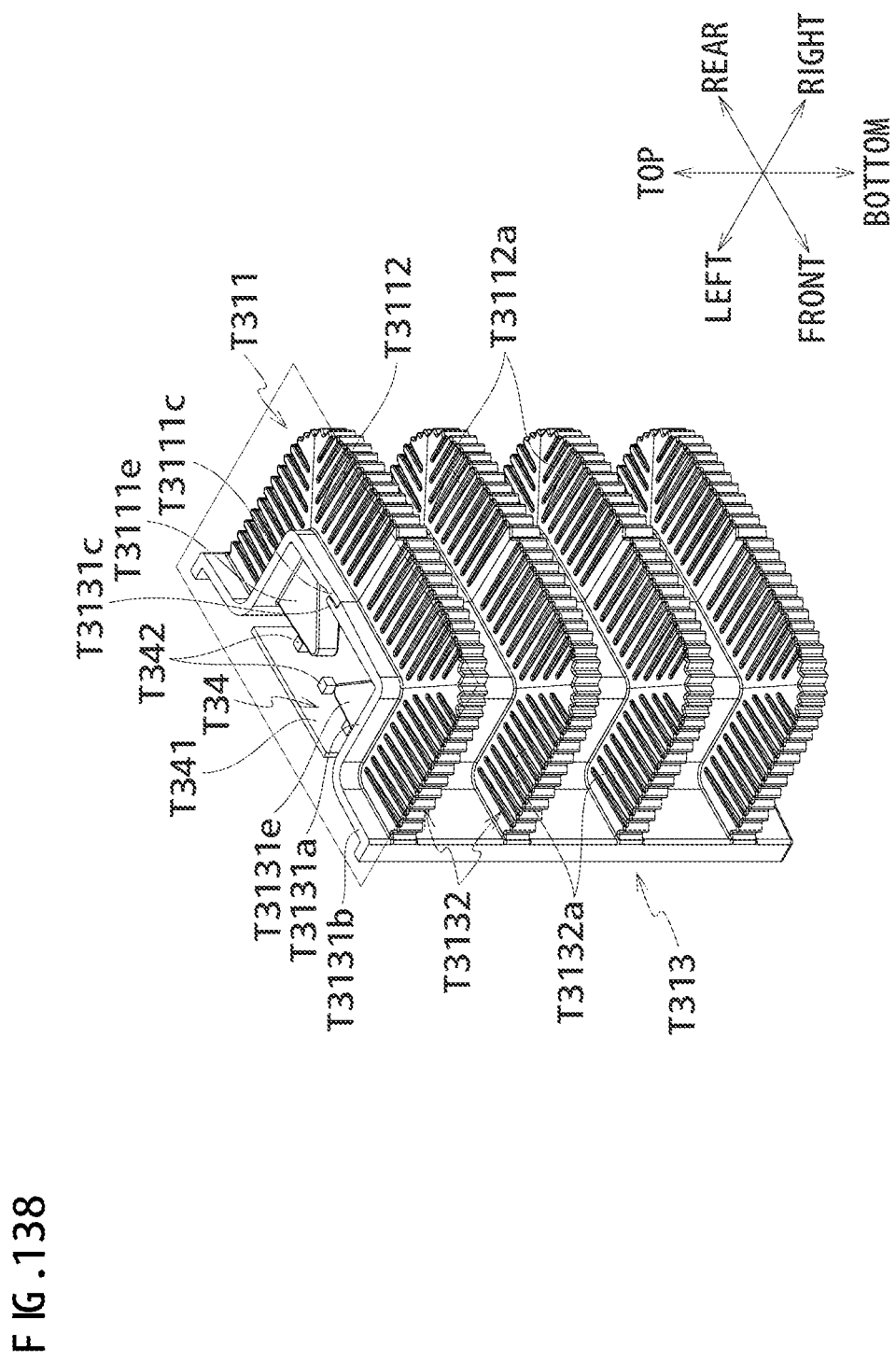
FIG. 138 is a cross sectional perspective view of the upper front illumination member and the upper rear illumination member.
Figure 139A:
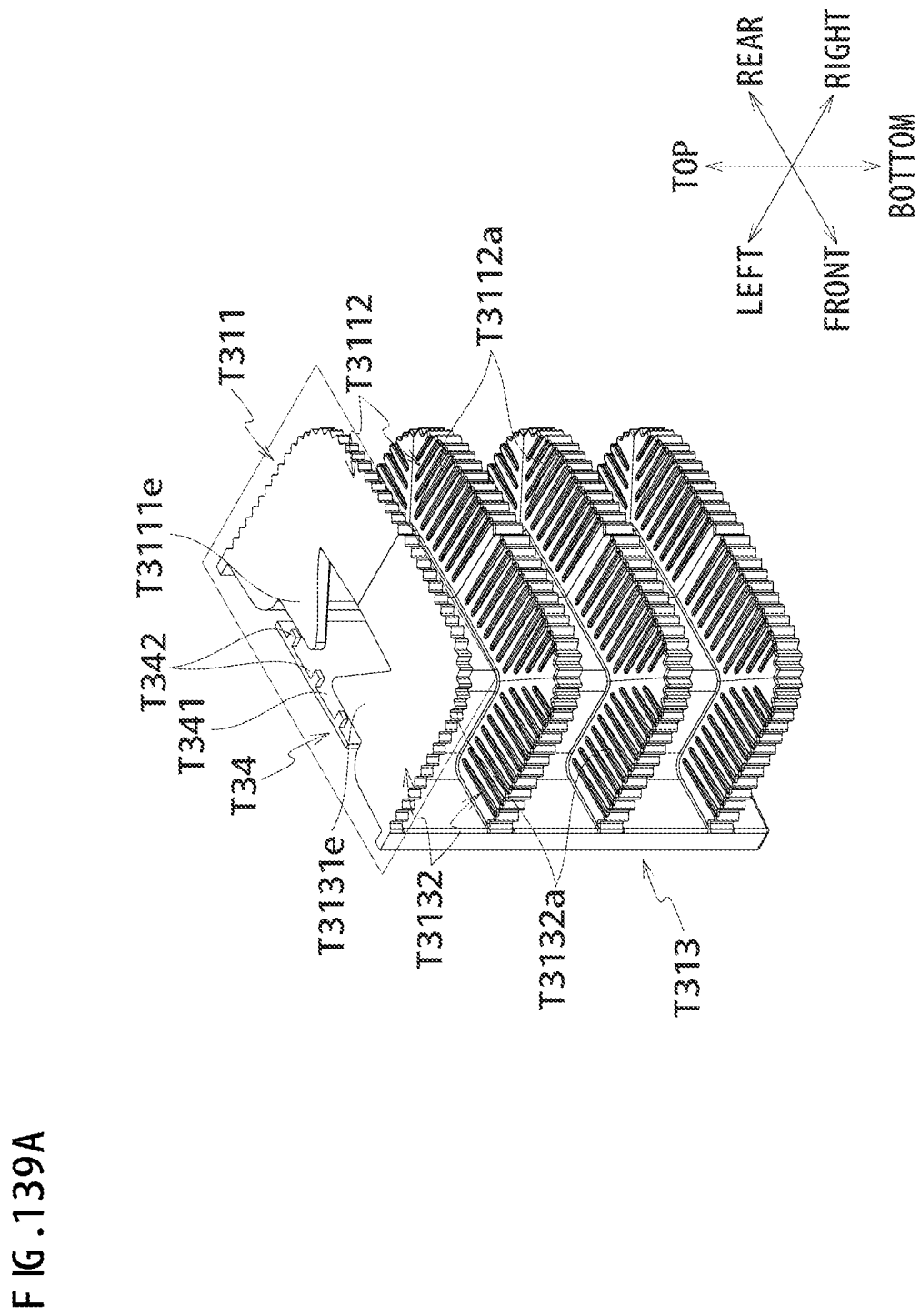
FIG. 139A is a cross sectional perspective view of the upper front illumination member and the upper rear illumination member.

In addition to the above, the base body T3131 includes plural (seven) light guiding portions T3131e therein. Each light guiding portion T3131e is provided between neighboring claw members T3131c and is arranged to face the light sources T342 of each column, the light sources T342 being arranged on the printed board T341 in a matrix manner. As shown in FIG. 138 and FIG. 139A, each light guiding portion T3131e is shaped as an equilateral triangle in a top view, and is formed in such a way that, when the upper front illumination member T313 is mounted in the topper device T2 as the illumination mechanism T3, the first side Td including the first apex Ta which is a right angle is in parallel to the surface of the upper light source substrate T34.

Figure 136:
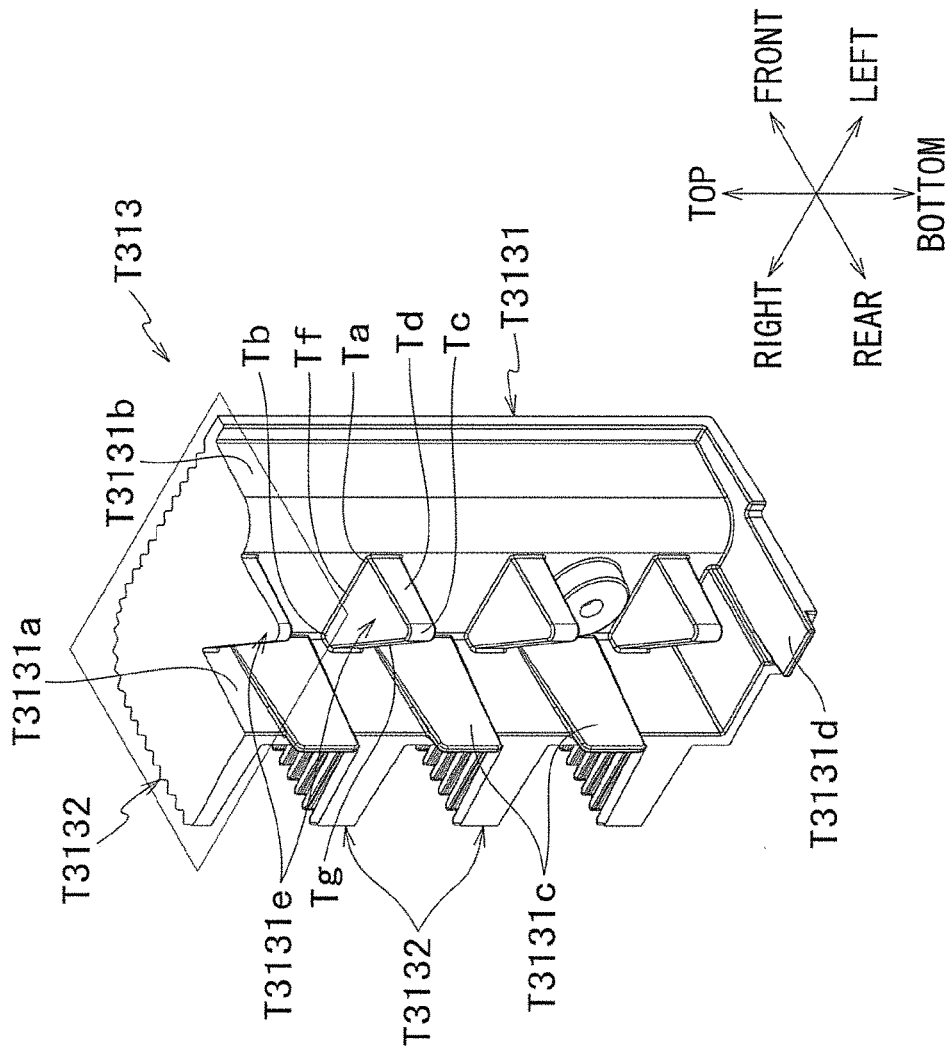
FIG. 136 is a cross sectional perspective view of the upper front illumination member.

To be more specific, as shown in FIG. 135 and FIG. 136, each light guiding portion T3131e includes a first apex Ta which is a right angle, a first side Td and a second side Tf each of which has the first apex Ta as one end, a second apex Tc which is the other end of the first side Td, a third apex Tb which is the other end of the second side Tf, and an oblique side Tg which opposes the first apex Ta. The first side Td is disposed to be in parallel to the upper light source substrate T34 shown in FIG. 127. The first apex Ta is disposed at a left end portion of the front wall of the base main body portion T3131a (i.e., at a part which is the closest to the upper light source substrate T34 shown in FIG. 127). The second side Tf having this first apex Ta as one end is joined at the entire front wall in the left/right direction, and the third apex Tb is joined with the front end portion of the inner surface of the right wall of the base main body portion T3131a. With this, the light guiding portion T3131e is arranged such that the first side Td is in parallel to the inner surface of the base main body portion T3131a and the oblique side Tg is tilted with respect to the inner surface of the base main body portion T3131a.

As shown in FIG. 138 and FIG. 139A, the seven light guiding portions T3131e are disposed at regular intervals so that each first side Td opposes the light sources T342 of the three columns on the upper light source substrate T34. With this, the illumination light emitted from the light sources T342 of the upper light source substrate T34 advances in the direction orthogonal to the first side Td of each light guiding portion T3131e, and a part of the light is reflected by the light guiding portion T3131e whereas the most of the light enters the light guiding portion T3131e. When, for example, the illumination light having advanced in the light guiding portion T3131e reaches the oblique side Tg, a part of the light is emitted and the remaining part of the light is reflected in accordance with an angle of the illumination light with respect to the oblique side Tg, and the remaining part of the reflected illumination light advances toward the second side Tf and the third apex Tb and enters the base main body portion T3131a which is joined with the second side Tf and the third apex Tb. In this way, all of the illumination light is emitted from the light guiding portion T3131e. The specific traveling paths of the illumination light in the light guiding portion T3131e will be detailed later.

As such, even if the illumination light with strong directivity is emitted in one direction from the light source T342, the illumination light is emitted from the all surfaces of the light guiding portion T3131e in a scattered manner in various directions, with various traveling paths of the illumination light formed by the walls of the light guiding portion T3131e, and such scattered light enters the base main body portion T3131a.

On the outer surface of the base main body portion T3131a, light scattering members T3132 are formed. These light scattering members T3132 protrude outward from the base main body portion T3131a (i.e., protrude in the direction away from the light guiding portion T3131e). As shown in FIG. 135, the light scattering members T3132 are disposed to correspond to the light guiding portions T3131e each of which is provided between neighboring claw members T3131c. With this, the most of the illumination light emitted in different directions on account of the light guiding portion T3131e enters the light scattering member T3132.

As shown in FIG. 133, each light scattering member T3132 is formed to be a plate protruding outward from the front and right walls of the base main body portion T3131a (i.e., protrudes forward and rightward). Each light scattering member T3132 has a plurality of grooves T3132a. The grooves T3132a are linearly formed on the top wall to extend outward from the base main body portion T3131a side. The grooves T3132a are formed also at the outer leading end portion. The grooves T3132a may be formed on the under surface of the light scattering member T3132. With this, the light scattering member T3132 outputs the illumination light incident from the entire wall of the base main body portion T3131a while causing the illumination light to be minutely scattered at the grooves T3132a.

Figure 137:
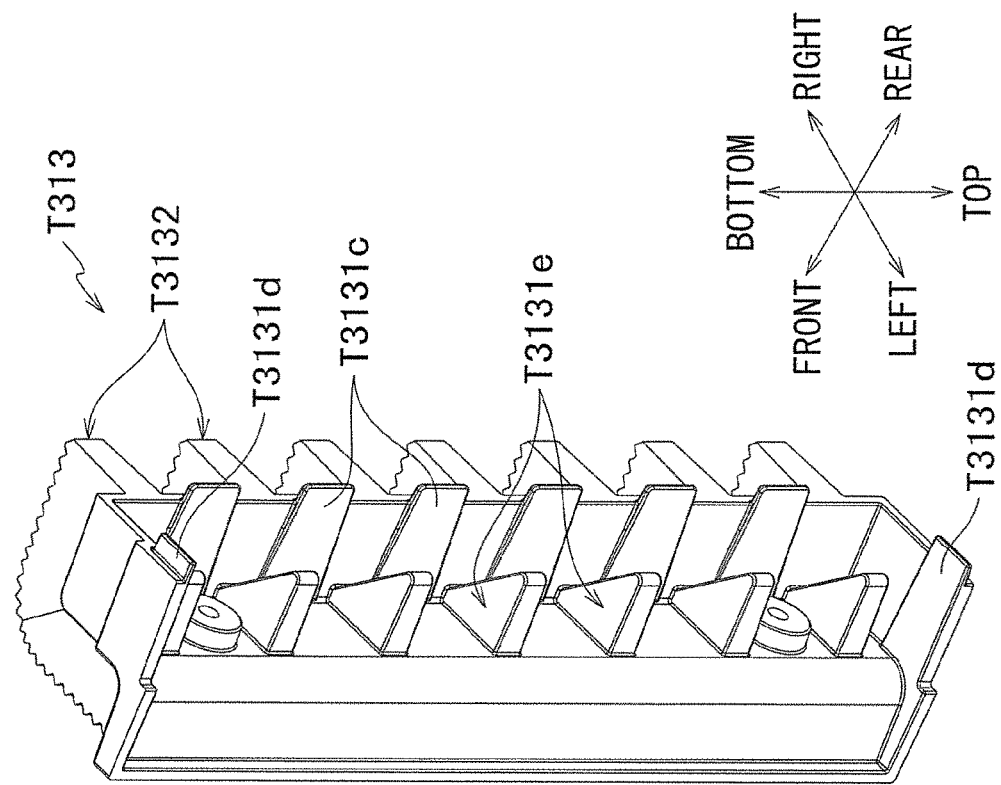
FIG. 137 is a perspective view of the upper front illumination member.

The base main body portion T3131a described above has a top wall with a flat surface. In the meanwhile, as shown in FIG. 137, the under surface of the base main body portion T3131a is stepped. With this, the vertical direction of the upper front illumination member T313 can be confirmed by visually checking the difference between the top surface and the under surface of the base main body portion T3131a.

(Illumination Mechanism T3: Upper Rear Illumination Member T311)

Figure 140:
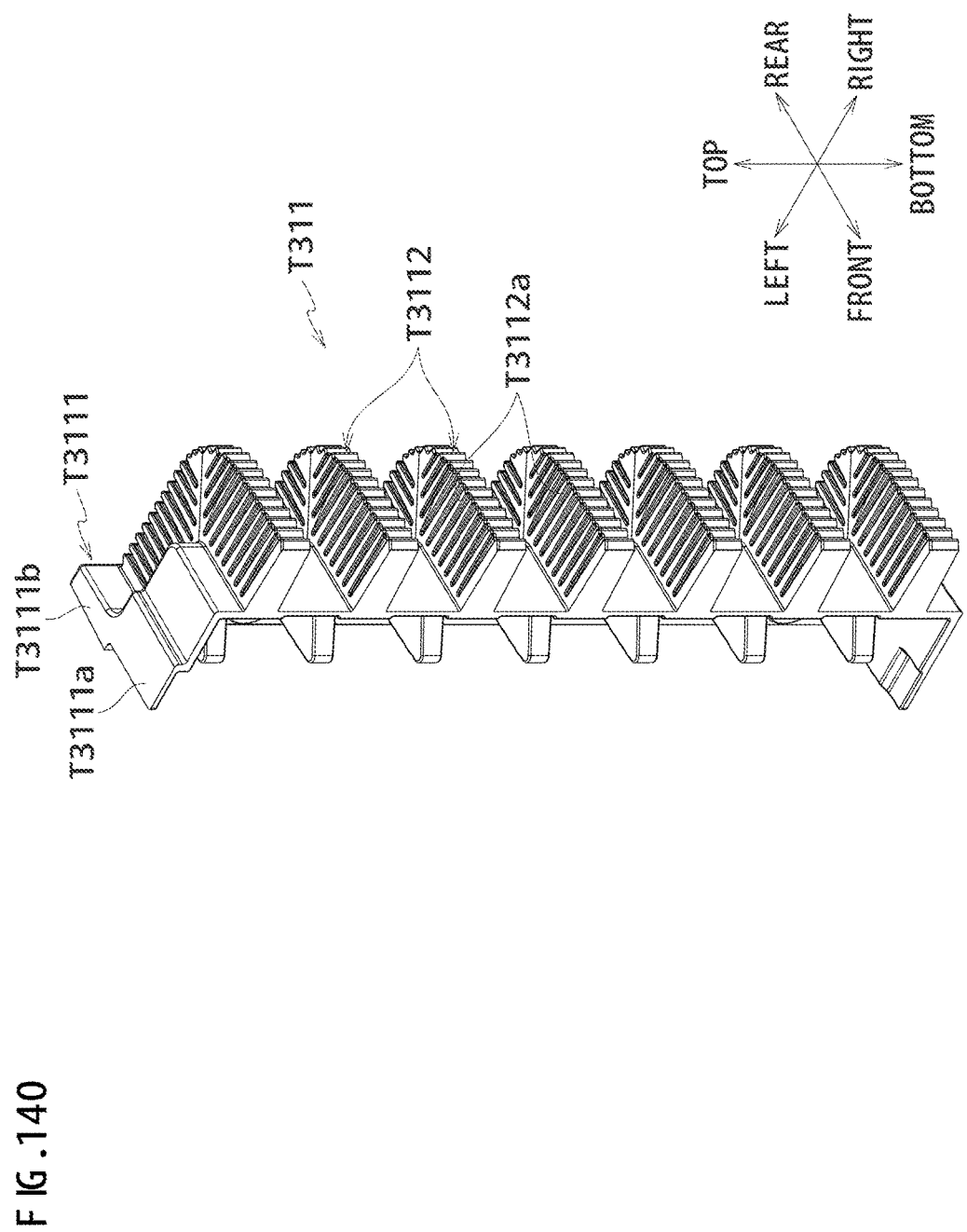
FIG. 140 is a perspective view of the upper rear illumination member.

The upper rear illumination member T311 is made of the same material as the upper front illumination member T313, and includes, as shown in FIG. 140, a long base body T3111 which is longitudinally in parallel to the vertical direction and a plurality of light scattering members T3112 horizontally protruding from the base body T3111. The upper rear illumination member T311 is attached to a topper rear cover T212 and the light scattering members T3112 are exposed to the outside in such a way that the base body T3111 contacts with the inner surface of the topper rear cover T212 shown in FIG. 124 and the light scattering members T3112 protrude from the engagement portions T2122b.

Figure 141:
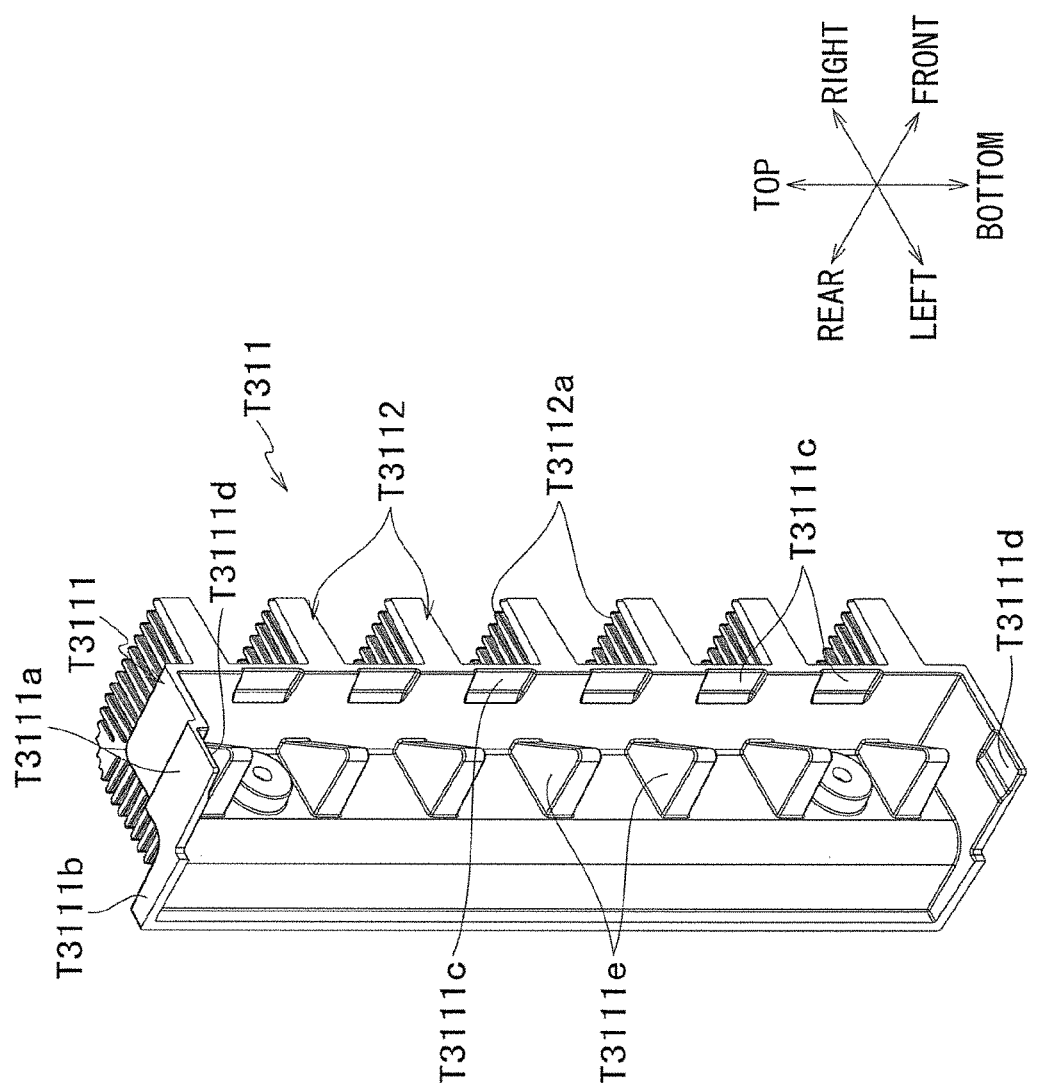
FIG. 141 is a perspective view of the upper rear illumination member.

The base body T3111 includes a base main body portion T3111a which is a quadrangular prism in shape and a plate member T3111b which protrudes from a front left end portion of the base main body portion T3111a. As shown in FIG. 141, the base main body portion T3111a is open at the left side and the back side, and has claw insertion portions T3111d at the inner sides of the top wall and the bottom wall (i.e., on the upper light source substrate T34 side in FIG.

127) to be vertically symmetrical with each other. Into the claw insertion portions T3111d, the claw members T3111d and T3131d shown in FIG. 134 are inserted.

In addition to the above, on the inner side of the right wall of the base main body portion T3111a are provided plural (six) claw insertion portions T3111c. These claw insertion portions T3111c are provided at regular intervals in the vertical direction, and the claw members T3131c shown in FIG. 134 are inserted into the claw insertion portions T3111c. Each claw insertion portion T3111c is disposed between the light sources T342 of each column, the light sources T342 being arranged in a matrix manner on the printed board T341. The claw members T3111d at the top wall and the bottom wall and the claw insertion portions T3111c on the right wall are used for positioning and provisional tacking, when the upper front illumination member T313 is joined with the upper rear illumination member T311.

Figure 142:
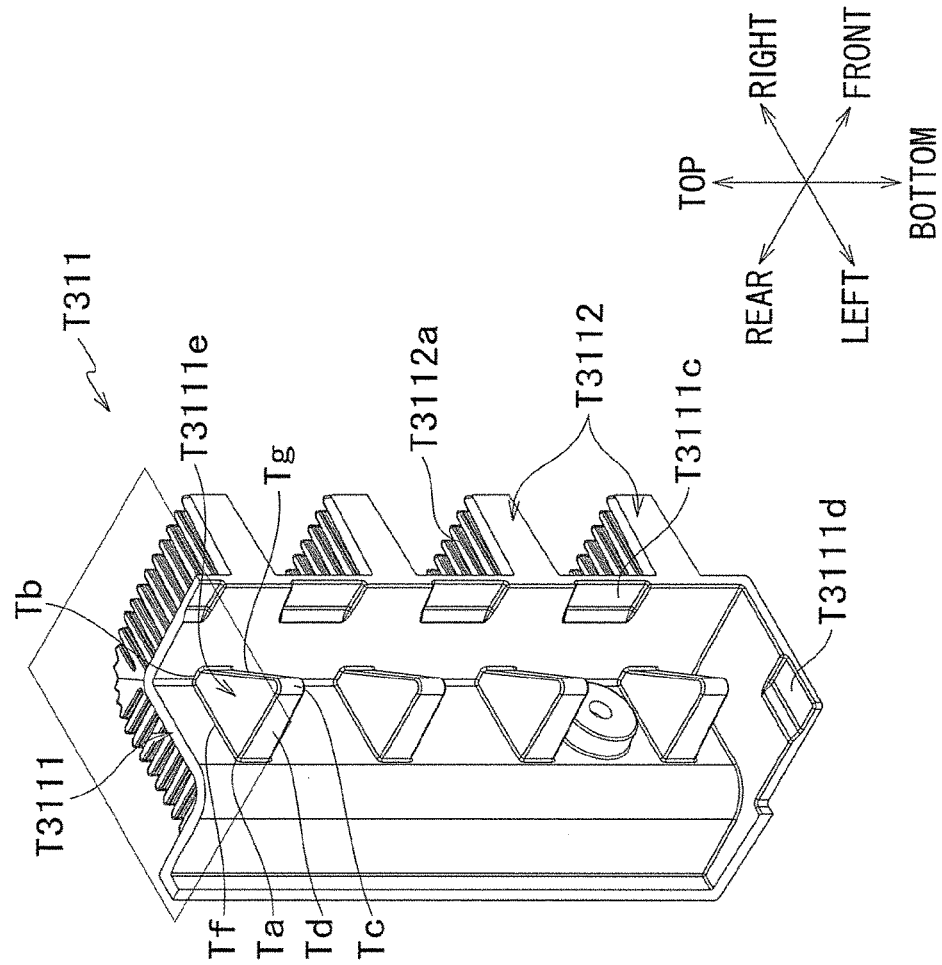
FIG. 142 is a cross sectional perspective view of the upper rear illumination member.
Figure 143:
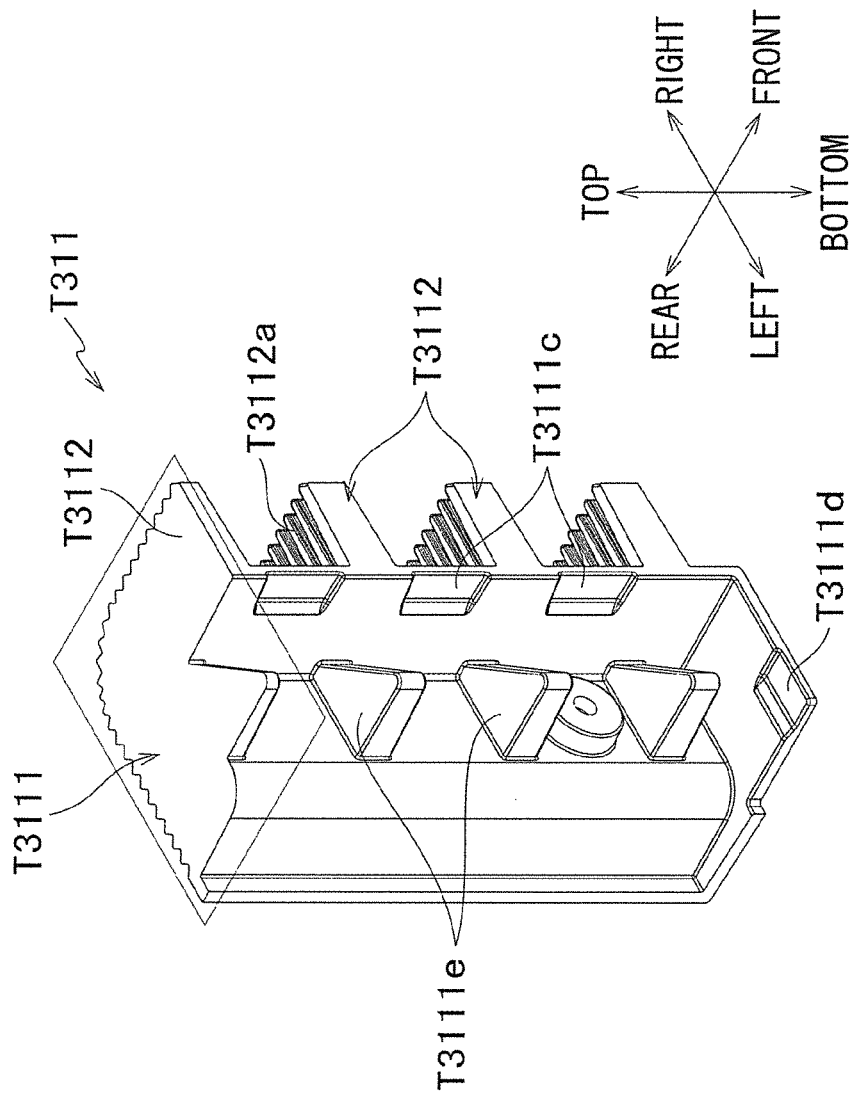
FIG. 143 is a cross sectional perspective view of the upper rear illumination member.

In addition to the above, the base body T3111 includes plural (seven) light guiding portions T3111e therein. The light guiding portions T3111e are each provided between neighboring claw insertion portions T3111c, and are arranged to face the light sources T342 of each column, the light sources T342 being arranged in a matrix manner on the printed board T341. As shown ion FIG. 142 and FIG. 143, each light guiding portion T3111e is shaped as an equilateral triangle in a top view, and is formed in such a way that, when the upper rear illumination member T311 is mounted in the topper device T2 as the illumination mechanism T3, the first side Td including the first apex Ta which is a right angle is in parallel to the surface of the upper light source substrate T34. The details of the light guiding portions T3111e are not given because they are identical with the light guiding portions T3131e of the upper front illumination member T313.

As shown in FIG. 138 and FIG. 139A, the seven light guiding portions T3111e are disposed at regular intervals in such a way that the first side Td opposes the light sources T342 of the three columns on the upper light source substrate T34. With this, the illumination light emitted from the light sources T342 of the upper light source substrate T34 advances in the direction orthogonal to the first side Td of the light guiding portion T3111e, and a part of the light is reflected by the light guiding portion T3111e whereas the most of the light enters the light guiding portion T3111e. When, for example, the illumination light having advanced in the light guiding portion T3111e reaches the oblique side Tg, a part of the light is emitted and the remaining part of the light is reflected in accordance with an angle of the illumination light at the oblique side Tg, and the remaining part of the reflected illumination light advances toward the second side Tf and the third apex Tb and enters the base main body portion T3111a which is joined with the second side Tf and the third apex Tb. In this way, all of the illumination light is emitted from the light guiding portion T3111e. The specific traveling paths of the illumination light in the light guiding portion T3111e will be detailed later.

As such, even if the illumination light with strong directivity is emitted in one direction from the light source T342, the illumination light is emitted from the all surfaces of the light guiding portion T3111e in a scattered manner in various directions, with various traveling paths of the illumination light formed by the walls of the light guiding portion T3111e, and such scattered light enters the base main body portion T3111a.

On the outer surface of the base main body portion T3111a, light scattering members T3112 are provided. This light scattering members T3112 protrude outward from the base main body portion T3111a (i.e., protrude in the direction away from the light guiding portion T3111e). The light scattering members T3112 are disposed to correspond to the light guiding portions T3111e each of which is provided between neighboring claw insertion portions T3111c and 3131c. With this, the most of the illumination light emitted in different directions on account of the light guiding portion T3111e enters the light scattering member T3112.

As shown in FIG. 140, each light scattering member T3112 is formed to be a plate protruding from the front and right walls of the base main body portion T3111a (i.e., protrudes forward and rightward). The light scattering member T3112 has a plurality of grooves T3112a. The grooves T3112a are linearly formed on the top surface to extend outward from the base main body portion T3111a side. The grooves T3112a are formed also at the outer leading end portion. The grooves T3112a may be formed on the under surface of the light scattering member T3112. With this, the light scattering member T3112 outputs the illumination light incident from the entire wall of the base main body portion T3111a while causing the illumination light to be minutely scattered at the grooves T3112a.

Figure 144:
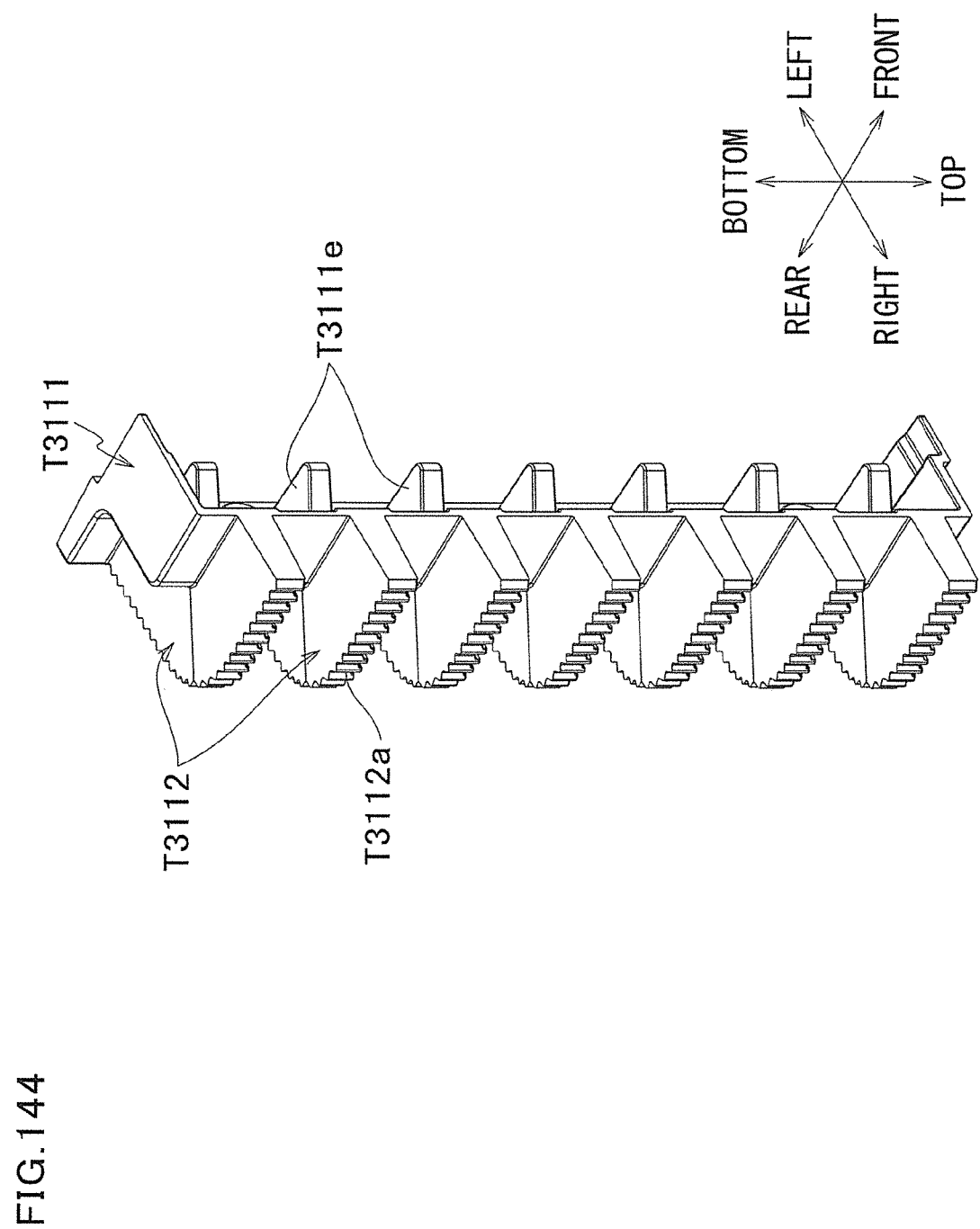
FIG. 144 is a perspective view of the upper rear illumination member.

The base main body portion T3111a described above has a stepped top surface. In the meanwhile, as shown in FIG. 144, the under surface of the base main body portion T3111a is flat. With this, the vertical direction of the upper rear illumination member T311 can be confirmed by visually checking the difference between the top surface and the under surface of the base main body portion T3111a.

(Traveling Paths of Illumination Light)

Figure 139B:
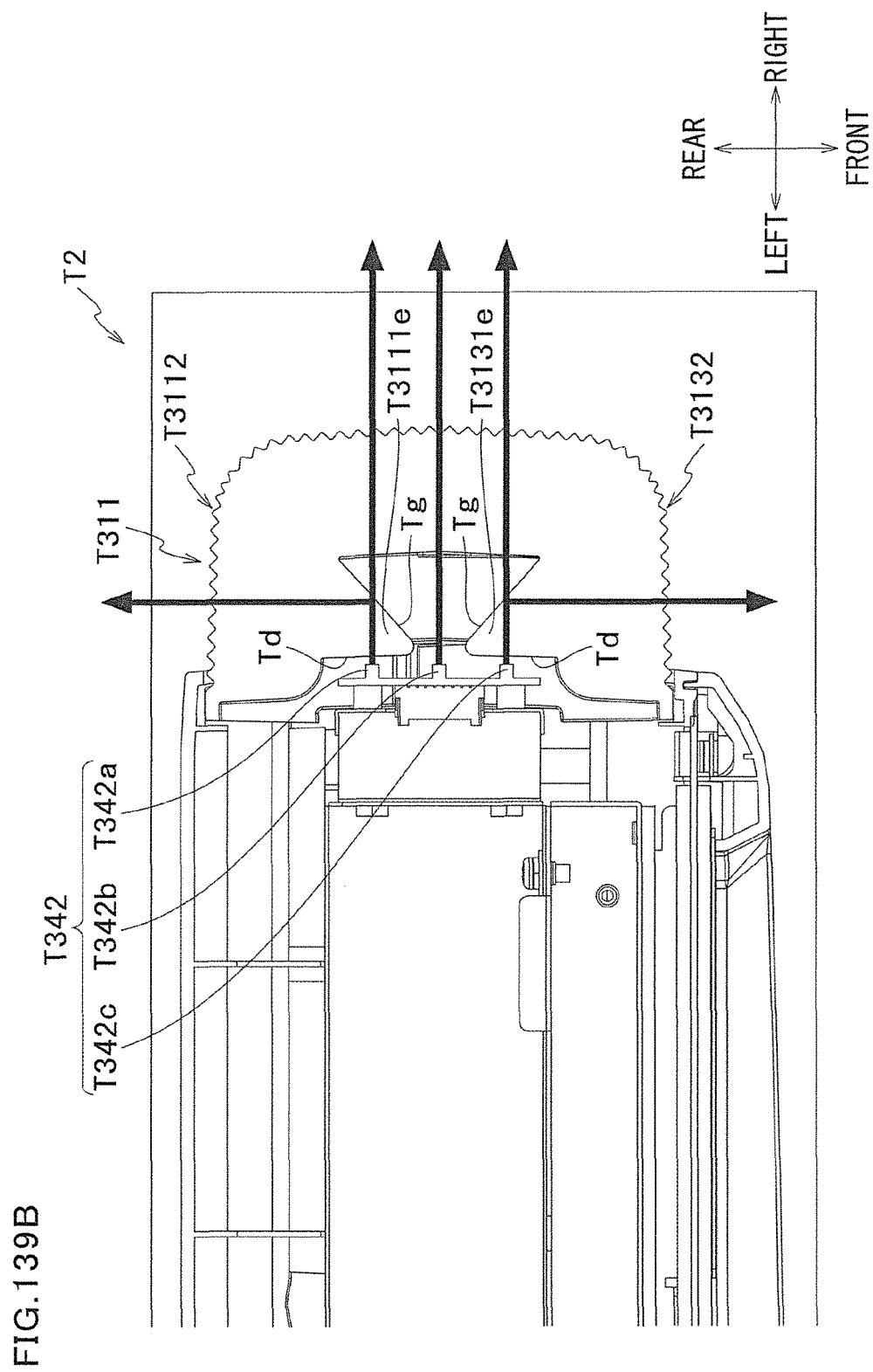
FIG. 139B is an explanatory diagram showing a traveling path of illumination light.

Now, with reference to FIG. 139B, the traveling paths of the illumination light emitted from the light source T342 of the upper illumination member T31 provided on the right side will be specifically described. In the figure, the full lines indicate the optical axes of the illumination light emitted from the light source T342.

As the illumination light is emitted rightward from the light source T342a which is provided on the back side in the horizontal plane, the illumination light enters the first side Td of the light guiding portion T3111e in the direction orthogonal to the first side Td. When the illumination light advances in the light guiding portion T3111e and reaches the oblique side Tg, a part of the illumination light linearly advances rightward whereas the remaining part of the illumination light is reflected in accordance with the incident angle, at the oblique side Tg which is the interface with the air. That is to say, because the light guiding portion T3111e is a rectangular equilateral triangle, the oblique side Tg of the light guiding portion T3111e is the interface which forms an angle of 45 degrees with the illumination light. Therefore, as the illumination light advances in the incident angle of 45 degrees with respect to the oblique side Tg, the illumination light is reflected backward at a reflection angle of 45 degrees.

As a result, in the illumination light emitted from the light source T342a on the back side, a part of the light advances rightward by the light guiding portion T3111e and the remaining part advances backward, with the result that the illumination light is emitted from the light scattering member T3112 in a state of being divided into an optical axis extending backward of the topper device T2 and an optical axis extending rightward of the topper device T2.

When the illumination light is emitted rightward from the light source T342b provided in the middle part in the horizontal direction, the illumination light passes through a gap between the light guiding portions T3111e and T3131e and reaches the light scattering members T3112 and T3132. The light is then emitted from the light scattering member T3112 as illumination light having an optical axis extending rightward of the topper device T2.

When the illumination light is emitted rightward from the light source T342c which is provided on the front side in the horizontal plane, this illumination light enters the first side Td of the light guiding portion T3131e in the direction orthogonal to the first side Td. When the illumination light advances in the light guiding portion T3131e and reaches the oblique side Tg, a part of the illumination light passes through and advances linearly rightward at the oblique side Tg which is the interface with the air. The remaining part of the illumination light advances in an incident angle of 45 degrees with respect to the oblique side Tg, and is reflected forward at a reflection angle of 45 degrees.

As a result, in the illumination light emitted from the light source T342c on the front side, a part of the light advances rightward by the light guiding portion T3131e whereas the remaining part advances frontward, with the result that the illumination light is emitted from the light scattering member T3132 in a state of being divided into an optical axis extending frontward of the topper device T2 and an optical axis extending rightward of the topper device T2.

As such, the upper rear illumination member T311 emits illumination light with the optical axes extending frontward, backward, and rightward of the slot machine 1. As shown in FIG. 114, as the upper illumination members T31 on the left side, which are structurally identical with and are symmetrical with the upper illumination members T31 on the right side, emit the illumination light with the optical axes extending forward, backward, and leftward from the slot machine 1, the left and right upper illumination members T31 emit the illumination light in all four directions including the forward, leftward, rightward, and backward from the topper device T2. In a similar manner, with the same mechanism of emission the illumination light, the left and right lower illumination members T32 emit the illumination light in all four directions including frontward, leftward, rightward, and backward from the topper device T2.

The other arrangements are identical with those in Embodiment 1 and the explanations thereof are therefore omitted. While in Embodiment 2 the topper device T2 is fixed to the top device 3, the topper support mechanism T215 of the topper device T2 may be arranged to be identical with the topper support mechanism 215 of Embodiment 1, and the topper device T2 may be rotatable between the front-facing posture and the tilted posture and the display plate module T2117 may be replaceable from a side.

Embodiment 3

It should be noted that the following describes a structure in which a gaming machine of the present invention includes a slot machine 1 of at least one of Embodiment 1 and Embodiment 2.

(Outline of Gaming Machine and Definitions of Terms)

Figure 147:
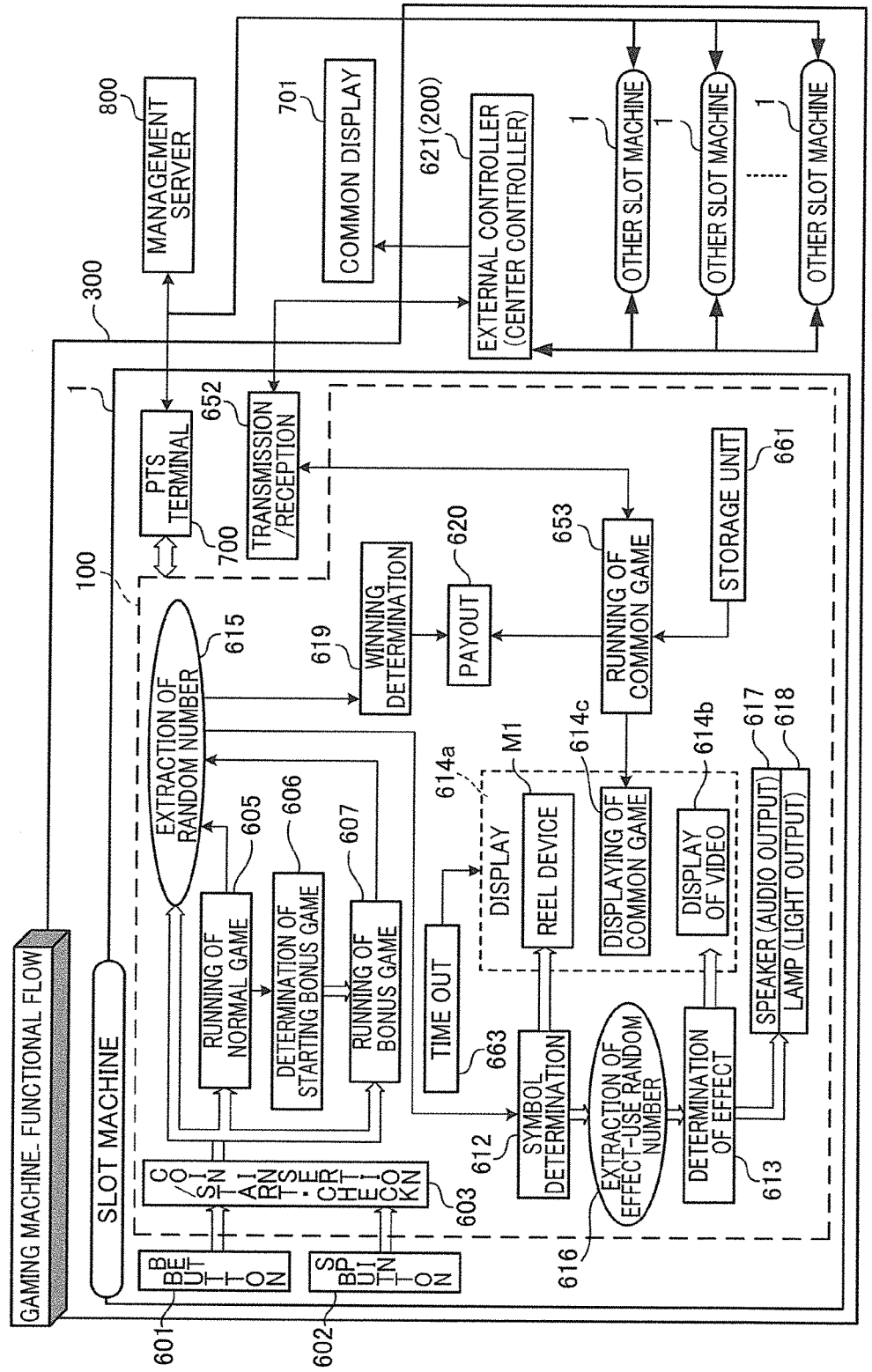
FIG. 147 is a functional block diagram of the gaming machine.

As shown in FIG. 147, a gaming machine 300 is a multi-player gaming machine in which a plurality of slot machines 1 that are gaming terminals are connected to a center controller 200 to be able to perform data communications with one another. The gaming machine 300 is able to run a base game such as a slot game at each slot machine 1 and run a common game at a common display 701 or the like which is a common display device, while synchronizing the slot machines 1. The slot machines 1 and the center controller 200 are connected wireless, by wires, or by both of them. A unit of bet amount may be a currency of a country or area such as dollar, yen, euro, or the like, or may be a game point used exclusively in a hall having the gaming machine 300 or in the industry.

More specifically, the gaming machine 300 includes the slot machines 1 and the center controller 200. The slot machines 1 each have an input device which accepts an external input, and a terminal controller which runs the base game and which is programmed to execute various steps in order to run a common game executed at more than one of the plurality of slot machines 1. The center controller 200 is connected in communication with the slot machines 1 and is programmed to execute various steps.

The terminal controller of the gaming machine 300 is arranged to be able to execute at least a first process in which a base game is run in response to a start command input to the input device, a second process in which a common game is run in response to a game start command from the center controller 200, and a third process in which a game result of the common game is determined based on game result information from the center controller 200.

It is noted that the "common game" is a sub game different from the main game of the gaming machine 300, and is run along with the basic game or run while the basic game is stopped. Examples of the common game include craps, baseball, and soccer.

The center controller 200 of the gaming machine 300 is arranged to be able to execute at least a first process in which a game start command is output at a predetermined timing to a slot machine 1 which satisfies a game running condition, a second process in which the game result of the common game is determined, and a third process in which the game result determined in the second process is output, as game result information, serially to the slot machines 1.

The "game running condition" is a condition for being qualified to participate in the common game. Examples of the game running condition include a cumulative value of a base game bet amount equal to or greater than a minimum bet amount, and the number of base games played being equal to or greater than a minimum number of bets. Note that the game running condition can be satisfied at the will of a player before the common game is begun. For example, when the cumulative value of bet amounts in the base game falls short of the minimum bet amount and the game running condition is not satisfied for this reason, the game running condition can be satisfied by paying a bet amount to compensate the differential between the minimum bet amount and the cumulative value of the bet amounts or making a payment for satisfying a predetermined condition, immediately before the common game is started. Further, in cases where the number of base games falls short, the game running condition can be satisfied by payment corresponding to the shortage, or by making a payment for satisfying a predetermined condition.

Further, the "predetermined timing" at which a game start command is outputted is a timing when a common game start condition has been satisfied at any one of the slot machines 1. Here, examples of the common game start condition include: accumulated bet amount information, and an accumulated base game count. Note that Embodiment 3 is described using the gaming machine 300 having a center controller 200 aside from the slot machines 1; however, the present invention is not limited to this. In other words, the gaming machine 300 may be configured in such a manner that at least one slot machine 1 has a function of the center controller 200, and the slot machines 1 may be connected with each other so as to allow data communications therebetween.

The "base game" in the present embodiment is run by the slot machines 1. The base game is a slot game where a plurality of symbols are rearranged. Note that the base game is not limited to slot game: The base game may be any type as long as it is independently runnable at gaming terminals such as slot machines 1.

The rearrangement of the symbols in the slot game is conducted on the reel device M1 (symbol display device). The slot game includes processes of: running a normal game on condition that a gaming value is bet, in which normal game the symbols are rearranged on the reel device M1, and awarding a normal payout according to the symbols rearranged; and when the symbols are rearranged on a predetermined condition, running a bonus game where the symbols are rearranged under such a condition that a payout rate thereof is greater than that of the normal game, and awarding a bonus payout according to the symbols rearranged.

The type and the number of the "symbols" is not limited as long as they are rearranged on the reel device M1, The symbols are a superordinate conception of the specific symbols and normal symbols. The specific symbols are added to the normal symbols according to need. For example, the specific symbols include wild symbols and trigger symbols. Each of the wild symbols is a symbol substitutable for any type of symbols. Each of the trigger symbols is a symbol which triggers at least a bonus game. Further, the trigger symbol may trigger increases in the number of specific symbols in the bonus game, that is, the trigger symbol may trigger increases in the number of trigger symbols and/or wild symbols. Furthermore, the trigger symbol may function as a trigger of increase in the number of times to run the bonus game.

A coin, a bill, or electrically valuable information corresponding to these is used as a gaming value. Note that the gaming value in the present invention is not particularly limited. Examples of the gaming value include game media such as medals, tokens, cyber money, tickets, and the like. A ticket is not particularly limited, and a later-mentioned barcoded ticket may be adopted for example.

The "bonus game" has a same meaning as a "feature game". In Embodiment 3, the bonus game is a game in which free games are repeated. However, the bonus game is not particularly limited and may be any type of game, provided that the bonus game is more advantageous than the normal game for a player. Another bonus game may be adopted in combination, provided that a player is given more advantageous playing conditions than the normal game. For example, the bonus game may be a game that provides a player with a chance of winning more gaming values than the normal game or a game that provides a player with a higher chance of winning gaming values than the normal game. Alternatively, the bonus game may be a game that consumes fewer amounts of gaming values than the normal game. In the bonus game, these games may be provided alone or in combination.

The "free game" is a game runnable with a bet of fewer gaming values than the normal game. Note that "bet of fewer amounts of gaming values" encompasses a bet of zero gaming value. The "free game" therefore may be a game runnable without a bet of a gaming value, which free game awards an amount of gaming values based on symbols rearranged. In other words, the "free game" may be a game which is started without consumption of a gaming value. To the contrary, the "normal game" is a game runnable on condition that a gaming value is bet, which normal game awards an amount of gaming value based on the symbols rearranged. In other words, the "normal game" is a game which starts with consumption of a gaming value.

The expression "rearrange" in this specification means dismissing an arrangement of symbols, and arranging symbols once again. Arrangement means a state where the symbols can be visibly confirmed by a player.

The phrase "base payout based on the rearranged symbols" means a normal payout corresponding to a rearranged winning combination. The phrase "bonus payout based on the rearranged symbols" means a bonus payout corresponding to a rearranged winning combination. Furthermore, the term "winning combination" indicates that a winning is established.

Examples of a "condition in which a payout rate is higher than in the normal game" includes the running of a free game and the running of a game in which the number of wild symbols or trigger symbols is increased or a replaced symbol table is used. In the base game, a rescue process may be executed when a rescue start condition is established.

The "rescue process" is a process for rescuing players. Examples of the rescue process include: running a free game, running a game in which the number of wild symbols or trigger symbols is increased or a replaced symbol table is used, and awarding an insurance payout.

Examples of the "rescue start condition" include a state in which the normal game is excessively repeated, i.e., the normal game is repeated a predetermined number or more times and a state in which the total amount of the obtained payout is excessively small, i.e., the normal payout and the bonus payout that a single player obtained as a result of playing a game a predetermined number or more times are not higher than a predetermined value. The "rescue process" is a process for rescuing players. Examples of the rescue process include: running a free game, running a game in which the number of wild symbols or trigger symbols is increased or a replaced symbol table is used, and awarding an insurance payout.

In addition to the above, the gaming machine 300 includes a common display 701 which is installed to be visible from the operating positions of all slot machines 1. The center controller 200 may cause the common display 701 to display states until the common game start condition is established. It is noted that the "operating position" is the eye level position of the player at each slot machine 1. The gaming machine 300 arranged in this way allows each player to estimate the waiting time until the common game starts, by displaying on the common display 701 the states until the common game start condition is established.

(Functional Flow of Gaming Machine 300: Slot Machine)

The gaming machine 300 having the above structure has slot machines 1 and an external controller 621 (center controller 200) connected to the slot machines 1 so as to allow data communications therebetween. The external controller 621 are connected to the slot machines 1 installed in the hall so that data communications is possible therebetween.

The slot machines 1 each include a bet button 601, a spin button 602, a display 614, and a game controller 100 which controls these units. Note that the bet button 601 and the spin button 602 each are a kind of an input device. Further, the slot machine 1 includes a transceiver unit 652 which enables data communications with the external controller 621.

The bet button 601 has a function of accepting a bet amount through a player's operation. The spin button 602 has a function of accepting a start of a game such as normal game through a player's operation, that is, a start operation. The display 614 has a function of displaying still-image information and moving-image information. Examples of the still-image information are various types of symbols, numeral values, and signs. Examples of the moving-image information include effect video. The display 614 has a symbol display region 614a, an image display region 614b, and a common game display region 614c.

The symbol display region 614a includes the reel device M1 and displays the symbols shown in FIG. 1. The image display region 614b displays various types of effect image information to be displayed during a game, in the form of a moving image or a still image. The common game display region 614c is a region where a common game such as a jackpot game is displayed.

The game controller 100 includes: a coin insertion/start-check unit 603; a normal game running unit 605; a bonus game start determining unit 606; a bonus game running unit 607; a random number sampling unit 615; a symbol determining unit 612; an effect-use random number sampling unit 616; an effect determining unit 613; a speaker unit 617; a lamp unit 618; a winning determining unit 619; and a payout unit 620.

The normal game running unit 605 has a function of running a normal game on condition that the bet button unit 601 has been operated. The bonus game start determining unit 606 determines whether to run a bonus game, based on a combination of rearranged symbols resulted from the normal game. In other words, the bonus game start determining unit 606 has functions of: (i) determining that the player is entitled to a bonus game when one or more trigger symbols rearranged satisfy a predetermined condition; and (b) activating the bonus game running unit 607 so as to run a bonus game from the subsequent unit game.

Note that a unit game includes a series of operations executed within a period between a start of receiving a bet and a point where a winning may be resulted. For example, bet reception, rearrangement of symbols having been stopped, and a payout process to award a payout are executed once each within a single unit game of the normal game. Note that a unit game in a normal game is referred to as a unit normal game.

The bonus game running unit 607 has a function of running the bonus game which repeats a free game for a plurality of times, merely in response to an operation on the spin button 602.

The symbol determining unit 612 has functions of: determining symbols to be rearranged based on a random number given from the random number sampling unit 615; rearranging the determined symbols in the symbol display region 614a of the display 614; outputting information on rearrangement of the rearranged symbols to the winning determining unit 619; and outputting an effect specifying signal to the effect-use random number sampling unit 616, based on the rearrangement of the symbols.

The effect-use random number sampling unit 616 has functions of: when receiving the effect instruction signal from the symbol determining unit 612, extracting an effect-use random number; and outputting the effect-use random number to the effect determining unit 613. The effect determining unit 613 has functions of: determining an effect by using the effect-use random number; outputting image information on the determined effect in the image display region 614b of the display 614; outputting audio and illumination information on the determined effect to the speaker unit 617 and the lamp unit 618, respectively.

The winning determining unit 619 has functions of: determining whether a winning is achieved when information on symbols rearranged and displayed on the display 614 is given; calculating an amount of payout based on a winning combination formed when it is determined that a winning has been achieved; outputting to the payout unit 620 a payout signal which is based on the payout amount. The payout unit 620 has a function of paying out a gaming value to a player in the form of a coin, a medal, a credit, or the like. Further, the payout unit 620 has a function of adding credit data to credit data stored on an IC card 500 inserted into a later-described PTS terminal 700, the credit data to be added corresponding to the credit to be paid out.

In addition to the above, the game controller 100 includes an not-shown storage unit 661 which stores game-related information such as bet amount data. The storage unit 661 is a storage device which stores data in a rewritable manner, such as a hard disk and a memory.

Further, the game controller 100 has a common game running unit 653. The common game running unit 653 has functions of: outputting bet amount information to the external controller 621 for each unit base game, the bet amount information being based on a bet amount placed as a bet on a normal game; running a common game in response to a game start command from the external controller 621; and accepting a bet input through the bet button unit 601 when the bet input corresponds to common game bet amount data indicating a bet amount bettable on the common game.

Further, the game controller 100 is connected to the PTS terminal 700. The PTS terminal 700 is a unit in which an LCD, a microphone, a human body detection camera, etc. are integrated, and has, for example, a function of executing an effect for a game by mutual communications with the game controller 100. In particular, the PTS terminal 700 has a card slot to which an IC card can be inserted. Thus allows a player to use a credit stored on an IC card at a slot machine 1, by inserting the IC card into the card slot. Note that a mechanical structure of the PTS terminal 700 is detailed later.

Further, when receiving credit data from the PTS terminal 700, the game controller 100 updates a credit display on the display 614. Further, when a cash out occurs, the game controller 100 outputs cash-out credit data to the PTS terminal 700.

The PTS terminal 700 of each of the plurality of slot machines 1 constituting the gaming machine 300 is connected in communication with a management server 800, which performs central management of image downloading, IC cards 500, and credits.

(Functional Flow of Gaming Machine 300: External Controller)

The gaming machine 300 arranged as above is connected to an external controller 621. The external controller 621 has a function of remotely operating and remotely monitoring an operating status of each slot machine 1 and a process such as change in various game setting values. Furthermore, the external controller 621 has a function of determining the common game start condition for each gaming terminal, and running the common game at a plurality of slot machines 1 when a result satisfying the common game start condition is achieved in any one of the gaming terminals.

Figure 148:
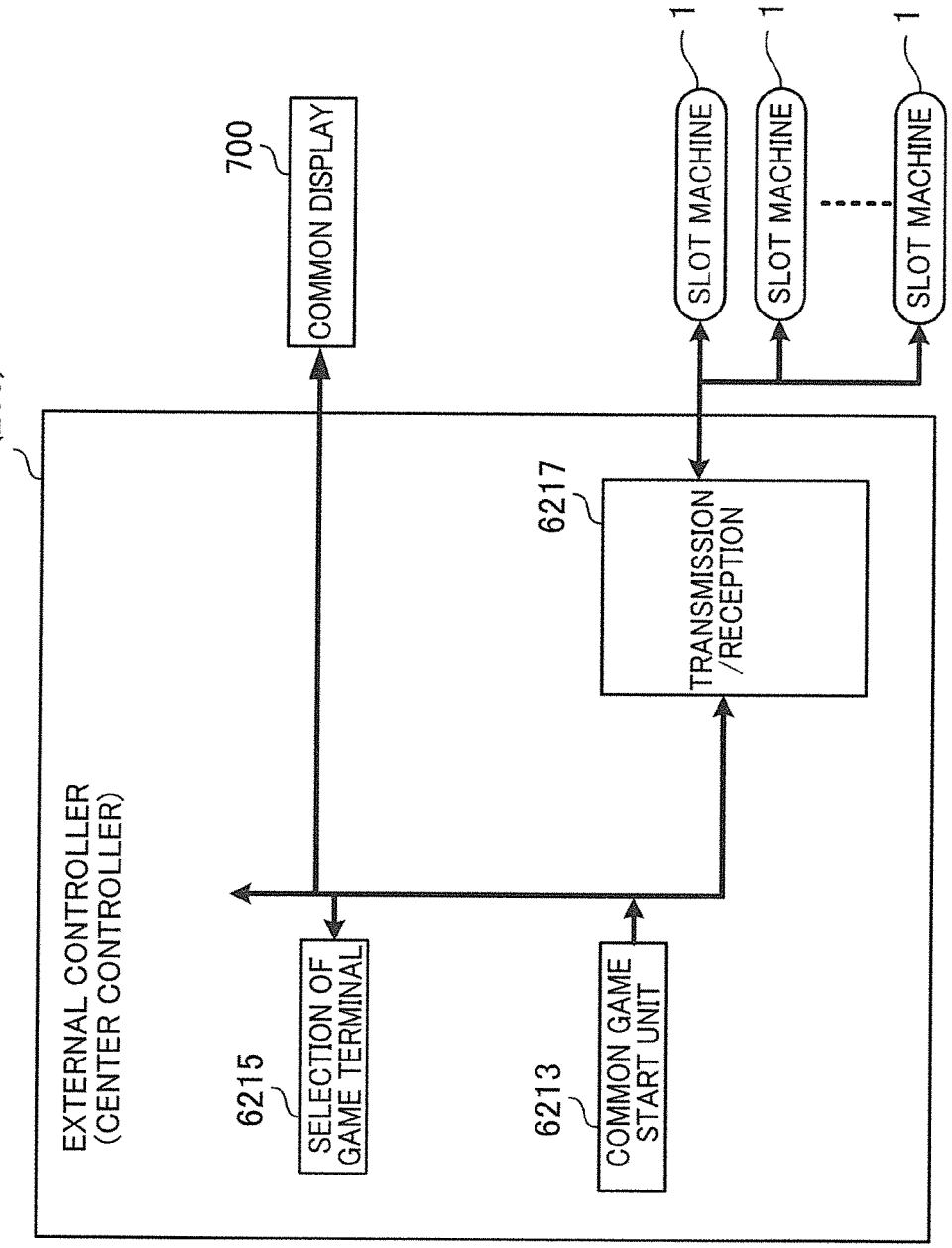
FIG. 148 is a block diagram of an external controller.

More specifically, as shown in FIG. 148, the external controller 621 includes a common game start unit 6213, a gaming terminal selection unit 6215, and a transceiver unit 6217. The common game start unit 6213 has functions of: determining whether the common game start condition is established, based on accumulated bet amount information transmitted from each slot machine 1 in each unit base game; outputting a game start command to the plurality of slot machines 1; and displaying on the common display 701 a screen showing states until the common game start condition is established.

Note that the determination of whether the common game start condition is established is made based on accumulated bet amount information, as well as all the accumulated values which increase according to repetition of the unit base games. The accumulated value may be, for example, the number of basic games having played or the gaming period of the base game.

In addition to the above, the common game start unit 6213 has a function of outputting a game start command to a slot machine 1 in which the accumulated value which increases as the base game is repeated satisfies the game running condition. Accordingly, the common game start unit 6213 does not qualify the one or more slot machines 1 whose accumulated value is less than the minimum setting value to participate in the common game. This motivates the player to proactively repeat base games.

Further, the common game start unit 6213 has functions of monitoring the no-input period during which no start operation is executed, and outputting a game start command to all the slot machines 1 except one or more slot machines 1 whose no-input period equals or exceeds the time-out period. Thus, the common game start unit 6213 is capable of determining that no player is present at a slot machine 1 where no base game is run for a period of time equal to or longer than the time-out period, thus preventing such a slot machine 1 from running the common game.

The gaming terminal selection unit 6215 has a function of selecting a specific slot machine 1 from among the plurality of slot machines 1, and outputting a common game start command signal to the specific slot machine 1. The transceiver unit 6217 has a function of enabling data communications with the slot machines 1.

(Entire Structure of Game System)

The following describes a game system 350 having the gaming machine 300 with the above functions.

Figure 149:
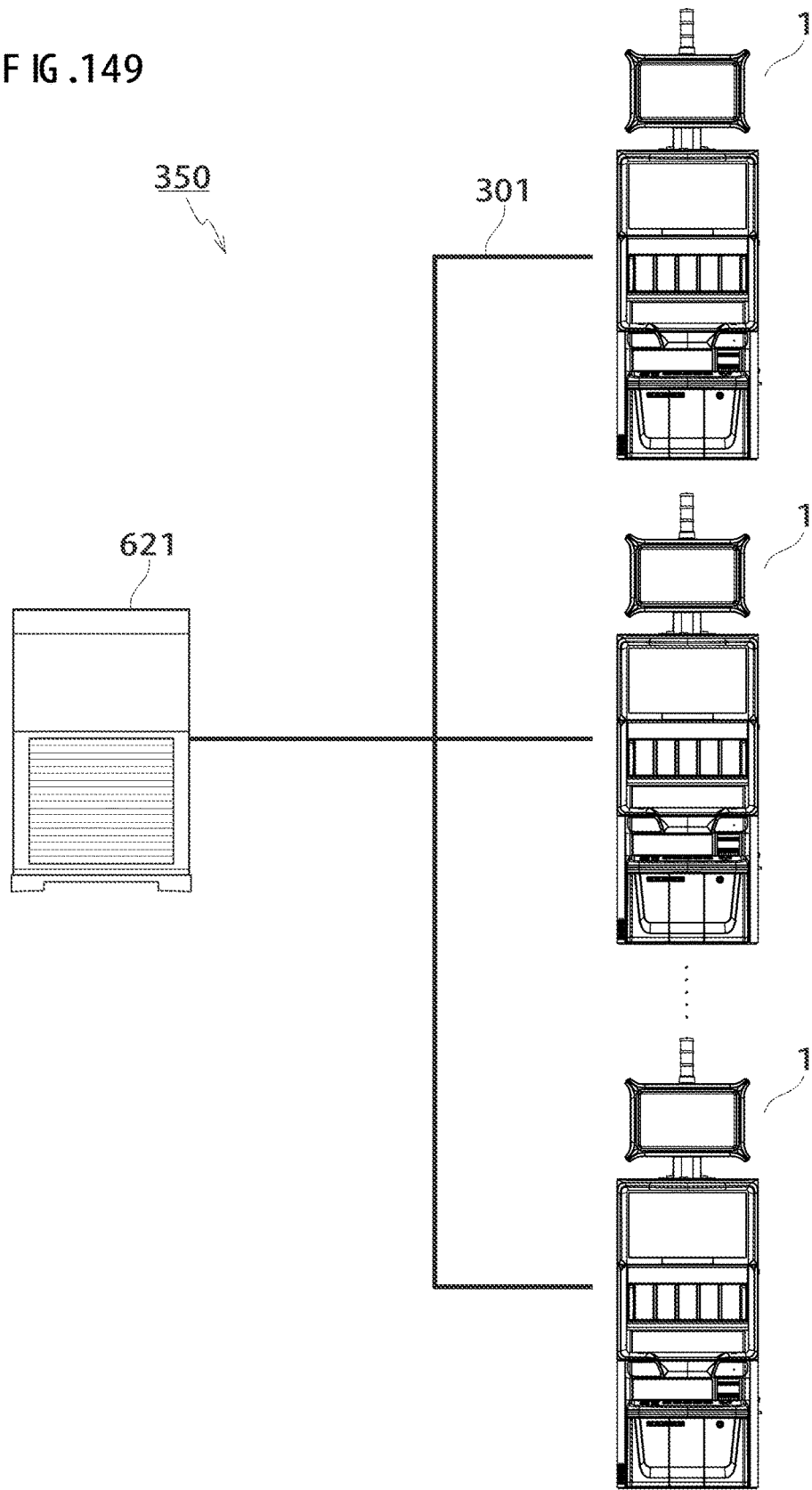
FIG. 149 is a schematic structural diagram of the gaming machine.

As shown in FIG. 149, the game system 350 includes a plurality of slot machines 1, and an external controller 621 which is connected to the slot machines 1 through communication lines 301.

The external controller 621 is for controlling the plurality of slot machines 1. In the present embodiment, the external controller 621 is a so-called hall server installed in a game arcade where the plurality of slot machines 1 are provided. Each slot machine 1 is allotted a unique identification number. The external controller 621 distinguishes an origin of data transmitted from each slot machine 1. Further, the external controller 621 determines transmission target of data with the identification number when transmitting data to a slot machine 1.

Note that the game system 350 may be installed in one game arcade where various games take place such as a casino, or between a plurality of game arcades. In a case of the game system 350 being installed in one game arcade, gaming systems 350 may be provided for each floor or each section of the game arcade. The communication line 301 may have a wired or wireless structure. A dedicated line or exchange line may be employed as the communication line 301.

Figure 150:
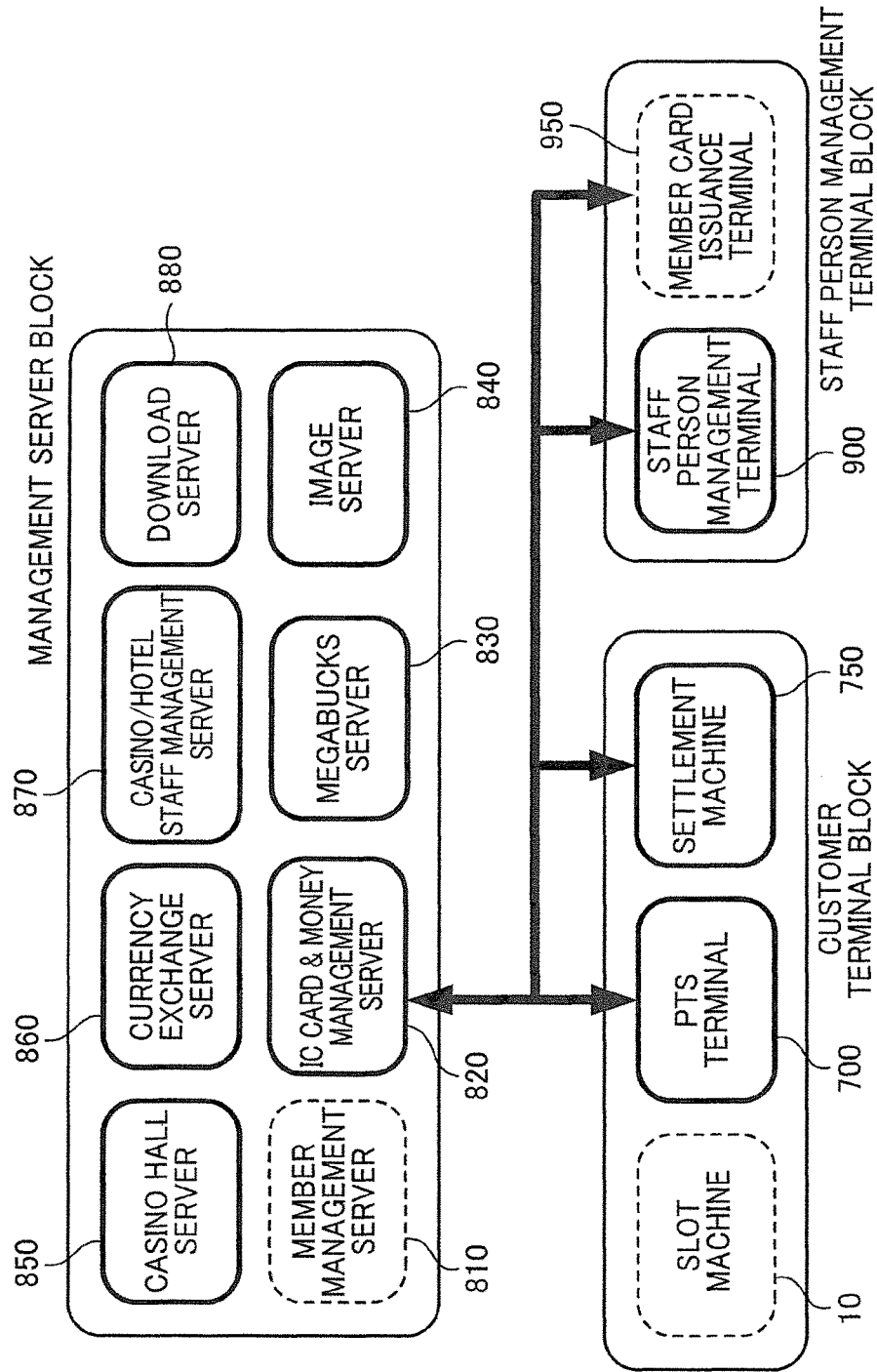
FIG. 150 is a block diagram of a game system.

As shown in FIG. 150, the game system is divided into three major blocks: a management server block, a customer terminal block, and a staff terminal block. The management server block has a casino hall server 850, a currency exchange server 860, a casino/hotel staff management server 870, and a download server 880.

The casino hall server 850 manages an entire casino hall where slot machines 1 are installed. The currency exchange server 860 creates currency exchange rate data, based on currency exchange information and the like. The casino/hotel staff management server 870 manages the casino hall, or staff persons of a hotel associated with the casino hall. The download server 880 downloads the newest information such as information or news related to a game, and informs a player to the newest information through the PTS terminal 700 of each slot machine 1.

Further, the management server block has a member management server 810, an IC card & money management server 820, a megabucks server 830, and an image server 840.

The member management server 810 manages membership information of a player who plays at the slot machine 1. The IC card & money management server 820 manages an IC card 500 utilized at the slot machine 1. Specifically, the IC card & money management server 820 stores broken number cash data in association with an identification code, outputs the broken number cash data to the PTS terminal 700, and the like. Note that the IC card & money management server 820 creates and manages denomination rate data and the like. The megabucks server 830 manages a megabucks which is a game where a total amount of wagers is utilized as a payout, the wagers being placed at slot machines 1 provided at a plurality of casino halls and the like, for example. The image server 840 downloads a newest image such as an image or news related to a game, and informs the player thereof, through the PTS terminal 700 of each slot machine 1.

The customer terminal block includes a slot machine 1, a PTS terminal 700, and a settlement machine 750. The PTS terminal 700 is attachable to a slot machine 1, and is capable of communicating with the management server 800. The settlement machine 750 performs settlement by converting cash data into cash, stores coins or bills T as cash data onto the IC card 500, and the like, the cash data being stored on the IC card 500 carried by the player.

The staff terminal block has a staff person management terminal 900 and a member card issuance terminal 950. The staff person management terminal 900 is provided for a staff person at the casino hall to manage various types of slot machines 1. Particularly in the present embodiment, the staff person management terminal 900 allows a staff person at the casino hall to check for a possible excess number of IC cards 500 stocked in the PTS terminal 700, or shortage of IC cards 500 in the PTS terminal 700. The member card issuance terminal 950 is for a player who plays games at the casino hall to obtain a member card.

(PTS Terminal 700)

Figure 151:
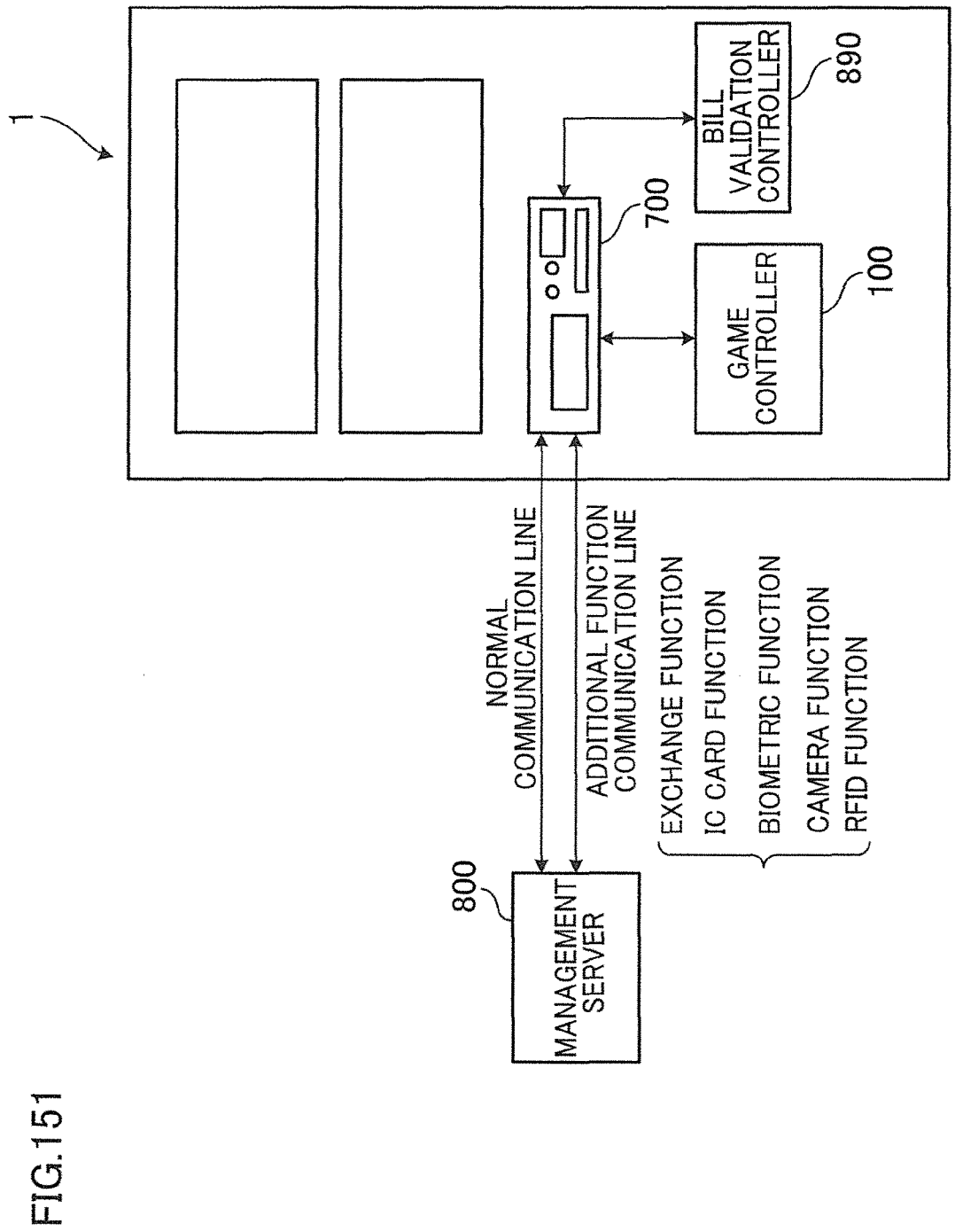
FIG. 151 is a block diagram of a PTS system.
Figure 152:
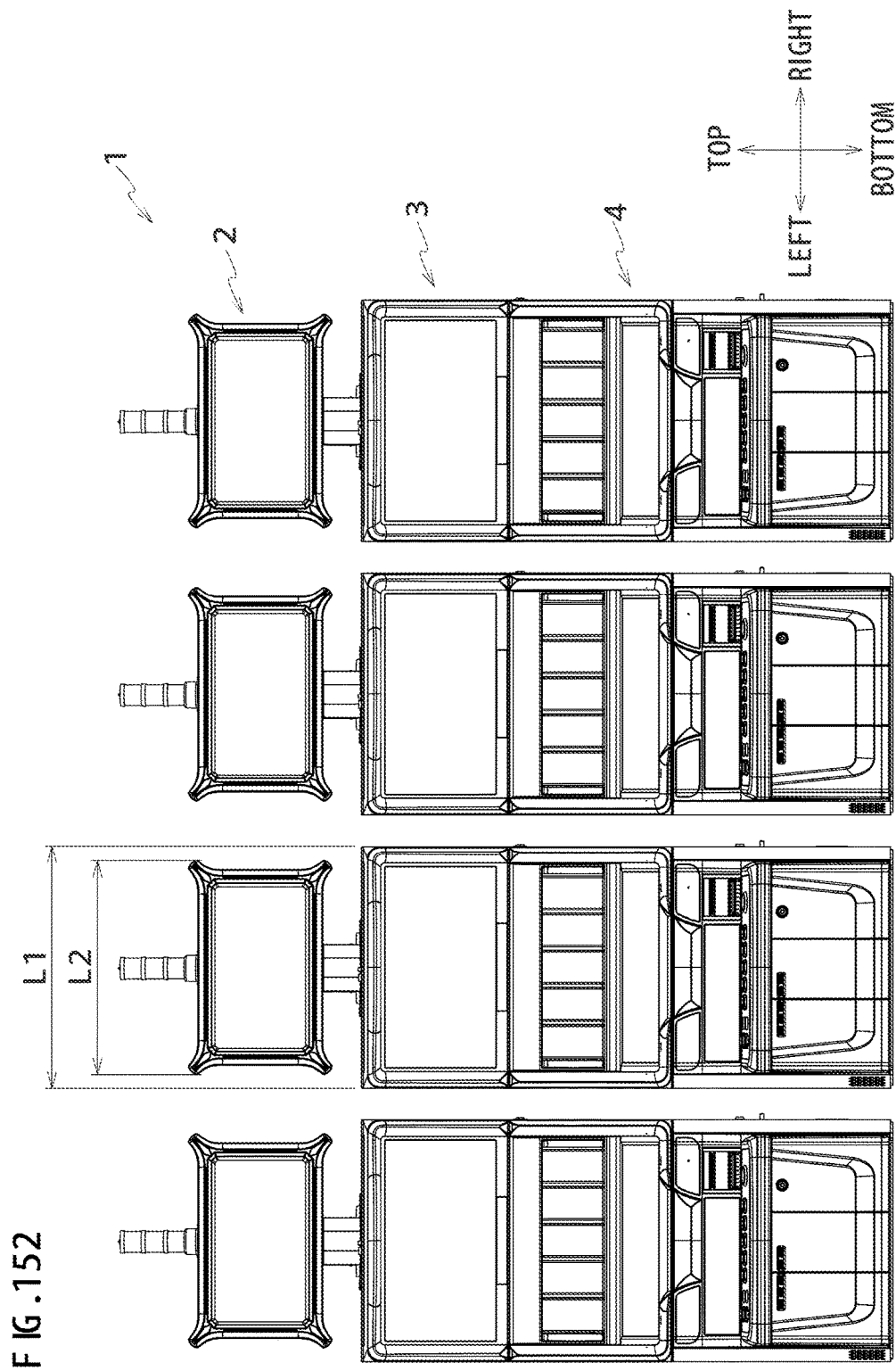
FIG. 152 is a block diagram of the PTS system.

The PTS terminal 700 is incorporated in a PTS system, as shown in FIG. 151. The PTS terminal 700 attached to the slot machine 1 is arranged to be able to communicate with the game controller 100 of the slot machine 1 and the bill validation controller 890.

Through communication with the game controller 100, the PTS terminal 700 executes an effect of a game with a sound or an image, updates credit data, and the like. Further, through communication with the bill validation controller 890, the PTS terminal 700 transmits credit data necessary for settlement.

Further, the PTS terminal 700 is connected in communication with the management server 800. The PTS terminal 700 communicates with the management server 800 through the two lines: a normal communication line and an additional function communication line.

Through the normal communication line, the PTS terminal 700 communicates data such as cash data, identification code data, player membership information, and the like. Meanwhile, through the additional function communication line, the PTS terminal 700 executes communication related to an additional function. In the present embodiment, through the additional function communication line, the PTS terminal 700 executes communication related to an exchange function, and IC card function, a biometric function, a camera function, a RFID (Radio Frequency Identification) function which is for executing a solid-matter identification function with radio wave.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available. The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine comprising:
a storage unit;
an SSD device including a storage area and a storage area control component that controls the storage area; and,
a control unit,
wherein,
the storage area includes:
a first partition that stores a game program that executes a game;
a second partition that stores an authentication program that authenticates the game program, the authentication program including an authentication key; and,
a boot record storing, in advance, encrypted data that is an encrypted signature based on data in the second partition,
the storage area control component includes a reference key storage unit that stores a reference key corresponding to the authentication key, information stored in the reference key storage unit not directly accessible from outside, the reference key being unique identification information of the SSD device,
the storage unit stores a public key that decrypts the encrypted data, and,
the control unit executes the steps of:
decrypting the encrypted data with the public key to obtain decrypted data indicating the signature based on the data in the second partition;
obtaining reference data corresponding to the encrypted data based on the data in the second partition of the gaming machine;
determining whether the decrypted data and the reference data match each other;
determining that authentication of the second partition is successful when it is determined that the decrypted data and the reference data match each other;
retrieving the reference key from the storage area control component when the authentication of the second partition is successful, and determining whether the authentication key and the reference key match each other;
executing authentication of the game program by the authentication program when it is determined that the authentication key and the reference key match each other; and
starting the game by running the game program when the authentication of the game program is successful.

2. The gaming machine according to claim 1, wherein when the authentication key and the reference key are determined to not match, ending a booting process and outputting an error message.

3. The gaming machine of claim 1, wherein an operating system is stored in the second partition.

4. A method of authenticating a system including:
a storage unit;
an SSD device including a storage area and a storage area control component that controls the storage area; and
a control unit,
wherein,
the storage area includes:
a first partition that stores a program that executes an operation;

a second partition that stores an authentication program for authentication the program, the authentication program including an authentication key; and a boot record storing in advance encrypted data which is an encrypted signature based on data in the second partition, the storage area control component includes a reference key storage unit that stores a reference key corresponding to the authentication key, information stored in the reference key storage unit not directly accessible from outside, the reference key being unique identification information of the SSD device, and the storage unit stores a public key for decrypting the encrypted data, the method comprising, with the control unit, executing the steps of:

decrypting the encrypted data with the public key to obtain decrypted data indicating the signature based on the data in the second partition;

obtaining reference data corresponding to the encrypted data based on the data in the second partition;

determining whether the decrypted data and the reference data match with each other;

determining that authentication of the second partition is successful when it is determined that the decrypted data and the reference data match each other;

retrieving the reference key from the storage area control component when the authentication of the second partition is successful, and determining whether the authentication key and the reference key match each other;

executing authentication of the program by the authentication program when it is determined that the authentication key and the reference key match with each other; and starting the program when the authentication of the program is successful.

\* \* \* \* \*